United States Patent
Lu et al.

(10) Patent No.: US 10,101,538 B2
(45) Date of Patent: *Oct. 16, 2018

(54) HARDENED FIBER OPTIC CONNECTOR COMPATIBLE WITH HARDENED AND NON-HARDENED FIBER OPTIC ADAPTERS

(71) Applicant: CommScope Technologies LLC, Hickory, NC (US)

(72) Inventors: Yu Lu, Eden Prairie, MN (US); Randy Reagan, Morristown, NJ (US); Craig M. Standish, Waconia, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,778

(22) Filed: Oct. 6, 2016

(65) Prior Publication Data

US 2017/0123163 A1 May 4, 2017

Related U.S. Application Data

(60) Continuation of application No. 13/859,372, filed on Apr. 9, 2013, now Pat. No. 9,482,829, which is a
(Continued)

(51) Int. Cl.
*G02B 6/38* (2006.01)

(52) U.S. Cl.
CPC ......... *G02B 6/3825* (2013.01); *G02B 6/3821* (2013.01); *G02B 6/3849* (2013.01);
(Continued)

(58) Field of Classification Search
None
See application file for complete search history.

(56) References Cited

U.S. PATENT DOCUMENTS

| 2,950,338 A | 8/1960 | Taylor |
| 4,140,366 A | 2/1979 | Makuch et al. |

(Continued)

FOREIGN PATENT DOCUMENTS

| DE | 35 37 684 A1 | 4/1987 |
| DE | 10 2004 049 697 A1 | 4/2006 |

(Continued)

OTHER PUBLICATIONS

U.S. Appl. No. 60/607,696, filed Sep. 7, 2004 entitled "Optical Transceiver Module with Environmentally Sealed, Hardened, Strain Relieved and Shielded Adapter for Outside Plant Cable Assemblies".

(Continued)

*Primary Examiner* — Mike Stahl
(74) *Attorney, Agent, or Firm* — Merchant & Gould P.C.

(57) ABSTRACT

A fiber optic connector and cable assembly includes a cable with one or more strength members secured to a connector that is connectable to both a hardened and a non-hardened fiber optic adapter. The cable can include multiple cable types with various shapes and strength member configurations. The connector includes a connector housing having a one-piece main body and a cover piece mounted thereon. The one-piece main body defines a plug portion compatible with the adapters. A ferrule assembly is mounted in the plug portion and biased outwardly by a spring. An insert within the connector housing includes a spring stop for holding the spring and a cable retention portion for securing the strength members of the cable. The spring stop and the cable retention portion can be included on a one-piece insert or they can separately be included on separate inserts. The cable retention portion of the insert and the cover piece can take various forms suited for a particular cable of a given fiber optic connector and cable assembly.

16 Claims, 82 Drawing Sheets

Related U.S. Application Data continuation of application No. 12/825,111, filed on Jun. 28, 2010, now Pat. No. 8,414,196, which is a division of application No. 12/203,508, filed on Sep. 3, 2008, now Pat. No. 7,744,288.

(60) Provisional application No. 61/029,524, filed on Feb. 18, 2008, provisional application No. 61/007,222, filed on Dec. 11, 2007.

(52) U.S. Cl.
CPC ......... *G02B 6/3877* (2013.01); *G02B 6/3887* (2013.01); *G02B 6/3893* (2013.01); *G02B 6/3894* (2013.01)

(56) References Cited

U.S. PATENT DOCUMENTS

| | | |
|---|---|---|
| 4,140,367 A | 2/1979 | Makuch et al. |
| 4,142,776 A | 3/1979 | Cherin et al. |
| 4,174,882 A | 11/1979 | McCartney |
| 4,225,214 A | 9/1980 | Hodge et al. |
| 4,279,467 A | 7/1981 | Borsuk et al. |
| 4,291,943 A | 9/1981 | Binek et al. |
| 4,339,171 A | 7/1982 | Makuch et al. |
| 4,354,731 A | 10/1982 | Mouissie |
| 4,447,120 A | 5/1984 | Borsuk |
| 4,448,478 A | 5/1984 | Matthews |
| 4,515,434 A | 5/1985 | Margolin et al. |
| 4,611,887 A | 9/1986 | Glover et al. |
| 4,615,581 A | 10/1986 | Morimoto |
| 4,648,688 A | 3/1987 | Ashman et al. |
| 4,684,205 A | 8/1987 | Margolin et al. |
| 4,687,291 A | 8/1987 | Stape et al. |
| 4,705,352 A | 11/1987 | Margolin et al. |
| 4,715,675 A | 12/1987 | Kevern et al. |
| 4,725,120 A | 2/1988 | Parzygnat |
| 4,787,706 A | 11/1988 | Cannon, Jr. et al. |
| 4,793,683 A | 12/1988 | Cannon, Jr. et al. |
| 4,805,980 A | 2/1989 | Mackenroth |
| 4,815,810 A | 3/1989 | Betzler et al. |
| 4,820,185 A | 4/1989 | Moulin |
| 4,846,564 A | 7/1989 | Caron et al. |
| 4,854,664 A | 8/1989 | McCartney |
| 4,902,238 A | 2/1990 | Iacobucci |
| 4,907,853 A | 3/1990 | Hiratsuka |
| 4,961,623 A | 10/1990 | Midkiff et al. |
| 4,964,688 A | 10/1990 | Caldwell et al. |
| 4,974,925 A | 12/1990 | Troutman et al. |
| 4,979,792 A | 12/1990 | Weber et al. |
| 5,016,968 A | 5/1991 | Hammond et al. |
| 5,042,901 A | 8/1991 | Merriken et al. |
| 5,076,656 A | 12/1991 | Briggs et al. |
| 5,096,276 A | 3/1992 | Gerace et al. |
| 5,101,463 A | 3/1992 | Cubukciyan et al. |
| 5,104,242 A | 4/1992 | Ishikawa |
| 5,121,458 A | 6/1992 | Nilsson et al. |
| 5,123,071 A | 6/1992 | Mulholland et al. |
| 5,129,023 A | 7/1992 | Anderson et al. |
| 5,134,677 A | 7/1992 | Leung et al. |
| 5,136,672 A | 8/1992 | Mulholland et al. |
| 5,142,601 A | 8/1992 | Shibata et al. |
| 5,157,749 A | 10/1992 | Briggs et al. |
| 5,166,995 A | 11/1992 | Briggs et al. |
| 5,202,942 A | 4/1993 | Collins |
| 5,210,810 A | 5/1993 | Darden et al. |
| 5,212,752 A | 5/1993 | Stephenson et al. |
| 5,214,731 A | 5/1993 | Chang et al. |
| 5,214,732 A | 5/1993 | Beard et al. |
| 5,214,830 A | 6/1993 | Rozycki |
| 5,222,169 A | 6/1993 | Chang et al. |
| 5,259,052 A | 11/1993 | Briggs et al. |
| 5,263,105 A | 11/1993 | Johnson et al. |
| 5,265,181 A | 11/1993 | Chang |
| 5,267,342 A | 11/1993 | Takahashi et al. |
| 5,268,982 A | 12/1993 | Schaffer et al. |
| 5,271,080 A | 12/1993 | Hopper et al. |
| 5,274,729 A | 12/1993 | King et al. |
| 5,276,750 A | 1/1994 | Manning |
| 5,283,848 A | 2/1994 | Abendschein et al. |
| 5,283,853 A | 2/1994 | Szegda |
| 5,293,581 A | 3/1994 | DiMarco |
| 5,293,582 A | 3/1994 | Beard et al. |
| 5,313,540 A | 5/1994 | Ueda et al. |
| 5,315,679 A | 5/1994 | Baldwin et al. |
| 5,317,663 A | 5/1994 | Beard et al. |
| 5,359,688 A | 10/1994 | Underwood |
| 5,363,459 A | 11/1994 | Hultermans |
| 5,367,594 A | 11/1994 | Essert et al. |
| 5,390,270 A | 2/1995 | Hanzawa et al. |
| 5,392,373 A | 2/1995 | Essert |
| 5,394,497 A | 2/1995 | Erdman et al. |
| 5,408,557 A | 4/1995 | Hsu |
| 5,418,874 A | 5/1995 | Carlisle et al. |
| 5,428,703 A | 6/1995 | Lee |
| 5,450,517 A | 9/1995 | Essert |
| 5,465,313 A | 11/1995 | Belenkiy et al. |
| 5,475,782 A | 12/1995 | Ziebol |
| 5,481,634 A | 1/1996 | Anderson et al. |
| 5,548,677 A | 8/1996 | Kakii et al. |
| 5,569,050 A | 10/1996 | Lloyd |
| 5,577,145 A | 11/1996 | Musk |
| 5,590,229 A | 12/1996 | Goldman et al. |
| 5,633,970 A | 5/1997 | Olson et al. |
| 5,636,306 A | 6/1997 | Mock et al. |
| 5,638,474 A | 6/1997 | Lampert et al. |
| 5,668,906 A | 9/1997 | Yamamura et al. |
| 5,680,494 A | 10/1997 | Kaas |
| 5,682,450 A | 10/1997 | Patterson et al. |
| 5,682,451 A | 10/1997 | Lee et al. |
| 5,715,342 A | 2/1998 | Nodfelt et al. |
| 5,732,174 A | 3/1998 | Carpenter et al. |
| 5,751,874 A | 5/1998 | Chudoba |
| 5,778,122 A | 7/1998 | Giebel et al. |
| 5,806,175 A | 9/1998 | Underwood |
| 5,809,192 A | 9/1998 | Manning et al. |
| 5,862,289 A | 1/1999 | Walter et al. |
| 5,887,095 A | 3/1999 | Nagase |
| 5,892,870 A | 4/1999 | Fingler et al. |
| 5,896,477 A | 4/1999 | Stephenson et al. |
| 5,905,832 A | 5/1999 | Afille et al. |
| 5,909,526 A | 6/1999 | Roth et al. |
| 5,920,669 A | 7/1999 | Knecht et al. |
| 5,923,804 A | 7/1999 | Rosson |
| 5,923,805 A | 7/1999 | Anderson et al. |
| 5,940,559 A | 8/1999 | Noll |
| 5,946,436 A | 8/1999 | Takashi |
| 5,971,625 A | 10/1999 | Lu |
| 5,980,118 A | 11/1999 | Henningsson et al. |
| 5,984,532 A | 11/1999 | Tamaki et al. |
| 5,993,070 A | 11/1999 | Tamekuni et al. |
| 5,993,071 A | 11/1999 | Hultermans |
| 6,022,150 A | 2/2000 | Erdman et al. |
| 6,079,881 A | 6/2000 | Roth |
| 6,149,313 A | 11/2000 | Giebel et al. |
| 6,149,451 A | 11/2000 | Weber |
| 6,151,432 A | 11/2000 | Nakajima et al. |
| RE37,028 E | 1/2001 | Cooke et al. |
| 6,173,097 B1 | 1/2001 | Throckmorton et al. |
| 6,178,283 B1 | 1/2001 | Weigel |
| 6,179,475 B1 | 1/2001 | Takamatsu et al. |
| 6,179,482 B1 | 1/2001 | Takizawa et al. |
| 6,186,670 B1 | 2/2001 | Austin et al. |
| 6,188,822 B1 | 2/2001 | McAlpine et al. |
| RE37,079 E | 3/2001 | Stephenson et al. |
| RE37,080 E | 3/2001 | Stephenson et al. |
| 6,206,579 B1 | 3/2001 | Selfridge et al. |
| 6,224,270 B1 | 5/2001 | Nakajima et al. |
| 6,234,683 B1 | 5/2001 | Waldron et al. |
| 6,234,685 B1 | 5/2001 | Carlisle et al. |
| 6,254,278 B1 | 7/2001 | Andrews et al. |
| 6,261,006 B1 | 7/2001 | Selfridge |
| 6,264,374 B1 | 7/2001 | Selfridge et al. |
| 6,298,190 B2 | 10/2001 | Waldron et al. |

(56) References Cited

U.S. PATENT DOCUMENTS

| | | |
|---|---|---|
| 6,302,594 B1 | 10/2001 | Lee |
| 6,305,849 B1 | 10/2001 | Roehrs et al. |
| 6,347,888 B1 | 2/2002 | Puetz |
| 6,350,063 B1 | 2/2002 | Gilliland et al. |
| 6,357,929 B1 | 3/2002 | Roehrs et al. |
| 6,371,660 B1 | 4/2002 | Roehrs et al. |
| 6,379,054 B2 | 4/2002 | Throckmorton et al. |
| 6,419,399 B1 | 7/2002 | Loder et al. |
| 6,419,402 B1 | 7/2002 | Zimmel |
| 6,422,764 B1 | 7/2002 | Mans |
| 6,427,035 B1 | 7/2002 | Mahony |
| 6,428,215 B1 | 8/2002 | Nault |
| 6,431,783 B2 | 8/2002 | Nakajima et al. |
| 6,435,732 B1 | 8/2002 | Asao et al. |
| 6,461,057 B2 | 10/2002 | Chen |
| 6,466,725 B2 | 10/2002 | Battey et al. |
| 6,496,641 B1 | 12/2002 | Mahony |
| 6,508,594 B1 | 1/2003 | Bruland |
| 6,522,804 B1 | 2/2003 | Mahony |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,550,977 B2 | 4/2003 | Hizuka |
| 6,568,861 B2 | 5/2003 | Benner et al. |
| 6,575,640 B2 | 6/2003 | Connelly et al. |
| 6,579,014 B2 | 6/2003 | Melton et al. |
| 6,599,026 B1 | 7/2003 | Fahrnbauer et al. |
| 6,614,980 B1 | 9/2003 | Mahony et al. |
| 6,619,697 B2 | 9/2003 | Griffioen et al. |
| 6,619,859 B1 | 9/2003 | Minamino et al. |
| 6,625,375 B1 | 9/2003 | Mahony |
| 6,629,782 B2 | 10/2003 | McPhee et al. |
| 6,648,520 B2 | 11/2003 | McDonald et al. |
| 6,652,156 B2 | 11/2003 | Shinagawa et al. |
| 6,655,851 B1 | 12/2003 | Lee |
| 6,663,292 B1 | 12/2003 | Shirakawa |
| 6,668,127 B1 | 12/2003 | Mahony |
| 6,672,774 B2 | 1/2004 | Theuerkorn et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,478 B2 | 3/2004 | Inagaki et al. |
| 6,705,764 B2 | 3/2004 | Shang |
| 6,714,710 B2 | 3/2004 | Gimblet |
| 6,729,773 B1 | 5/2004 | Finona et al. |
| 6,738,555 B1 | 5/2004 | Cooke et al. |
| 6,739,759 B1 | 5/2004 | Seeley |
| 6,767,141 B1 | 7/2004 | Dudek et al. |
| 6,783,281 B2 | 8/2004 | Cheng |
| 6,785,450 B2 | 8/2004 | Wagman |
| 6,789,950 B1 | 9/2004 | Loder et al. |
| 6,809,265 B1 | 10/2004 | Gladd et al. |
| 6,816,662 B2 | 11/2004 | Doss et al. |
| 6,817,902 B2 | 11/2004 | Bernardi et al. |
| 6,821,024 B2 | 11/2004 | Bates, III |
| 6,832,856 B2 | 12/2004 | Chiu et al. |
| 6,848,836 B2 | 2/2005 | Ueda et al. |
| 6,854,895 B2 | 2/2005 | Coffey et al. |
| 6,863,446 B2 | 3/2005 | Ngo |
| 6,899,467 B2 | 5/2005 | McDonald et al. |
| 6,909,821 B2 | 6/2005 | Ravasio et al. |
| 6,916,120 B2 | 7/2005 | Zimmel et al. |
| 6,918,703 B2 | 7/2005 | Chen et al. |
| 6,918,704 B2 | 7/2005 | Marrs et al. |
| 6,962,445 B2 | 11/2005 | Zimmel et al. |
| 6,974,265 B2 | 12/2005 | Chiu et al. |
| 7,008,116 B2 | 3/2006 | Kobayashi et al. |
| 7,011,454 B2 | 3/2006 | Caveney et al. |
| 7,025,507 B2 | 4/2006 | de Marchi |
| 7,035,513 B2 | 4/2006 | Mohler et al. |
| 7,044,650 B1 | 5/2006 | Tran et al. |
| 7,050,692 B2 | 5/2006 | Harlan et al. |
| 7,074,066 B2 | 7/2006 | Pepe |
| 7,076,144 B2 | 7/2006 | Loder et al. |
| 7,079,734 B2 | 7/2006 | Seddon et al. |
| 7,090,406 B2 | 8/2006 | Melton et al. |
| 7,090,407 B2 | 8/2006 | Melton et al. |
| 7,093,983 B2 | 8/2006 | Taira et al. |
| 7,111,990 B2 | 9/2006 | Melton et al. |
| 7,113,679 B2 | 9/2006 | Melton et al. |
| 7,114,857 B2 | 10/2006 | Kayner et al. |
| 7,121,731 B2 | 10/2006 | Weynant et al. |
| 7,121,732 B2 | 10/2006 | Pimpinella et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,175,352 B2 | 2/2007 | De Marchi |
| 7,178,990 B2 | 2/2007 | Caveney et al. |
| 7,182,522 B2 | 2/2007 | Sasaki et al. |
| 7,184,634 B2 | 2/2007 | Hurley et al. |
| 7,201,518 B2 | 4/2007 | Holmquist |
| 7,204,644 B2 | 4/2007 | Barnes et al. |
| 7,206,482 B2 | 4/2007 | Rhyne et al. |
| 7,207,727 B2 | 4/2007 | Tran et al. |
| 7,210,855 B2 | 5/2007 | Rossi et al. |
| 7,213,975 B2 | 5/2007 | Khemakhem et al. |
| 7,220,061 B2 | 5/2007 | De Marchi |
| 7,228,047 B1 | 6/2007 | Szilagyi et al. |
| 7,234,875 B2 | 6/2007 | Krowiak et al. |
| 7,234,876 B2 | 6/2007 | Ohtsu et al. |
| 7,234,877 B2 | 6/2007 | Sedor |
| 7,239,812 B2 | 7/2007 | Hung et al. |
| 7,244,066 B2 | 7/2007 | Theuerkorn |
| 7,255,486 B2 | 8/2007 | Cox et al. |
| 7,255,490 B2 | 8/2007 | Zhang et al. |
| 7,264,401 B2 | 9/2007 | Johnson |
| 7,264,402 B2 | 9/2007 | Theuerkorn et al. |
| 7,278,791 B2 | 10/2007 | Demaret et al. |
| 7,281,856 B2 | 10/2007 | Grzegorzewska et al. |
| 7,290,941 B2 | 11/2007 | Kiani et al. |
| 7,292,763 B2 | 11/2007 | Smith et al. |
| 7,302,152 B2 | 11/2007 | Luther et al. |
| 7,317,863 B2 | 1/2008 | Lu et al. |
| 7,326,087 B2 | 2/2008 | Gerlach et al. |
| 7,331,719 B2 | 2/2008 | Manning et al. |
| RE40,150 E | 3/2008 | Ishibashi et al. |
| 7,346,256 B2 | 3/2008 | Marrs et al. |
| 7,347,627 B2 | 3/2008 | Saito et al. |
| 7,369,738 B2 | 5/2008 | Larson et al. |
| 7,371,014 B2 | 5/2008 | Willis et al. |
| 7,380,992 B2 | 6/2008 | Kramer et al. |
| 7,460,750 B2 | 12/2008 | Durrant et al. |
| 7,463,803 B2 | 12/2008 | Cody et al. |
| 7,467,896 B2 | 12/2008 | Melton et al. |
| 7,481,585 B2 | 1/2009 | Scadden et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,677,814 B2 | 3/2010 | Lu et al. |
| 7,686,519 B2 | 3/2010 | Lu |
| 7,722,258 B2 | 5/2010 | Lu et al. |
| 7,744,286 B2 | 6/2010 | Lu et al. |
| 7,744,288 B2 | 6/2010 | Lu et al. |
| 7,762,726 B2 | 7/2010 | Lu et al. |
| 7,942,590 B2 | 5/2011 | Lu et al. |
| 7,959,361 B2 | 6/2011 | Lu et al. |
| RE42,522 E | 7/2011 | Zimmel et al. |
| 8,135,256 B2 | 3/2012 | Solheid et al. |
| 8,202,008 B2 | 6/2012 | Lu et al. |
| 8,414,196 B2 | 4/2013 | Lu et al. |
| 8,770,862 B2 | 7/2014 | Lu et al. |
| 9,482,829 B2 | 11/2016 | Lu et al. |
| 2001/0012428 A1 | 8/2001 | Nakajima et al. |
| 2001/0036345 A1 | 11/2001 | Gimblet et al. |
| 2002/0022392 A1 | 2/2002 | Below et al. |
| 2002/0062978 A1 | 5/2002 | Sakabe et al. |
| 2002/0081077 A1 | 6/2002 | Nault |
| 2002/0164130 A1 | 11/2002 | Elkins, II et al. |
| 2003/0063867 A1 | 4/2003 | McDonald et al. |
| 2003/0081905 A1 | 5/2003 | Bethea et al. |
| 2003/0094298 A1 | 5/2003 | Morrow et al. |
| 2003/0095754 A1 | 5/2003 | Matsumoto et al. |

(56) References Cited

U.S. PATENT DOCUMENTS

| | | |
|---|---|---|
| 2003/0095780 A1 | 5/2003 | Chang |
| 2004/0017983 A1 | 1/2004 | Chen et al. |
| 2004/0033028 A1 | 2/2004 | Cheng |
| 2004/0038588 A1 | 2/2004 | Bernardi et al. |
| 2004/0047566 A1 | 3/2004 | McDonald et al. |
| 2004/0120663 A1 | 6/2004 | Lail et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0041928 A1 | 2/2005 | Zimmel et al. |
| 2005/0064752 A1 | 3/2005 | Serino |
| 2005/0100286 A1 | 5/2005 | Cox |
| 2005/0117850 A1 | 6/2005 | Milette |
| 2005/0215101 A1 | 9/2005 | Pepe |
| 2005/0232553 A1 | 10/2005 | Holmquist |
| 2005/0254757 A1 | 11/2005 | Ferretti, III et al. |
| 2006/0056769 A1 | 3/2006 | Khemakhem et al. |
| 2006/0088247 A1 | 4/2006 | Tran et al. |
| 2006/0088248 A1 | 4/2006 | Tran et al. |
| 2006/0089049 A1 | 4/2006 | Sedor |
| 2006/0115219 A1 | 6/2006 | Mudd et al. |
| 2006/0193562 A1 | 8/2006 | Theuerkorn |
| 2007/0014522 A1 | 1/2007 | Yamaguchi et al. |
| 2007/0025665 A1 | 2/2007 | Dean, Jr. et al. |
| 2007/0077010 A1 | 4/2007 | Melton et al. |
| 2007/0127873 A1 | 6/2007 | Manning et al. |
| 2008/0044137 A1 | 2/2008 | Luther et al. |
| 2008/0131132 A1 | 6/2008 | Solheid et al. |
| 2008/0175541 A1 | 7/2008 | Lu et al. |
| 2008/0175542 A1 | 7/2008 | Lu et al. |
| 2008/0175546 A1 | 7/2008 | Lu et al. |
| 2008/0273840 A1 | 11/2008 | Lu et al. |
| 2008/0310796 A1 | 12/2008 | Lu |
| 2009/0003772 A1 | 1/2009 | Lu et al. |
| 2009/0041411 A1 | 2/2009 | Melton et al. |
| 2009/0060423 A1 | 3/2009 | Melton et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0162016 A1 | 6/2009 | Lu et al. |
| 2010/0034502 A1 | 2/2010 | Lu et al. |
| 2010/0266242 A1 | 10/2010 | Lu et al. |
| 2010/0266244 A1 | 10/2010 | Lu et al. |
| 2010/0290741 A1 | 11/2010 | Lu et al. |
| 2014/0133804 A1 | 5/2014 | Lu et al. |
| 2014/0314379 A1 | 10/2014 | Lu et al. |

FOREIGN PATENT DOCUMENTS

| | | |
|---|---|---|
| EP | 0 156 075 A2 | 10/1985 |
| EP | 0 345 519 A2 | 12/1989 |
| EP | 0 547 778 A1 | 6/1993 |
| EP | 0 581 527 A1 | 2/1994 |
| EP | 0 689 069 A1 | 12/1995 |
| EP | 0 468 671 B1 | 1/1996 |
| EP | 0 762 171 A1 | 3/1997 |
| EP | 0 848 267 A2 | 6/1998 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 258 758 A2 | 11/2002 |
| EP | 1 333 537 A1 | 8/2003 |
| EP | 1 457 793 A2 | 9/2004 |
| EP | 1 566 674 A1 | 8/2005 |
| GB | 2 154 333 A | 9/1985 |
| JP | 52-30447 | 3/1977 |
| JP | 58-142308 | 8/1983 |
| JP | 62-54204 | 3/1987 |
| JP | 4-44607 | 4/1992 |
| JP | 5-106765 | 4/1993 |
| JP | 8-62432 | 3/1996 |
| JP | 9-135526 | 5/1997 |
| JP | 9-159867 | 6/1997 |
| JP | 10-160969 | 6/1998 |
| JP | 11-160579 | 6/1999 |
| JP | 2000-292653 | 10/2000 |
| JP | 2001-116968 | 4/2001 |
| JP | 2003-195103 | 7/2003 |
| JP | 2005-114860 | 4/2005 |
| JP | 2006-146084 | 6/2006 |
| WO | WO 94/15232 | 7/1994 |
| WO | WO 94/25885 | 11/1994 |
| WO | WO 00/31575 | 6/2000 |
| WO | WO 01/27660 A2 | 4/2001 |
| WO | WO 01/92937 A1 | 12/2001 |
| WO | WO 03/073819 A2 | 9/2003 |
| WO | WO 2005/072395 A2 | 8/2005 |
| WO | WO 2005/101078 A1 | 10/2005 |

OTHER PUBLICATIONS

Delphi Connection Systems, "Harsh Environment Hermaphroditic Fiber Optic Connectors," 16 pages. (© 2002).

Invitation to Pay Additional Fees with Partial International Search cited in PCT/US2008/086085 dated Apr. 6, 2009.

International Search Report and Written Opinion cited in PCT/US2008/086085 dated Jul. 3, 2009.

Mikon Series ST-III Multimode and Singlemode Connectors, 2 pages (Publicly known at least as early as Jan. 2, 1992).

Opti Tap™ Connector. An Evolant Solutions Product, 2 pages (Sep. 2005).

Stratos Lightwave™ Brochure, "HDLC Hermaphroditic Butt Joint Connector," 2 pages (known as prior art at least as early as Sep. 8, 2003).

Stratos Lightwave™ Brochure, "HQLC Hermaphroditic Butt Joint Connector," 2 pages (known as prior art at least as early as Sep. 8, 2003).

U.S. Non-Final Office Action for U.S. Appl. No. 11/657,402 dated Jan. 11, 2008.

U.S. Non-Final Office Action for U.S. Appl. No. 11/657,403 dated Jan. 17, 2008.

U.S. Final Office Action for U.S. Appl. No. 11/657,404 dated Jan. 7, 2009.

U.S. Non-Final Office Action for U.S. Appl. No. 11/657,404 dated Apr. 16, 2008.

U.S. Non-Final Office Action for U.S. Appl. No. 11/981,850 dated Aug. 6, 2010.

U.S. Non-Final Office Action for U.S. Appl. No. 12/203,508 dated Jun. 25, 2009.

U.S. Non-Final Office Action for U.S. Appl. No. 12/203,522 dated Jun. 24, 2009.

U.S. Non-Final Office Action for U.S. Appl. No. 12/203,530 dated Jul. 16, 2009.

U.S. Non-Final Office Action for U.S. Appl. No. 12/203,535 dated Aug. 2, 2010.

U.S. Final Office Action for U.S. Appl. No. 12/333,509 dated Oct. 10, 2013.

U.S. Non-Final Office Action for U.S. Appl. No. 12/333,509 dated Jun. 6, 2013.

U.S. Final Office Action for U.S. Appl. No. 12/333,509 dated Feb. 2, 2011.

U.S. Non-Final Office Action for U.S. Appl. No. 12/333,509 dated Mar. 18, 2010.

U.S. Non-Final Office Action for U.S. Appl. No. 12/564,752 dated Aug. 5, 2010.

HARDENED FIBER OPTIC CONNECTOR COMPATIBLE WITH HARDENED AND NON-HARDENED FIBER OPTIC ADAPTERS

CROSS REFERENCE TO RELATED APPLICATIONS

The present application is a continuation of U.S. patent application Ser. No. 13/859,372, filed Apr. 9, 2013, which is a continuation of U.S. patent application Ser. No. 12/825,111, filed Jun. 28, 2010 and now U.S. Pat. No. 8,414,196, which is a divisional of Ser. No. 12/203,508, filed on Sep. 3, 2008 and now U.S. Pat. No. 7,744,288, which claims the benefit of U.S. Provisional Patent Application Ser. No. 61/029,524, filed Feb. 18, 2008 and U.S. Provisional Patent Application Ser. No. 61/007,222, filed Dec. 11, 2007, the disclosures of which are hereby incorporated by reference in their entireties.

The present application is related to the following U.S. patent applications, all filed on Sep. 3, 2008, and incorporated herein by reference in their entireties: U.S. patent application Ser. No. 12/203,522, now U.S. Pat. No. 7,762,726; Ser. No. 12/203,530, now U.S. Pat. No. 7,744,286; Ser. No. 12/203,535, now U.S. Pat. No. 7,942,590; Ser. No. 12/825,081, now U.S. Pat. No. 8,202,008; and Ser. No. 12/843,692, now U.S. Pat. No. 7,959,361.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

SUMMARY OF THE DISCLOSURE

The present disclosure relates to a fiber optic connector compatible with a hardened fiber optic adapter and a non-hardened fiber optic adapter. The fiber optic connector includes a connector housing with a plug portion that connects with both the hardened and the non-hardened fiber optic adapters. In a preferred embodiment, the non-hardened fiber optic adapter is an SC adapter.

The present disclosure also relates to a fiber optic connector and cable assembly with multiple configurations. Multiple cable types (e.g., flat or cylindrical) with multiple reinforcing methods (e.g., reinforcing yarn or fiberglass epoxy rods) can be configured and included as a cable in the fiber optic connector and cable assembly. In preferred embodiments, the fiber optic connector and cable assembly is hardened (e.g., the assembly is suited for outdoor environmental conditions and is able to support comparatively high structural loads).

In preferred embodiments, the cable of the fiber optic connector and cable assembly includes an optical fiber, a jacket surrounding the optical fiber, and at least one strength member for providing the fiber optic cable with axial reinforcement. The strength member(s) (e.g., reinforcing yarn and/or fiberglass epoxy rods) preferably extend beyond an end of the cable jacket and the optical fiber preferably extends beyond an end of the strength member(s) at an end of the cable that is attached to the connector.

The connector of the fiber optic connector and cable assembly includes a connector housing with a first end defining a plug portion and a second end that receives the strength member(s) and the optical fiber of the cable. The plug portion of the connector housing is adapted for insertion into both the hardened and the non-hardened fiber optic adapter. A ferrule is positioned at the first end of the connector housing and receives an end portion of the optical fiber. A spring biases the ferrule in a direction that extends outwardly from the first end of the connector housing. An insert is mounted within the connector housing. In certain preferred embodiments, the insert includes a spring stop for retaining the spring and a cable retention portion for securing the strength member(s). The spring stop and the cable retention portion can be included on a one-piece insert or they can separately be included on separate inserts. The cable retention portion of the insert can take various forms (e.g., gripping teeth, receiving channels, crimp area, etc.) An anchor can be secured to the strength member(s) of the cable (e.g., by crimping and/or bonding the strength member(s) to the anchor by a crimp band).

In preferred embodiments, the connector housing includes a one-piece main body that defines the plug portion and includes a proximal extension that projects outwardly from the plug portion. The preferred connector housing also includes a cover piece that mounts to the proximal extension of the one-piece main body. In certain preferred embodiments, the end(s) of the strength member(s) are retained (e.g., clamped, glued, etc.) between the proximal extension of the one-piece main body and the cover piece. The cover piece can include retaining features (e.g., gripping teeth, receiving channels, etc.) that are complimentary to the cable retention portion of the insert. The anchor can be anchored between the proximal extension of the one-piece main body and the cover piece (e.g., retention tabs of the anchor can fit within corresponding notches provided on the one-piece main body and/or the cover piece).

In preferred embodiments, the one-piece main body is included in the multiple configurations and the insert and the cover piece are tailored for a specific configuration.

In preferred embodiments of the present disclosure, various angled surfaces are included on various protrusions, latching features, grooves, etc. Angled surfaces on the various features typically are used in conjunction with various flexible members and are selected to provide adequate holding strength for various functions of the fiber optic connector while also allowing manual manipulation and operation. Thus, in preferred embodiments, tools are not required to use the fiber optic connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 16:
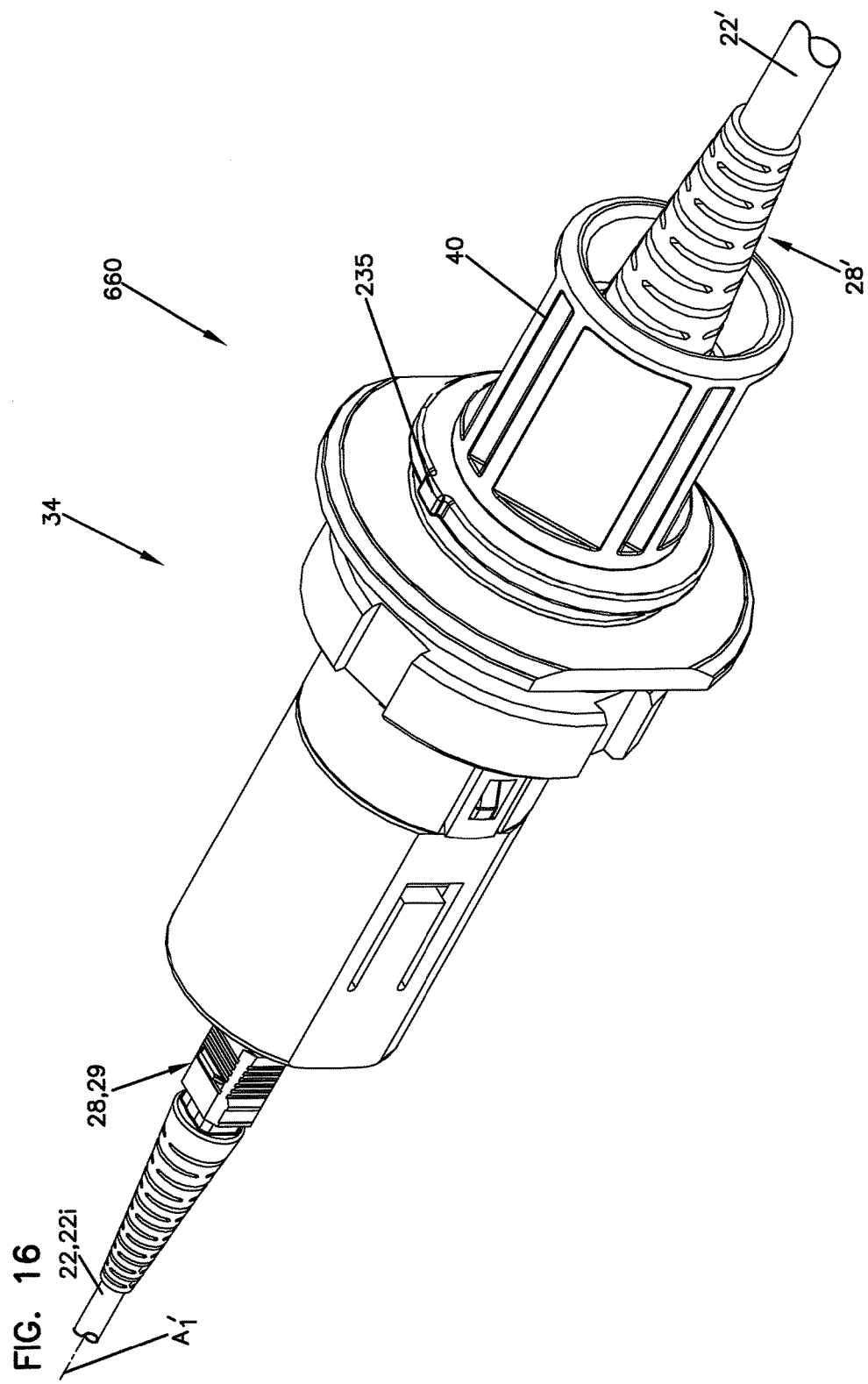
FIG. 16 is a perspective view of a sixth arrangement of the example fiber optic connection system connecting the SC connector of FIG. 1 to the hardened port of the hardened fiber optic adapter of FIG. 1, wherein the SC connector has been modified by removing a release sleeve and installing a converter sleeve.
Figure 17:
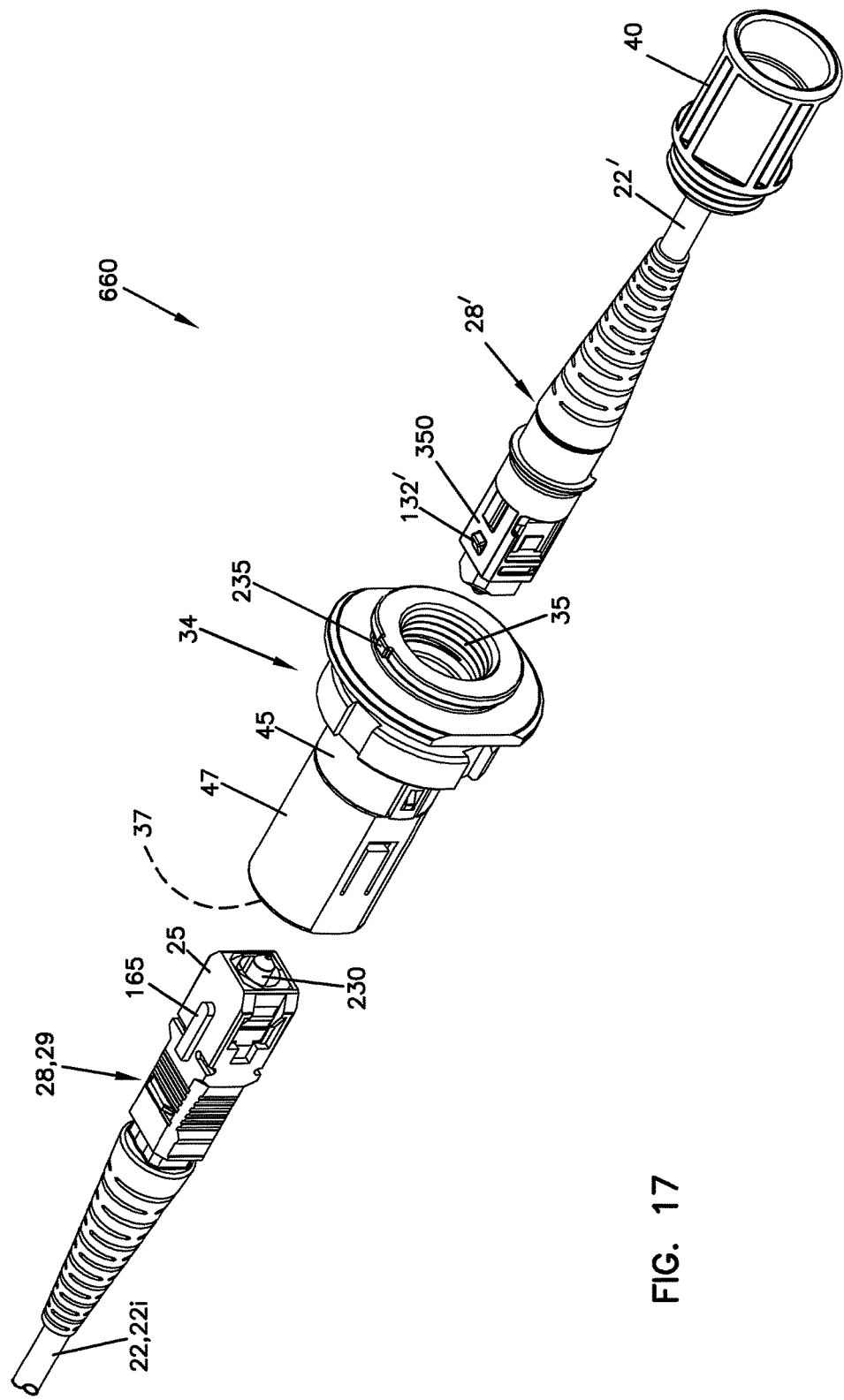
FIG. 17 is a perspective view of the sixth arrangement of the example fiber optic connection system of FIG. 16 with the modified SC connector of FIG. 16 disconnected from the hardened port of the hardened fiber optic adapter of FIG. 1.
Figure 18:
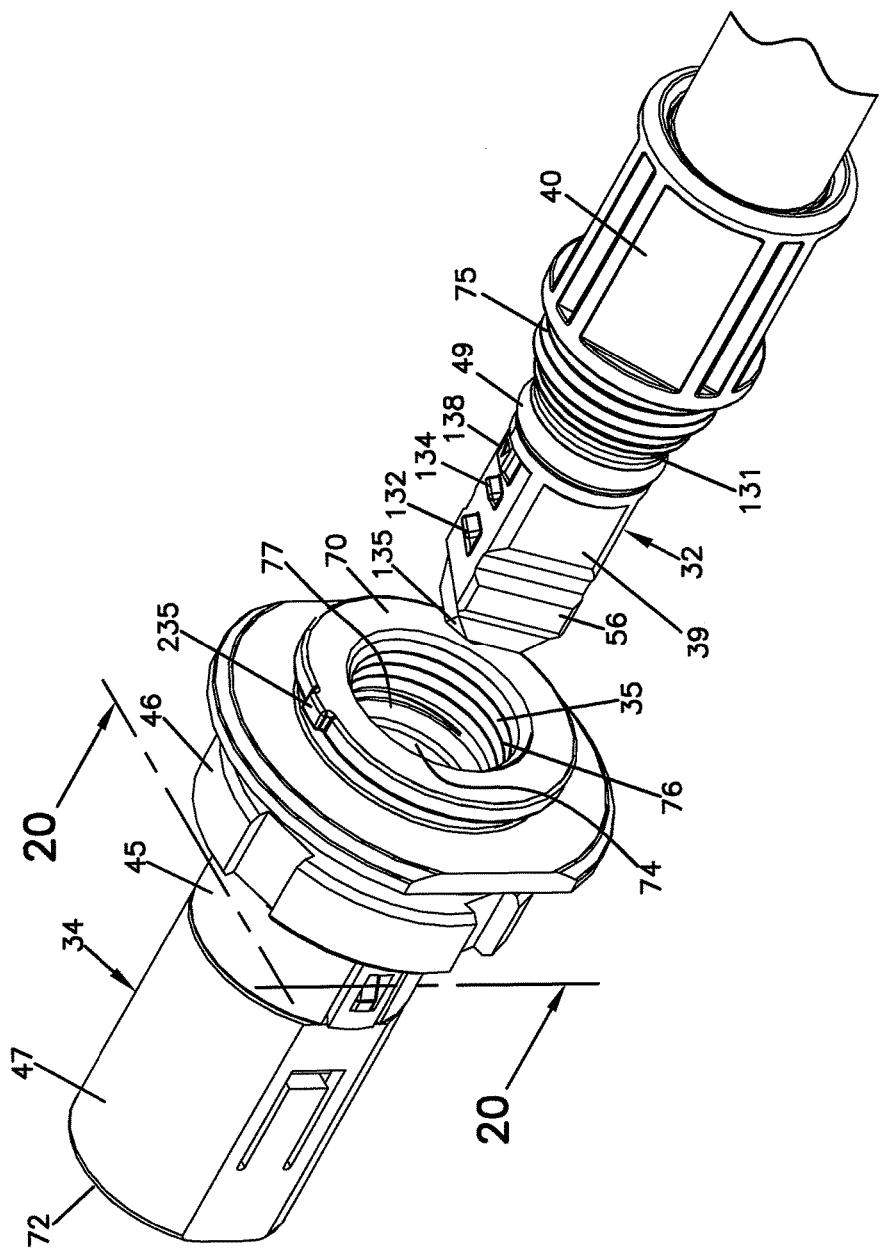
FIG. 18 is a perspective view showing an angular misalignment between the hardened fiber optic connector and hardened fiber optic adapter of FIG. 1, the hardened fiber optic adapter including a first housing piece and a second housing piece.
Figure 19:
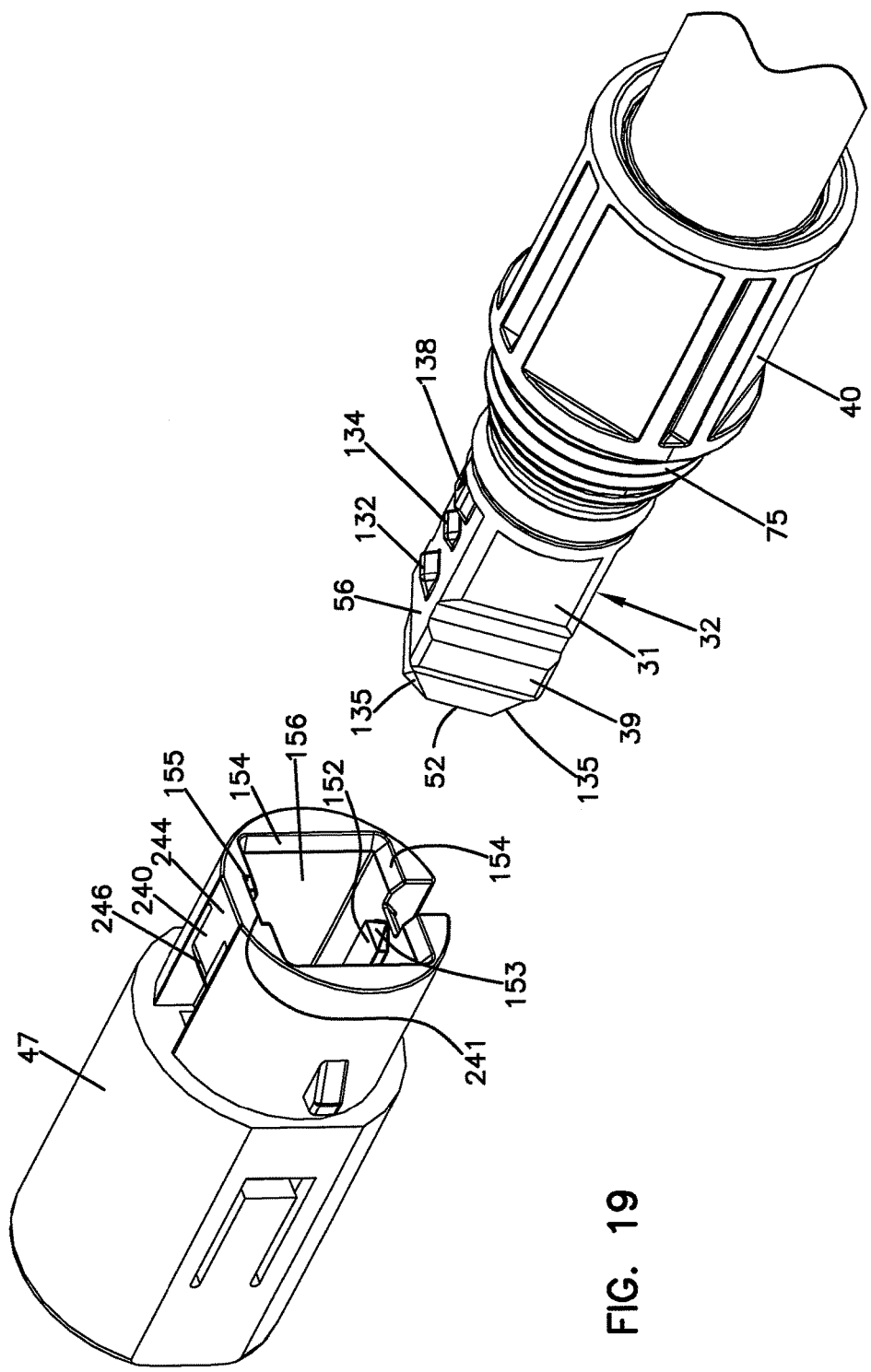
FIG. 19 is the perspective view of FIG. 18 with the first housing piece of the hardened fiber optic adapter removed revealing details of the second housing piece of the hardened fiber optic adapter.
Figure 20:
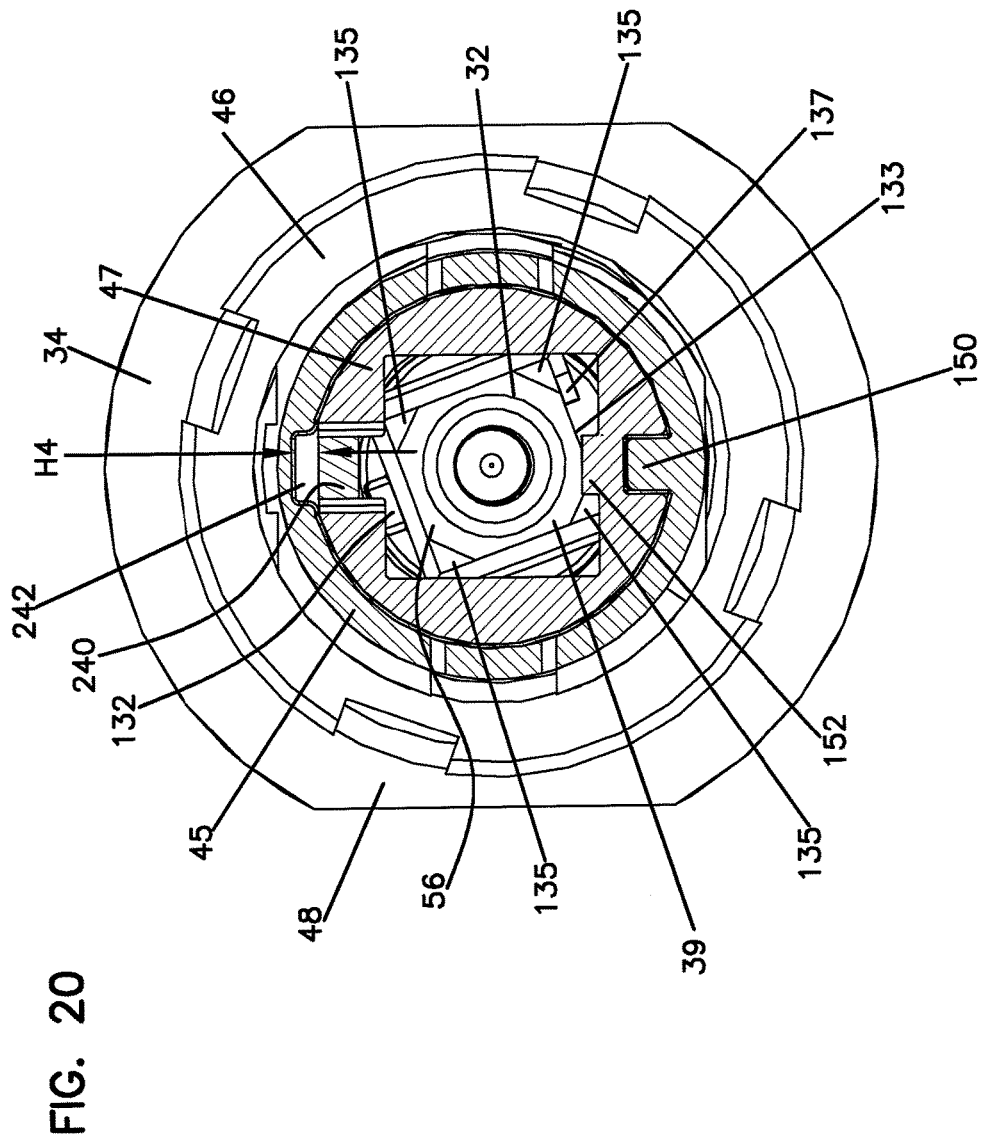
FIG. 20 is a cross-section view further showing the angular misalignment of FIG. 18 between the hardened fiber optic connector and hardened fiber optic adapter of FIG. 1.

FIGS. 1-17, 81, and 82 depict a fiber optic connection system 600 in accordance with the principles of the present disclosure. In the examples shown in the Figures, six distinct connection arrangements are illustrated. A first arrangement 610, illustrated at FIGS. 1, 2, and 82, a second arrangement 620, illustrated at FIGS. 5, 6, and 82, a third arrangement 630, illustrated at FIGS. 7, 8, and 82, a fourth arrangement 640, illustrated at FIGS. 9-12, 81, and 82, and a sixth arrangement 660, illustrated at FIGS. 16, 17, and 82 provide for optically connecting a first fiber optic cable or fiber to a second fiber optic cable or fiber. A fifth arrangement 650, including arrangements 650C and 650P, illustrated at FIGS. 13-15 and 82 provides for environmentally sealing components when not connected. The six illustrated arrangements 610, 620, 630, 640, 650, 660 are exemplarily and should not be interpreted as limiting the principles of the present disclosure. As further disclosed below, the six arrangements 610, 620, 630, 640, 650, 660 are complimentary with each other and share components and features where beneficial. The complimentary nature of the fiber optic connection system 600 provides functional benefits in terms of interchangeability and interconnectability, and provides economic benefits in terms of manufacturing and logistical efficiency.

Figure 1:
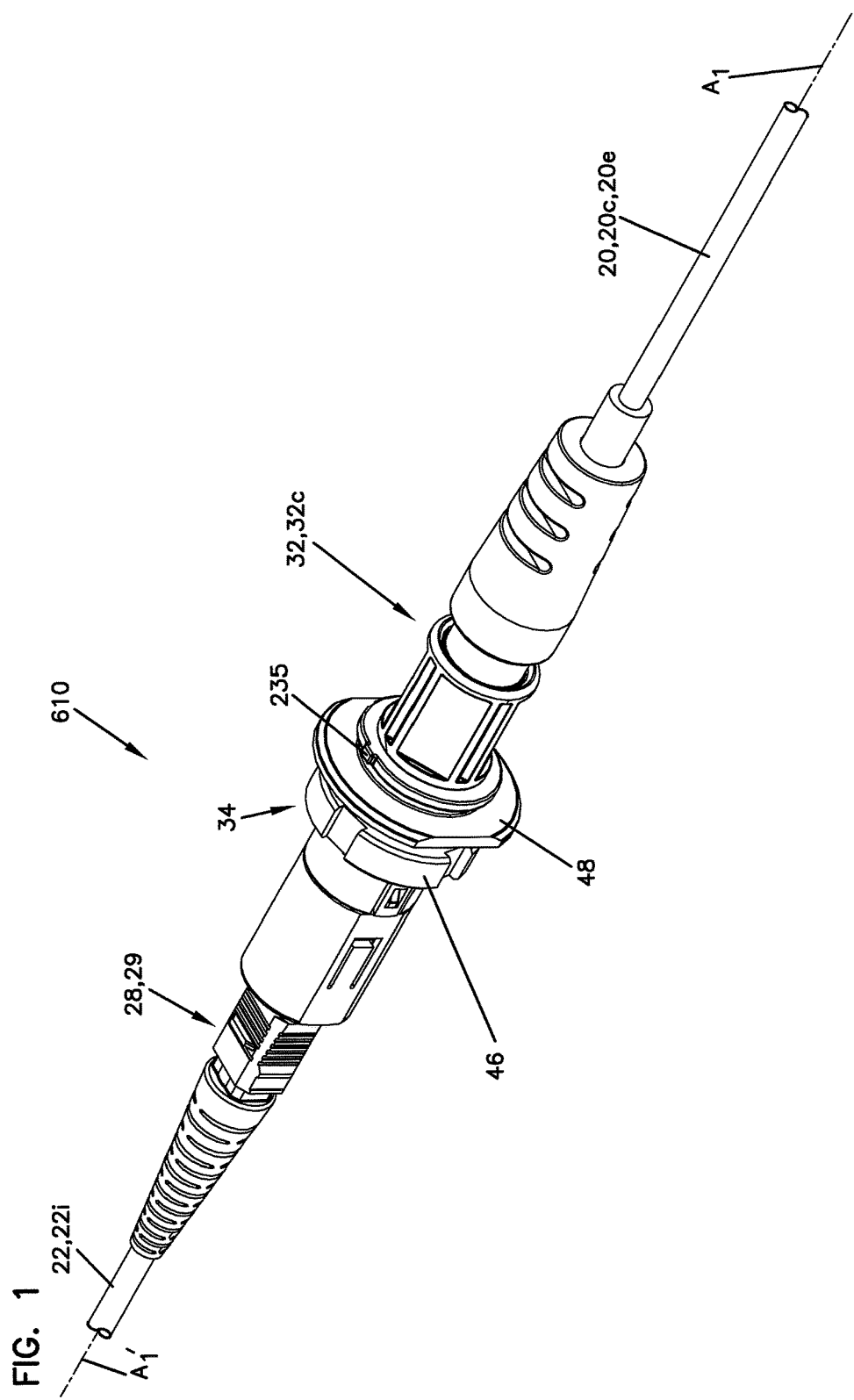
FIG. 1 is a perspective view of a first arrangement of an example fiber optic connection system connecting an optical fiber terminated at an SC connector with a fiber optic cable terminated at a hardened fiber optic connector via a hardened fiber optic adapter, wherein the SC connector is connected at an unhardened port of the hardened fiber optic adapter and the hardened fiber optic connector is connected at a hardened port of the hardened fiber optic adapter.
Figure 2:
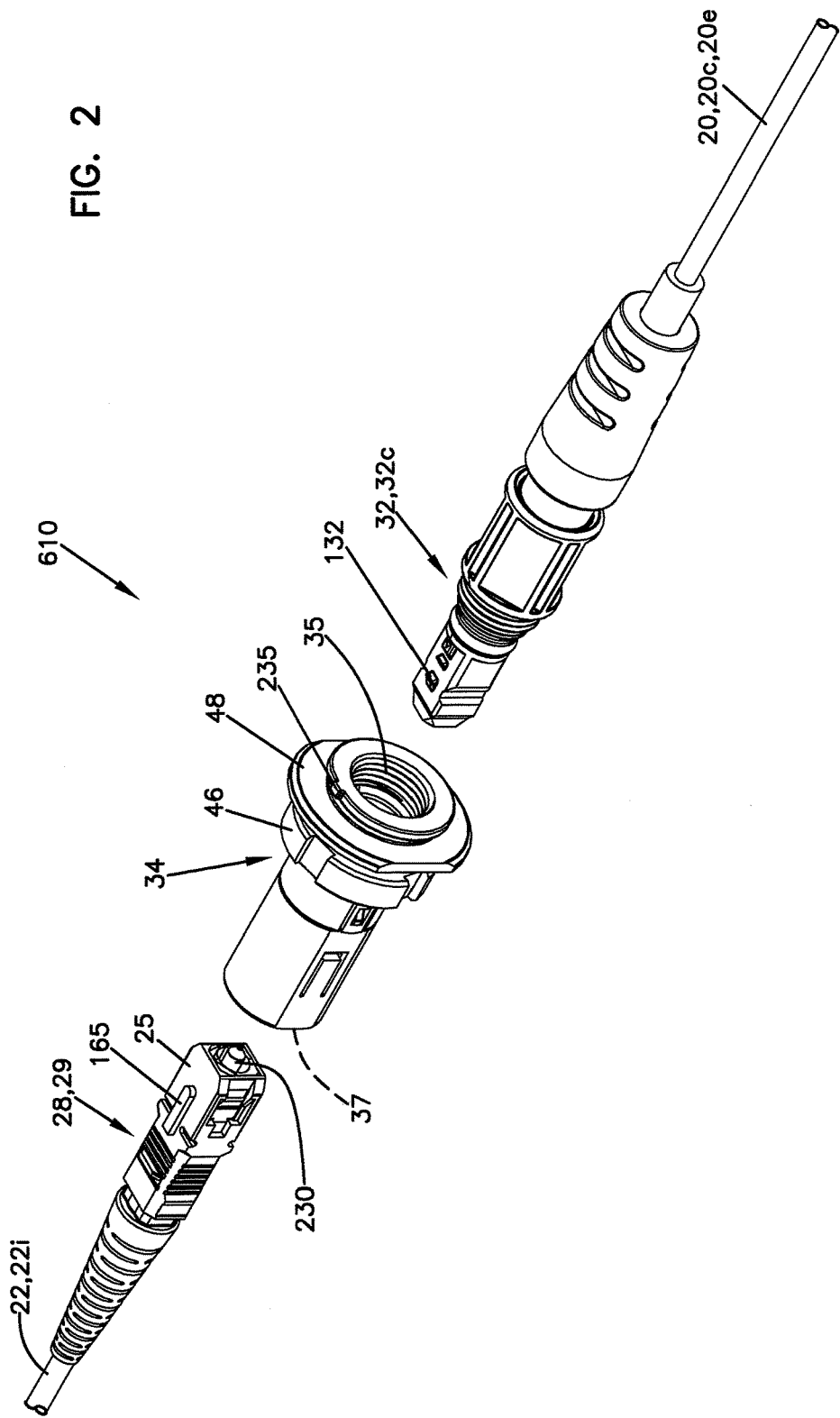
FIG. 2 is a perspective view of the first connection system arrangement of FIG. 1 with the SC connector disconnected from the hardened fiber optic adapter and the hardened fiber optic connector also disconnected from the hardened fiber optic adapter.

The first fiber optic connection system arrangement 610, illustrated at FIGS. 1 and 2, includes a fiber optic adapter 34, a first fiber optic connector 32 terminating a first cable 20, and a second fiber optic connector 28 terminating a second fiber optic cable 22. In a preferred embodiment, the adapter 34 can be mounted through a properly sized opening 18 in an enclosure 19 by sandwiching the enclosure 19 between an adapter flange 48 and an adapter mounting nut 46 (see FIG. 28). A sealing member 17 can be provided to environmentally seal the adapter 34 around the opening 18 of the enclosure 19. The adapter 34 includes a hardened first port 35 for receiving the first connector 32 and an unhardened second port 37 for receiving the second connector 28. One example of an adapter is illustrated and described at U.S. patent application Ser. No. 11/657,402 entitled HARDENED FIBER OPTIC CONNECTOR, filed Jan. 24, 2007, that is hereby incorporated by reference in its entirety. In one embodiment, adapters 34 can be mounted to a drop terminal of the type disclosed at U.S. patent application Ser. No. 11/075,847, entitled FIBER ACCESS TERMINAL, filed on Mar. 8, 2005, now U.S. Pat. No. 7,292,763, and that is hereby incorporated by reference in its entirety. For such embodiments, the first cable 20 can be a drop cable routed to a subscriber premises and the second cable 22 can be a connectorized fiber from a stub cable that is routed from the drop terminal to a fiber break-out location of a fiber distribution cable. Example fiber break-out configurations are disclosed at U.S. patent application Ser. No. 11/491,336, entitled FIBER OPTIC CABLE BREAKOUT CONFIGURATION WITH RETENTION BLOCK, filed on Jul. 21, 2006, now U.S. Pat. No. 7,317,863, and that is hereby incorporated by reference in its entirety. In another embodiment, one or more of the adapters can be mounted to a network interface device of the type disclosed at U.S. patent application Ser. No. 11/607,676, entitled NETWORK INTERFACE DEVICE, filed on Dec. 1, 2006, and that is hereby incorporated by reference in its entirety. In such an embodiment, the first cable 20 is an external cable 20e, such as a drop cable, and the second cable 22 is an internal cable 22i and can include a connectorized cable/fiber positioned within the network interface device. Alternatively, the fiber optic connection system arrangement 610 can also be used without an enclosure (e.g., the adapter 34 can be panel mounted). The first cable 20 is optically coupled to the second cable 22 when the connectors 28, 32 are positioned within their respective ports 37, 35 of the adapter 34. The second connector 28 can be a conventional fiber optic connector such as an SC connector 29. One example of an SC connector 29 is illustrated and described at U.S. Pat. No. 5,317,663, that is hereby incorporated by reference in its entirety. The enclosure 19 can further include other optical enclosures/housings (e.g., drop terminals, pedestals, network interface devices, fiber distribution hubs, splice enclosures, optical network terminals, etc.).

In the depicted embodiment, the first connector 32 and the adapter 34 are hardened or ruggedized. By hardened or ruggedized, it is meant that first connector 32 and the adapter 34 are adapted for outside environmental use. For example, the first connector 32 and the adapter 34 can include environmental seals for preventing moisture/water intrusion. Also, it is preferred for the first connector 32 to be able to withstand a 100 pound axial pull-out force when coupled to the adapter 34.

Figure 3:
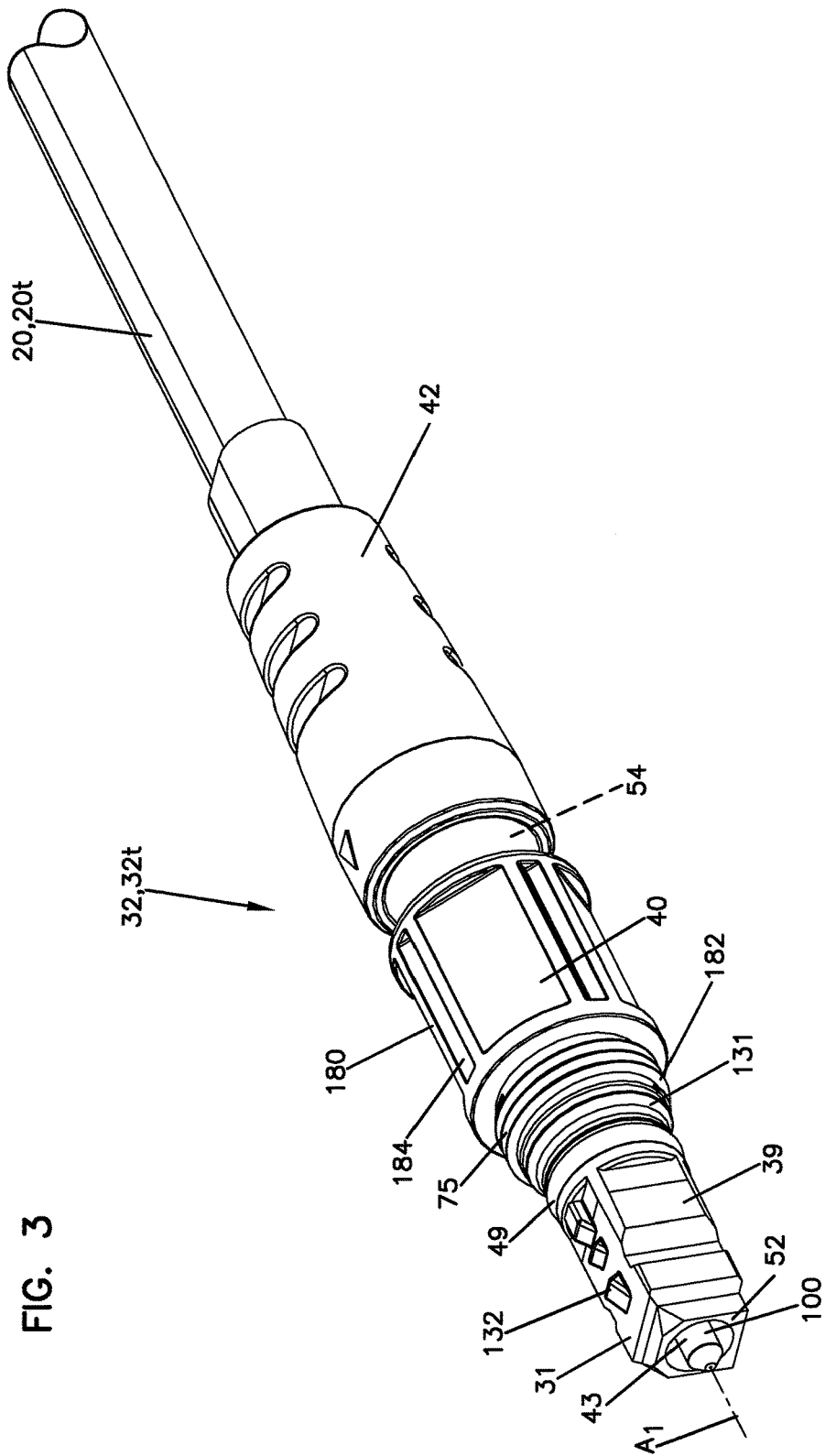
FIG. 3 is a perspective view of the hardened fiber optic connector of FIG. 1 configured for terminating a flat fiber optic tether cable.
Figure 4:
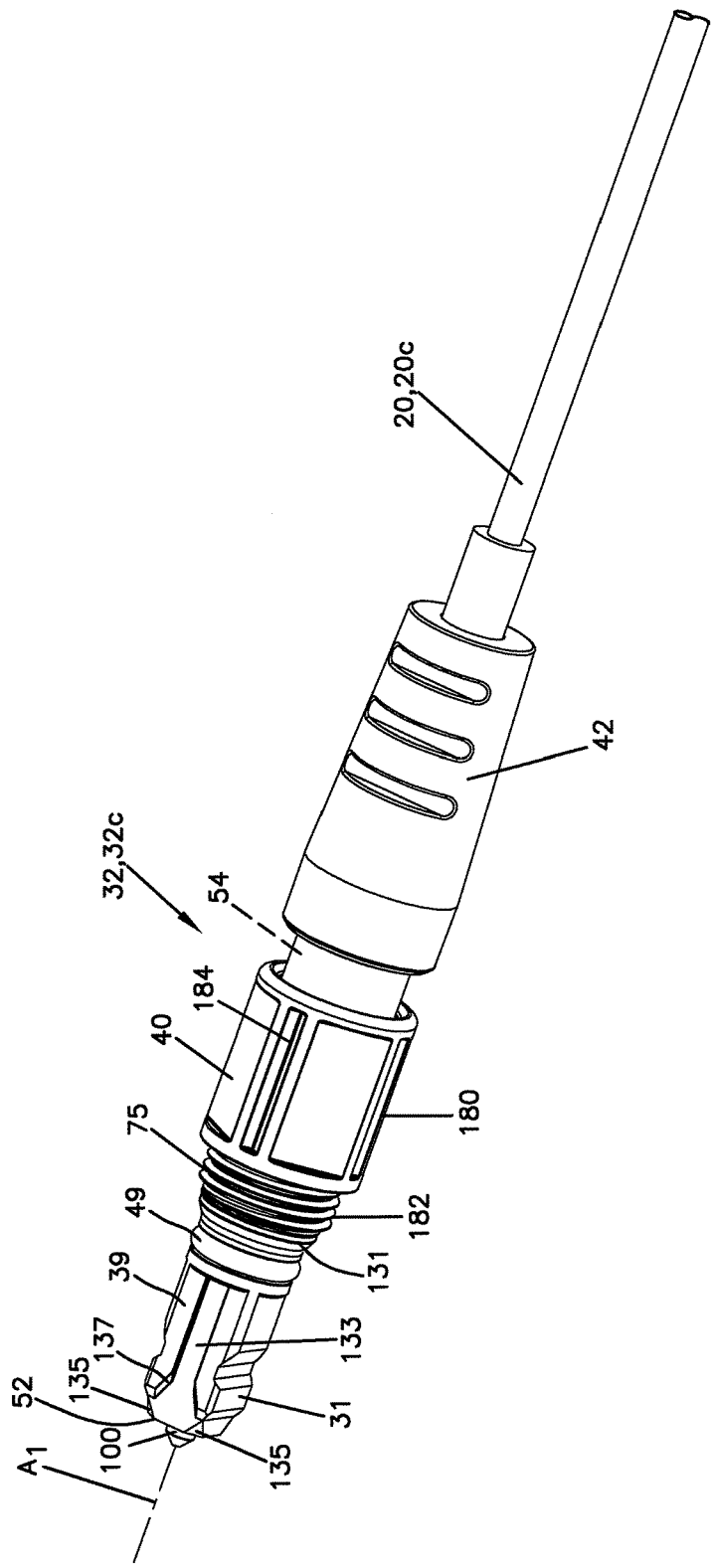
FIG. 4 is a perspective view of the hardened fiber optic connector of FIG. 1 configured for terminating a cylindrical fiber optic cable.

The fiber optic connector 32 is further illustrated at FIGS. 3 and 4 and includes a connector housing 39 supporting a ferrule assembly 43. The connector housing 39 extends from a distal end 52 to a proximal end 54 (distal and proximal are defined with respect to the connection with the fiber optic cable 20 for the connector 32). A coupling nut 40 is rotatably mounted around the connector housing 39 and includes a threaded portion 75. The ferrule assembly 43 mounts adjacent the distal end 52 of the connector housing 39 and a strain relief boot 42 mounts adjacent the proximal end 54 of the connector housing 39.

The first cable 20 is an external cable (e.g., an outside plant cable located outside the enclosure) and the second cable 22 is located inside the enclosure. In such an embodiment, the first cable 20 is adapted to carry an optical signal to the enclosure and the fiber optic connection system arrangement 610 allows the signal to be transferred from the first cable 20 to the second cable 22.

Further details on the first fiber optic connection system arrangement 610, including details on the function and construction, are given below.

Figure 5:
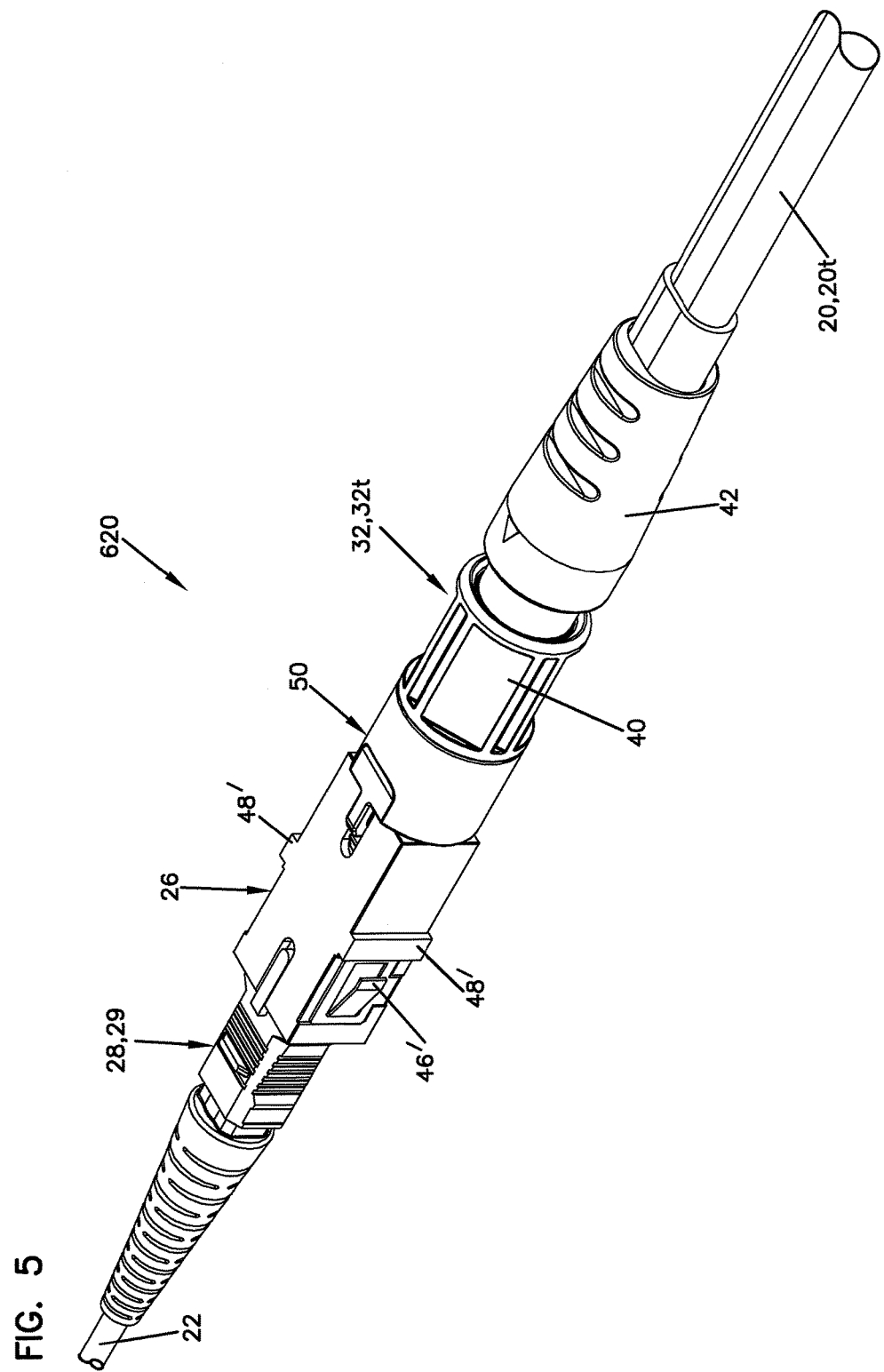
FIG. 5 is a perspective view of a second arrangement of the example fiber optic connection system connecting the optical fiber terminated at the SC connector of FIG. 1 with the fiber optic cable terminated at the hardened fiber optic connector of FIG. 1 via an SC fiber optic adapter, wherein a slideable lock is attached to a coupling nut of the hardened fiber optic connector and is in a locked position.
Figure 6:
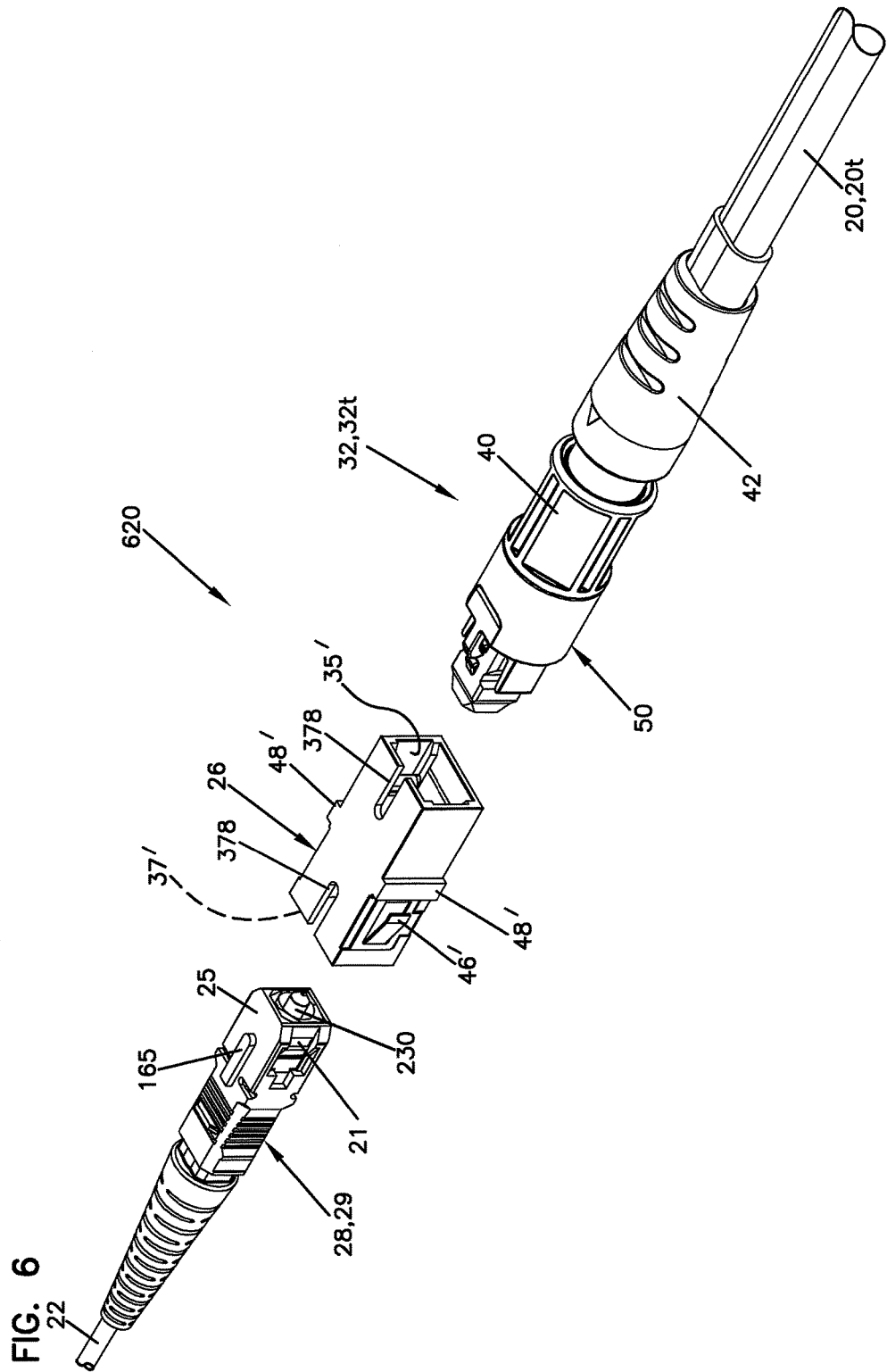
FIG. 6 is a perspective view of the second connection system arrangement of FIG. 5 with the SC connector disconnected from the SC adapter and the hardened fiber optic connector also disconnected from the SC adapter.

The second fiber optic connection system arrangement 620, illustrated at FIGS. 5 and 6, includes an SC fiber optic adapter 26, the first fiber optic connector 32 terminating the first fiber optic cable 20, and the second fiber optic connector 28 terminating the second fiber optic cable 22. In a preferred embodiment, the SC adapter 26 can be mounted through a properly sized opening in a panel by clipping the panel between an adapter flange(s) 48' and an adapter mounting clip(s) 46'. The SC adapter 26 includes a first port 35' for receiving the first connector 32 and a second port 37' for receiving the second connector 28. The SC adapter 26 includes a split sleeve that receives and aligns a ferrule from a connector inserted into the first port 35' with another ferrule from another connector inserted into the second port 37'. The split sleeve of the SC adapter 26 defines an axis $A_2$ (see FIG. 40). Movement of the connectors 28, 32 into and out of the ports 35', 37' is generally parallel to the axis $A_2$. The SC adapter 26 also includes two alignment slots 378. One of the alignment slots 378 extends through a wall of each of the ports 35', 37'. The first cable 20 is optically coupled to the second cable 22 when the connectors 28, 32 are properly aligned with the alignment slots 378 and positioned within their respective ports 37', 35' of the SC adapter 26. Either port 35', 37' of the SC adapter 26 is compatible and connectable with either connector 28, 32. Thus the first connector 32 can be connected to the second port 37' and the second connector 28 can be connected to the first port 35'. In a preferred embodiment, the second fiber optic connector 28 is an SC connector 29. Alternatively, two of the connectors 32 can be connected to the SC adapter 26, one at each port 35', 37'. In the second arrangement 620, a slideable lock 50 is attached to the first fiber optic connector(s) 32 for securing the connection between the first connector(s) 32 and the SC adapter 26.

Further details on the second fiber optic connection system arrangement 620, including details on the function and construction, are given below.

Figure 7:
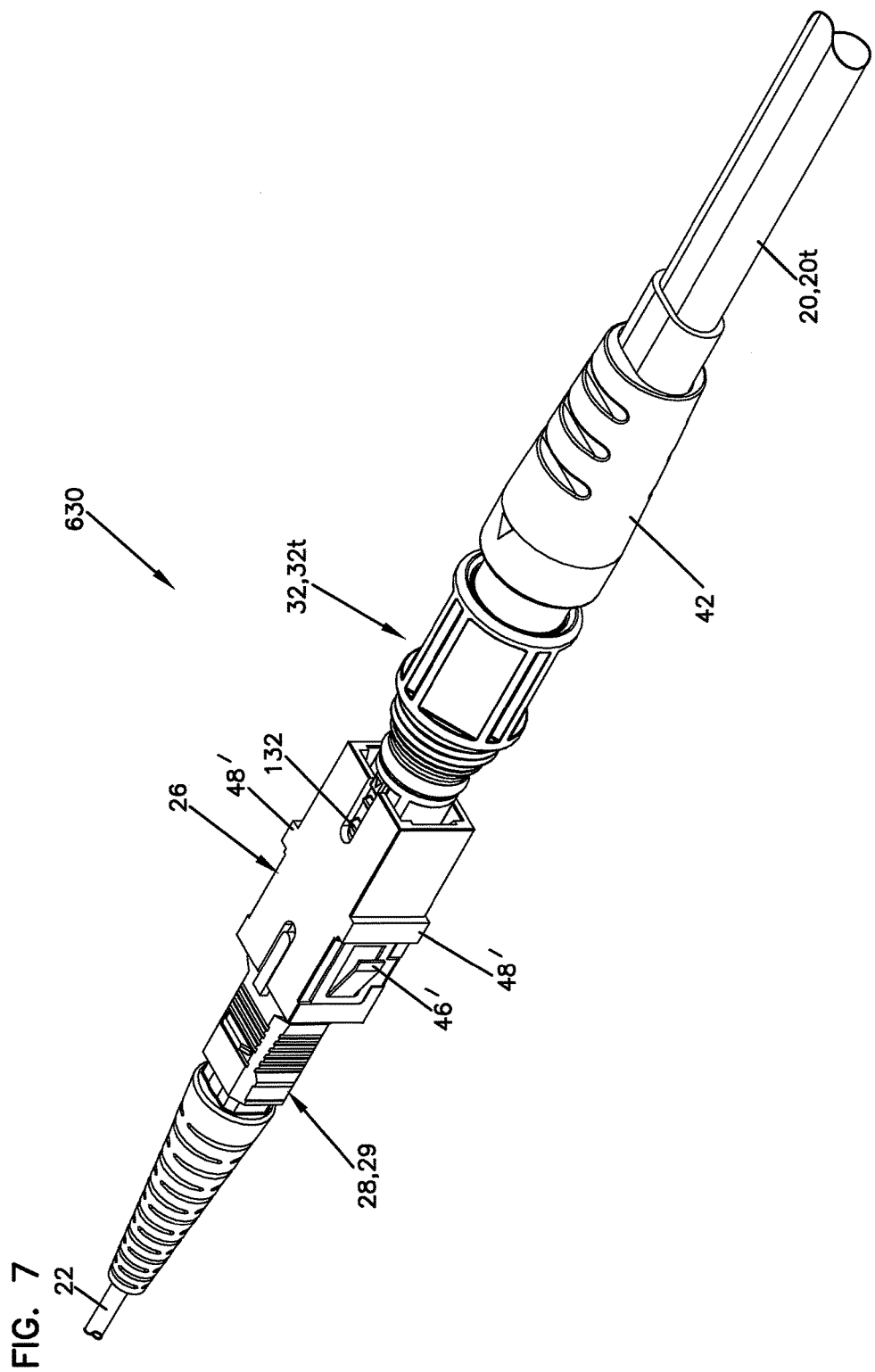
FIG. 7 is a perspective view of a third arrangement of the example fiber optic connection system connecting the optical fiber terminated at the SC connector of FIG. 1 with the fiber optic cable terminated at the hardened fiber optic connector of FIG. 1 via an SC fiber optic adapter.
Figure 8:
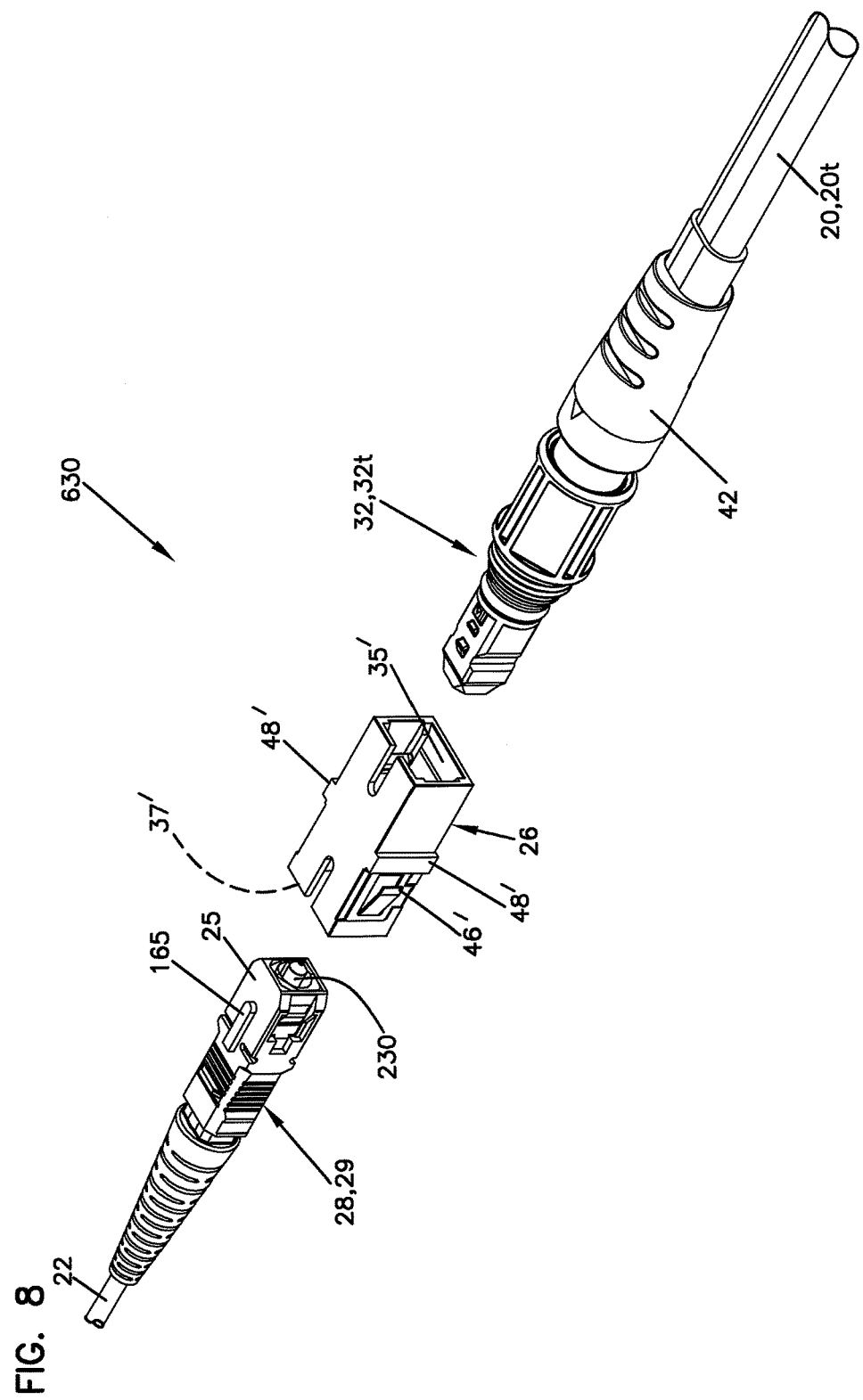
FIG. 8 is a perspective view of the third connection system arrangement of FIG. 7 with the SC connector disconnected from the SC adapter and the hardened fiber optic connector also disconnected from the SC adapter.
Figure 9:
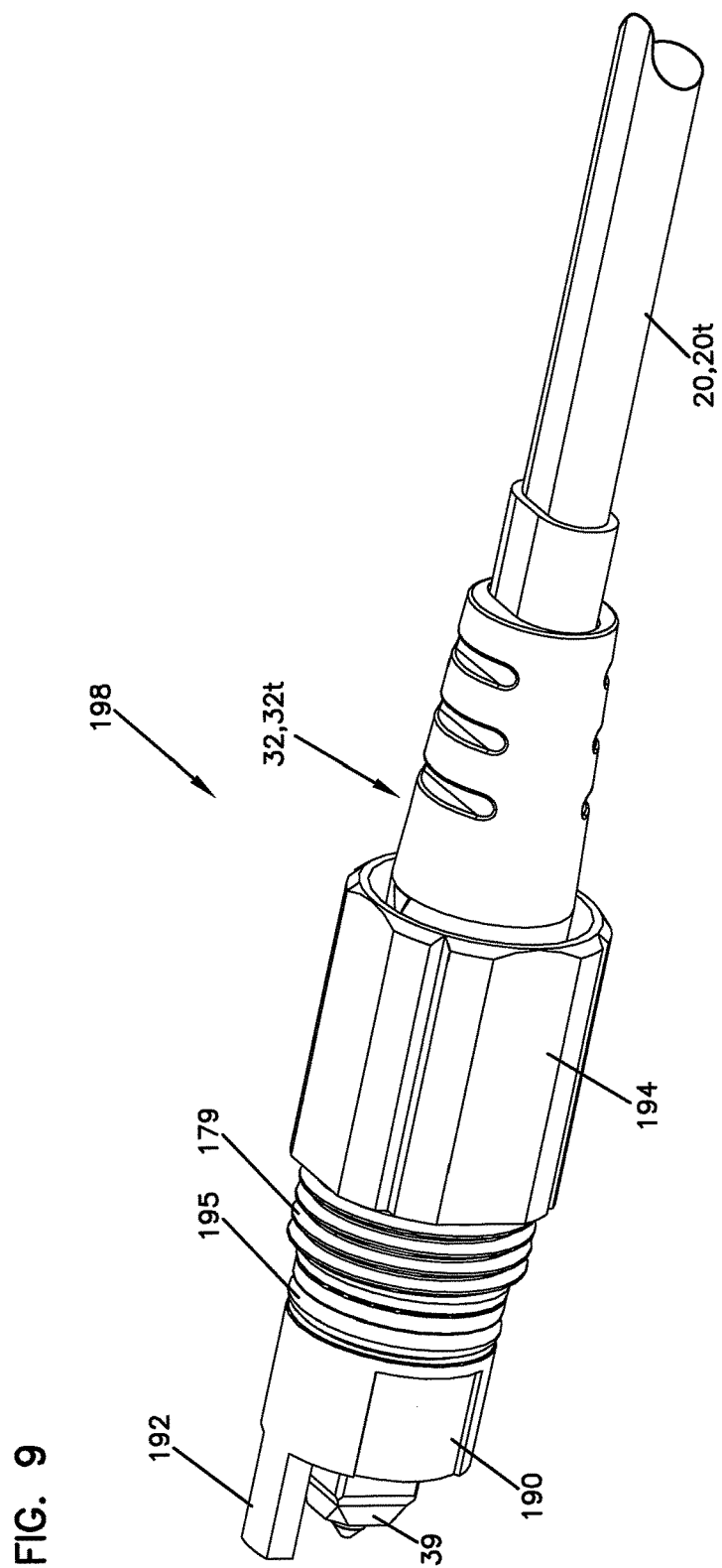
FIG. 9 is a perspective view of the hardened fiber optic connector of FIG. 1 attached to a hardened fiber optic converter thereby forming a converted fiber optic connector of a fourth arrangement of the example fiber optic connection system.
Figure 10:
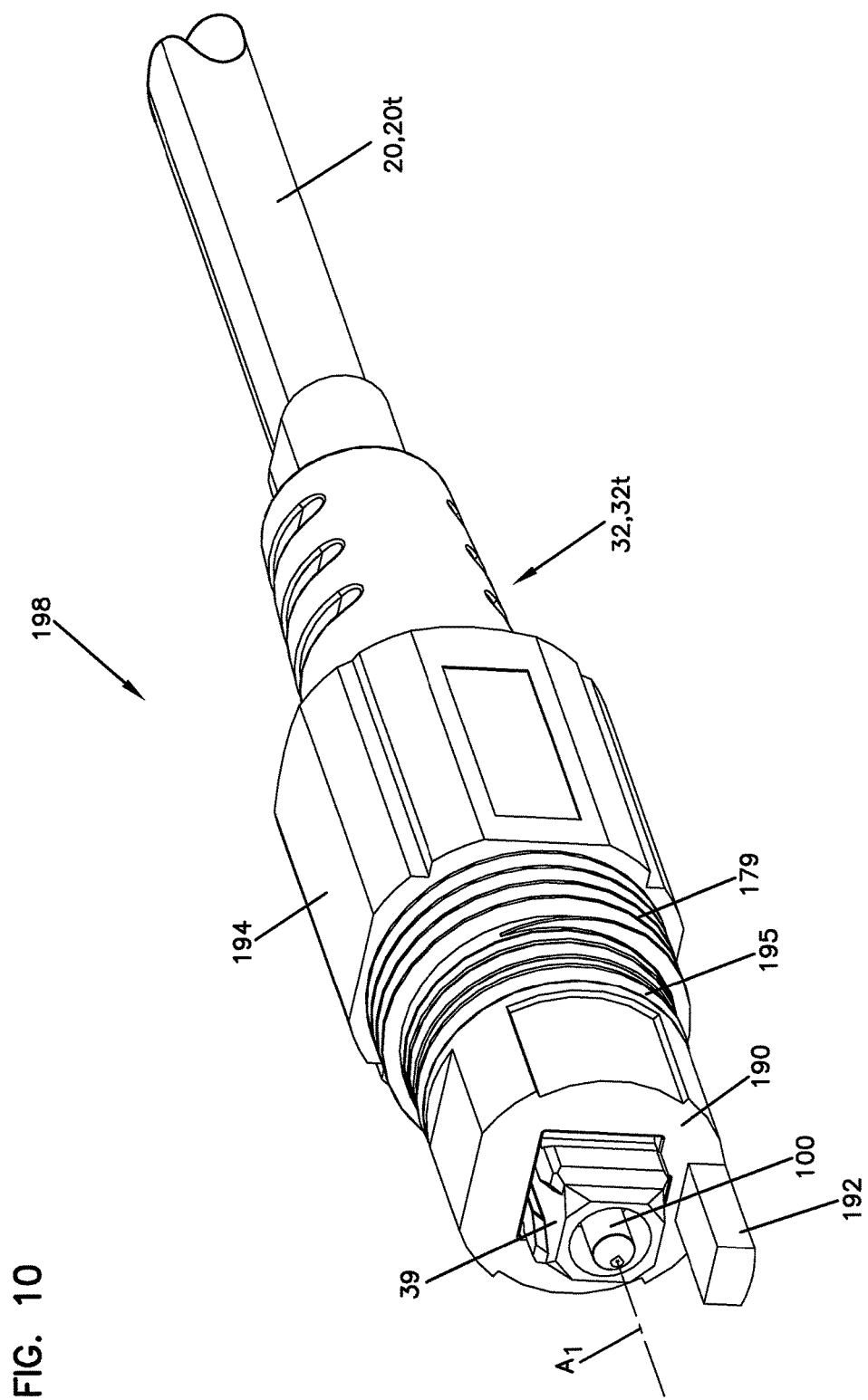
FIG. 10 is another perspective view of the converted fiber optic connector of FIG. 9 of the fourth arrangement of the example fiber optic connection system.
Figure 11:
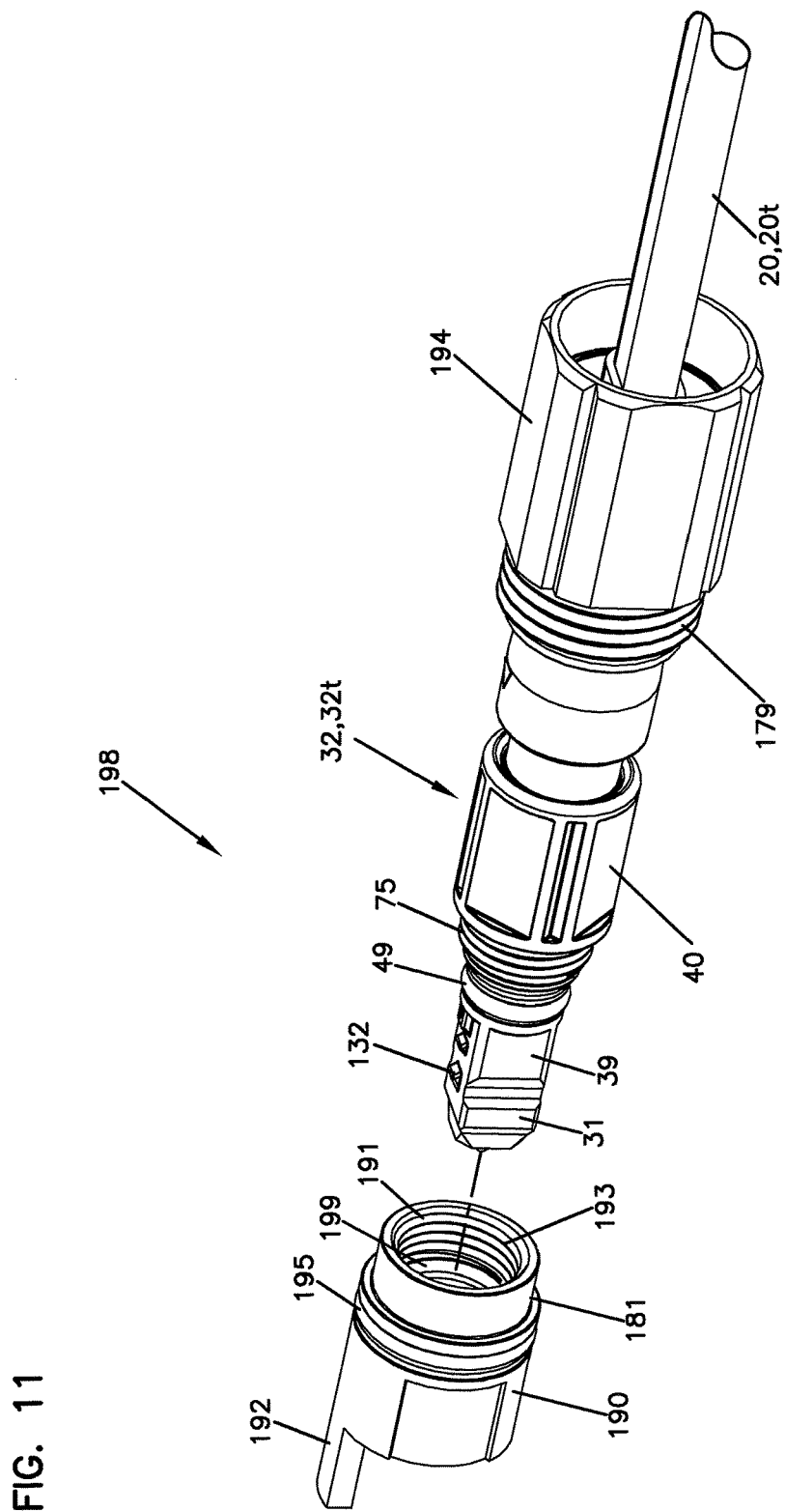
FIG. 11 is another perspective view of the converted fiber optic connector of FIG. 9 of the fourth arrangement of the example fiber optic connection system, wherein the hardened fiber optic converter is detached.
Figure 12:
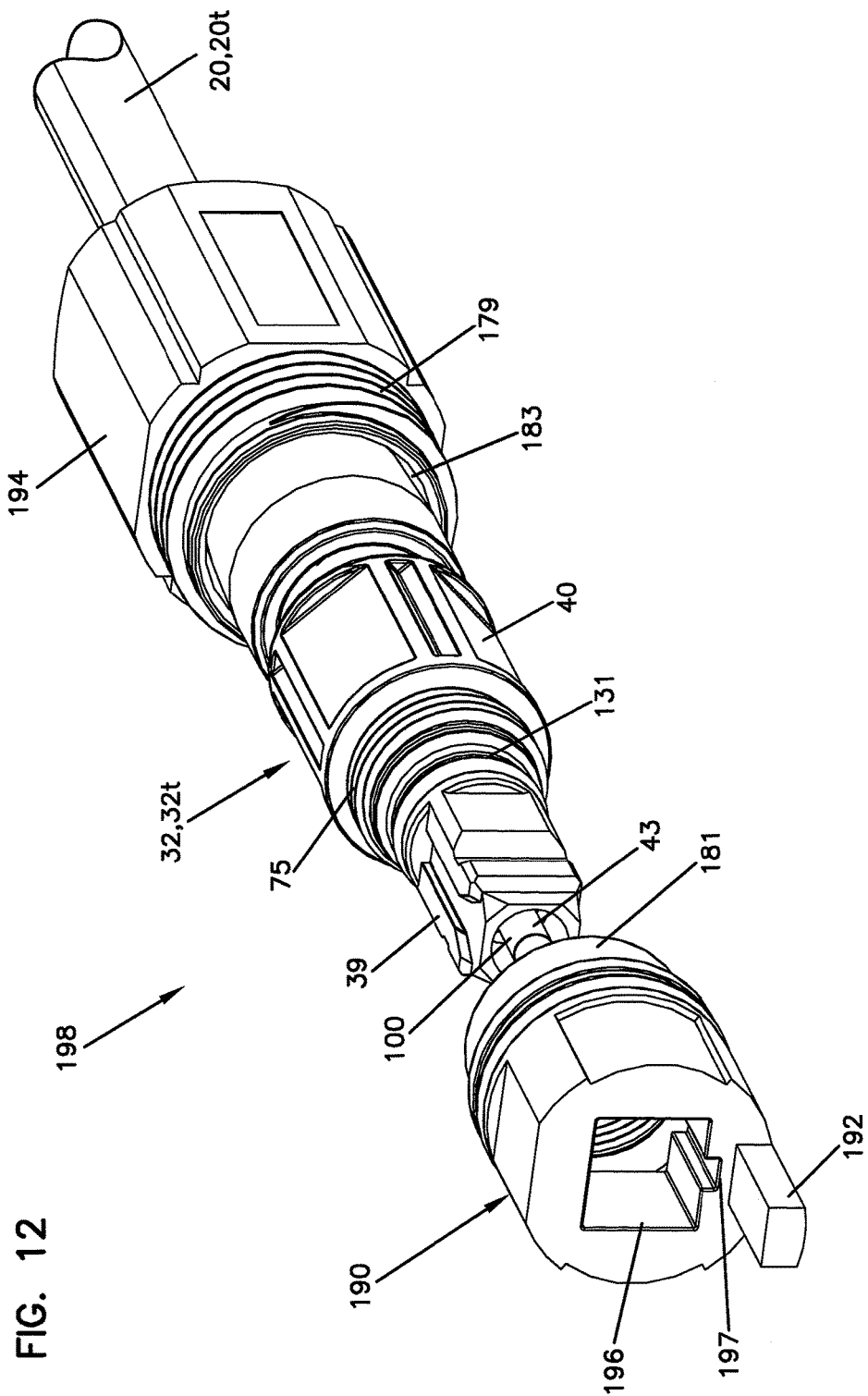
FIG. 12 is yet another perspective view of the converted fiber optic connector of FIG. 9 of the fourth arrangement of the example fiber optic connection system, wherein the hardened fiber optic converter is detached.

The third fiber optic connection system arrangement 630, illustrated at FIGS. 7 and 8, is the same as the second fiber optic connection system arrangement 620 except the slideable lock 50 is excluded from the third arrangement 630. Further details on the third fiber optic connection system arrangement 630, including details on the function, are given below.

Figure 81:
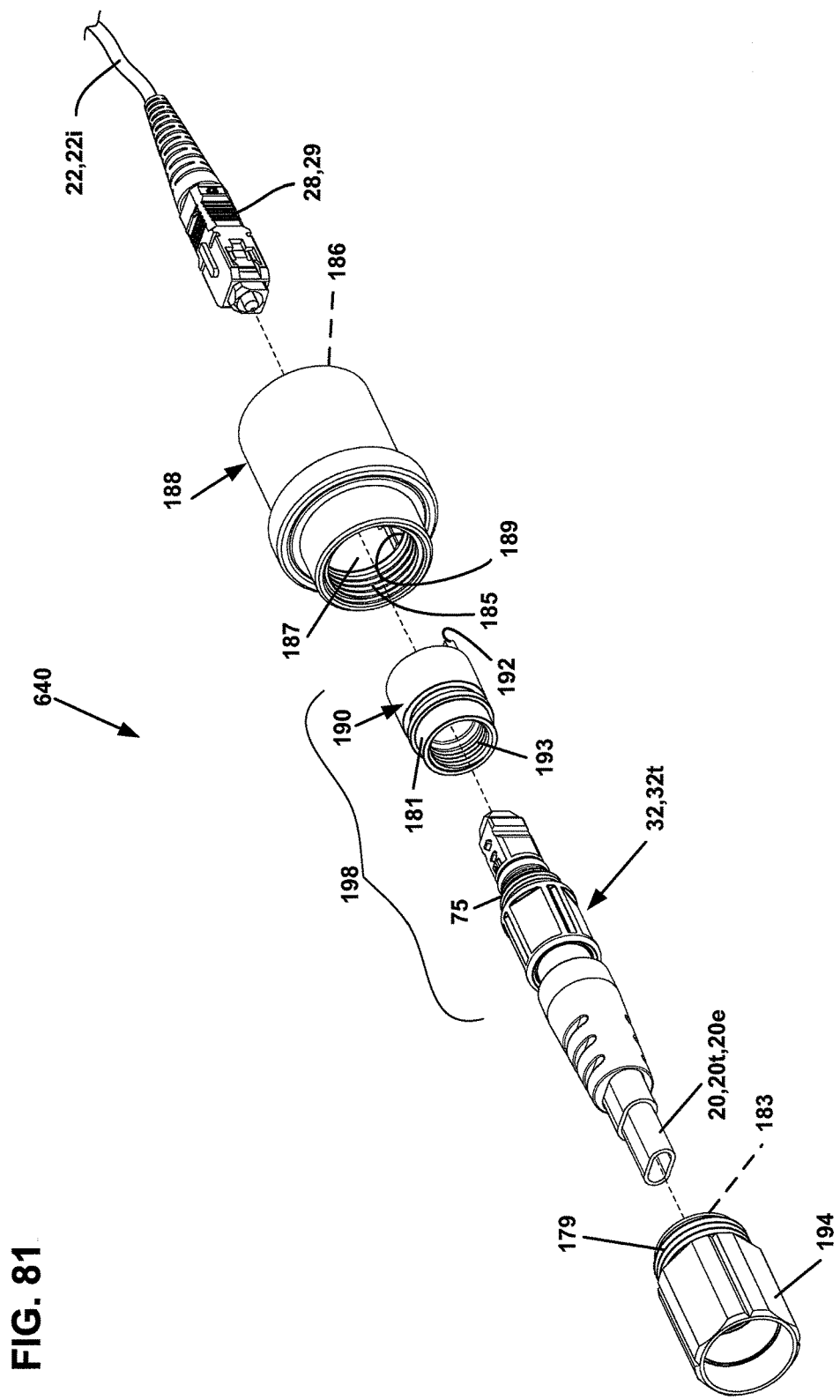
FIG. 81 is an exploded perspective view of the fourth arrangement of the example fiber optic connection system connecting the optical fiber terminated at the SC connector of FIG. 1 with the converted fiber optic connector of FIG. 9 via another fiber optic adapter.
Figure 82:
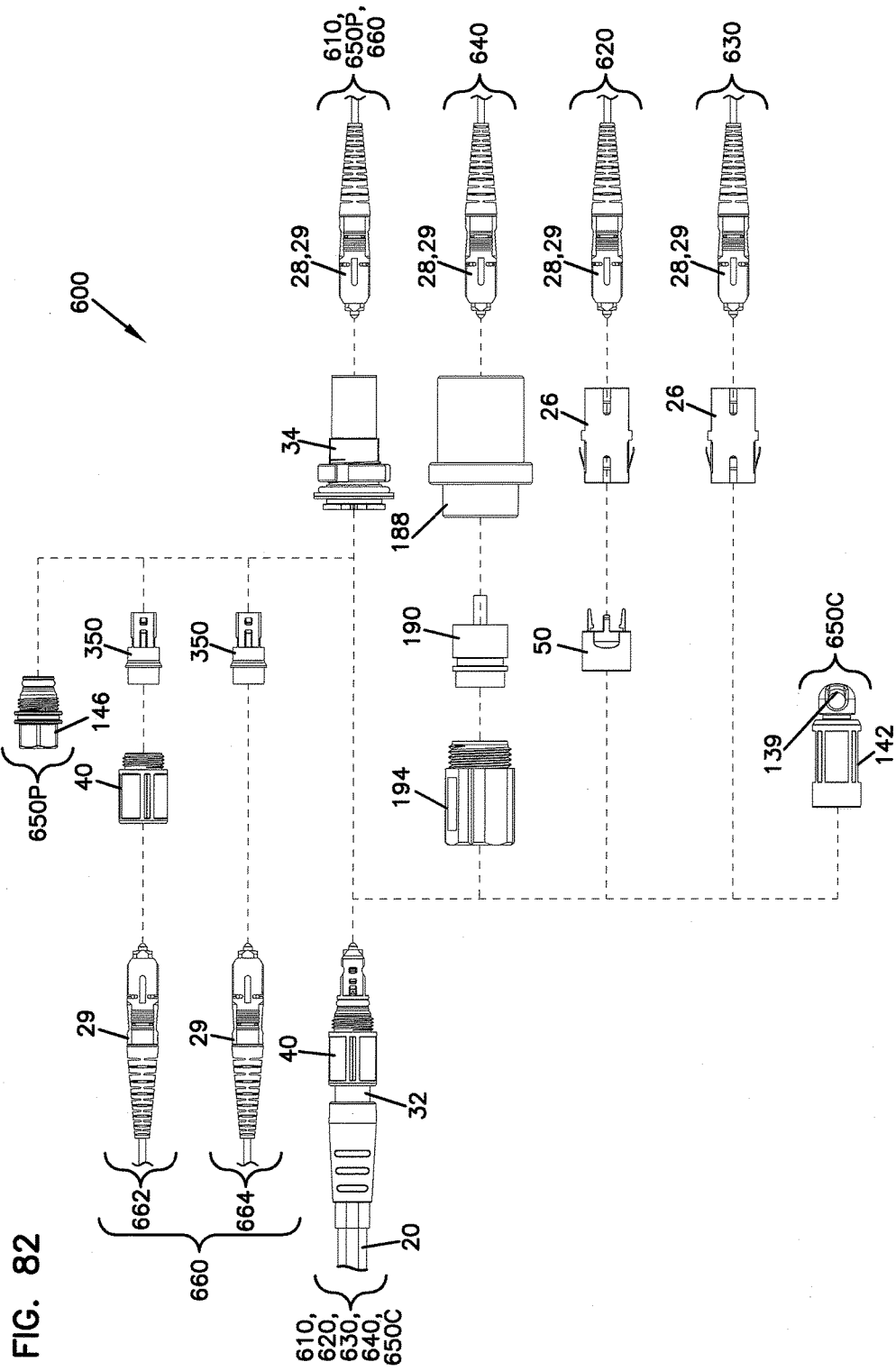
FIG. 82 is a schematic view illustrating the relationships between the various arrangements of the example fiber optic connection system.
Figure 83:
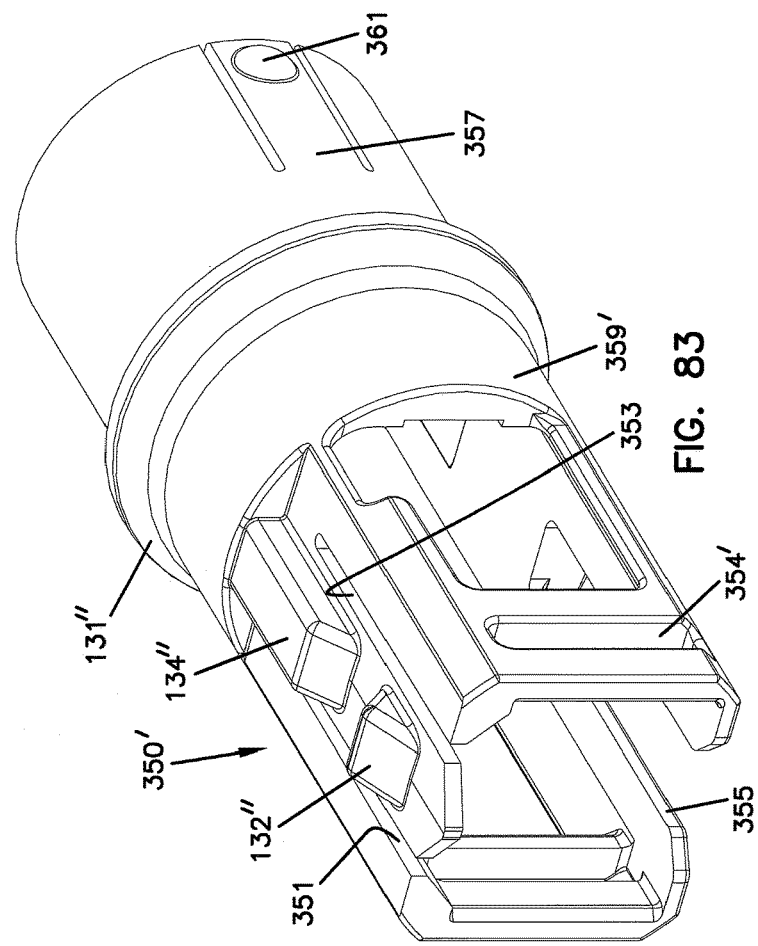
FIG. 83 is a perspective view of an alternate converter sleeve similar in function to the converter sleeve of FIG. 16.
Figure 84:
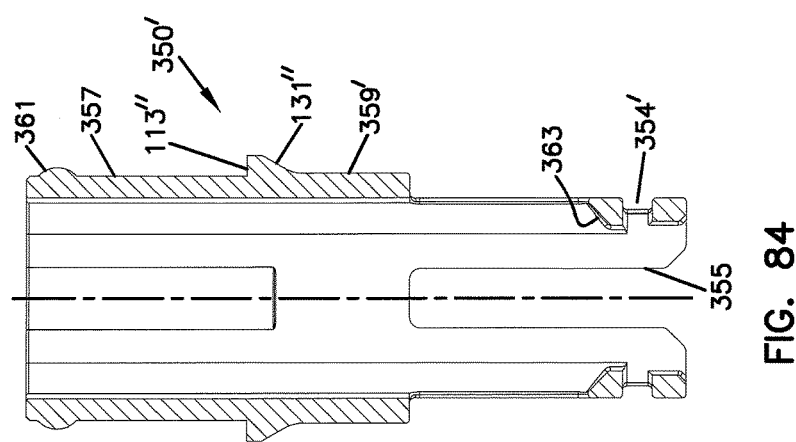
FIG. 84 is a cross-sectional top plan view of the converter sleeve of FIG. 83.
Figure 85:
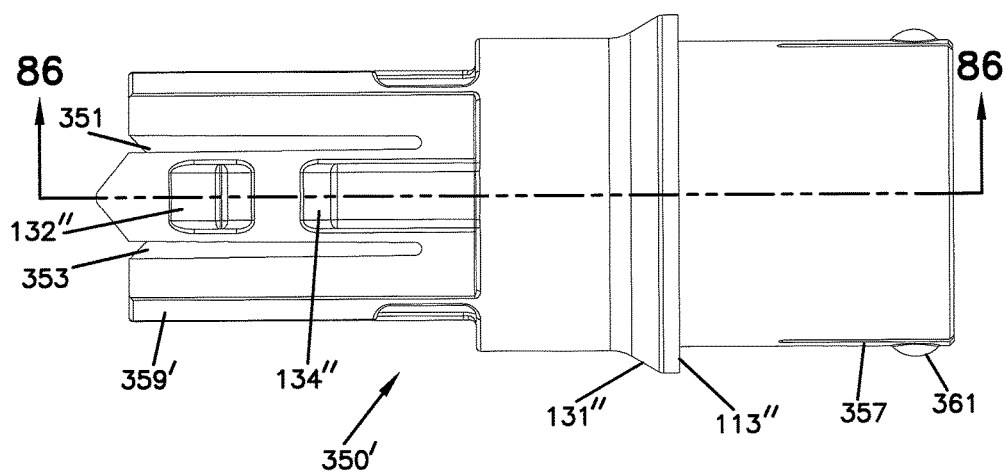
FIG. 85 is a top plan view of the converter sleeve of FIG. 83.
Figure 86:
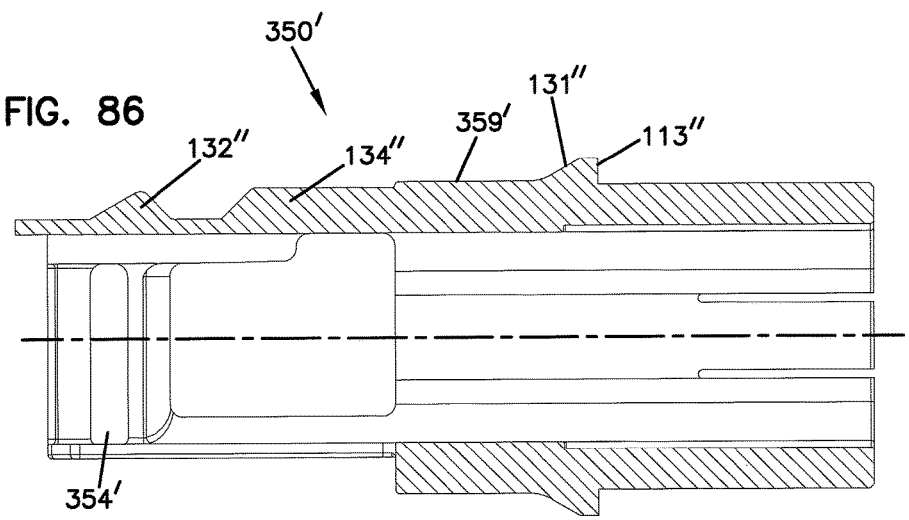
FIG. 86 is a cross-sectional side elevation view of the converter sleeve of FIG. 83.

The fourth fiber optic connection system arrangement 640, illustrated at FIGS. 9-12 and 81, includes an example interface converter 190 attached to the fiber optic connector 32 terminating the cable 20. In a preferred embodiment, the interface converter 190 includes a threaded portion 193 compatible with the threaded portion 75 of the coupling nut 40. A preferred method of attaching the interface converter 190 to the fiber optic connector 32 involves aligning a first protrusion 132 on the connector housing 39 with a keyway 197 of the interface converter 190. Upon alignment of the keyway 197 with the first protrusion 132, an opening 196 of the interface converter 190 is slid over the connector housing 39 and the threaded portion 75 of the coupling nut 40 is screwed into the threaded portion 193 of the interface converter 190. Screwing the threaded portion 75 of the coupling nut 40 into the threaded portion 193 continues until a tapered seat 191 (see FIG. 11) of the interface converter 190 is drawn against a tapered seat 131 (see FIG. 12) of the connector housing 39. The interface converter 190 is thereby securely attached to the fiber optic connector 32 and converts the fiber optic connector 32 into a fiber optic connector 198 with a different interface compatible with other fiber optic adapters and components. For example, as illustrated at FIG. 81, the example interface converter 190 includes an interface feature 192 which matches and is compatible with an interface feature 189 of a fiber optic adapter 188. Additional information on such a fiber optic adapter 188 is disclosed at U.S. Provisional Utility Patent Application Ser. No. 60/948,860, entitled INTERFACE CONVERTER FOR SC FIBER OPTIC CONNECTORS, filed Jul. 10, 2007 and at U.S. Provisional Utility Patent Application Ser. No. 61/004,045, entitled INTERFACE CONVERTER FOR SC FIBER OPTIC CONNECTORS, filed Nov. 21, 2007 which are hereby incorporated by reference in their entirety.

In certain embodiments, the converted fiber optic connector 198 is environmentally sealed. Environmental sealing between the fiber optic connector 32 and the interface converter 190 can be accomplished by a sealing member 49 (e.g., an O-ring) mounted on the connector housing 39 which seals against a sealing surface 199 of the converter 190. Environmental sealing between the converted fiber optic connector 198 and the fiber optic adapter 188 or other component may be accomplished by another O-ring 195.

In a preferred embodiment, the converted fiber optic connector 198 is securely attached to the fiber optic adapter 188 or other component. For example, a coupling nut 194 can include external threads 179 and an internal piloting diameter 183. Additionally, as illustrated at FIG. 81, the fiber optic adapter 188 includes a hardened port 187 adapted for connection with the interface converter 190 and the converted fiber optic connector 198. The hardened port 187 can include threads 185 compatible with the threads 179 of the coupling nut 194. The converted fiber optic connector 198 can thus be plugged into the hardened port 187 of the adapter 188 and secured by the coupling nut 194. The orientation between the converted connector 198 and the adapter 188 can be aligned by cooperation of the interface features 189 and 192. The interface converter 190 can include an external piloting diameter 181 that rotatably engages the internal piloting diameter 183 of the coupling nut 194. Preferably, the coupling nut 194 and the interface converter 190 rotatably and removably connect to each other when the external piloting diameter 181 is positioned within the internal piloting diameter 183 by a light manual force. This characteristic can be imparted to the coupling nut 194/interface converter 190 connection by including a slight draft and/or undercut on either the external piloting diameter 181, the internal piloting diameter 183, or both. Preferably, a light manual force can disconnect the coupling nut 194 from the interface converter 190. Examples of such attachments are disclosed at the aforementioned U.S. provisional patent applications which were incorporated by reference above.

Typically, the fourth fiber optic connection system arrangement 640 is employed when transmitting an optical signal from an external cable, such as the external cable 20e, to an internal cable, such as the internal cable 22i, located within an enclosure. In this case, the hardened port 187 of the adapter 188 is an external port. Opposite the hardened external port 187 is an internal port 186 compatible with a connector terminating an internal cable such as the SC connector 29 terminating the internal cable 22i. The fiber optic adapter 188, illustrated at FIG. 81, can thus be securely mounted through a hole in an enclosure with the hardened external port 187 accessible from the enclosure's exterior and the internal port 186 accessible from within the enclosure. The external cable 20e can be connected to the hardened external port 187 and the internal cable 22i can be connected to the internal port 186. In such an embodiment, the external cable 20e is adapted to carry the optical signal to the enclosure and the fiber optic connection system arrangement 640 allows the signal to be transferred from the external cable 20e to the internal cable 22i. An optical signal can likewise be carried by the internal cable 22i and transmitted to the external cable 20e.

Figure 13:
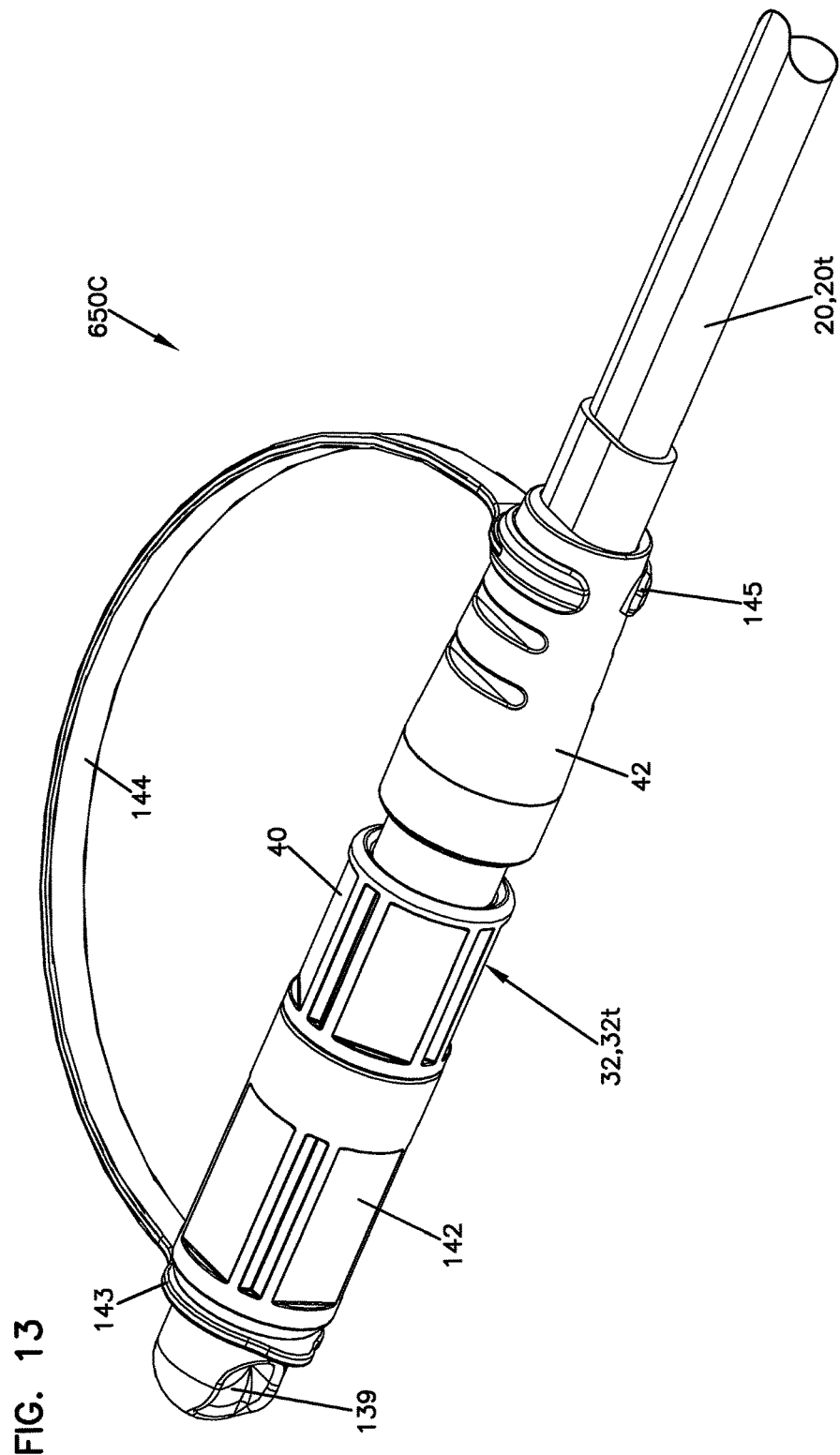
FIG. 13 is a perspective view of a fifth arrangement of the example fiber optic connection system wherein the coupling nut of FIG. 5 of the hardened fiber optic connector of FIG. 1 is attached to a hardened cap.
Figure 14:
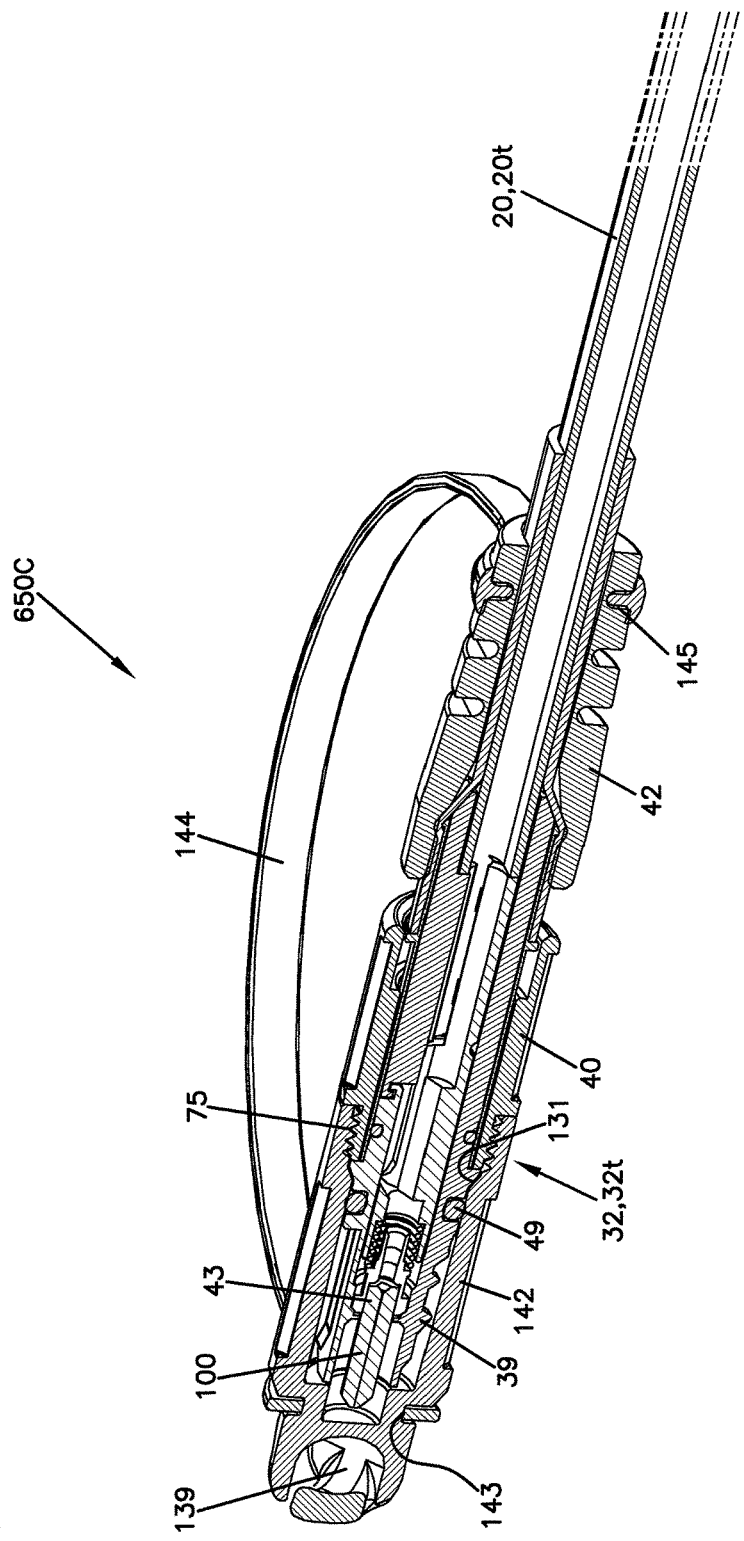
FIG. 14 is a cross-sectional perspective view of the fifth arrangement of the example fiber optic connection system of FIG. 13, wherein a central buffer tube is shown as transparent.
Figure 15:
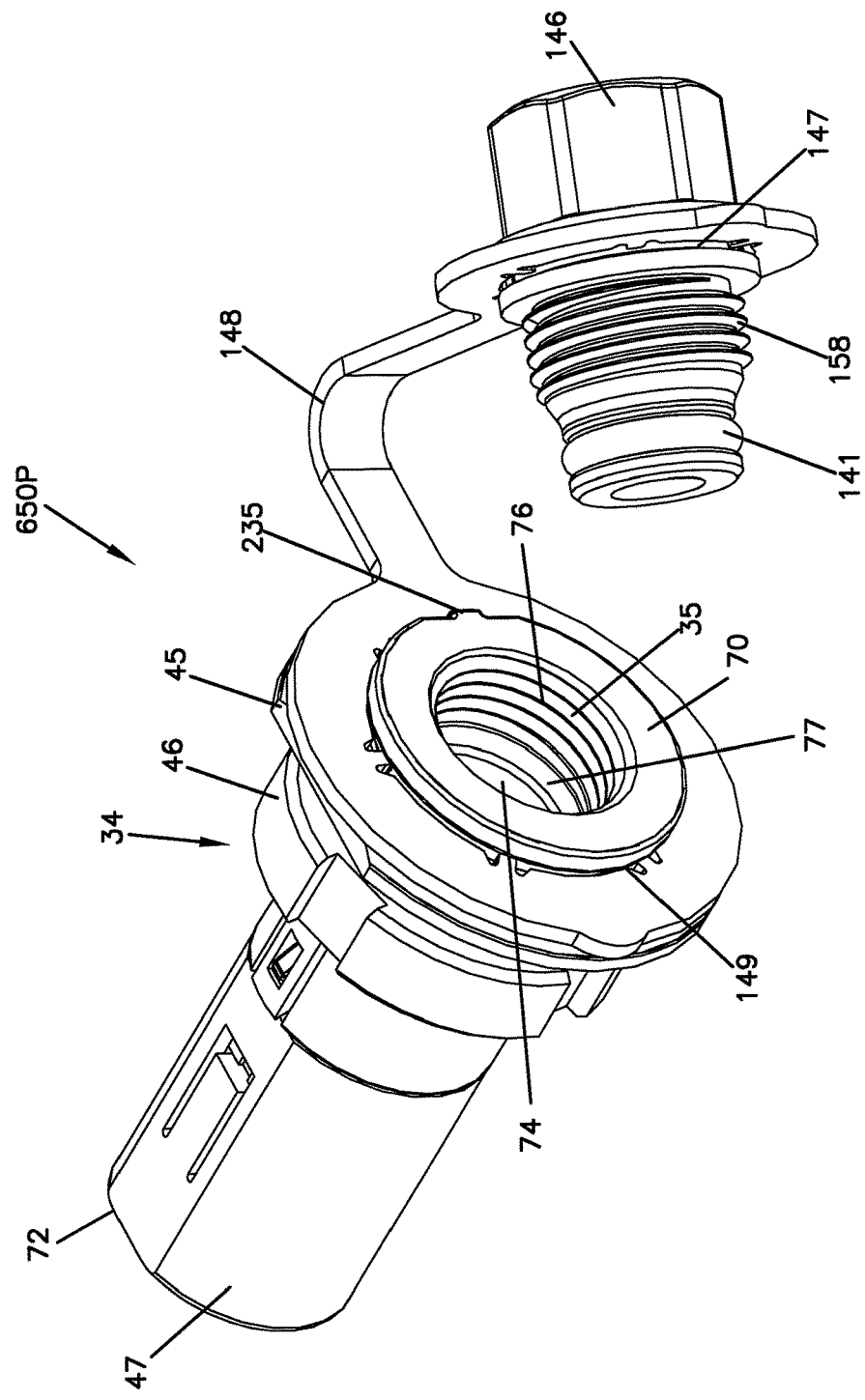
FIG. 15 is a perspective view of the hardened fiber optic adapter of FIG. 1 and an adapter plug and a plug strap.

The fifth fiber optic connection system arrangement 650, illustrated at FIGS. 13-15, includes a cap 142 attached to the fiber optic connector 32 terminating the cable 20 and a plug 146 inserted into the hardened port 35 of the fiber optic adapter 34. This arrangement 650 is useful in protecting optical interfaces of the fiber optic connector 32 and the fiber optic adapter 34 from the environment when not otherwise connected.

The arrangement 650 includes arrangement 650C with the cap 142 covering at least a portion of the connector 32. To install the cap 142 on the connector 32, the open end of the cap 142 is slid over the connector housing 39 and the threaded portion 75 of the coupling nut 40 is screwed into a threaded portion 157 of the cap 142. Screwing the threaded portion 75 of the coupling nut 40 into the threaded portion 157 of the cap 142 continues until a tapered seat of the cap 142 is drawn against the tapered seat 131 of the connector housing 39 (see FIG. 14). Environmental sealing between the fiber optic connector 32 and the cap 142 can be accomplished by the sealing member 49 mounted on the connector housing 39 which seals against a sealing surface of the cap 142.

The arrangement 650 also includes arrangement 650P with the plug 146 sealing the hardened port 35 of the adapter 34. To install the plug 146 in the adapter 34, a threaded portion 158 of the plug 146 is inserted into the hardened port 35 of the adapter 34 and the threaded portion 158 is screwed into a threaded portion 76 of the adapter 34. Screwing the threaded portion 158 of the plug 146 into the threaded portion 76 of the adapter 34 continues until a tapered seat 77 of the adapter 34 is drawn against a tapered seat of the plug 146 (see FIG. 15). Environmental sealing between the plug 146 and the adapter 34 can be accomplished by an O-ring 141 mounted on the plug 146 which seals against a sealing surface 74 of the adapter 34.

In a preferred embodiment, additional features are included on the cap 142 and the plug 146. The cap 142 can be fitted with an eyelet 139 and serve as a pulling and/or holding fixture for holding or pulling on the connector 32 (e.g., when routing the cable 20). A first end of a strap 144 can be connected to the cap 142 at a connection location 143 and a second end of the strap 144 can be connected to the strain relief boot 42 of the connector 32 at a connection location 145. Similarly, a first end of a strap 148 can be connected to the plug 146 at a connection location 147 and a second end of the strap 148 can be connected to the adapter 34 at a connection location 149. The adapter 34 can include a strap attachment feature 178, such as a groove (see FIG. 76) for attaching the connection location 149 of the strap 148. In a preferred embodiment, the strap 144 can break away from either the cap 142, the strain relief boot 42, or both and later be reconnected. In the example illustrated at FIGS. 13, 14, and 63, the strap 144 can break away from the strain relief boot 42 at the connection location 145. After breaking away, the strap 144 can be reconnected to the strain relief boot 42 at the connection location 145. Likewise, the strap 148 can be removed and reattached to the plug 146 and/or the adapter 34.

When the connector 32 is connected to the adapter 34, the plug 146 of the adapter 34 may be connected to the cap 142 of the connector 32 and retained by the straps 144, 148 thereby storing the cap 142 and the plug 146. The threaded portions 158, 157 of the plug 146 and the cap 142 can be screwed together creating the connection. When connected, the O-ring 141 mounted on the plug 146 may seal against the sealing surface of the cap 142 thus preventing environmental contamination of clean areas of the plug 146 and the cap 142.

The sixth fiber optic connection system arrangement 660, illustrated at FIGS. 16 and 17, includes the fiber optic adapter 34 and a fiber optic connector 28' terminating a cable 22'. Several details of the adapter 34 are described above including the hardened first port 35 and the unhardened second port 37. In a preferred embodiment, the unhardened second port 37 is compatible with the SC connector 29. The hardened first port 35, by itself, is not compatible with the SC connector 29. To accommodate connecting the SC connector 29 into the hardened first port 35, the sixth connection system arrangement 660 modifies and converts the SC connector 29 into the fiber optic connector 28'. The fiber optic connector 28' is compatible with the hardened first port 35 of the adapter 34. In summary, a release sleeve 25 (see FIG. 2) is removed from the SC connector 29 and a converting sleeve 350 is installed on the SC connector 29 creating the converted fiber optic connector 28'.

Further details of the sixth fiber optic connection system arrangement 660, including details on the function and construction, are given below.

Returning now to the first fiber optic connection system arrangement 610, introduced at FIGS. 1 and 2, the methods and features of connecting the hardened fiber optic connector 32 to the hardened first port 35 of the fiber optic adapter 34 will be described in detail. FIGS. 18-28 illustrate in detail the connection method and features of this arrangement 610 with certain components and features shared with the other arrangements 620, 630, 640, 650, 660.

FIGS. 18-21 illustrate alignment features facilitating convenient insertion of the connector housing 39 of the connector 32 into the first port 35 of the adapter 34. This insertion is typically done by hand and initially involves placing a plug portion 56 of the connector housing 39 within the threaded portion 76 of the port 35. As the threaded portion 76 is generally cylindrical with an inner diameter significantly larger than the corresponding cross-section of the plug portion 56, the initial placement accuracy required is within the ability of most people. The generally cylindrical shape of the threaded portion 76 receives any axial rotational orientation of the plug portion 56. In addition, the larger inner diameter of the threaded portion 76 allows other angular and translational misalignments to occur initially.

Figure 21:
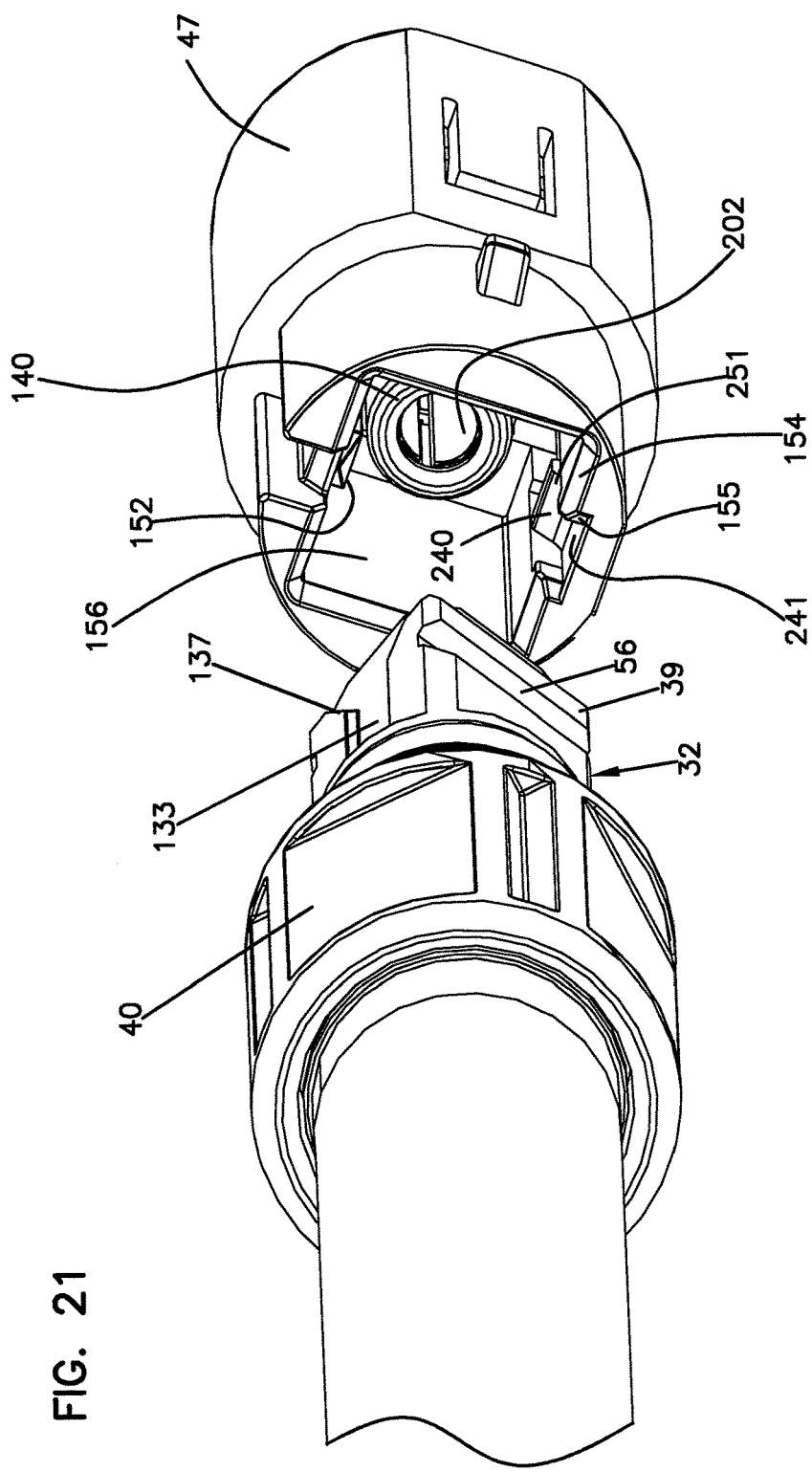
FIG. 21 is a partial perspective view with the first housing piece of the hardened fiber optic adapter of FIG. 1 removed revealing details of the second housing piece which is shown angularly misaligned with the hardened fiber optic connector of FIG. 1.
Figure 22:
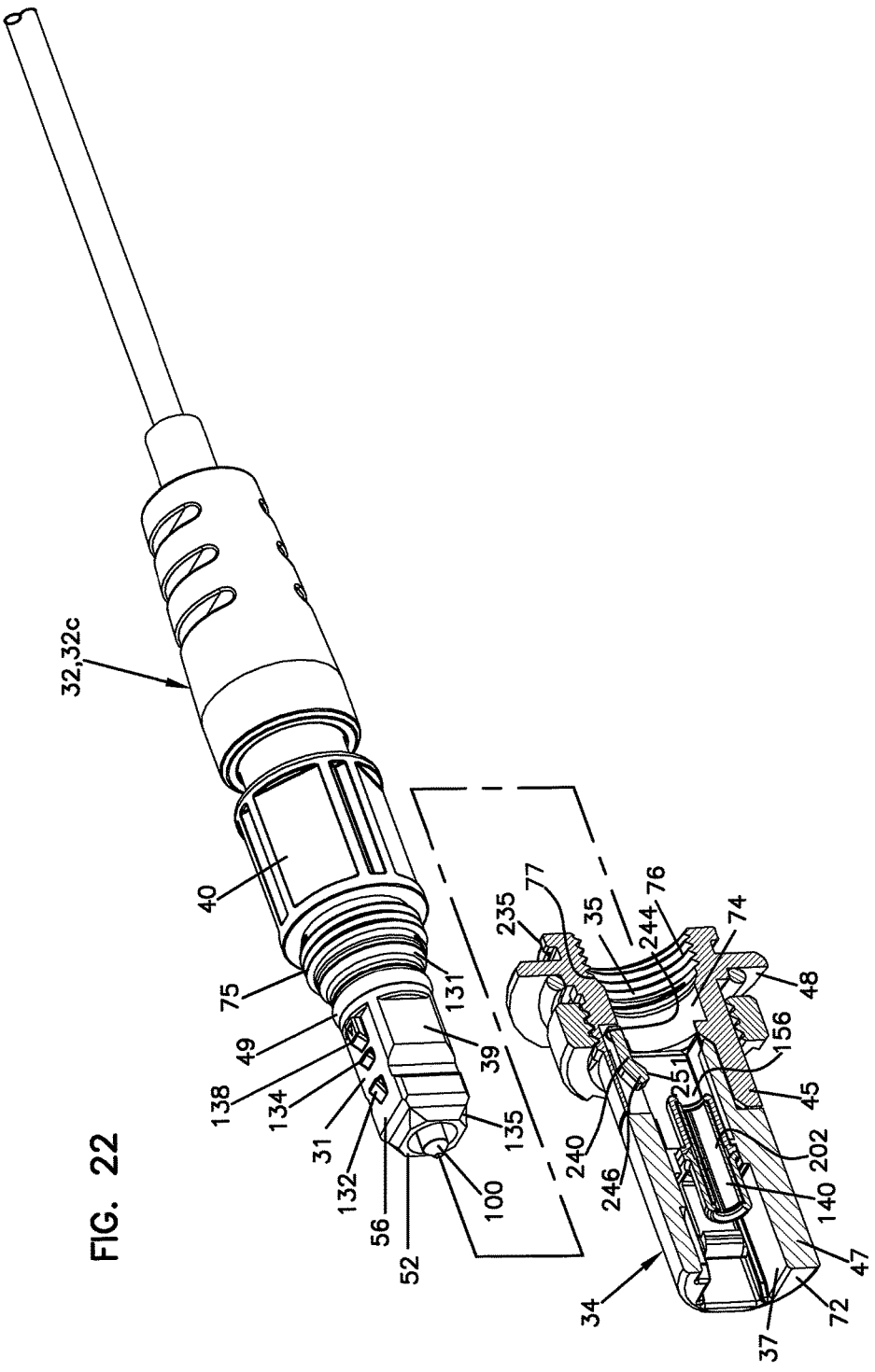
FIG. 22 is a perspective view with the hardened fiber optic adapter of FIG. 1 shown in cross-section and the hardened fiber optic connector of FIG. 1 disconnected from the adapter.

Before the insertion continues, the axial rotational orientation of the connector 32 must match the adapter 34 within a pre-determined tolerance to allow a key 152 of the adapter 34 to engage a keyway 133 of the connector 32 (see FIG. 21). Preferably, an axial rotational orientation indicator 235 (see FIG. 18) is provided on the adapter 34 that can be visually aligned with the first protrusion 132 (mentioned above) or other mark, such as a third protrusion 138, on the connector 32. For convenience and efficiency when inserting, it is beneficial and desired to have the pre-determined axial rotational orientation tolerance as large as practical. To achieve this goal, a preferred embodiment of the present disclosure includes corner chamfers 135 on the plug portion 56 of the connector housing 39 that engage alignment chamfers 154 of an inner portion 156 of the port 35 (see FIG. 19). In addition, keyway chamfers 137 are included on the keyway 133 to engage key chamfers 153 of the key 152 (see FIG. 21) and latch channel chamfers 155 are included on a latch channel 241 to engage the first protrusion 132 of the connector housing 39 (see FIG. 19). In a preferred embodiment of the present disclosure, an axial rotational orientation tolerance of ±30 degrees is achieved between the connector 32 and the first port 35 of the adapter 34 at an insertion depth where the plug portion 56 of the connector housing 39 begins to enter the inner portion 156 of the port 35. In another embodiment of the present disclosure, an axial rotational orientation tolerance of ±20 degrees is achieved between the connector 32 and the first port 35 of the adapter 34 at the insertion depth where the plug portion 56 of the connector housing 39 begins to enter the inner portion 156 of the port 35.

As the insertion continues, translational and angular misalignments are corrected and reduced by the features of the preceding paragraph. In addition, the tapered seat 77 (mentioned above) of the adapter 34 can also guide the plug portion 56 of the connector housing 39 into the inner portion 156 of the port 35. The translational and angular misalignments are sufficiently reduced at an insertion depth where a ferrule 100 of the connector 32 reaches an adapter assembly 140 of the adapter 34 that a tapered tip of the ferrule 100 is received within a split sleeve 202 of the adapter assembly 140. Continued insertion causes an outer diameter of the ferrule 100 to be received by an inner diameter of the split sleeve 202 (see FIG. 23). The fit between the outer diameter of the ferrule 100 and the inner diameter of the split sleeve 202 is sufficiently accurate to allow transmission of a fiber optic signal between a first fiber within a first ferrule 100 and a second fiber within a second ferrule 230 when both the first and second ferrules 100, 230 are held by the same split sleeve 202.

The plug portion 56 of the connector housing 39 of the connector 32 is sized and shaped to fit within the inner portion 156 of the first port 35 of the adapter 34, as shown at FIGS. 21-26. The plug portion 56 preferably has a generally rectangular exterior 490 (see FIGS. 49 and 50) that mates or matches (e.g., nests, complements) with a generally rectangular interior 491 (see FIGS. 76-78) of the inner portion 156 of the first port 35 accessed through the threaded portion 76 (see FIGS. 18, 19, and 21). The generally rectangular exterior 490 and the generally rectangular interior 491 each have a generally rectangular form that extends in a distal-to-proximal direction. The rectangular form of the generally rectangular exterior 490 at least partially defines the plug portion's 56 exterior, and the rectangular form of the generally rectangular interior 491 at least partially defines the inner portion 156 of the first port 35. Injection molding draft angles, fillets, radii, and various other features can depart from the generally rectangular form of the exterior 490 of the plug portion 56 and the interior 491 of the inner portion 156 of the first port 35. A square shape is a particular kind of a rectangular shape and is also referred to by the term "rectangular".

Figure 23:
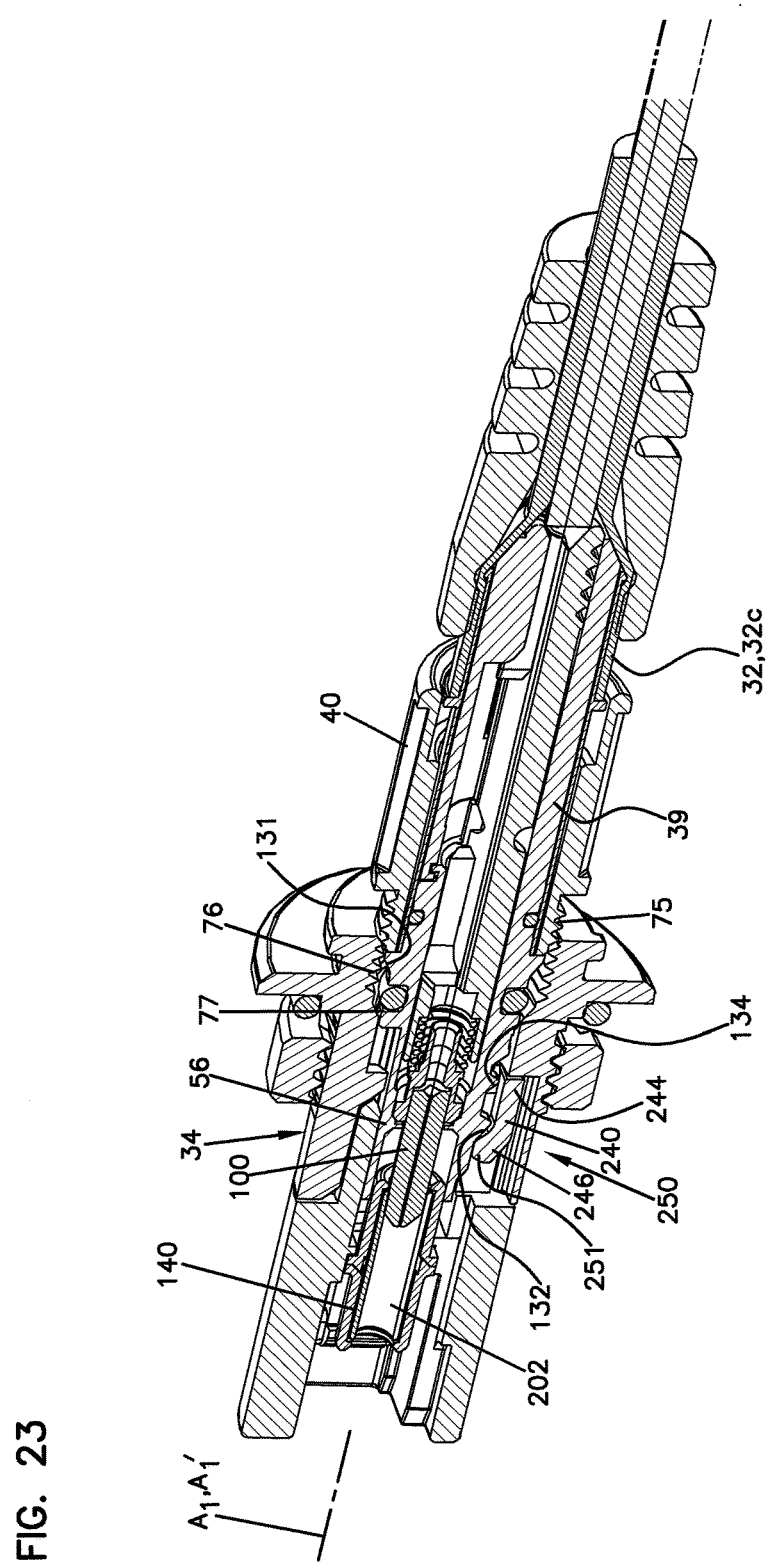
FIG. 23 is a cross-sectional perspective view of the hardened fiber optic connector of FIG. 1 inserted but not connected at the hardened port of the hardened fiber optic adapter of FIG. 1, wherein the central buffer tube is shown as transparent.

FIG. 23 illustrates the connection progress at a point where the plug portion 56 has entered the inner portion 156 and the ferrule 100 has entered the split sleeve 202.

Figure 24:
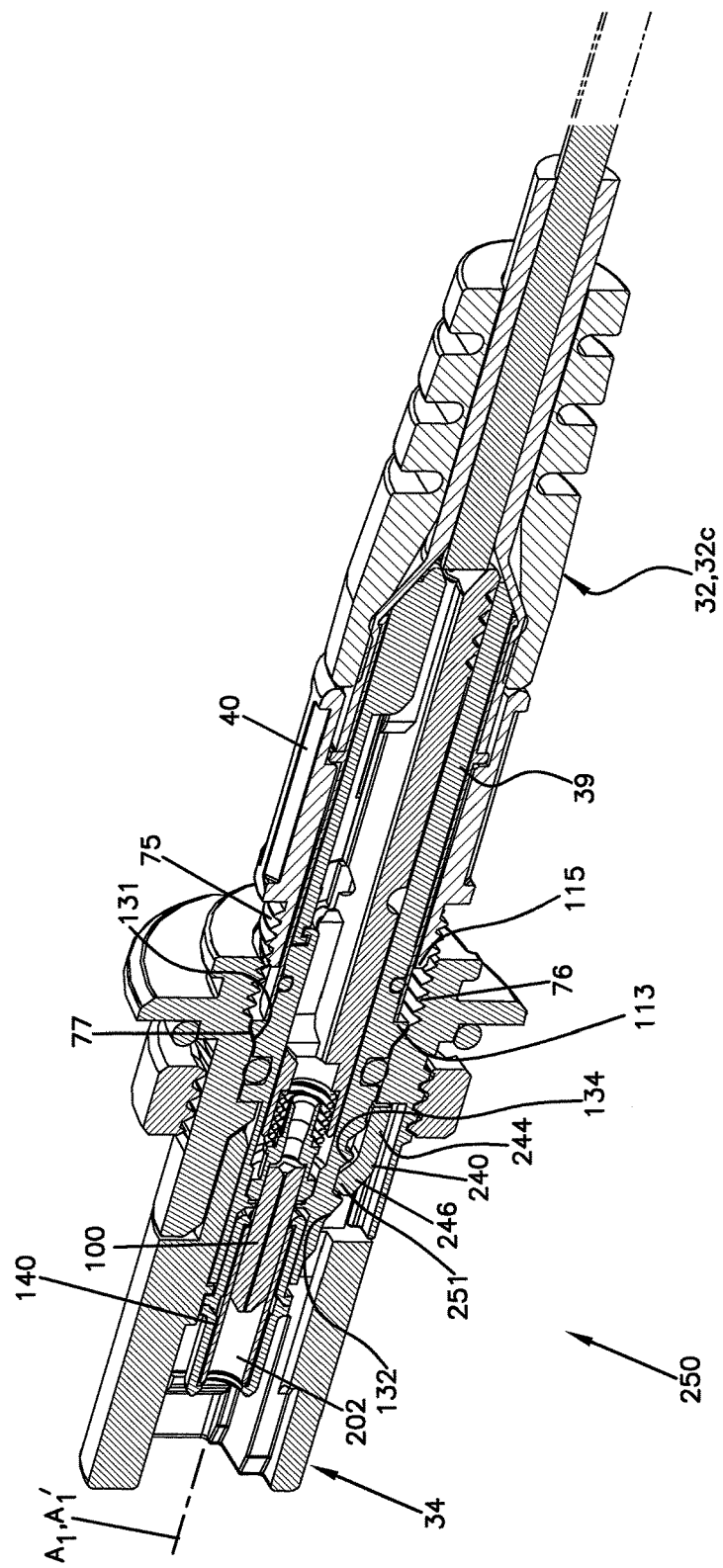
FIG. 24 is a cross-sectional perspective view of the hardened fiber optic connector of FIG. 1 connected but not fully secured at the hardened port of the hardened fiber optic adapter of FIG. 1, wherein a fiber and the central buffer tube are removed for the purpose of illustration.
Figure 25:
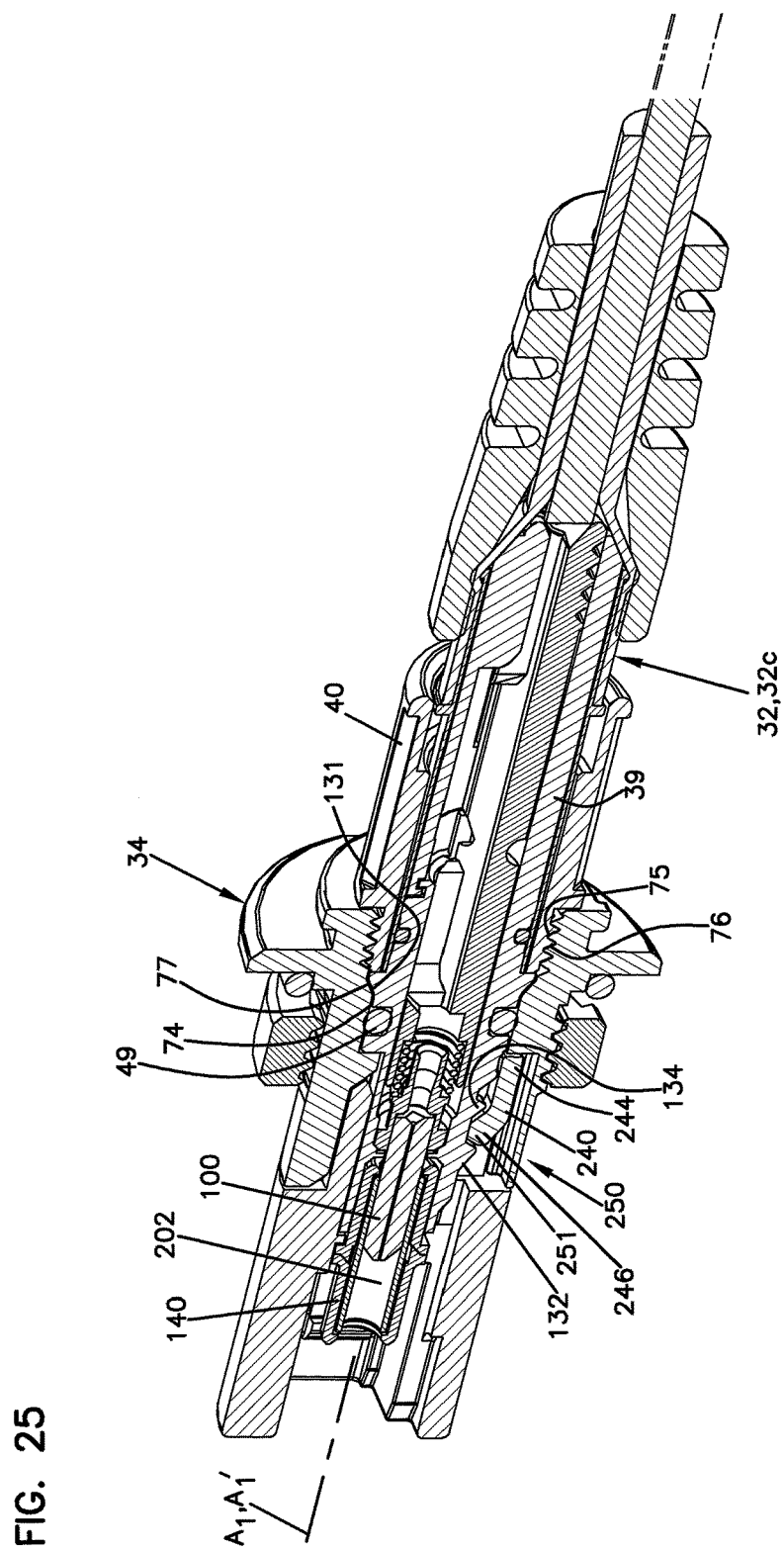
FIG. 25 is a cross-sectional perspective view of the hardened fiber optic connector of FIG. 1 connected and secured at the hardened port of the hardened fiber optic adapter of FIG. 1, wherein the fiber and the central buffer tube are removed for the purpose of illustration.
Figure 26:
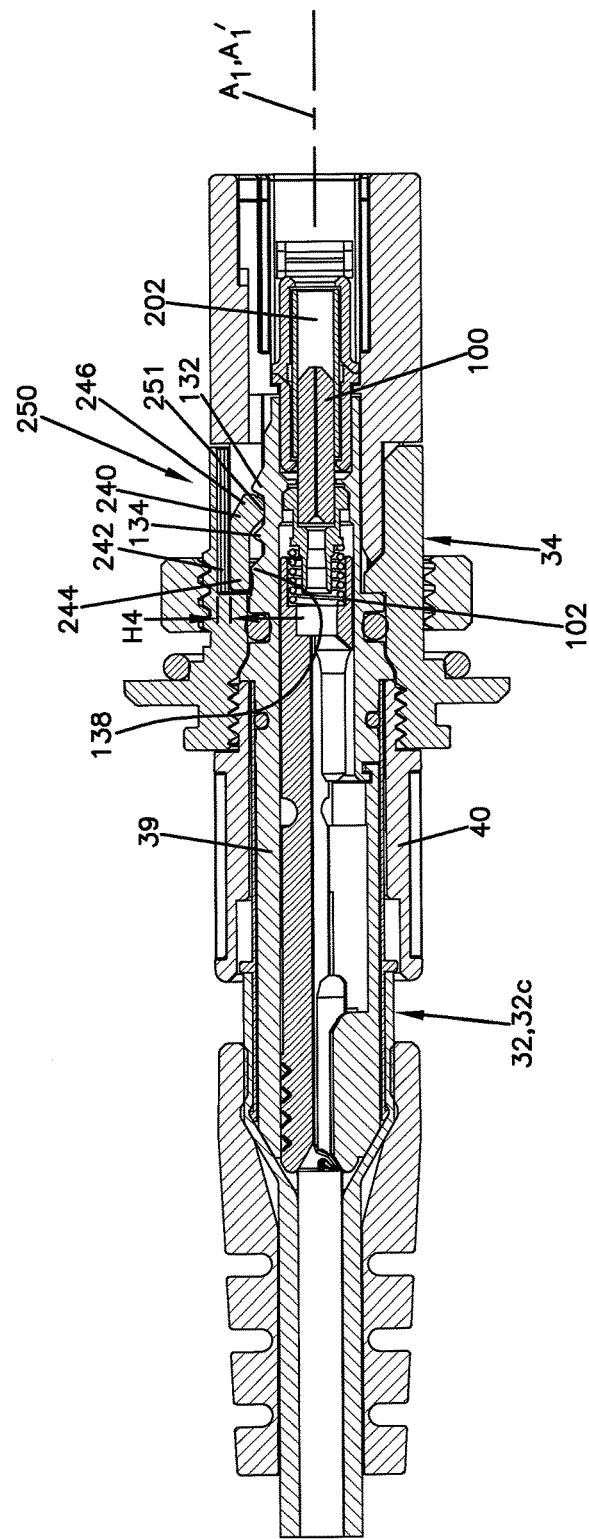
FIG. 26 is a cross-sectional elevation view of the hardened fiber optic connector of FIG. 1 connected and secured at the hardened port of the hardened fiber optic adapter of FIG. 1, wherein the fiber and the central buffer tube are removed for the purpose of illustration.

The next step in the connection process involves a latch 250. As shown at FIGS. 23-26, the latch 250 is provided at the inner portion 156 of the port 35. The latch 250 has a cantilever arm 240 with a base end 244 that is integrally molded with the inner portion 156 (see FIGS. 19, 21, and 22). In a preferred embodiment, the arm 240 extends in a distal direction from the base end 244 to a free end 246. In other embodiments, the arm 240 can extend in a proximal direction. In still other embodiments, the arm 240 can extend in other directions such as a circumferential direction. A retention tab 251 is provided adjacent the free end 246 of the arm 240. The retention tab 251 includes an inclined region 249 and a declined region 248 (see FIGS. 28 and 80). In a preferred embodiment, a convexly curved region 253 is provided between the inclined region 249 and the declined region 248 (see FIG. 80). In other embodiments, a retention tab plateau is provided between the inclined region 249 and the declined region 248 (see FIGS. 25 and 28). In still other embodiments, other shapes can be provided on the retention tab 251 between the inclined region 249 and the declined region 248. The arm 240 is configured to flex as the plug portion 56 of the connector housing 39 is inserted into the inner portion 156 of the first port 35 of the adapter 34, and to provide a snap-fit connection between the connector 32 and the adapter 34 when the plug portion 56 is fully inserted into the inner portion 156. For example, as shown at FIGS. 24-26, the retention tab 251 snaps between the first protrusion 132 and a second protrusion 134 of the connector housing 39 when the plug portion 56 is fully inserted into the inner portion 156.

When inserting the plug portion 56 of the connector housing 39 into the inner portion 156 of the first port 35 of the adapter 34, the arm 240 of the latch 250 is flexed away from a central longitudinal axis $A_1$ of the connector 32 as the inclined region 249 of the retention tab 251 comes into contact with an inclined region 252 of the first protrusion 132 of the connector housing 39. Alternatively, the inclined region 249 of the retention tab 251 comes into contact with a corner 255 of the first protrusion 132. An insertion force, applied at the connector 32, is required to flex the arm 240 of the latch 250. In a preferred embodiment, the insertion force is between four and six pounds. In other embodiments, the insertion force is between two and nine pounds. The arm 240 is designed of a material capable of flexing under an applied load, such as a plastic. Insertion of the plug portion 56 into the port 35 continues until the inclined region 252 of the first protrusion 132 passes by the inclined region 249 of the retention tab 251. After the inclined region 252 of the first protrusion 132 is entirely past the inclined region 249 of the retention tab 251, the declined region 248 of the retention tab 251 comes into contact with a declined region 254 of the first protrusion 132. A restoring force generated by the flexing of the arm 240 causes the retention tab 251 to return toward the un-flexed position as the declined regions 248, 254 proceed pass each other. Insertion continues until the declined region 254 of the first protrusion 132 is completely, or almost completely, past the retention tab 251 of the arm 240. At this point, compression of the arm 240 by the connector 32 is released or mostly released, such that the arm 240 returns to or near its uncompressed state. Alternatively, the connector 32 can be designed to retain a significant portion of the compression of arm 240.

One of the benefits of the latch mechanism is that it provides a holding force that inhibits removal of the first connector 32 from the first port 35 of the adapter 34, such as to resist unintentional disengagement of the first connector 32 from the first port 35. For example, if the first connector 32 begins to move in a direction away from the first port 35, the declined regions 248, 254 come into contact with each other. At this point, in order for the first connector 32 to be removed from the first port 35, a pull-out force must be applied in a direction away from the first port 35 sufficient to cause the arm 240 to compress as the declined regions 248, 254 are pulled across each other. The pull-out force required can be configured to be greater or lesser by properly selecting the strength of the arm 240, and/or also by properly selecting slopes $\alpha_1$, $\alpha_2$ of the declined regions 254, 248 (see FIGS. 27 and 28). In a preferred embodiment, the pull-out force is between six and eight pounds. In other embodiments, the pull-out force is between three and eleven pounds. The snap-fit configuration of the latch 250 also provides a physical and audible indication that the first connector 32 has been fully inserted into the first port 35 of the adapter 34.

Figure 27:
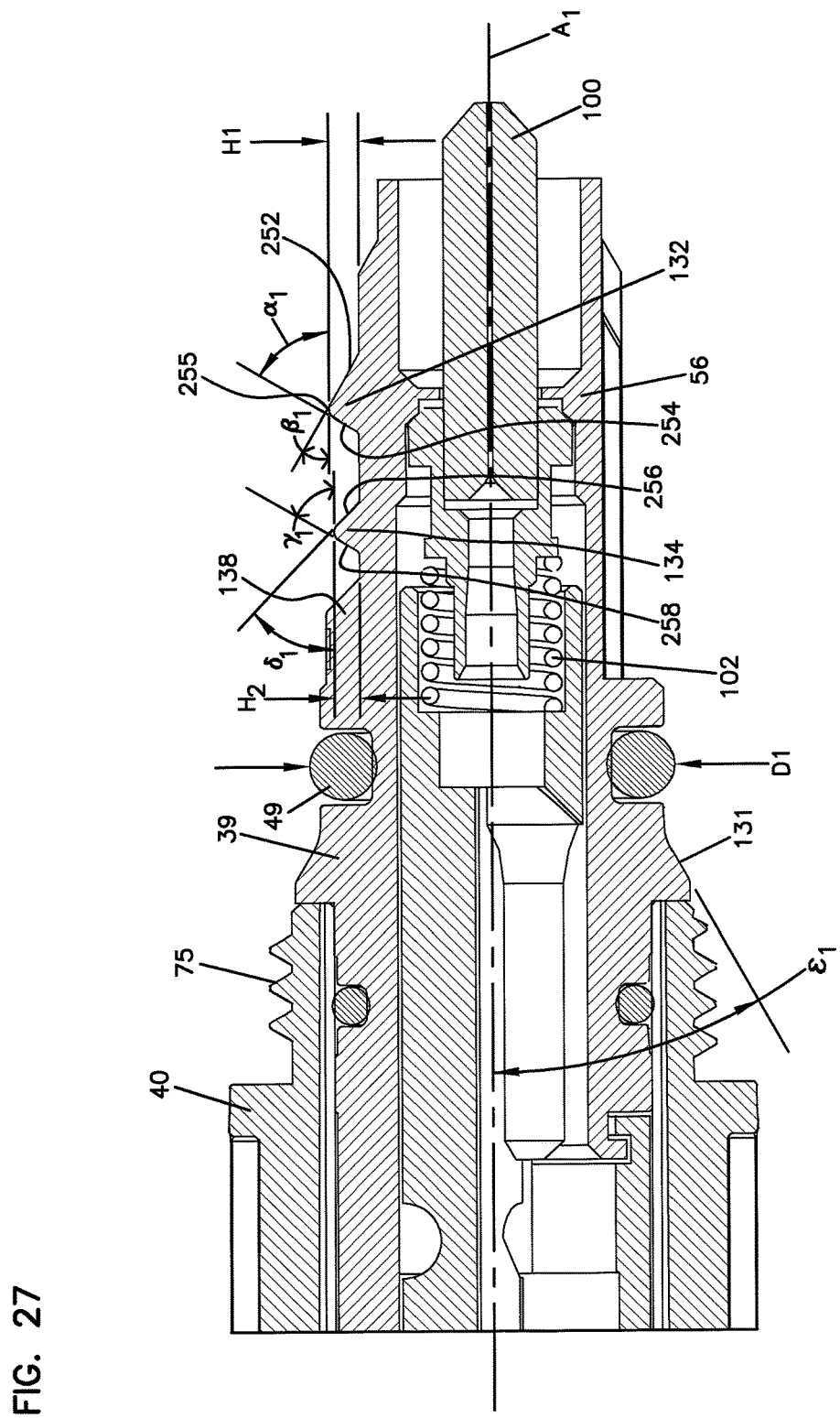
FIG. 27 is a partial cross-sectional elevation view of the hardened fiber optic connector of FIG. 1, wherein the fiber and the central buffer tube are removed for the purpose of illustration.

In one embodiment, illustrated at FIGS. 23 and 27, the inclined region 252 of the first protrusion 132 of the connector housing 39 has an angle of incline illustrated as $\beta_1$ and the declined region 254 of the first protrusion 132 has the above mentioned angle of decline illustrated as $\alpha_1$. In the illustrated embodiment, the angle $\beta_1$ is less than the angle $\alpha_1$. The benefit of this is that the latch 250 will allow easier insertion of the first connector 32 into the adapter 34 than it will allow removal, because the decreased angle of incline ($\beta_1$) will not present as much resistance to insertion as the increased angle of decline ($\alpha_1$) will present to removal. In one example, the angle $\alpha_1$ is at least 1.5 times or two times the angle $\beta_1$. In another example, the angle $\alpha_1$ is about equal to angle $\beta_1$. It is recognized, however, that any angles may be formed for angles $\alpha_1$ and $\beta_1$. In one example, angles $\alpha_1$ and $\beta_1$ are in a range from about 0 degrees to about 90 degrees, and preferably from 15 degrees to about 85 degrees. In another example, angle $\beta_1$ is in a range from about 15 degrees to about 45 degrees and angle $\alpha_1$ is in a range from about 30 degrees to about 90 degrees.

Figure 61:
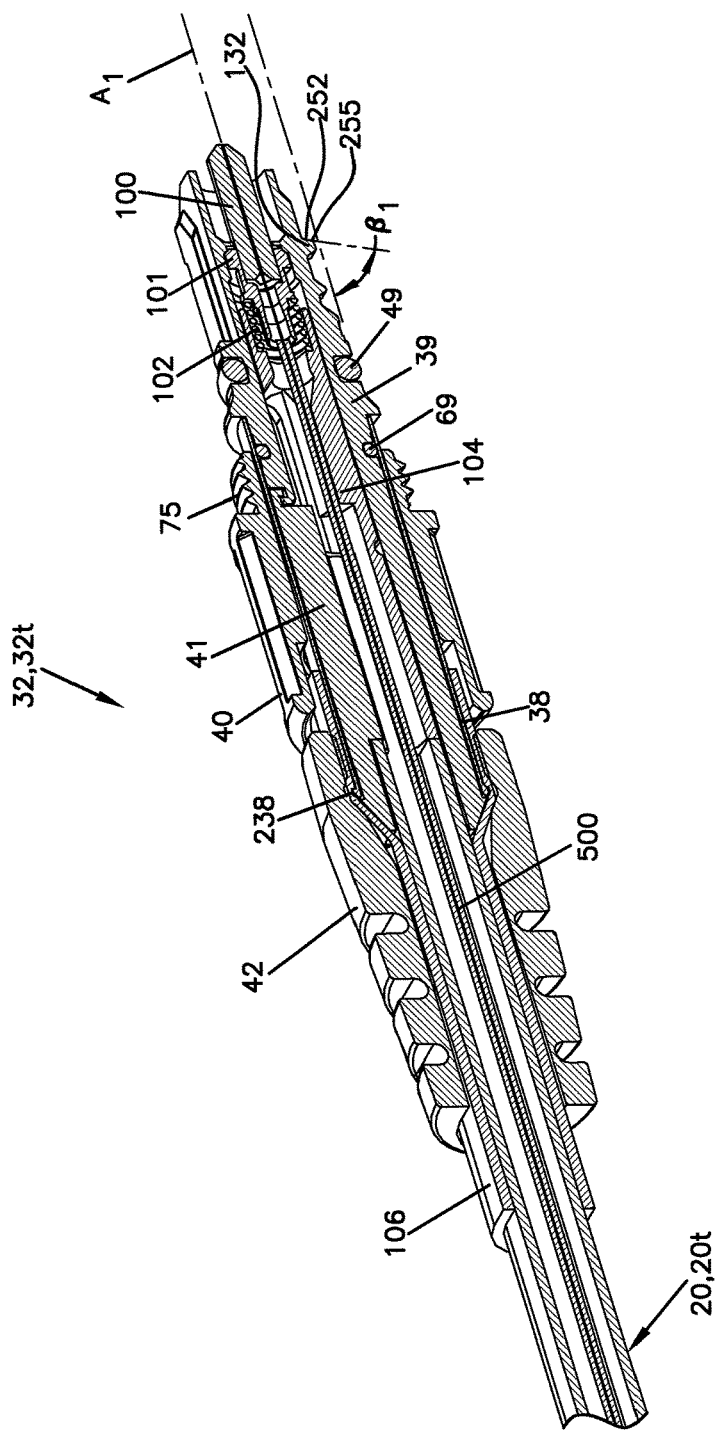
FIG. 61 is a cross-sectional perspective view of the hardened fiber optic connector of FIG. 1 configured for terminating the fiber optic tether cable of FIG. 3.
Figure 62:
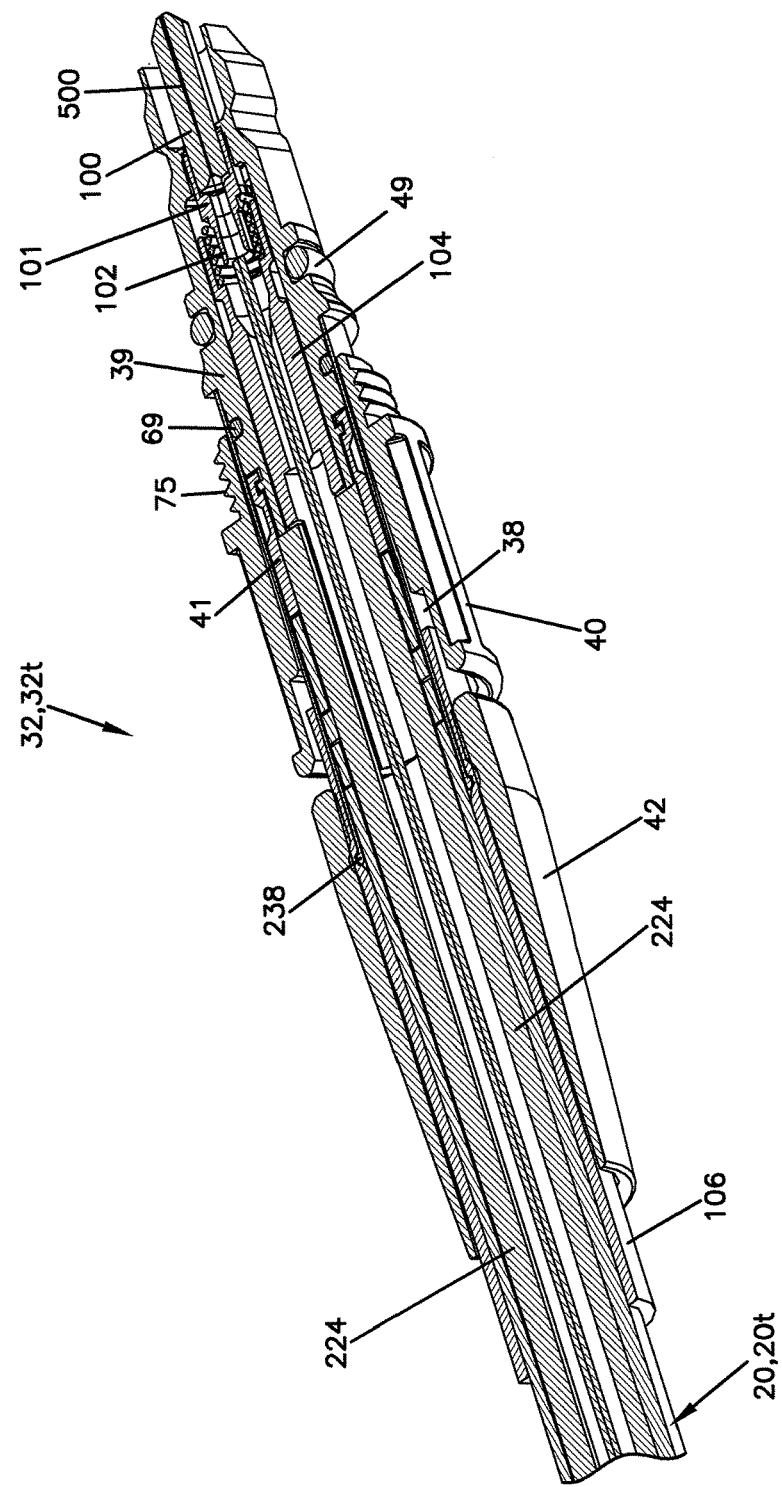
FIG. 62 is another cross-sectional perspective view of the hardened fiber optic connector of FIG. 1 configured for terminating the fiber optic tether cable of FIG. 3.

In another embodiment, illustrated at FIG. 61, angle $\beta_1$ is greater than 70 degrees and less than 90 degrees and preferably is between 75 degrees and 85 degrees. In this example, the angle $\alpha_1$ ranges between 50 degrees and 70 degrees and preferably between 55 degrees and 65 degrees.

Figure 28:
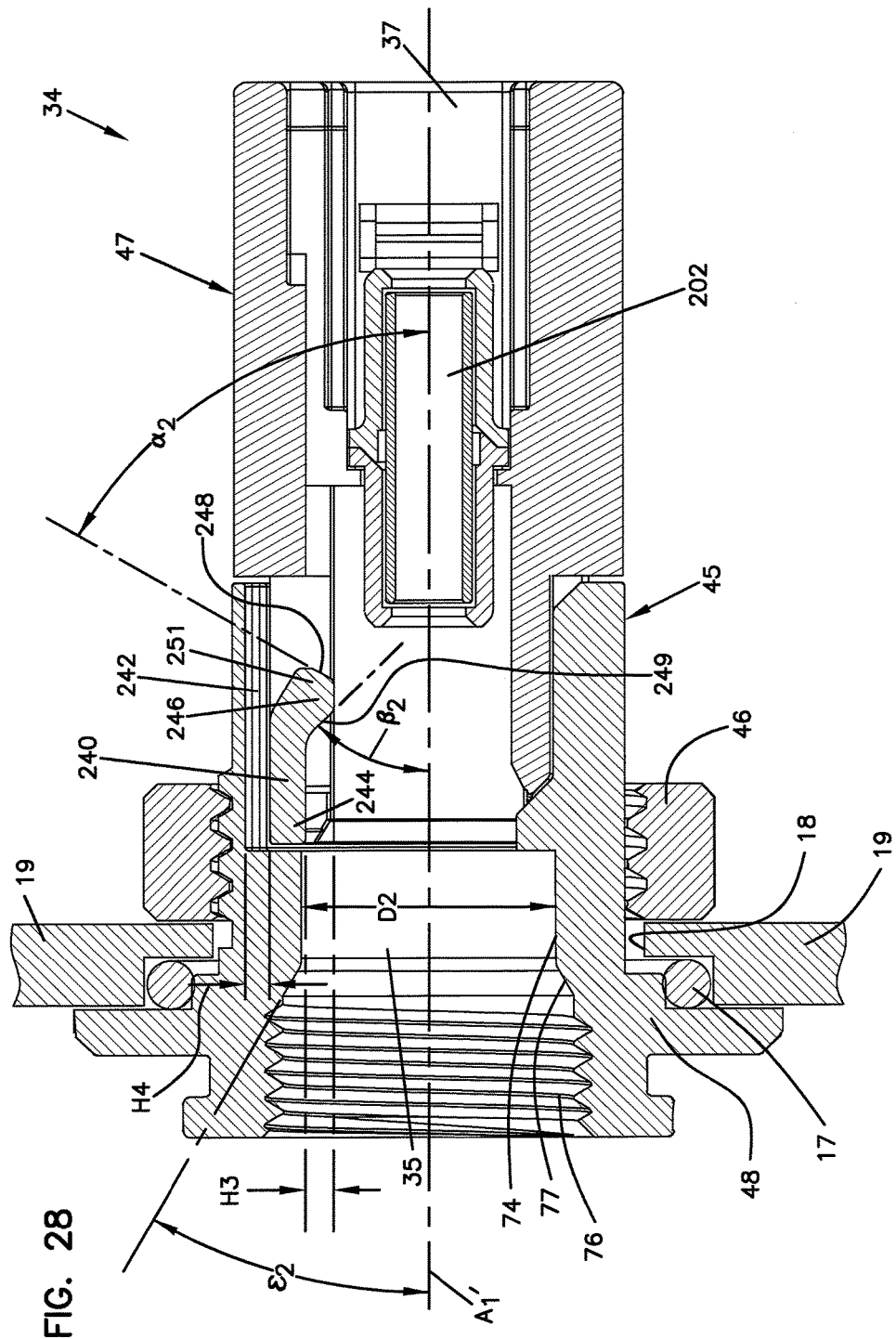
FIG. 28 is a cross-sectional elevation view of the hardened fiber optic adapter of FIG. 1.

As illustrated at FIG. 28, the inclined region 249 of the retention tab 251 of the latch 250 has an angle of incline illustrated as $\beta_2$ and the declined region 248 of the retention tab 251 has the above mentioned angle of decline illustrated as $\alpha_2$. In the illustrated embodiment, the angle $\beta_2$ is less than the angle $\alpha_2$. The benefit of this is that the latch 250 will allow easier insertion of the first connector 32 into the adapter 34 than it will allow removal, because the decreased angle of incline ($\beta_2$) will not present as much resistance to insertion as the increased angle of decline ($\alpha_2$) will present to removal. In one example, the angle $\alpha_2$ is at least 1.5 times or two times the angle $\beta_2$. In another example, the angle $\alpha_2$ is about equal to angle $\beta_2$. It is recognized, however, than any angles may be formed for angles $\alpha_2$ and $\beta_2$. In one example, angles $\alpha_2$ and $\beta_2$ are in a range from about 0 degrees to about 90 degrees, and preferably from 15 degrees to about 85 degrees. In another example, angle $\beta_2$ is in a range from about 15 degrees to about 45 degrees and angle $\alpha_2$ is in a range from about 30 degrees to about 90 degrees. In a preferred embodiment, $\alpha_2$ ranges between 50 degrees and 70 degrees and in a more preferred embodiment ranges between 55 degrees and 65 degrees. In a preferred embodiment, $\beta_2$ ranges between 20 degrees and 40 degrees and in a more preferred embodiment ranges between 25 degrees and 35 degrees.

In a preferred embodiment, the angles $\alpha_1$ and $\alpha_2$ are chosen, along with other latch 250 geometry and material, such that a spring 102 within the connector 32 can be sufficiently compressed by the latch 250 (i.e., the latch 250 has a holding force that is greater than a biasing force generated by the spring 102). The spring 102 functions to hold the ferrule 100 against the opposing ferrule 230 of the second connector 28 when both ferrules 100, 230 are received within the split sleeve 202 of the adapter assembly 140. By sufficiently compressing the spring 102, the latch 250 will remain engaged after insertion and hold the first connector 32 within the adapter 34 even in the presence of the second connector 28. Other loads, such as gravity, can also be considered when selecting the angles $\alpha_1$ and $\alpha_2$.

In the example shown at FIGS. 26-28, the angle $\alpha_1$ is approximately equal to the angle $\alpha_2$ and the angle $\beta_1$ is approximately equal to the angle $\beta_2$. In another example, shown at FIGS. 61 and 80, the angle $\alpha_1$ is approximately equal to the angle $\alpha_2$ but the angle $\beta_1$ is not equal to the angle $\beta_2$. In still other examples, the angle $\alpha_1$ is not equal to the angle $\alpha_2$ and/or the angle $\beta_1$ is not equal to the angle $\beta_2$.

In another example, the angles $\alpha_1$ and/or $\alpha_2$ can be about 90 degrees, such that the declined regions 248 and/or 254 extend generally perpendicular to the arm 240. In this example, the declined regions 248 and/or 254 will not readily permit the arm 240 of the latch 250 to be flexed by the mere application of a force in a direction away from the port 35 and thereby not permit removal of the first connector 32 from the adapter 34. Rather, the latch 250 can be manually released, such as by manually lifting the latch 250. The latch 250 can be lifted, for example, by inserting a narrow release tool through an opening to lift the latch 250. Alternatively, a tab can be formed attached to the arm 240. The tab can include another arm that extends through the wall of the adapter 34, such that when the tab is lifted, the arm lifts the latch 250, enabling the first connector 32 to be removed from the first port 35 of the adapter 34.

In certain embodiments, illustrated at FIGS. 26 and 27, the inclined and declined regions 252 and 254 of the first protrusion 132 meet at a peak, having a height H1 above an adjacent area of the plug portion 56 of the connector housing 39. In other embodiments, illustrated at FIG. 61, the inclined and declined regions 252 and 254 of the first protrusion 132 meet a protrusion plateau, having height H1 above the adjacent area of the plug portion 56. In certain embodiments, illustrated at FIGS. 26 and 28, the inclined and declined regions 249 and 248 of the retention tab 251 meet the retention tab plateau having a height H3 which is also approximately the height that the arm 240 is above the adjacent area of the plug portion 56. In other embodiments, illustrated at FIG. 80, the inclined and declined regions 249 and 248 of the retention tab 251 meet at a peak having height H3. The heights H1 and H3 influence the amount of flexing away from the axis $A_1$ induced on the arm 240 of the latch 250 when connecting and disconnecting the connector 32 and the adapter 34. To ensure that the latch 250 is not inhibited from movement by an adjacent portion of the adapter 34, a latch clearance area 242, with a height H4, is provided above the arm 240 (see FIGS. 20, 26, 28, 79, and 80). In one example, heights H1 and H3 are about equal to height H4. Alternatively, height H4 is larger than heights H1 and H3 to ensure that the latch 250 is not inhibited from movement by the adjacent portion of the adapter 34. Alternatively, height H4 can be less than heights H1 and H3, so long as adequate space is provided to enable the retention tab 251 of the latch 250 to be appropriately inserted between the first protrusion 132 and the second protrusion 134 of the connector housing 39.

FIG. 24 illustrates the connection progress at a point where the retention tab 251 of the latch 250 is seated between the first protrusion 132 and the second protrusion 134 of the connector housing 39.

The next step in the connection process involves the coupling nut 40. The coupling nut 40 of the first connector 32 is adapted to provide a second connection mechanism for securing the first connector 32 to the adapter 34. After the latch 250 has interlocked with the adapter 34, the threaded portion 75 of the coupling nut 40 can be threaded into the corresponding threaded portion 76 provided within the first port 35 so as to provide a second connection with the adapter 34. The coupling nut 40 provides a connection between the first connector 32 and the adapter 34 that has a substantially greater pull-out resistance as compared to the pull-out resistance provided by the latch 250. In one example embodiment, the coupling nut 40 retains the first connector 32 in the first port 35 even if a pull-out force of at least 100 pounds is applied to the first connector 32.

As illustrated at FIGS. 3 and 4, the coupling nut 40 of the first connector 32 includes a first region 180 and a second region 182. The first region 180 includes a plurality of grooves 184 to facilitate grasping of the first region 180, such as by a field technician or other user during connection or disconnection of the connector 32 with the adapter 34. The grooves 184 are, for example, a plurality of longitudinally oriented grooves that enable a user to more easily rotate the coupling nut 40. Turning of the coupling nut 40 enables a connection means of the second region 182 to engage or disengage with the adapter 34. In the illustrated embodiment, the second region 182 includes a connection means of exterior screw threads 75 adapted to mate with internal threads 76 provided within the first port 35 of the adapter 34. In another embodiment, other connection means may also be used.

Upon continued screwing of the threaded portion 75 of the coupling nut 40 into the threaded portion 76 of the first port 35, a first end surface 115 (shown at FIGS. 24 and 44) of the coupling nut 40 abuts a circumferential shoulder 113 of the connector housing 39. Further tightening of the threaded portion 75 draws the tapered seat 77 of the adapter 34 (see FIGS. 23 and 24) against the tapered seat 131 of the connector housing 39 thereby finalizing the connection. As shown at FIG. 27, the tapered seat 131 is illustrated as having an angle $\varepsilon_1$ with respect to the central longitudinal axis $A_1$. In a preferred embodiment, the angle $\varepsilon_1$ ranges from about 15 degrees to 45 degrees. In a more preferred embodiment, the angle $\varepsilon_1$ ranges from about 25 degrees to 35 degrees. In other embodiments, any angle $\varepsilon_1$ can be used. As shown at FIG. 28, the tapered seat 77 is illustrated as having an angle $\varepsilon_2$ with respect to a central longitudinal axis $A_1'$ of the adapter 34. In a preferred embodiment, the angle $\varepsilon_2$ ranges from about 15 degrees to 45 degrees. In a more preferred embodiment, the angle $\varepsilon_2$ ranges from about 25 degrees to 35 degrees. In other embodiments, any angle $\varepsilon_2$ can be used.

Environmental sealing between the fiber optic connector 32 and the adapter 34 can be accomplished by the sealing member 49 mounted on the connector housing 39 which seals against the sealing surface 74 of the adapter 34 (see FIGS. 3, 4, 15, 25, and 26).

FIGS. 25 and 26 illustrate the connection process completed with the threaded portion 75 of the coupling nut 40 fully engaged within the threaded portion 76 of the adapter 34 and the tapered seats 77, 131 seated to each other.

The inclusion of the coupling nut 40 and related features such as the circumferential shoulder 113 in the first fiber optic connection system arrangement 610 is optional as a functional connection is provided by the latch 250, as described above, without the coupling nut 40. Likewise, the latch 250 and related features such as the first protrusion 132 are also optional in the first fiber optic connection system arrangement 610 as a functional connection is provided by the coupling nut 40, as described above, without the latch 250.

Returning now to the second fiber optic connection system arrangement 620, introduced at FIGS. 5 and 6, the methods and features of connecting the hardened fiber optic connector 32 to the SC adapter 26, including the implementation of the slideable lock 50, will be described in detail. FIGS. 29-42 illustrate in detail the connection method and features of this arrangement 620 with certain components and features shared with the other arrangements 610, 630, 640, 650, 660.

Figure 29:
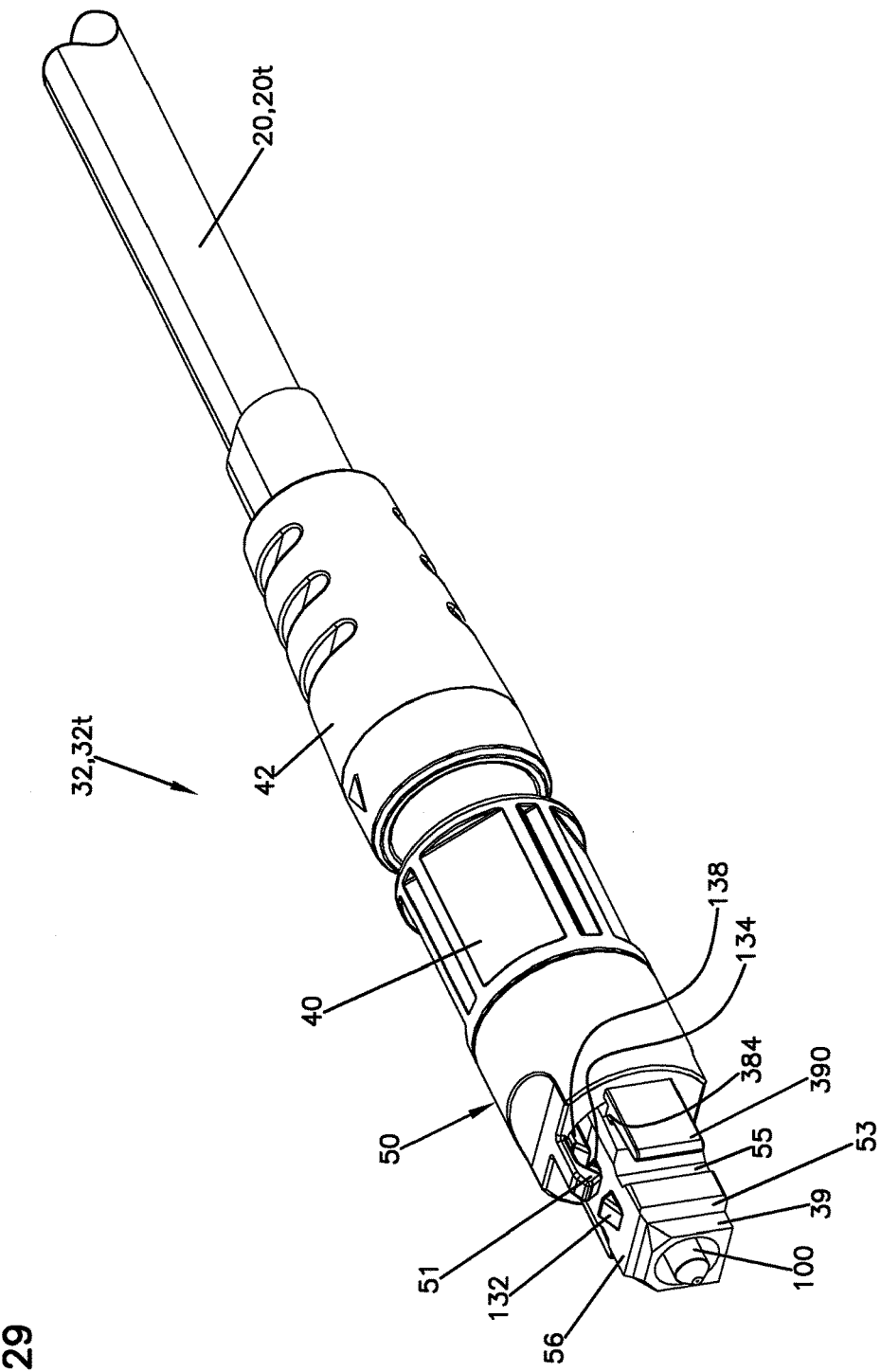
FIG. 29 is a perspective view of the slideable lock of FIG. 5 attached to the coupling nut of the hardened fiber optic connector of FIG. 1, wherein the slideable lock is in the locked position.
Figure 33:
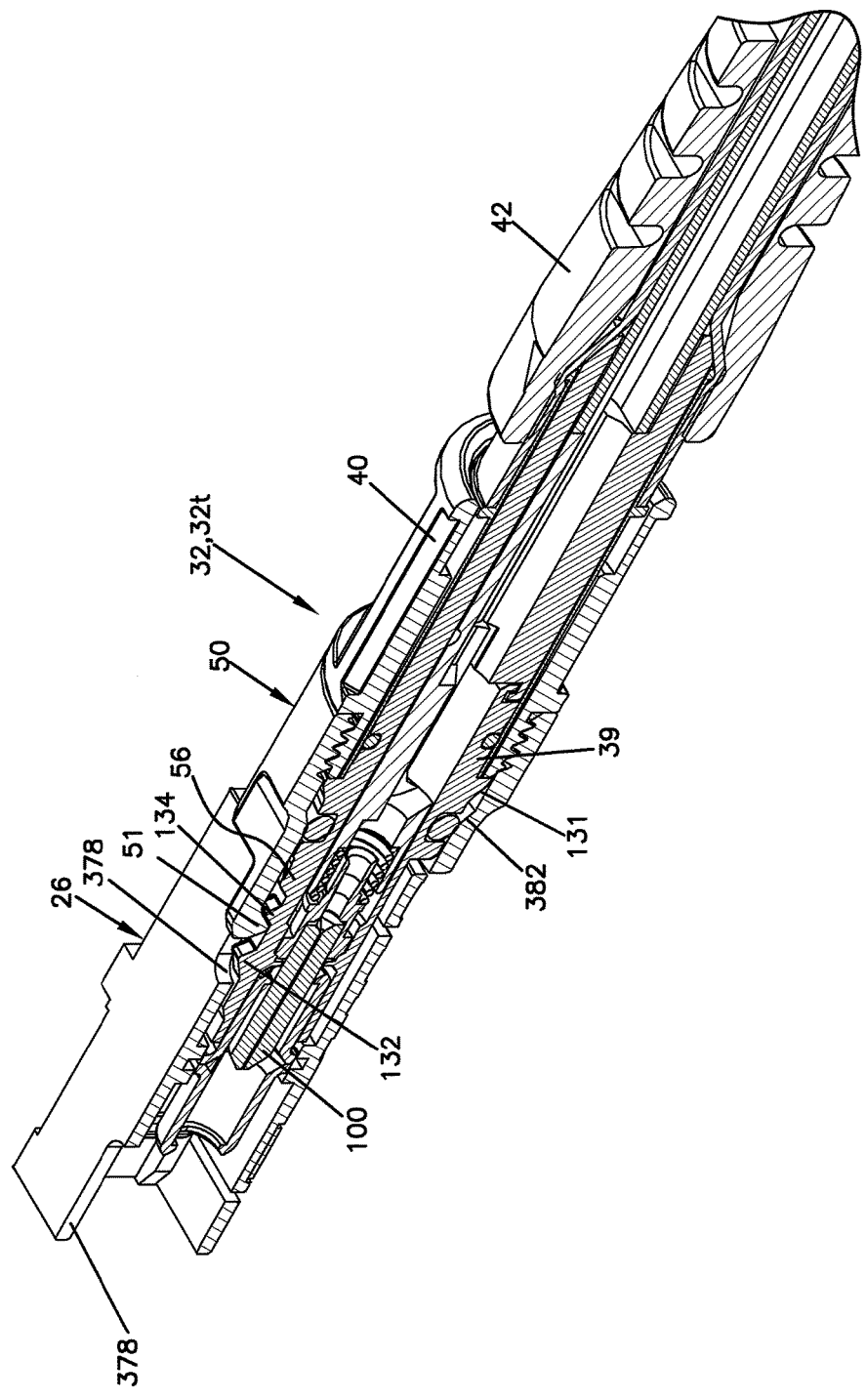
FIG. 33 is a cross-sectional perspective view of the slideable lock of FIG. 5 mounted to the hardened fiber optic connector of FIG. 1 connected to the SC fiber optic adapter of FIG. 5, wherein the slideable lock is in the locked position.
Figure 34:
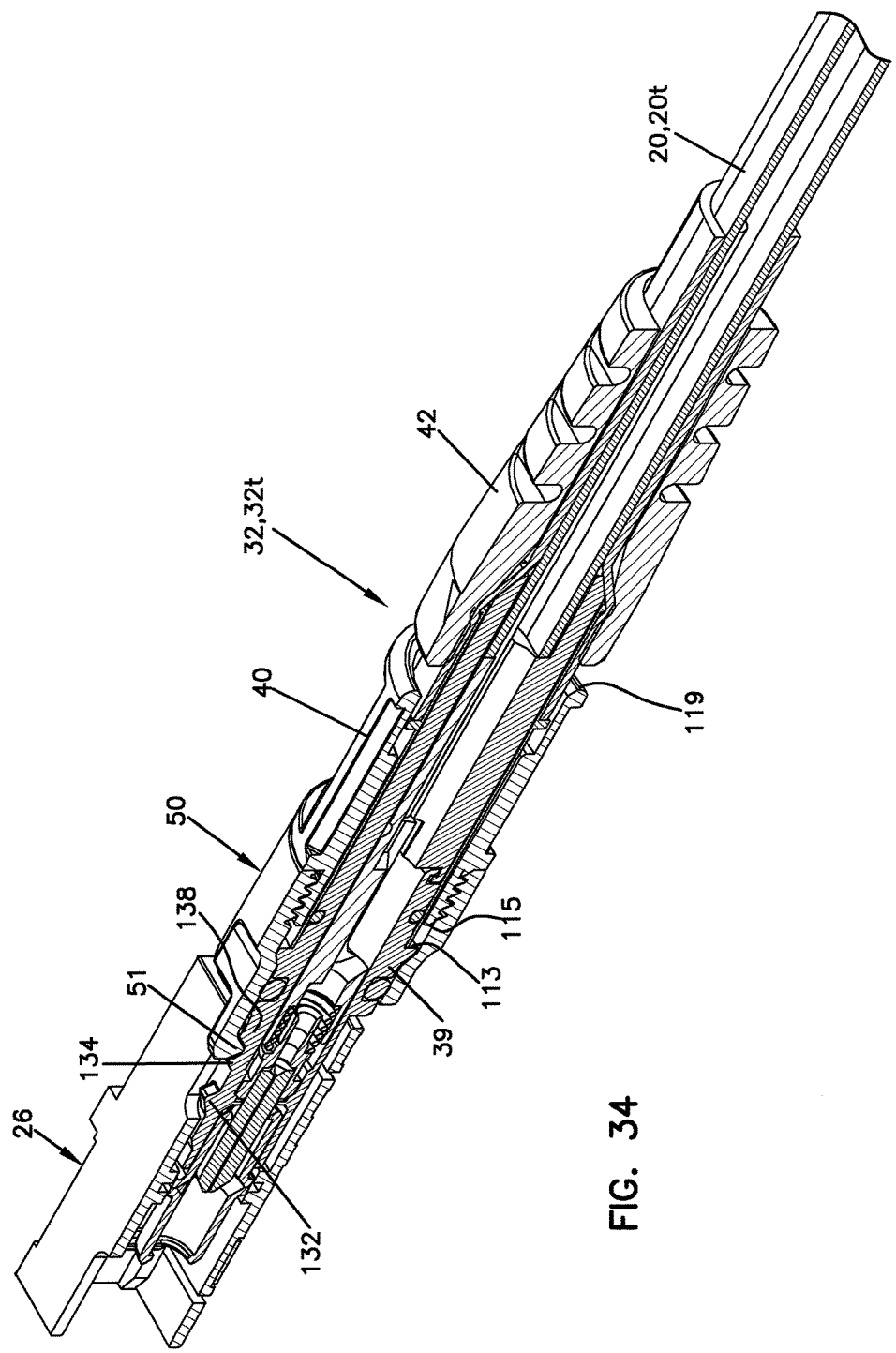
FIG. 34 is a cross-sectional perspective view of the slideable lock of FIG. 5 mounted to the hardened fiber optic connector of FIG. 1 connected to the SC fiber optic adapter of FIG. 5, wherein the slideable lock is in the unlocked position.
Figure 36:
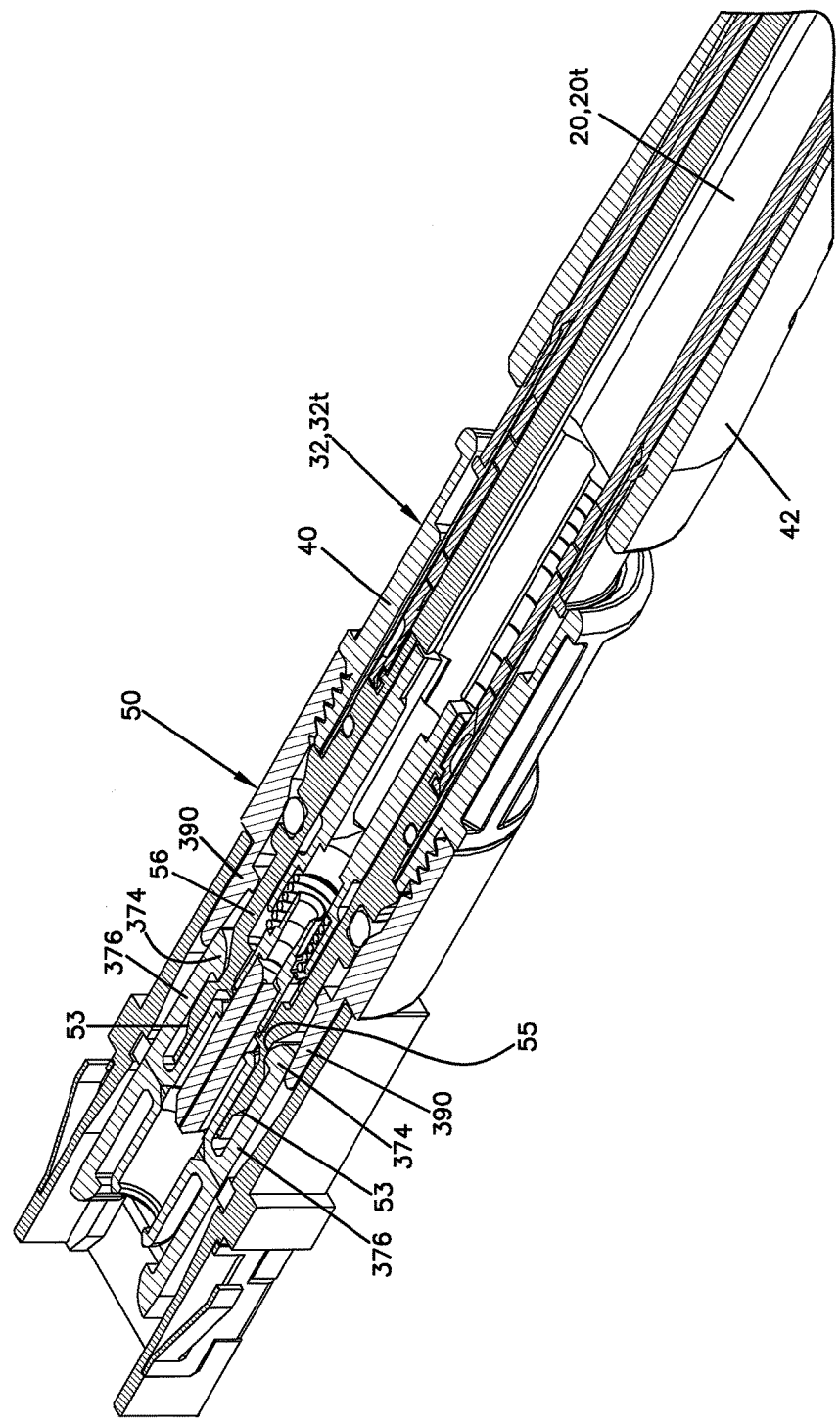
FIG. 36 is another cross-sectional perspective view of the slideable lock of FIG. 5 mounted to the hardened fiber optic connector of FIG. 1 connected to the SC fiber optic adapter of FIG. 5, wherein the slideable lock is in the locked position.
Figure 37:
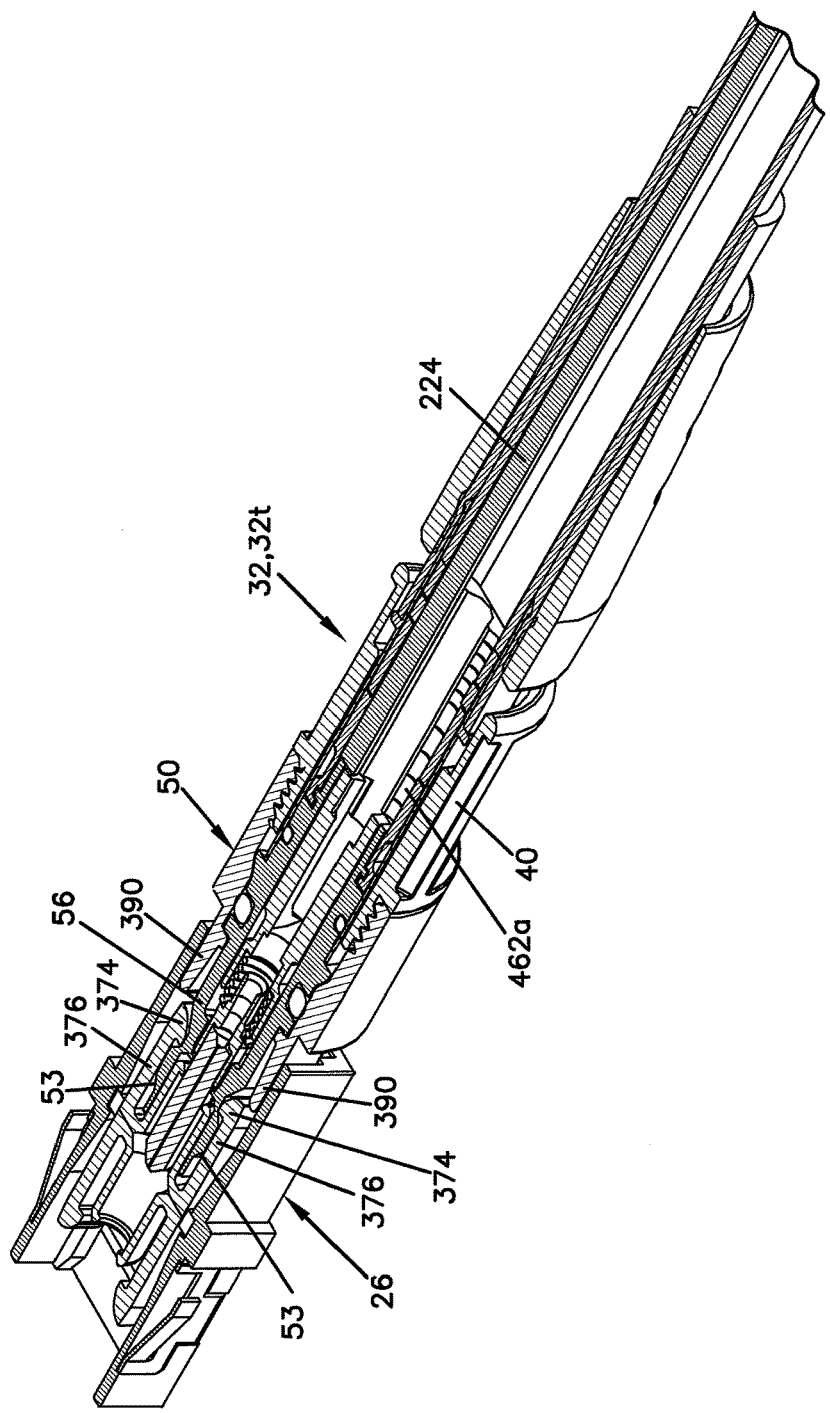
FIG. 37 is a cross-sectional perspective view of the slideable lock of FIG. 5 mounted to the hardened fiber optic connector of FIG. 1 connected to the SC fiber optic adapter of FIG. 5, wherein the slideable lock is in the unlocked position.

FIG. 29 further illustrates the connector 32 incorporating the slideable lock 50. In an example embodiment, the slideable lock 50 includes a threaded region 380 (see FIGS. 30 and 31) compatible with the threaded portion 75 of the coupling nut 40 and a retention tab 51 that interfaces with the first, second, and third protrusions 132, 134, 138 of the connector housing 39. As shown at FIGS. 6, 29, 33, 34, and 42, the retention tab 51 is first aligned with the first, second, and third protrusions 132, 134, 138 and then the threaded portion 75 of the coupling nut 40 is threaded into the threaded region 380 of the slideable lock 50. The coupling nut 40 is limited in its axial movement by the circumferential shoulder 113 of the connector housing 39 abutting the first end surface 115 of the coupling nut 40 in a distal direction and the strain relief boot 42 of the connector 32 abutting a second end surface 119 of the coupling nut 40 in a proximal direction (see FIG. 34). Upon connection of the slideable lock 50 to the coupling nut 40, the slideable lock 50 is likewise constrained in the axial direction and can be further constrained by the tapered seat 131 of the connector housing 39 contacting a tapered seat 382 of the slideable lock 50 (see FIG. 33). Anti-rotation guides 384 of the slideable lock 50 are constrained by the generally rectangular exterior 490 of the plug portion 56 of the connector housing 39 and keep the slideable lock 50 from rotating significantly (see FIGS. 29-31). The example embodiment of the slideable lock 50 is thus constrained to linearly move between a locked position, as illustrated at FIGS. 33 and 36, and an unlocked position, as illustrated at FIGS. 34 and 37.

Figure 32:
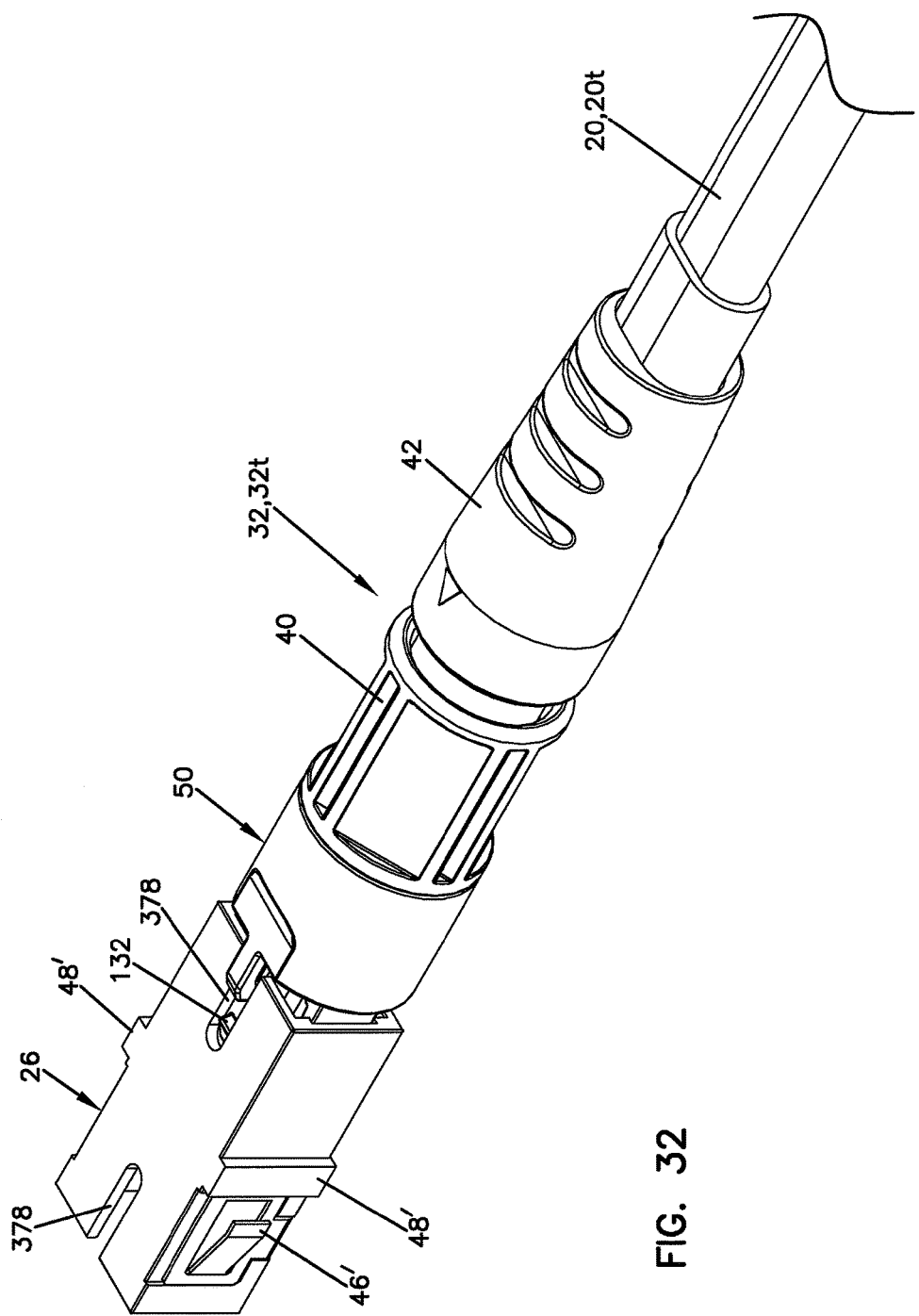
FIG. 32 is a perspective view of the slideable lock of FIG. 5 mounted to the hardened fiber optic connector of FIG. 1 connected to the SC fiber optic adapter of FIG. 5, wherein the slideable lock is in an unlocked position.

To initiate connection of the fiber optic connector 32, with the slideable lock 50 installed, to the SC adapter 26, the slideable lock 50 is first slid in the proximal direction until the tapered seat 382 of the slideable lock 50 seats against the tapered seat 131 of the connector housing 39 (the unlocked position). The retention tab 51 of the slideable lock 50 is then aligned with the slot 378 on the SC adapter 26 and the plug portion 56 of the connector 32 is inserted into either the first or second port 35', 37' (see FIG. 35) of the SC adapter 26. Attempting to initiate this connection without the retention tab 51 and the slot 378 aligned or without the slideable lock 50 in the unlocked position results in various features of the slideable lock 50, the connector housing 39, and the SC adapter 26 forming barriers to the connection. For example, as illustrated at FIGS. 32-34, when the connector 32 is functionally connected with the SC adapter 26, the retention tab 51 of the slideable lock 50 is located within the slot 378 on the SC adapter 26. Without proper alignment between the retention tab 51 and the slot 378, the retention tab 51 interferes with the insertion of the connector 32 and the SC adapter 26 thus providing a barrier to improperly connecting them.

Figure 42:
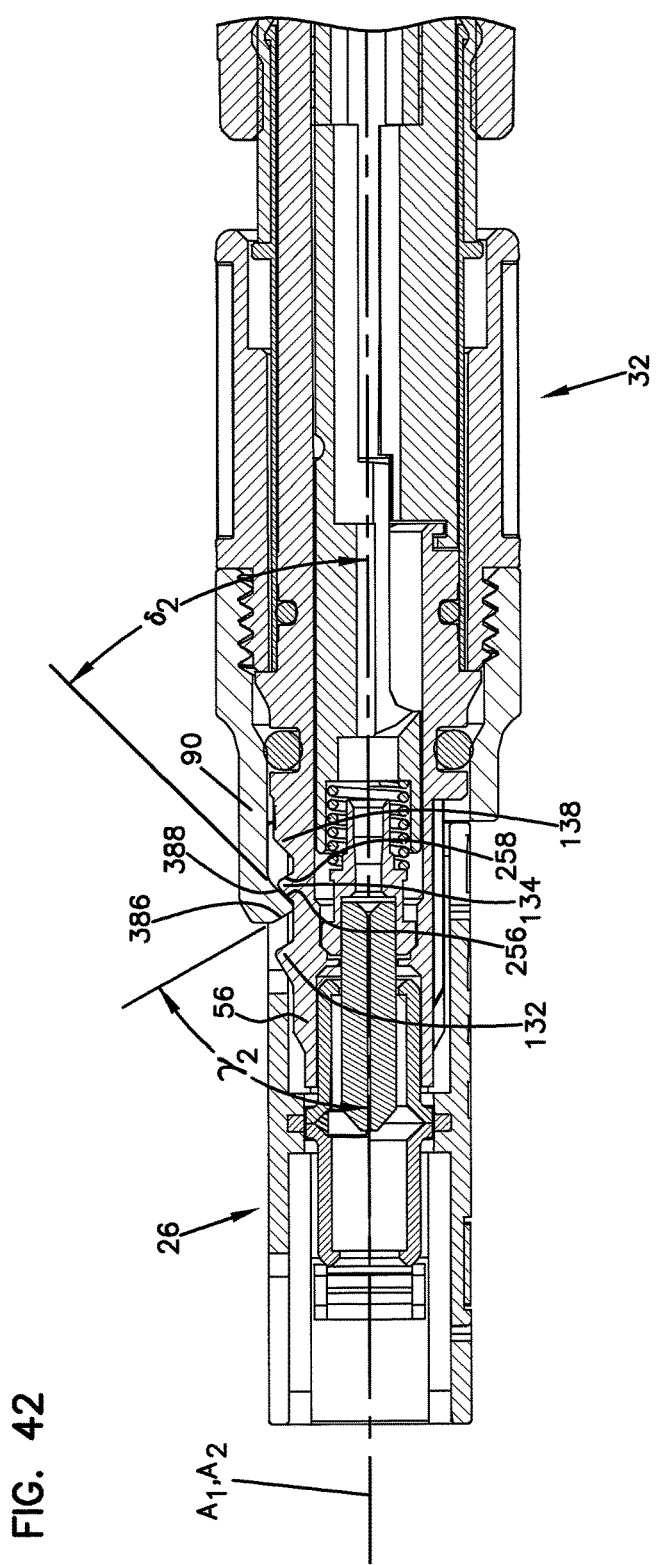
FIG. 42 is a cross-sectional elevation view of the slideable lock of FIG. 5 mounted to the hardened fiber optic connector of FIG. 1 connected to the SC fiber optic adapter of FIG. 5, wherein the slideable lock is in the locked position.

In a preferred embodiment, the retention tab 51 is mounted on a cantilevered arm 90 and provides a detent function in conjunction with the first protrusion 132, the second protrusion 134, and the third protrusion 138 of the connector housing 39 of the connector 32. For example, as shown at FIGS. 33 and 42, the retention tab 51 snaps between the first protrusion 132 and the second protrusion 134 when the slideable lock 50 is in the locked position. Likewise, as shown at FIG. 34, the retention tab 51 snaps between the second protrusion 134 and the third protrusion 138 when the slideable lock 50 is in the unlocked position. In particular, as illustrated at FIG. 42, the retention tab 51 includes an inclined region 386, defined by angle $\gamma_2$, and a declined region 388, defined by angle $\delta_2$. The second protrusion 134 of the connector housing 39 has a corresponding inclined region 258, defined by angle $\gamma_1$, and a corresponding declined region 256, defined by angle $\delta_1$ (see FIG. 27).

A lock actuating force is applied to the slideable lock 50 to move the slideable lock 50 from the unlocked position to the locked position. In a preferred embodiment, the lock actuating force ranges from 4 pounds to 6 pounds. In other embodiments, the lock actuating force ranges from 2 pounds to 8 pounds. In still other embodiments, other lock actuating forces can be used. As the slideable lock 50 is moved from the unlocked position to the locked position, the inclined regions 258, 386 engage and slide across each other causing the cantilevered arm 90 to flex. At some point, the inclined regions 258, 386 disengage and the declined regions 256, 388 engage each other. Further movement towards the locked position results in sliding between the declined regions 256, 388 and causes the cantilevered arm 90 to un-flex. The detent function thereby provides a stable holding position to the slideable lock 50 at the locked position and the unlocked position.

The above locking procedure can be reversed to enable removal of the fiber optic connector 32, including the slideable lock 50, from the SC adapter 26. An unlock actuating force is applied to the slideable lock 50 to move the slideable lock 50 from the locked position to the unlocked position. In a preferred embodiment, the unlock actuating force ranges from 4 pounds to 6 pounds. In other embodiments, the unlock actuating force ranges from 2 pounds to 8 pounds. In still other embodiments, other unlock actuating forces can be used. As the slideable lock 50 is moved from the locked position to the unlocked position, the declined regions 256, 388 engage and slide across each other causing the cantilevered arm 90 to flex. At some point, the declined regions 256, 388 disengage and the inclined regions 258, 386 engage each other. Further movement towards the unlocked position results in sliding between the inclined regions 258, 386 and causes the cantilevered arm 90 to un-flex (see FIGS. 33, 34, and 42).

As in the discussion on angles $\alpha_1$, $\beta_1$, $\alpha_2$, and $\beta_2$ above, the angles $\gamma_1$, $\delta_1$, $\gamma_2$, and $\delta_2$ can be selected to impart desired characteristics to the detent function. These characteristics can include a holding force when in the locked position, etc. In a preferred embodiment, the angles $\delta_1$ and $\delta_2$ range from 40 degrees to 50 degrees and the angles $\gamma_1$ and $\gamma_2$ range from 55 degrees to 65 degrees. In other embodiments, the angles $\delta_1$ and $\delta_2$ range from 30 degrees to 60 degrees and the angles $\gamma_1$ and $\gamma_2$ range from 45 degrees to 75 degrees. In still other embodiments, other angles $\gamma_1$, $\delta_1$, $\gamma_2$, and $\delta_2$ can be used.

Figure 30:
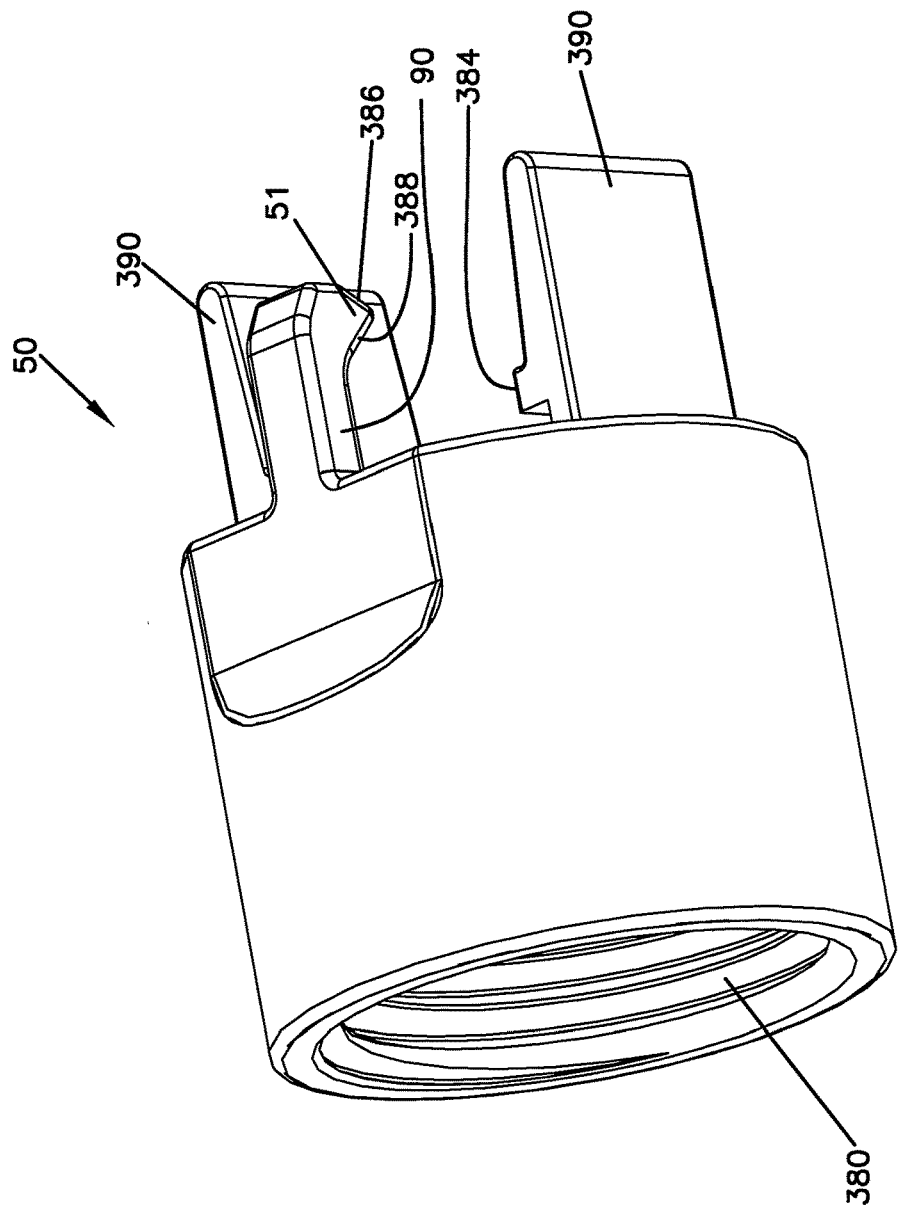
FIG. 30 is a perspective view of the slideable lock of FIG. 5.
Figure 31:
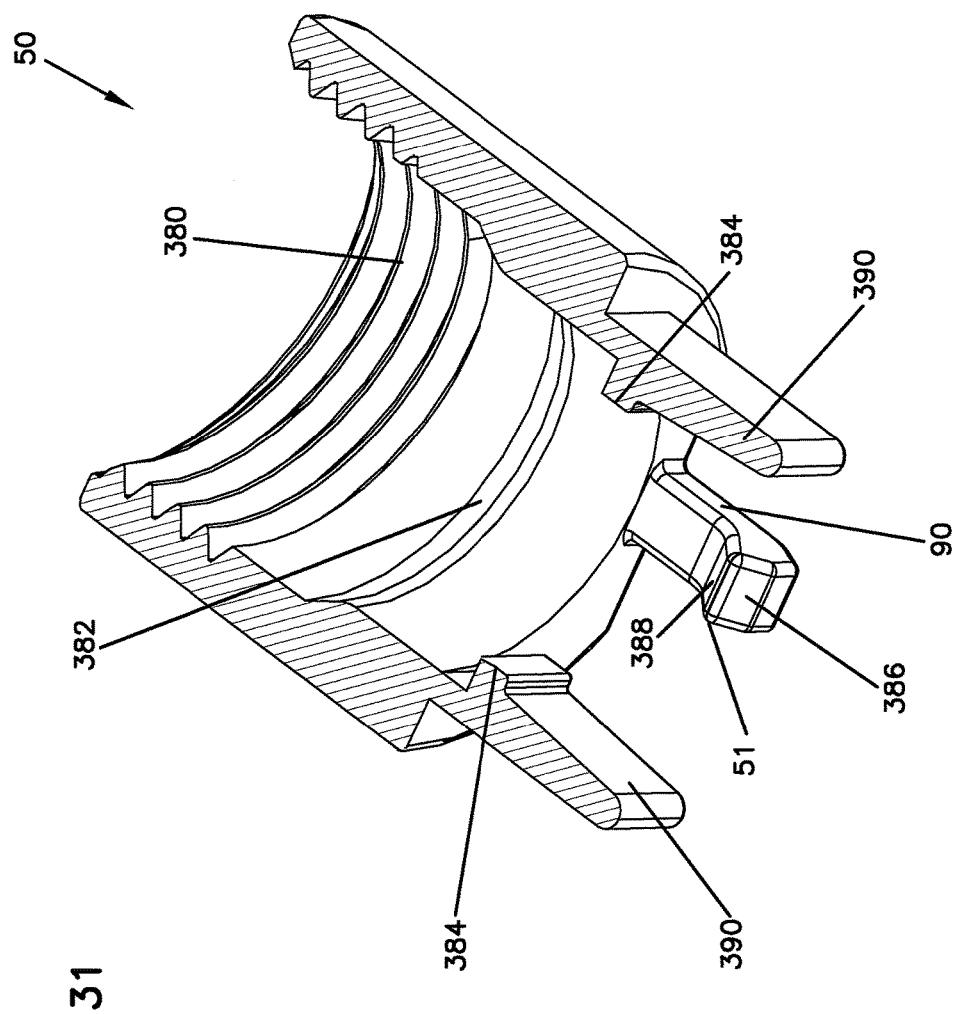
FIG. 31 is a cross-sectional perspective view of the slideable lock of FIG. 5.
Figure 41:
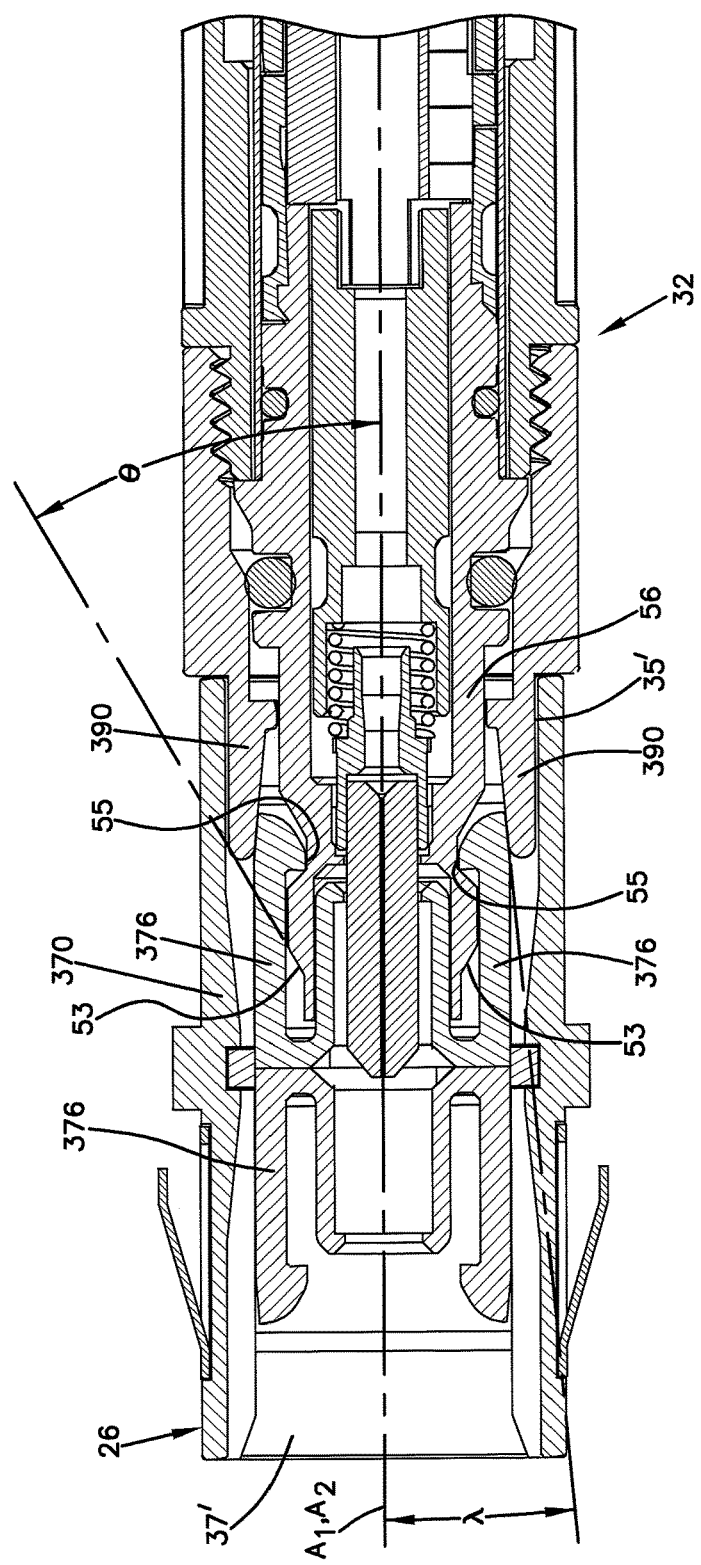
FIG. 41 is another cross-sectional plan view of the hardened fiber optic connector of FIG. 1 connected to the SC fiber optic adapter of FIG. 5.

As illustrated at FIGS. 30, 31, and 41, the slideable lock 50 includes an opposing pair of wedges 390 defined, in part, by an angle $\lambda$. In a preferred embodiment, the angle $\lambda$ ranges from 4.8 degrees to 5.8 degrees. In other embodiments, the angle $\lambda$ ranges from 4.0 degrees to 6.6 degrees. In still other embodiments, another angle $\lambda$ can be used. In a preferred embodiment, the wedges 390 are integral with the slideable lock 50 and penetrate into the port 35' or 37' of the SC adapter 26 when the connector 32, including the lock 50, is connected to the SC adapter 26. Further details on the wedges 390 and their function are given below.

Figure 38:
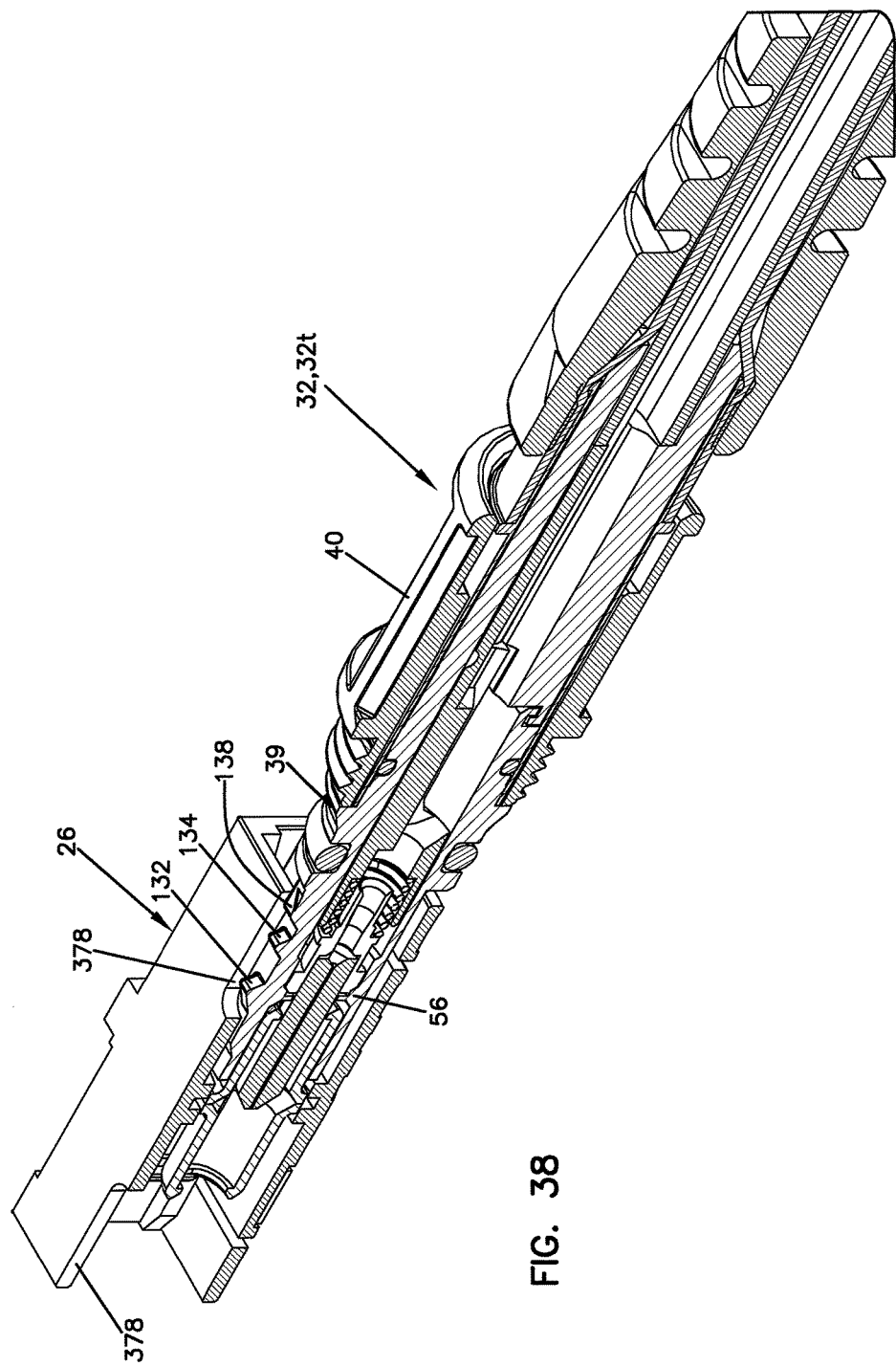
FIG. 38 is a cross-sectional perspective view of the hardened fiber optic connector of FIG. 1 connected to the SC fiber optic adapter of FIG. 5.

The SC adapter 26 of the present disclosure has certain provisions to accommodate the slideable lock 50. These include a plurality of wedge holding regions 372 defined within the housing 370 of the SC adapter 26 to hold and support the wedges 390 when inserted into the SC adapter 26. The slot 378 on the SC adapter 26 also accommodates the slideable lock 50. As illustrated at FIGS. 32, 33, and 38, the first protrusion 132, the second protrusion 134, and the third protrusion 138 of the connector housing 39 and the retention tab 51 of the slideable lock 50 can fit within the slot 378 on the SC adapter 26 while the connector 32, including the lock 50, is connected to, connected with, and disconnected from the SC adapter 26.

Figure 35:
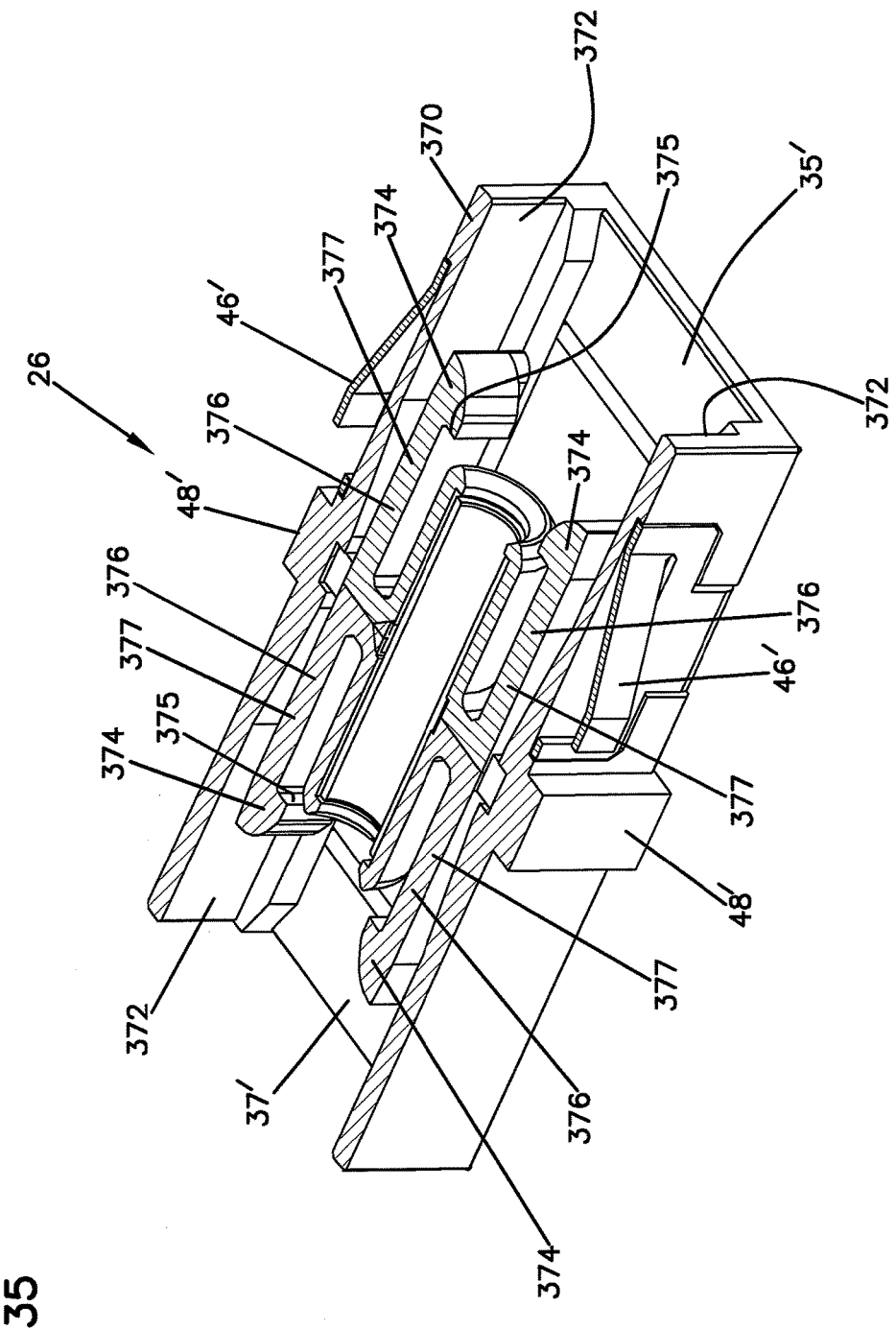
FIG. 35 is a cross-sectional perspective view of the SC fiber optic adapter of FIG. 5.
Figure 40:
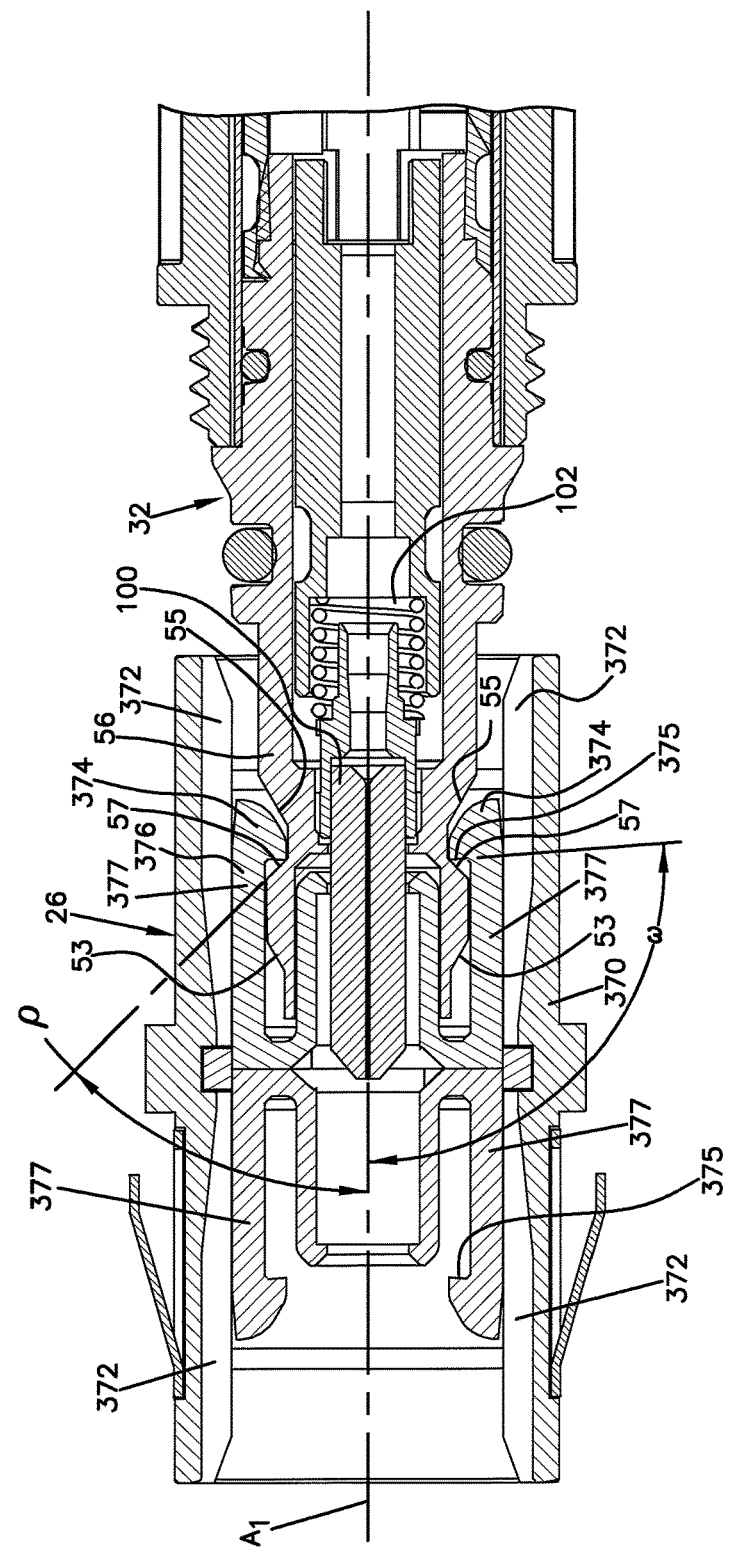
FIG. 40 is a cross-sectional plan view of the hardened fiber optic connector of FIG. 1 connected to the SC fiber optic adapter of FIG. 5.

Turning now to a brief discussion of certain features and functions of the SC adapter 26 and the SC connector 29 as they relate to the installation and retention of the fiber optic connector 32 into the SC adapter 26. As illustrated at FIGS. 35 and 40, the SC adapter 26 includes a plurality of connector retention clips 376 each including a hook 374 mounted on a cantilevered arm 377. The hooks 374 are defined, in part, by a hooking surface 375 defined by an angle w. As is known in the art, such hooks are used to secure a typical SC connector within a typical SC adapter. The hooks 374 of the retention clips 376 of the SC adapter 26 of the present disclosure also can be used to secure the SC connector 29 as illustrated at FIGS. 5 and 6. The cantilevered arms 377 of the connector retention clips 376 are configured to flex outwardly when the SC connector 29 is inserted into the SC adapter 26 allowing the hooking surfaces 375 of the hooks 374 to each reach behind a latch bar 21 of the SC connector 29 (see FIG. 6). Upon full insertion of the SC connector 29 into the SC adapter 26, the hooking surfaces 375 are behind the latch bars 21 and the cantilevered arms 377 un-flex thus engaging the hooking surfaces 375 behind the latch bars 21. After the SC connector 29 has been connected to the SC adapter 26, the hooking surfaces 375 of the hooks 374 cannot be directly disengaged from the latch bars 21 simply by pulling on the SC connector 29. The latch bars 21 of the SC connector 29 extend near perpendicular to the direction of insertion/retraction and do not lift the hooking surfaces 375 (at the angle w) when pulled. To release the SC connector 29 from the SC adapter 26, the release sleeve 25 (mentioned above) of the SC connector 29 is pulled in the direction of retraction. The release sleeve 25 has ramped surfaces which outwardly flex the cantilevered arms 377 when the release sleeve 25 is pulled thus releasing the SC connector 29 from the SC adapter 26.

In contrast to the SC connector 29 of the preceding paragraph, the fiber optic connector 32 has no release sleeve. Nonetheless, the connector 32 has provisions for connecting to and releasing from the SC adapter 26. A pair of ramps 53 is provided on the plug portion 56 of the connector housing 39 of the connector 32. The ramps 53 are defined, in part, by an angle θ, illustrated at FIG. 41. In a preferred embodiment, the angle θ ranges from 25 degrees to 35 degrees. In other embodiments, the angle θ ranges from 20 degrees to 40 degrees. In still other embodiments, other angles can be used for the angle θ. As the plug portion 56 is inserted with an insertion force into the port 35' or 37' of the SC adapter 26, the ramps 53 spread the corresponding hooks 374 outwardly apart and thus also cause the cantilevered arms 377 of the connector retention clips 376 to flex outwardly. In a preferred embodiment, the insertion force required to insert the plug portion 56 into the port 35', 37' of the SC adapter 26 ranges from 2.5 pounds to 3.5 pounds. In other embodiments, the plug insertion force ranges from 2 pounds to 4 pounds. A pair of detents 55 (e.g., recesses or depressions) is provided on the plug portion 56 of the connector housing 39 of the connector 32. As the insertion continues, the hooks 374 are forced into the detents 55 as the cantilevered arms 377 un-flex. The detents 55 each have a declined surface 57 illustrated at FIG. 40 at an angle ρ from a central longitudinal axis $A_1$ of the connector 32. Preferably, the angle ρ is chosen such that the force provided by the cantilevered arms 377 on the hooks 374 in combination with the declined surfaces 57 provides sufficient force at the ferrule 100 to sufficiently compress the ferrule spring 102. In a preferred embodiment, the angle ρ ranges from 40 degrees to 50 degrees. In other embodiments, the angle ρ ranges from 30 degrees to 60 degrees.

Direct removal of the connector 32 from the SC adapter 26 by application of a pulling force or a removal force is enabled by the declined surfaces 57 which act as ramps to spread the corresponding hooks 374 outwardly apart and thus also cause the cantilevered arms 377 of the connector retention clips 376 to flex outwardly. In a preferred embodiment, the removal force required to remove the plug portion 56 of the connector housing 39 of the connector 32 from the SC adapter 26 ranges from 2.5 pounds to 3.5 pounds. In other embodiments, the plug removal force ranges from 2 pounds to 4 pounds.

Returning now to the slideable lock 50. If direct removal of the connector 32 is undesired, the slideable lock 50 can be preassembled onto the connector 32 before the connector 32 is installed into the SC adapter 26. After connecting the slideable lock 50 to the coupling nut 40 of the connector 32, the slideable lock 50 is preferably slid to the unlocked position as the locked position would interfere with assembling the connector 32 to the SC adapter 26. After connecting the connector 32, with the slideable lock 50 installed, to the SC adapter 26, the connection can be locked by sliding the slideable lock 50 to the locked position. Sliding the slideable lock 50 from the unlocked position, illustrated at FIG. 37, to the locked position, illustrated at FIG. 36, moves the wedges 390 between the hooks 374 of connector retention clips 376 and the wedge holding regions 372 of the housing 370 of the SC adapter 26. The wedges 390 prevent the hooks 374 of the retention clips 376 from moving outward thereby trapping the hooks 374 within the detents 55. The connector 32 is thereby locked to the SC adapter 26. The connector 32 can be unlocked from the SC adapter 26 simply by sliding the slideable lock 50 from the locked position to the unlocked position.

As illustrated at FIG. 41 and mentioned above, the wedges are defined, in part, by the angle λ. The angle λ can be chosen to impart desired characteristics to the slideable lock 50. These characteristics can include a release force or a part of a release force required to unlock the slideable lock 50, etc.

The various angled surfaces described in the present disclosure, including those referenced by angles $α_1$, $α_2$, $β_1$, $β_2$, $γ_1$, $γ_2$, $δ_1$, $δ_2$, $ε_1$, $ε_2$, θ, λ, ρ, and ω, can be planar surfaces in certain embodiments. In other embodiments, the various angled surfaces are non-planar and have varying angles at various locations on the angled surface. In certain embodiments, the varying angles are projected and form an extruded, two-dimensional angled surface. In other embodiments, the varying angles vary in three dimensions. Prudent selection of the varying angles can be used to impart desired characteristics and behaviors to the various surfaces.

Figure 39:
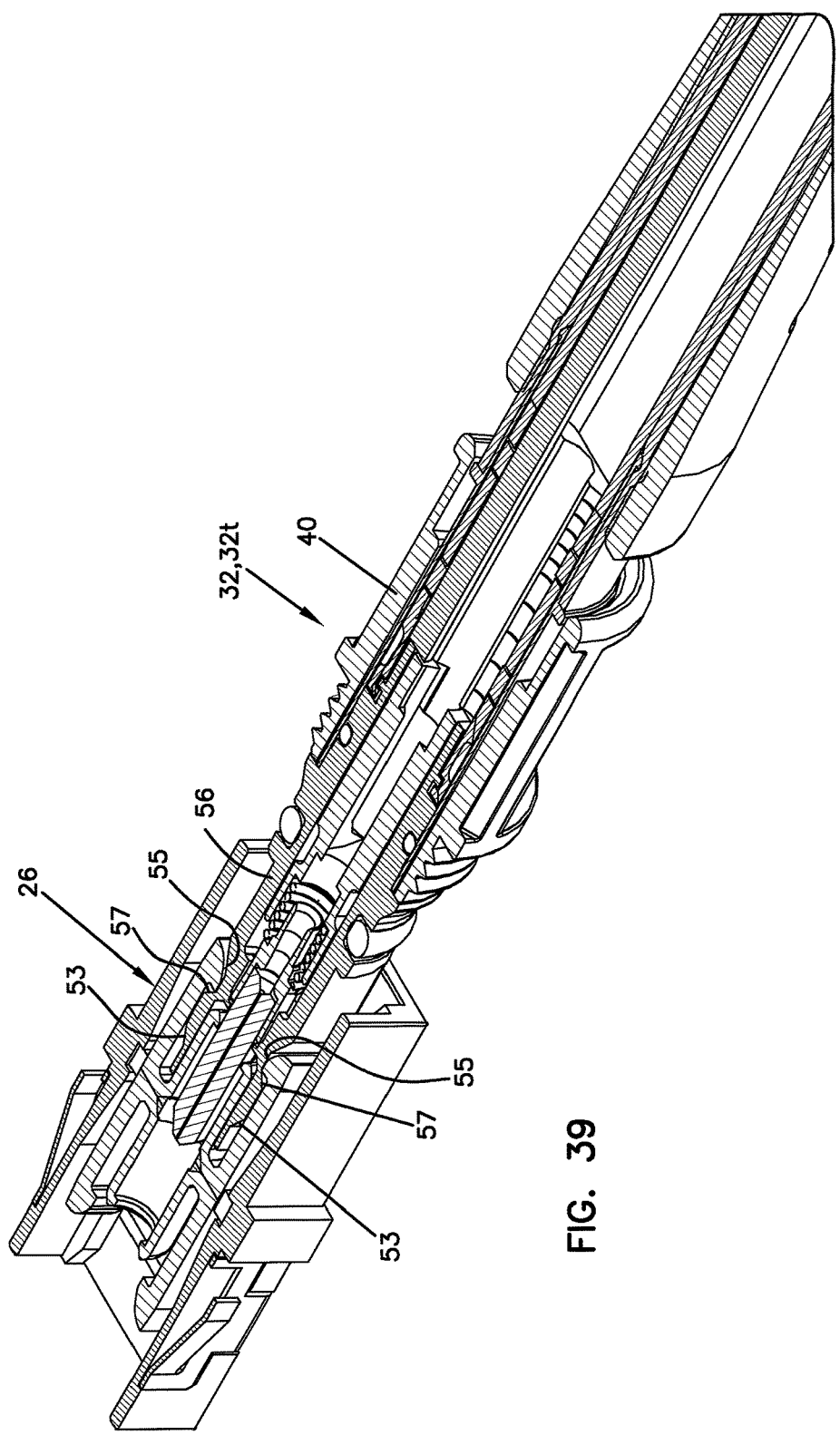
FIG. 39 is another cross-sectional perspective view of the hardened fiber optic connector of FIG. 1 connected to the SC fiber optic adapter of FIG. 5.

Returning now to the third fiber optic connection system arrangement 630 introduced at FIGS. 7 and 8. It may be desired to connect the connector 32, without the slideable lock 50, to the SC adapter 26 as illustrated at FIG. 39. Such an arrangement 630 allows the direct connection and removal of the connector 32 from the SC adapter 26. Characteristics of this arrangement 630 are discussed in detail above as certain features and characteristics are closely related to the second fiber optic connection system arrangement 620.

As mentioned above and illustrated at FIGS. 32 and 33, the retention tab 51 of the slideable lock 50 occupies the slot 378 on the SC adapter 26 when a proper connection of the second fiber optic connection system arrangement 620 is made. In addition, the retention tab 51 forms a barrier to improper connections. As illustrated at FIGS. 7 and 38, the first protrusion 132 of the connector housing 39 also occupies the slot 378 on the SC adapter 26 when a proper connection of the second or third fiber optic connection system arrangements 620 or 630 is made. In addition, the first protrusion 132 also forms a barrier to improper connections. However, the inclined region 252 of the first protrusion 132 can act as a ramp and spread open the ports 35', 37' potentially allowing an improper connection. Therefore, as shown at FIG. 61, the angle $β_1$ of the inclined region 252 of the first protrusion 132 can be selected sufficiently steep to allow the first protrusion 132 to function as an improper insertion barrier. The angle $β_1$ can thus be selected in the range greater than 70 degrees and less than 90 degrees and preferably between 75 degrees and 85 degrees.

Figure 43:
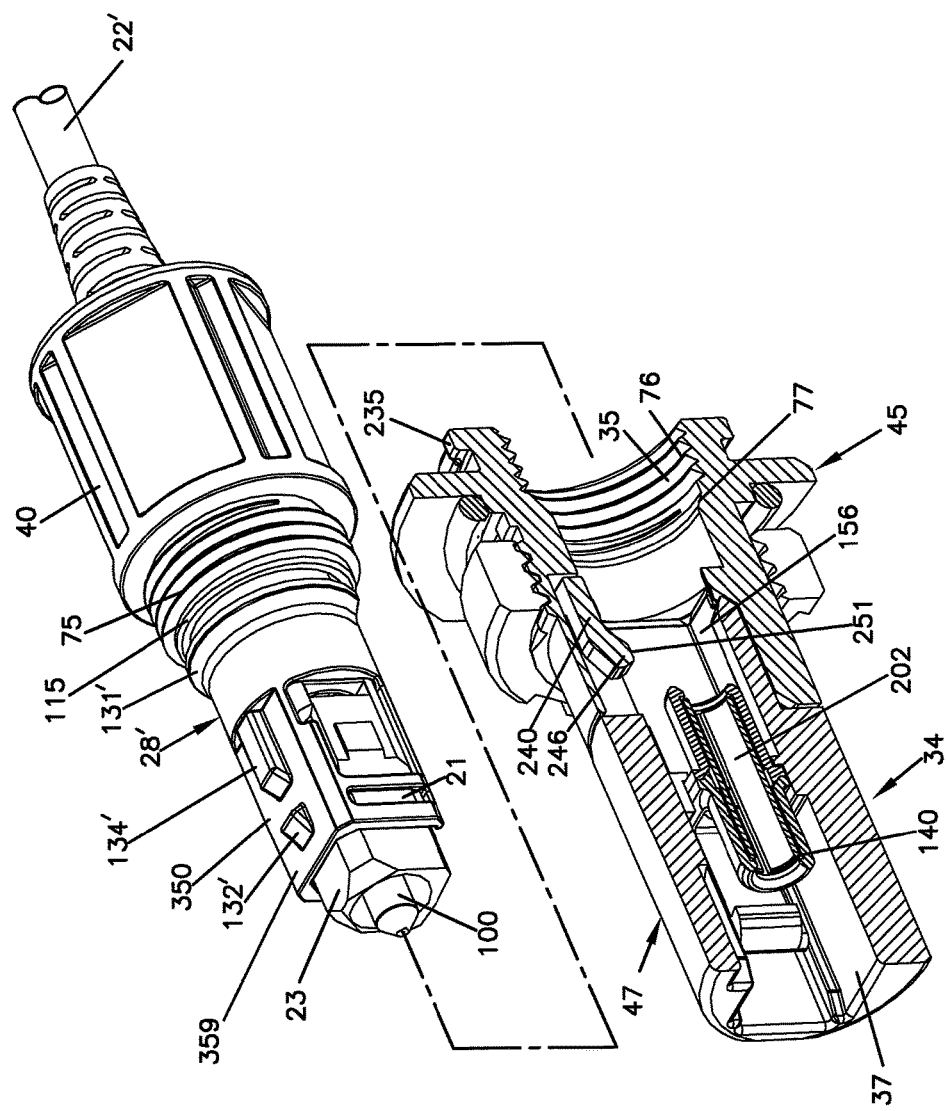
FIG. 43 is a perspective view with the hardened fiber optic adapter of FIG. 1 shown in cross-section and the modified SC connector of FIG. 16 disconnected from the hardened port of the adapter.
Figure 44:
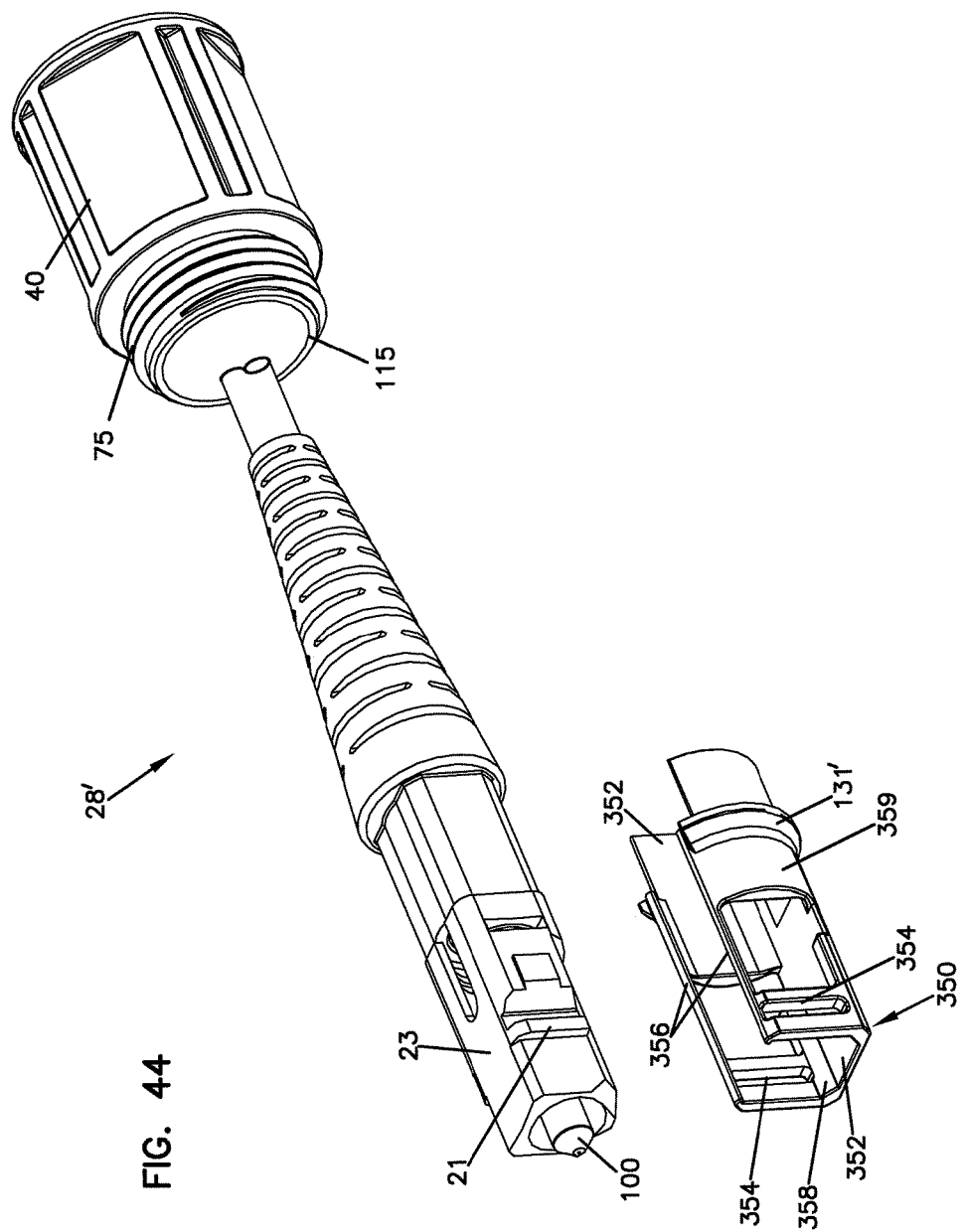
FIG. 44 is an exploded perspective view of the modified SC connector of FIG. 16.
Figure 45:
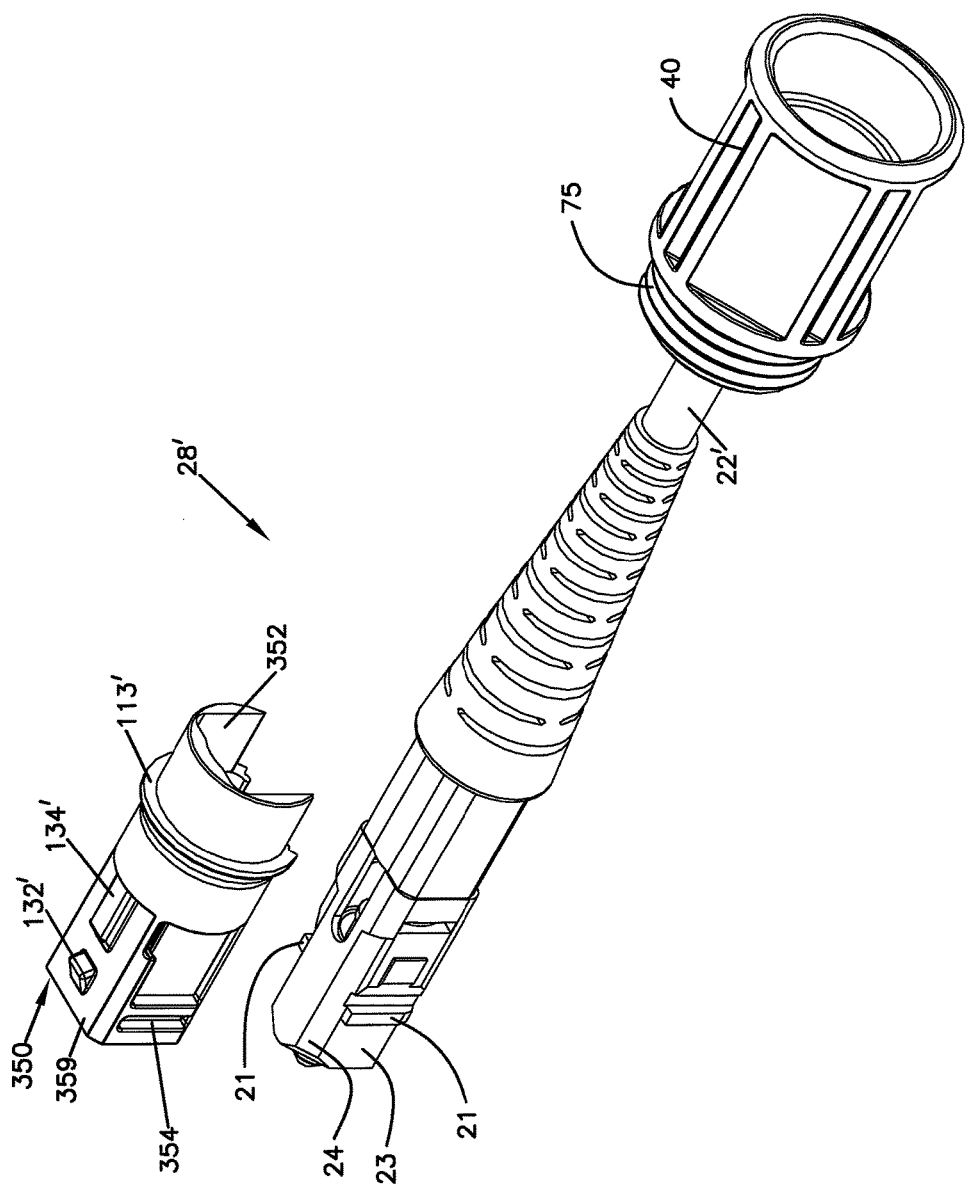
FIG. 45 is another exploded perspective view of the modified SC connector of FIG. 16.
Figure 46:
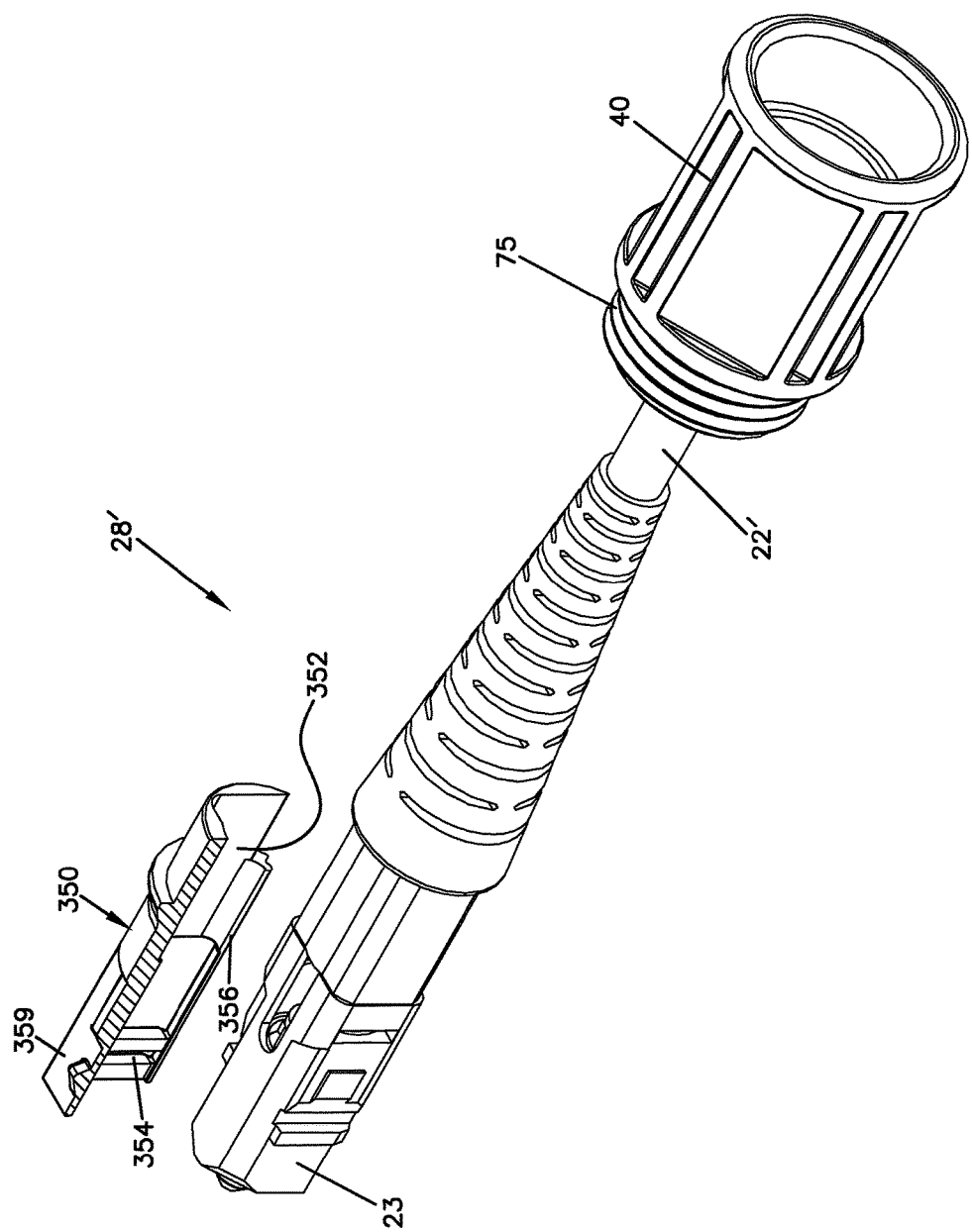
FIG. 46 is an exploded perspective view of the modified SC connector of FIG. 16 with the converter sleeve of FIG. 16 shown in cross-section.

Returning now to the sixth fiber optic connection system arrangement 660, introduced at FIGS. 16 and 17. As mentioned above, it may be desired to connect the SC connector 29 to the hardened first port 35 of the fiber optic adapter 34. According to the present disclosure, this can be accomplished by removing the release sleeve 25 (see FIG. 6) from the SC connector 29 as a first step. As illustrated at FIGS. 44-46, removing the release sleeve 25 significantly reduces the cross-sectional size of the (now modified) SC connector 29, exposes a connector body 23, and makes the pair of latch bars 21 available for other use. The converting sleeve 350, mentioned above, is then snapped over the connector body 23 as shown at FIG. 43 creating the converted connector 28' which is compatible and connectible with the hardened first port 35 of the fiber optic adapter 34.

The converting sleeve 350 is configured to secure the connector body 23 of the SC connector 29 (without the release sleeve 25) to the first port 35 of the fiber optic adapter 34. An inner portion 352 of the converting sleeve 350 is configured to match the connector body 23. A pair of openings 354 in the converting sleeve 350 each extend through the inner portion 352 and are configured to fit around the pair of latch bars 21 of the connector body 23. A pair of lips 356 of the converting sleeve 350 snaps around the connector body 23. In a preferred embodiment, the converting sleeve 350 can only be assembled to the connector body 23 in a unique and predetermined orientation. For example, one or more interior chamfers or radii 358 of the converting sleeve 350 (see FIG. 44) may uniquely match one or more exterior chamfers or radii 24 of the connector body 23 (see FIG. 45). By limiting assembly of the converting sleeve 350 to a single orientation about the connector body 23, the connection of the converted SC connector 28' to the fiber optic adapter 34 can also be limited to a single orientation and the rotational orientation of the SC connector 29 can be continued to the adapter 34.

An exterior 359 of the converting sleeve 350 is configured to be compatible with the hardened first port 35 of the fiber optic adapter 34. Thus, the exterior 359 of the converting sleeve 350 resembles an exterior 31 of the connector housing 39 of the connector 32 (see FIGS. 22 and 43). In particular, a first protrusion 132' resembles and functions similar to the first protrusion 132 of the connector 32, a second protrusion 134' resembles and functions similar to the second protrusion 134 of the connector 32, a circumferential shoulder 113' resembles and functions similar to the circumferential shoulder 113 of the connector 32, and a tapered seat 131' resembles and functions similar to the tapered seat 131 of the connector 32.

The coupling nut 40 can be used to secure the converted connector 28' within the first port 35 of the fiber optic adapter 34 in essentially the same way that it secures the connector 32 within the first port 35 of the adapter 34. The coupling nut 40 is preferably positioned over the cable 22', as illustrated at FIG. 45, before the converting sleeve 350 is applied to the connector body 23.

After attachment of the converting sleeve 350 to the connector body 23, the first protrusion 132' of the converting sleeve 350 is aligned with the axial rotational orientation indicator 235 of the adapter 34. The converted SC connector 28' is then inserted into the first port 35 of the fiber optic adapter 34. The threaded portion 75 of the coupling nut 40 is then screwed into the threaded portion 76 of the first port 35 as illustrated at FIGS. 16 and 43. The first end surface 115 of the coupling nut 40 abuts the circumferential shoulder 113' of the converting sleeve 350. Further tightening of the threaded portion 75 draws the tapered seat 77 of the adapter 34 against the tapered seat 131' of the converting sleeve 350 thereby finalizing the connection.

The inclusion of the coupling nut 40 and related features such as the circumferential shoulder 113' in the sixth fiber optic connection system arrangement 660 is optional as a functional connection is provided by the latch 250 of the adapter 34, (as described above) without the coupling nut 40. Likewise, the latch 250 and related features such as the first protrusion 132' are also optional in the sixth fiber optic connection system arrangement 660 as a functional connection is provided by the coupling nut 40, as described above, without the latch 250.

As illustrated at FIG. 82, inclusion of the coupling nut 40 yields a fiber optic connection system arrangement 662, and exclusion of the coupling nut 40 yields a fiber optic connection system arrangement 664. Both arrangements 662 and 664 are versions of the sixth fiber optic connection system arrangement 660.

FIGS. 83-86 show a modified converting sleeve 350' that serves the same function as the converting sleeve 350. An exterior 359' of the converting sleeve 350' is configured to be compatible with the hardened first port 35 of the fiber optic adapter 34. For example, the exterior of the converter sleeve 350' includes a first protrusion 132" resembling and functioning similar to the first protrusion 132 of the connector 32, a second protrusion 134" resembling and functioning similar to the second protrusion 134 of the connector 32, a circumferential shoulder 113" resembling and functioning similar to the circumferential shoulder 113 of the connector 32 and a tapered seat 131" resembling and functioning similar to the tapered seat 131 of the connector 32. The converting sleeve 350' includes a pair of openings 354' adapted to receive the latch bars 21 of the connector body 23 when the converting sleeve 350' is mounted on the connector body 23. The converting sleeve 350' also includes structure for allowing the converting sleeve 350' to be axially inserted over the connector body 23 after the release sleeve 25 of the connector body 23 has been removed. For example, the converting sleeve 350' includes first and second slots 351, 353 positioned at one side of the converting sleeve 350' and a third slot 355 positioned at an opposite side of the converting sleeve 350'. The first and second protrusions 132" and 134" are positioned on a cantilever member defined between the first and second slots 351, 353. A rear end of the converting sleeve 350' includes a flexible tab 357 including a bump 361.

To mount the converting sleeve 350' on the connector body 23 of an SC connector, the release sleeve 25 of the SC connector is initially removed. After removal of the release sleeve 25, the plug end of the SC connector body 23 is inserted axially into the rear end of the converting sleeve 350'. Axial insertion continues in a rear-to-forward direction until the latch bars 21 of the connector body 23 snap within the openings 354' of the converting sleeve 350'. The slots 351, 353, and 355 of the converting sleeve 350' allow the front end of the converting sleeve 350' to flex radially outwardly during insertion of the connector body 23 therein so that the inner passage defined by the front end of the converting sleeve 350' opens sufficiently large to allow the latch bars 21 to snap into the openings 354'. Ramps 363 can be provided on inner surfaces of the converting sleeve 350' adjacent the openings 354'. When the connector body 23 is inserted axially into the interior of the converting sleeve 350', the latch bars 21 engage the ramps 363 causing the front end of the converting sleeve 350' to spread radially open thereby allowing the latch bars 21 to snap into the openings 354'.

Prior to mounting the converting sleeve 350' on the connector body 23, the coupling nut 40 can be pre-inserted over the cable to which the connector body 23 is terminated. After the converting sleeve 350' is mounted over the connector body 23, the coupling nut 40 is slid forwardly over the back end of the converting sleeve 350' and is retained on the rear end of the converting sleeve 350' by a snap-fit connection provided by the flexible tab 357 and the bump 361.

Figure 56:
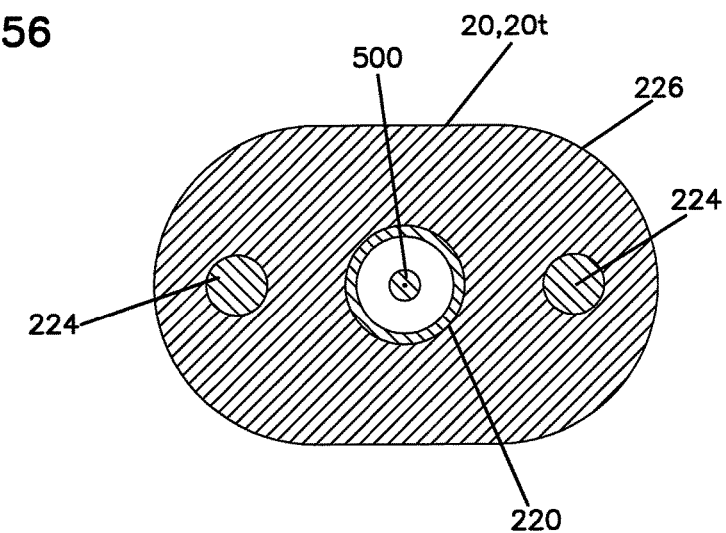
FIG. 56 is a cross-sectional view of an example flat fiber optic tether cable.
Figure 57:
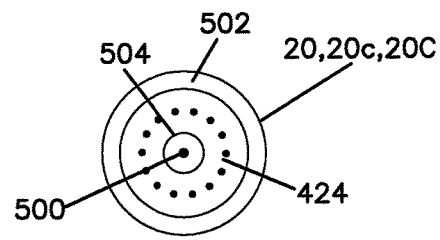
FIG. 57 is a cross-sectional view of an example cylindrical fiber optic cable reinforced by reinforcing fibers.
Figure 58:
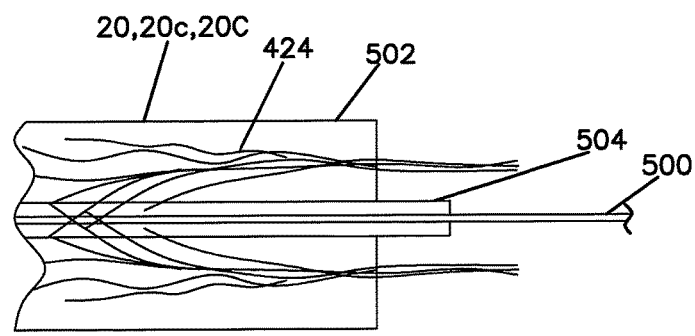
FIG. 58 is a longitudinal cross-sectional view of the example cylindrical fiber optic cable of FIG. 58, wherein the reinforcing fibers have been gathered together in two opposing bunches.

The first, second, third, fourth, and fifth fiber optic connection system arrangements 610, 620, 630, 640, 650 disclosed above each use the fiber optic connector 32 terminating the first cable 20. According to the present disclosure, the cable 20 may take various forms and the connector 32 can be adapted to terminate the various forms of the cable 20. In preferred embodiments, the cable 20 is reinforced to provide tensile strength adequate for a given application. In a first example embodiment, the cable 20 is a tether cable 20t, as illustrated at FIG. 56. Such a tether cable 20t includes an outer jacket 226, a central buffer tube 220 positioned around an optical fiber 500, and strength members 224 positioned on opposite sides of the central buffer tube 220. The strength members 224 and the buffer tube 220 are positioned within the outer jacket 226 of the cable 20t. In second and third example embodiments, the cable 20 is a cylindrical cable 20c, 20C as illustrated at FIGS. 57 and 58, reinforced by axial reinforcing fibers 424. Such cylindrical cables 20c, 20C further include an outer jacket 502 and a buffer tube 504 positioned around an optical fiber 500. The axial reinforcing fibers 424 are positioned radially around the buffer tube 504. The outer jacket 502 covers the reinforcing fibers 424 and the buffer tube 504. The various forms of cables 20t, 20c, 20C can include various sizes of a given form (e.g., 20c is smaller in outer diameter than 20C as illustrated in the example embodiments).

The first cable 20, in various forms, and the second cable 22 each include one or more optical fibers capable of carrying optical signals. In certain embodiments, the optical fibers include a core surrounded by cladding. The core is the light-conducting central portion of an optical fiber. The cladding surrounds the core and is composed of a material having a lower index of refraction than the material of the core. In certain example embodiments, light is internally reflected within the core to transmit the optical signal along the core. In other example embodiments, the core serves as a wave guide for the optical signal. The optical fibers can be protected within buffer tubes (e.g., the central buffer tube 220 and the buffer tube 504).

In preferred embodiments of the present disclosure, the connector housing 39 is used with the various forms and sizes of cables including cable 20t, 20c, and 20C. The connector housing 39 can be used in multiple assembly configurations, with each assembly configuration adapted to a different cable form and/or size. For example, as illustrated at FIGS. 47-50 and 61-66 in the first example embodiment, a connector housing assembly 36 includes the connector housing 39, an insert/spring holder 104, and a cover 41 and is adapted to receive the tether cable 20t. In another example, as illustrated at FIGS. 51-55, 59, 60, and 67-70 in the second example embodiment, another connector housing assembly 36' includes the connector housing 39, an insert/spring holder 104', and a cover 41' and is adapted to receive the cylindrical cable 20c. In still another example, as illustrated at FIGS. 71-75 in the third example embodiment, still another connector housing assembly 36" includes the connector housing 39, an insert/spring holder 104", a cable anchor 105, an anchor crimp band 107, and a cover 41" and is adapted to receive the cylindrical cable 20C.

The connector housing 39 of the connector 32 includes external features adapted to interface with various adapters, converters, slideable locks, and caps including the adapters 26 and 34, the converter 190, the slideable lock 50, and the cap 142 of the first, second, third, fourth, and fifth fiber optic connection system arrangements 610, 620, 630, 640, 650 mentioned above. The connector housing 39 can be used across the multiple connector housing assemblies 36, 36', 36" in the various assembly configurations introduced in the preceding paragraph. Thus, each of the assembly configurations of the connector housing assemblies 36, 36', 36" of the connector 32 will interface with the various adapters, converters, slideable locks, and caps mentioned above. For example, the connector housing 39 interfaces and connects with the fiber optic adapter 34 and the SC fiber optic adapter 26. Therefore, the connector housing assemblies 36, 36', and 36" will all interface and connect with the fiber optic adapter 34 and the SC fiber optic adapter 26.

The connector housing 39 of the connector 32 also includes external and internal features adapted to combine with the various components in each of the connector housing assemblies 36, 36', 36" of the first, second, and third example embodiments. The connector housing assembly 36 of the first example embodiment is used in fiber optic connector 32t which terminates the tether cable 20t; the connector housing assembly 36' of the second example embodiment is used in fiber optic connector 32c which terminates the cylindrical cable 20c; and the connector housing assembly 36" of the third example embodiment is used in fiber optic connector 32C which terminates the cylindrical cable 20C. In each case, the connector housing assemblies 36, 36', 36" provide one or more attachment means for connection with the cable 20t, 20c, 20C; a central passage 452 for conveying the optical fiber 500 from the cable 20t, 20c, 20C to the ferrule assembly 43; a mount for holding the ferrule assembly 43; provisions for an environmental seal with the cable 20t, 20c, 20C; provisions for an environmental seal with the fiber optic adapter 34, the converter 190, and the cap 142; and the external interface features of the preceding paragraph. The attachment means for connection with the various cables 20t, 20c, and 20C varies between the first, second, and third example embodiments and will be described separately below. Other aspects that are similar between the first, second, and third example embodiments will be described concurrently.

Various features of the connector housing 39 will now be described in detail including certain features discussed above. The connector housing 39 is preferably unitary in construction (i.e., made of one piece) and can be made as an injection molded plastic piece. Various features of the connector housing 39 can include draft angles, mold parting lines, and injection gate vestiges and thus may vary slightly from nominal form.

The plug portion 56 of the connector housing 39 is adjacent the distal end 52 and includes the generally rectangular exterior 490, as described above. In certain embodiments, the generally rectangular exterior 490 can include a smaller portion 490s and a larger portion 490l (see FIGS. 49 and 50). The ramps 53, also described above, can provide a transition between the smaller and larger portions 490s, 490l on one or more sides of the rectangular exterior 490. In a preferred embodiment, the first, second, and third protrusions 132, 134, 138 extend above one face of the larger portion 490l of the generally rectangular exterior 490, and the keyway 133 is recessed within an opposite face. The keyway 133 can be recessed to a depth matching and blending with a corresponding face of the smaller portion 490s of the rectangular exterior 490 (see FIG. 49). The pair of detents 55 is preferably recessed within a pair of opposite faces of the larger portion 490l of the rectangular exterior 490. The pair of detents 55 can extend from the face including the protrusions 132, 134, 138 to the face including the keyway 133.

Adjacent the generally rectangular exterior 490 of the plug portion 56 is a generally cylindrical exterior portion 492 of the connector housing 39. A cylindrical form of the cylindrical exterior portion 492 can continue over corners of the rectangular exterior 490 yielding a cylindrical trimming of the corners (see FIG. 49). The cylindrical exterior portion 492 includes a whole cylindrical segment 492w, adjacent the rectangular exterior 490, and a partial cylindrical segment 492p, adjacent the proximal end 54 of the connector housing 39. A retaining lip 482 and a retaining groove 481 (see FIGS. 47 and 49) are included on the whole cylindrical segment 492w adjacent the partial cylindrical segment 492p. The retaining lip 482 is at a proximal end of the whole cylindrical segment 492w. The whole cylindrical segment 492w further includes a first annular sealing groove 468, the tapered seat 131, the circumferential shoulder 113, and a second annular sealing groove 469 in succession between the generally rectangular exterior 490 and the retaining groove 481 and lip 482.

Figure 49:
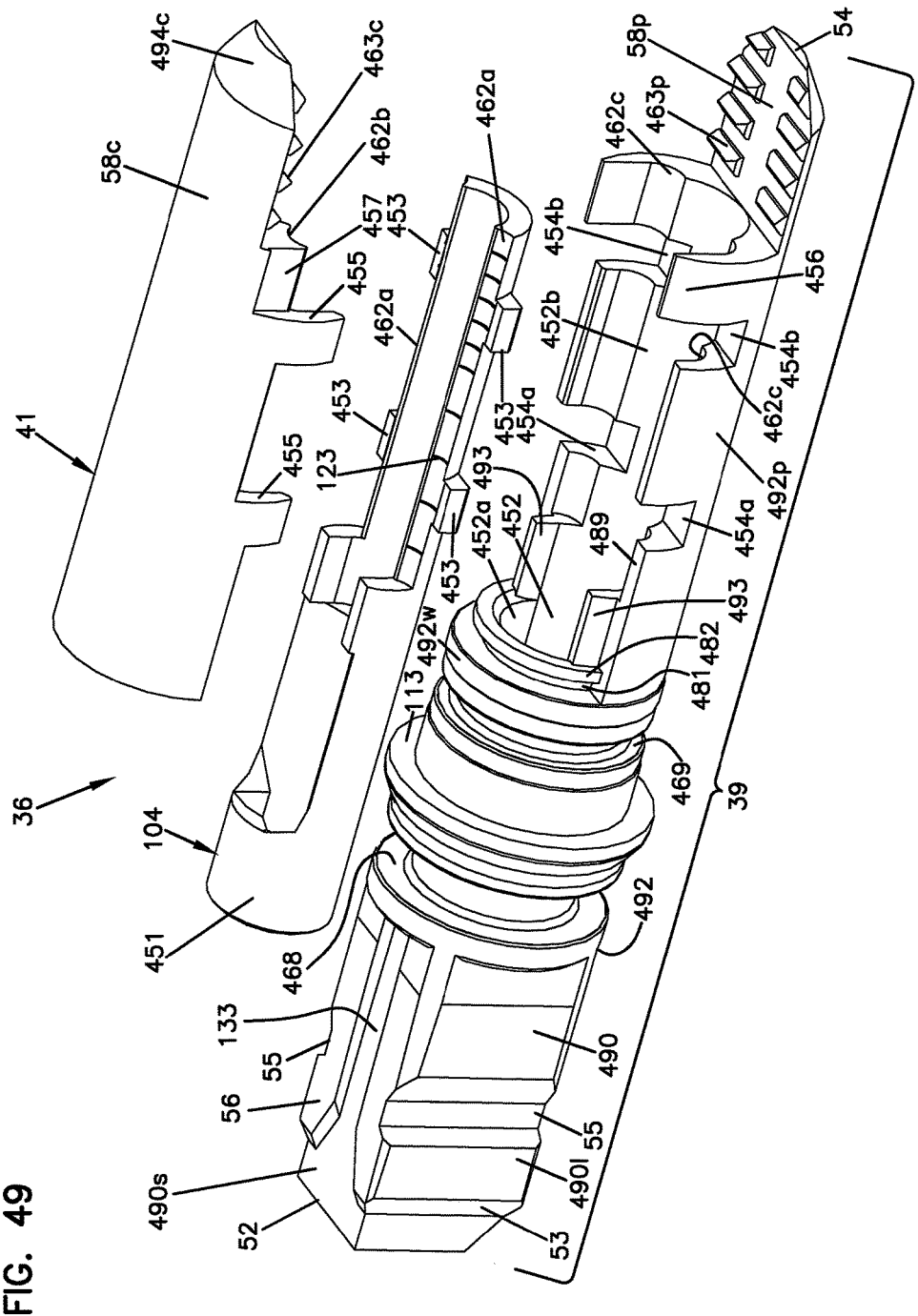
FIG. 49 is an exploded perspective view of the connector housing assembly of FIG. 47.

The partial cylindrical segment 492p provides access to a distal portion 452a and a proximal portion 452b of the central passage 452 within the connector housing 39 through an open side 489. Centering tabs 493, adjacent the retaining lip 482 are positioned at the open side 489 of the partial cylindrical segment 492p. A first pair of retaining slots 454a and a second pair of retaining slots 454b extend partially through the partial cylindrical segment 492p from the open side 489. The first pair of retaining slots 454a is closer to the retaining lip 482 while the second pair 454b is closer to the proximal end 54 of the connector housing 39. A portion of the open side 489 between the first and second pair of retaining slots 454a, 454b can extend beyond a portion of the open side 489 between the retaining lip 482 and the first pair of slots 454a. A pair of third channel portions 462c of a pair of channels 462 (further described below) can be included along and/or near the open side 489 of the partial cylindrical segment 492p. The pair of third channel portions 462c can extend axially between the centering tabs 493 and the proximal end 54 of the connector housing 39. A pair of retaining arms 456 are adjacent the second pair of retaining slots 454b. A retaining tab 58p of the connector housing 39 is adjacent the pair of retaining arms 456 and extends to the proximal end 54 of the connector housing 39. The retaining tab 58p can include retaining teeth 463p as illustrated at FIG. 49. The exterior 31 of the connector housing 39 can also include a circumferential shoulder 125 (see FIG. 69) and a tapered region 494 (see FIGS. 50 and 69) between the circumferential shoulder 125 and the proximal end 54.

The central passage 452 of the connector housing assembly, 36, 36', 36" is defined through the interior of the connector housing 39 from the proximal end 54 to the distal end 52. The central passage 452 has the distal portion 452a defined through the plug portion 56 of the connector housing 39 and the proximal portion 452b defined between the partial cylindrical segment 492p of the connector housing 39 and the cover 41, 41', 41". The proximal portion 452b of the central passage 452 is defined in part by the connector housing 39 and in part by the cover 41, 41', 41". Removal of the cover 41, 41', 41" from the connector housing 39 provides lateral access to the proximal portion 452b of the central passage 452. The distal portion 452a of the passage 452 is defined entirely by the connector housing 39 and extends through the plug portion 56. The distal portion 452a of the passage 452 has a distal end at the distal end 52 of the connector housing 39 and a proximal end adjacent the proximal portion 452b of the passage 452. Access to the distal portion 452a, in a proximal to distal longitudinal direction, is provided by the proximal portion 452b of the central passage 452.

Figure 47:
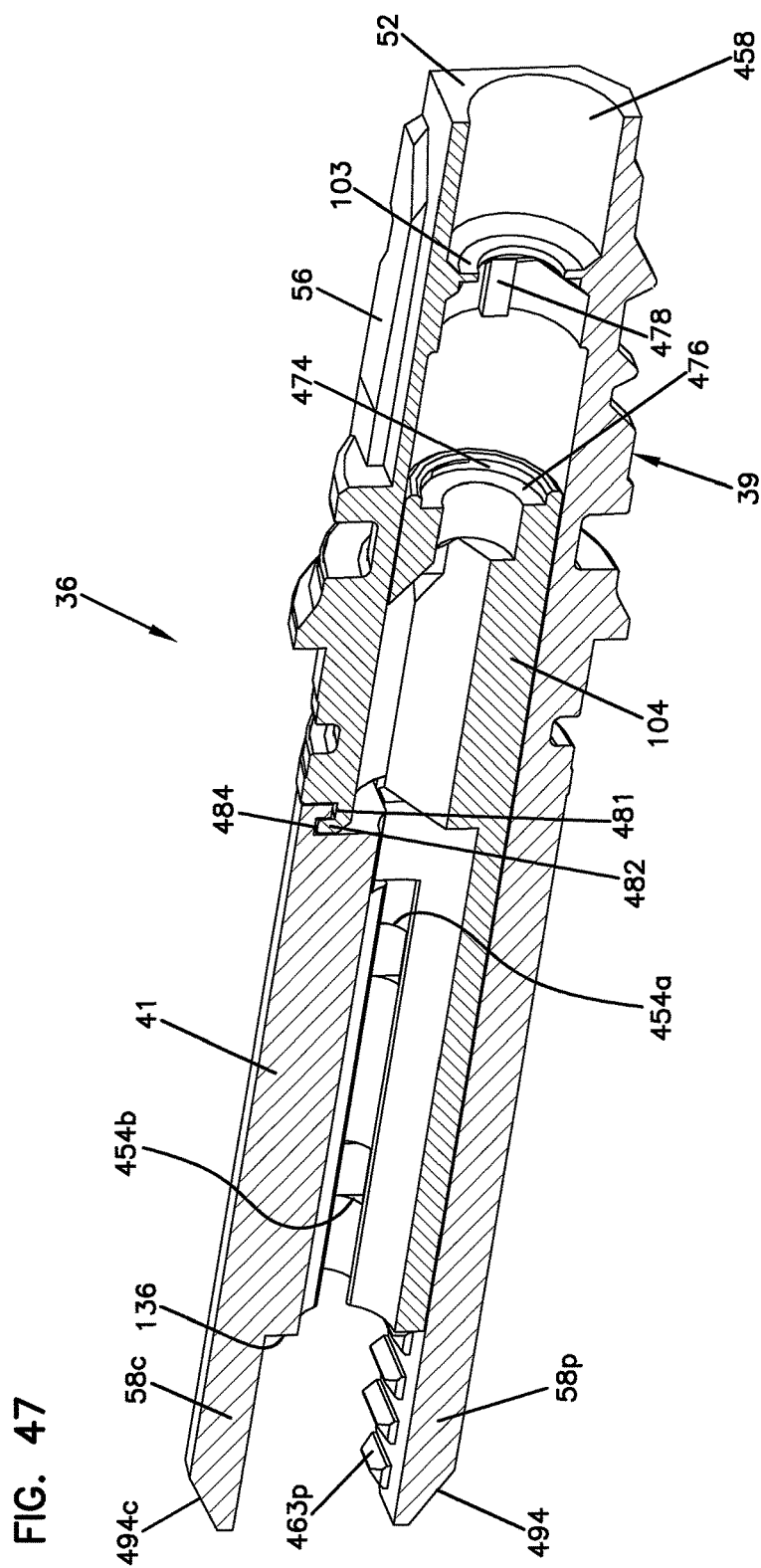
FIG. 47 is a cross-sectional perspective view of a connector housing assembly of the hardened fiber optic connector of FIG. 1, wherein the connector housing assembly is configured for terminating a flat fiber optic tether cable.
Figure 55:
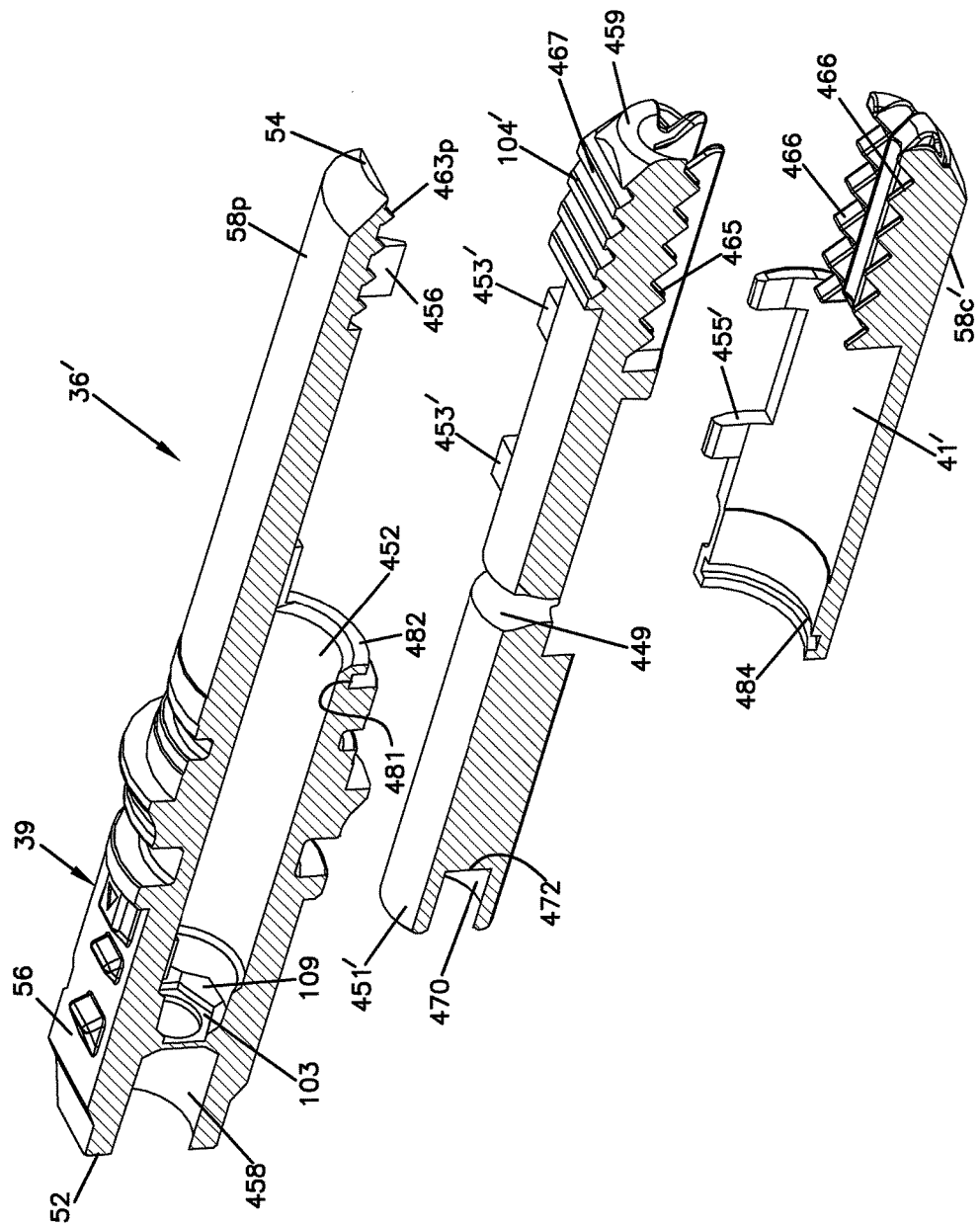
FIG. 55 is an exploded cross-sectional perspective view of the connector housing assembly of FIG. 51, wherein the cross-section is taken through the set of fiber clenching teeth.

The distal portion 452a of the central passage 452 includes an annular shoulder 103 (see FIGS. 47 and 55). A cavity 458 is formed between a first side of the annular shoulder 103 and the distal end 52 of the connector housing 39. A hex seat 109 facing the proximal end 54 of the connector housing 39 can be included on a second side of the annular shoulder 103 (see FIGS. 55 and 73). An anti-rotation key 478 (see FIGS. 47 and 73) can be included within the distal portion 452a of the central passage 452 between the annular shoulder 103 and the proximal end of the distal portion 452a.

As mentioned above, the connector housing 39 can be used to form three example connector housing assemblies, 36, 36', or 36", by using one of the covers, 41, 41', or 41", and one of the insert/spring holders, 104, 104', or 104", respectively. The covers, 41, 41', and 41", and the insert/spring holders, 104, 104', and 104", will now be described in detail with common features of each described concurrently.

Figure 48:
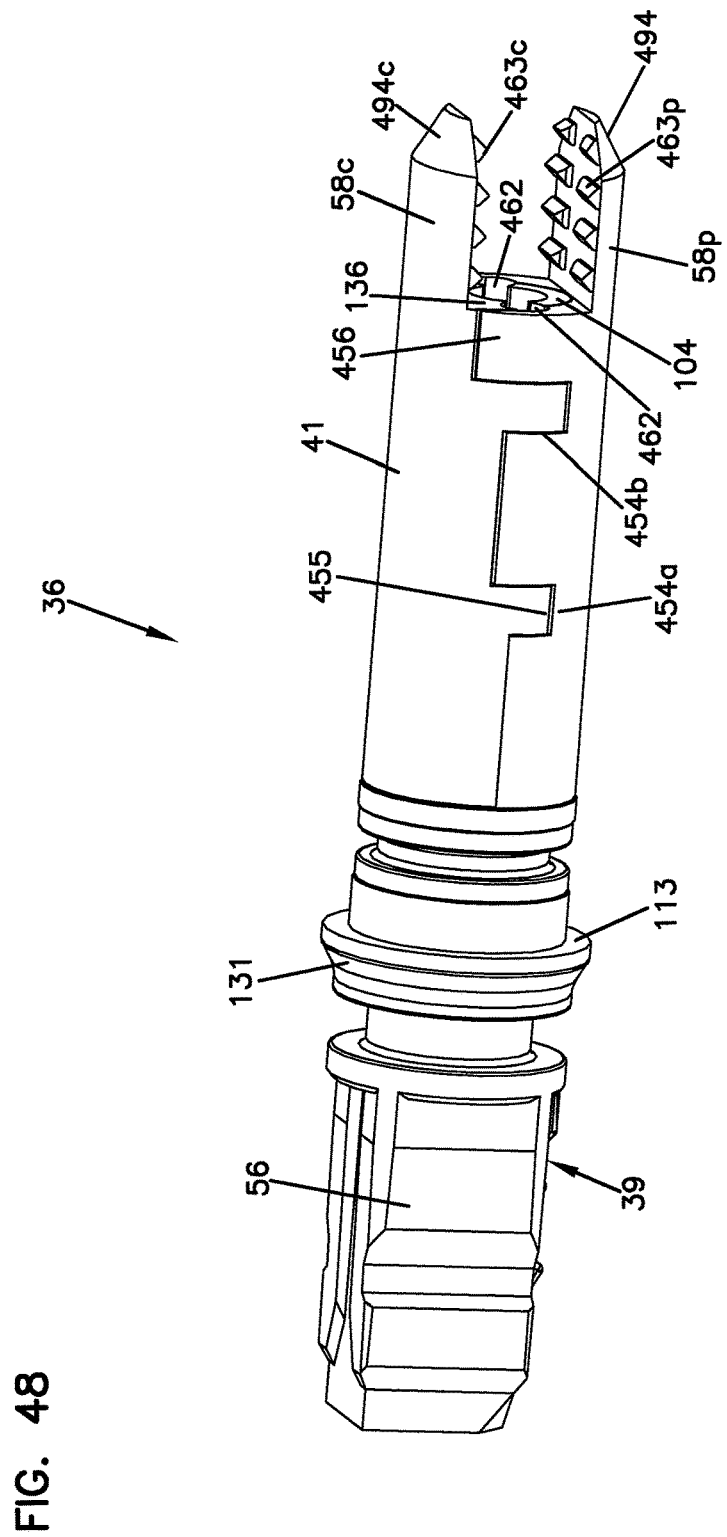
FIG. 48 is a perspective view of the connector housing assembly of FIG. 47.
Figure 51:
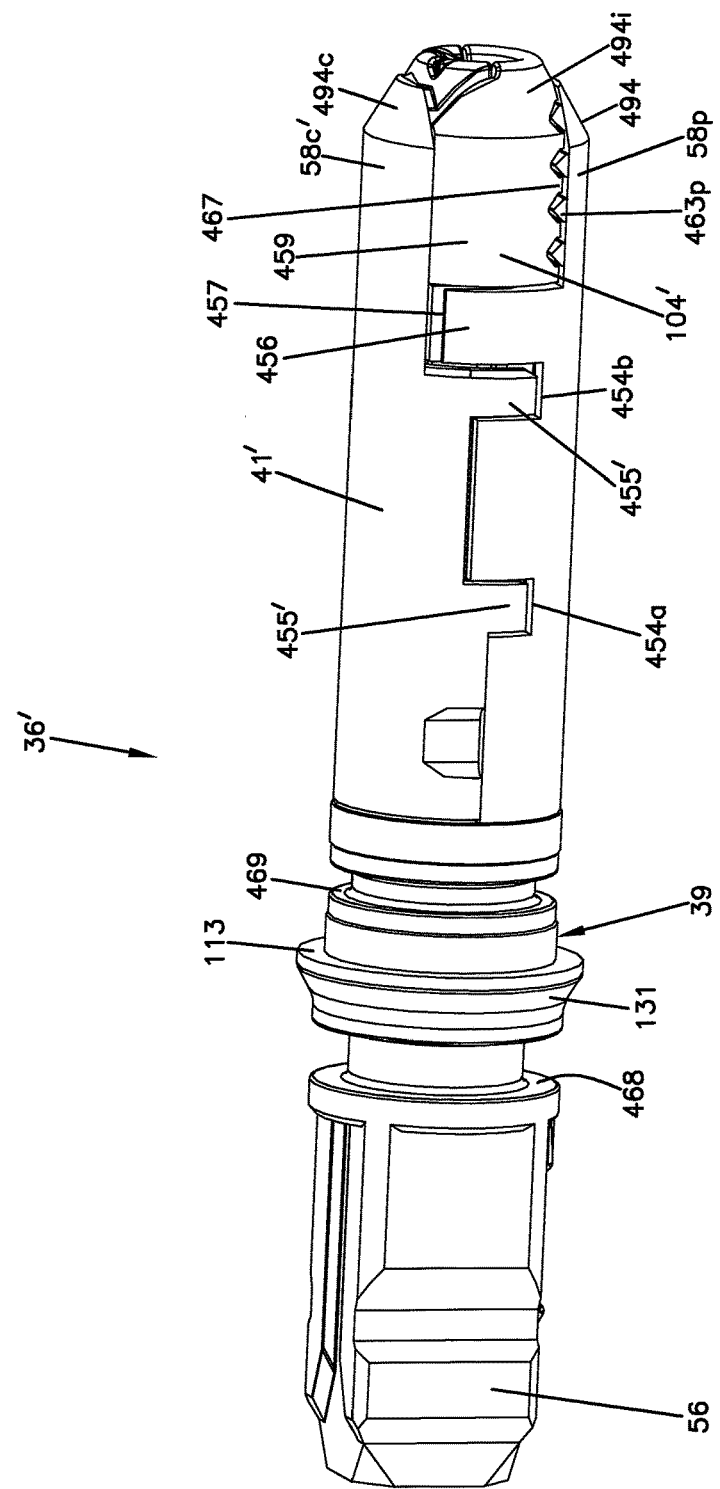
FIG. 51 is a perspective view of a connector housing assembly of the hardened fiber optic connector of FIG. 1, wherein the connector housing assembly is configured for terminating a cylindrical fiber optic cable reinforced by reinforcing fibers.
Figure 52:
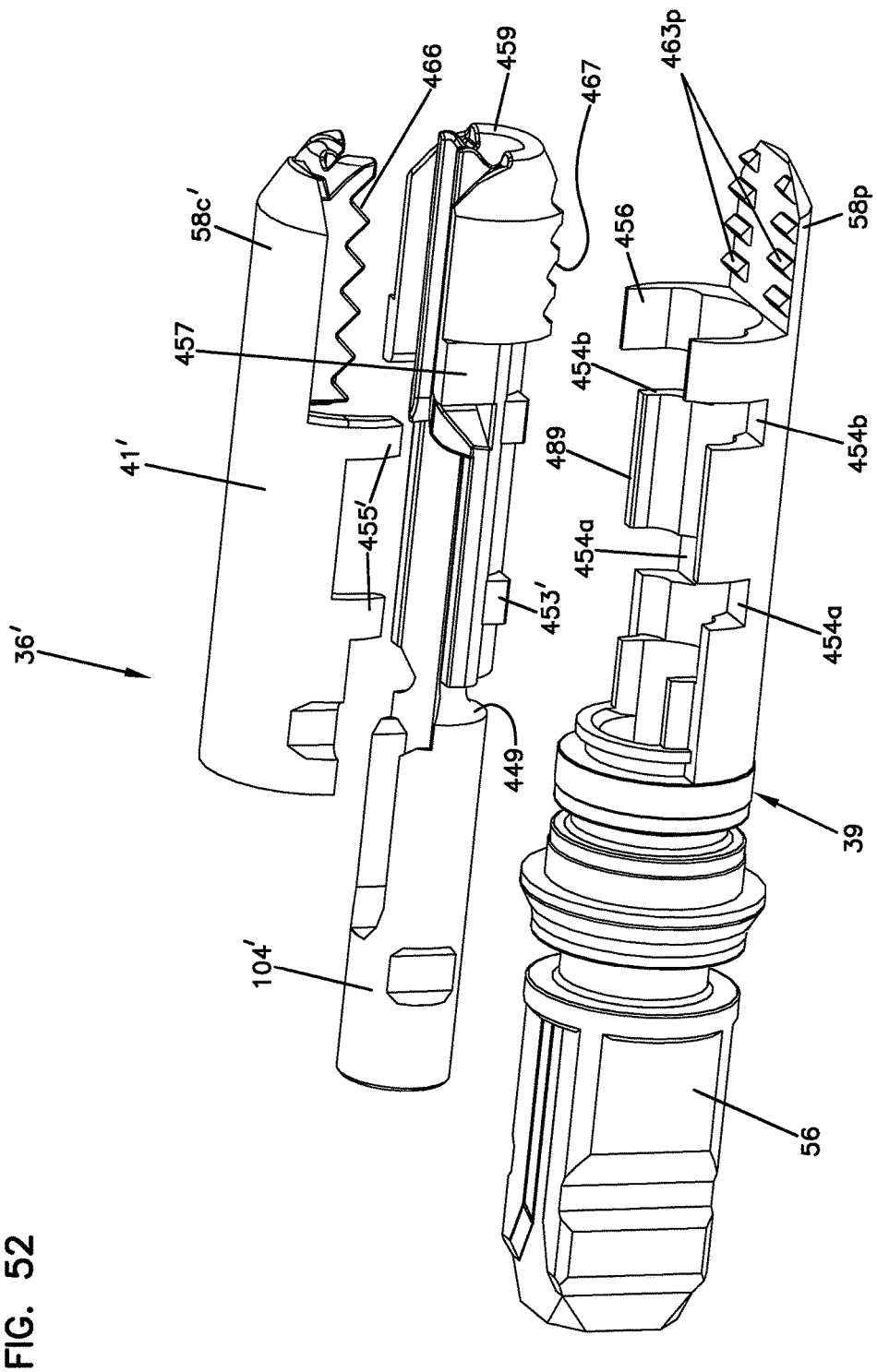
FIG. 52 is an exploded perspective view of the connector housing assembly of FIG. 51.
Figure 53:
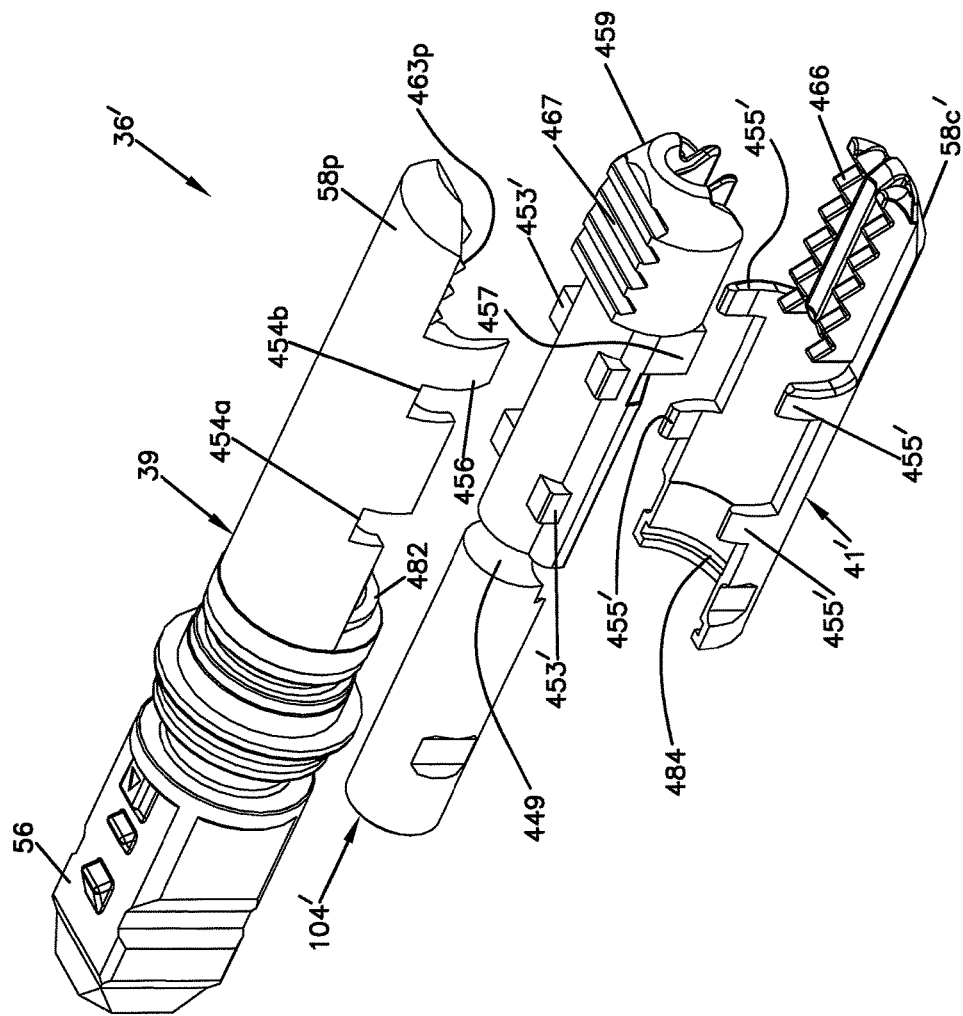
FIG. 53 is another exploded perspective view of the connector housing assembly of FIG. 51.
Figure 54:
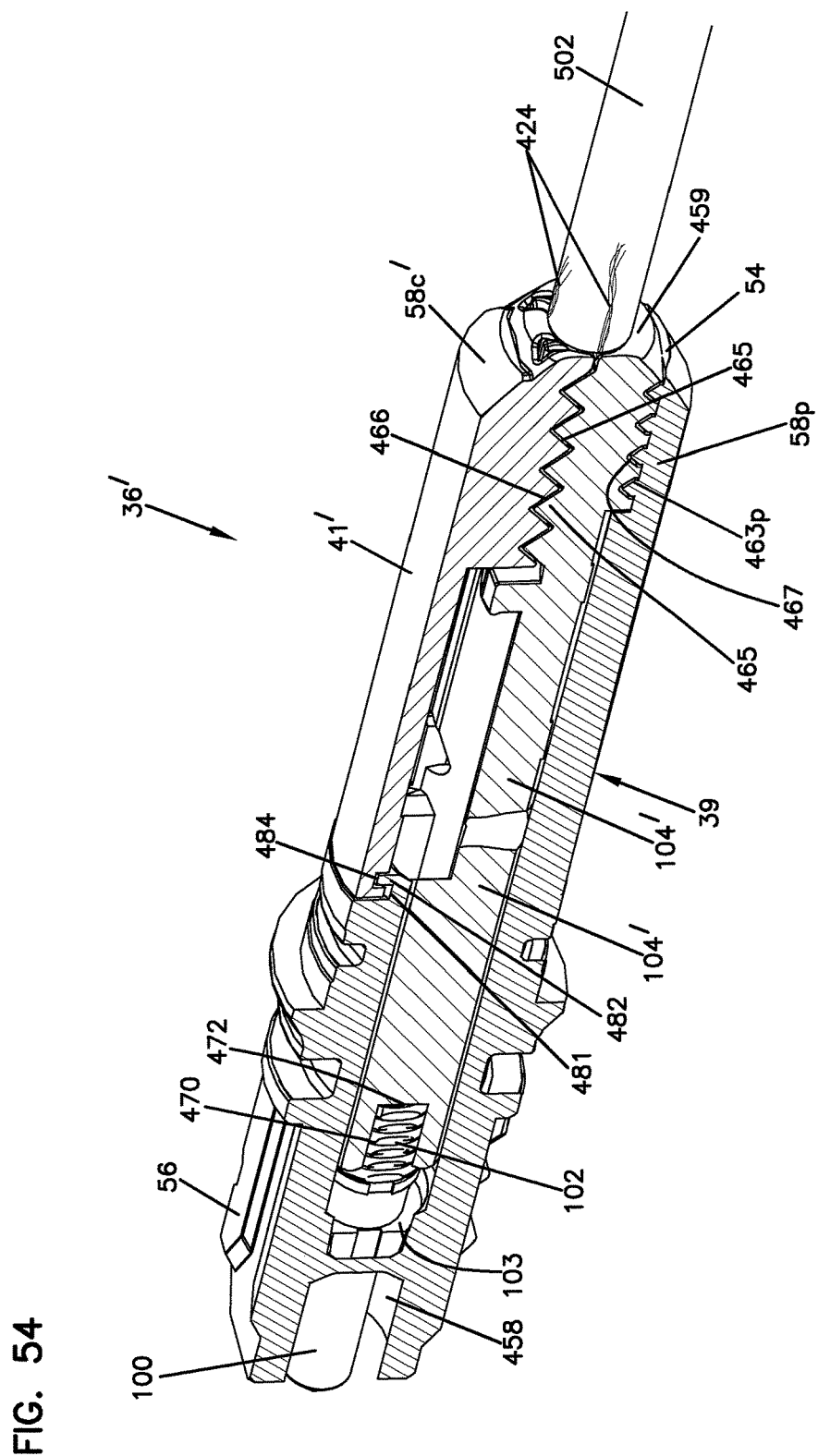
FIG. 54 is a cross-sectional perspective view of the connector housing assembly of FIG. 51, wherein the cross-section is taken through a set of fiber clenching teeth.
Figure 63:
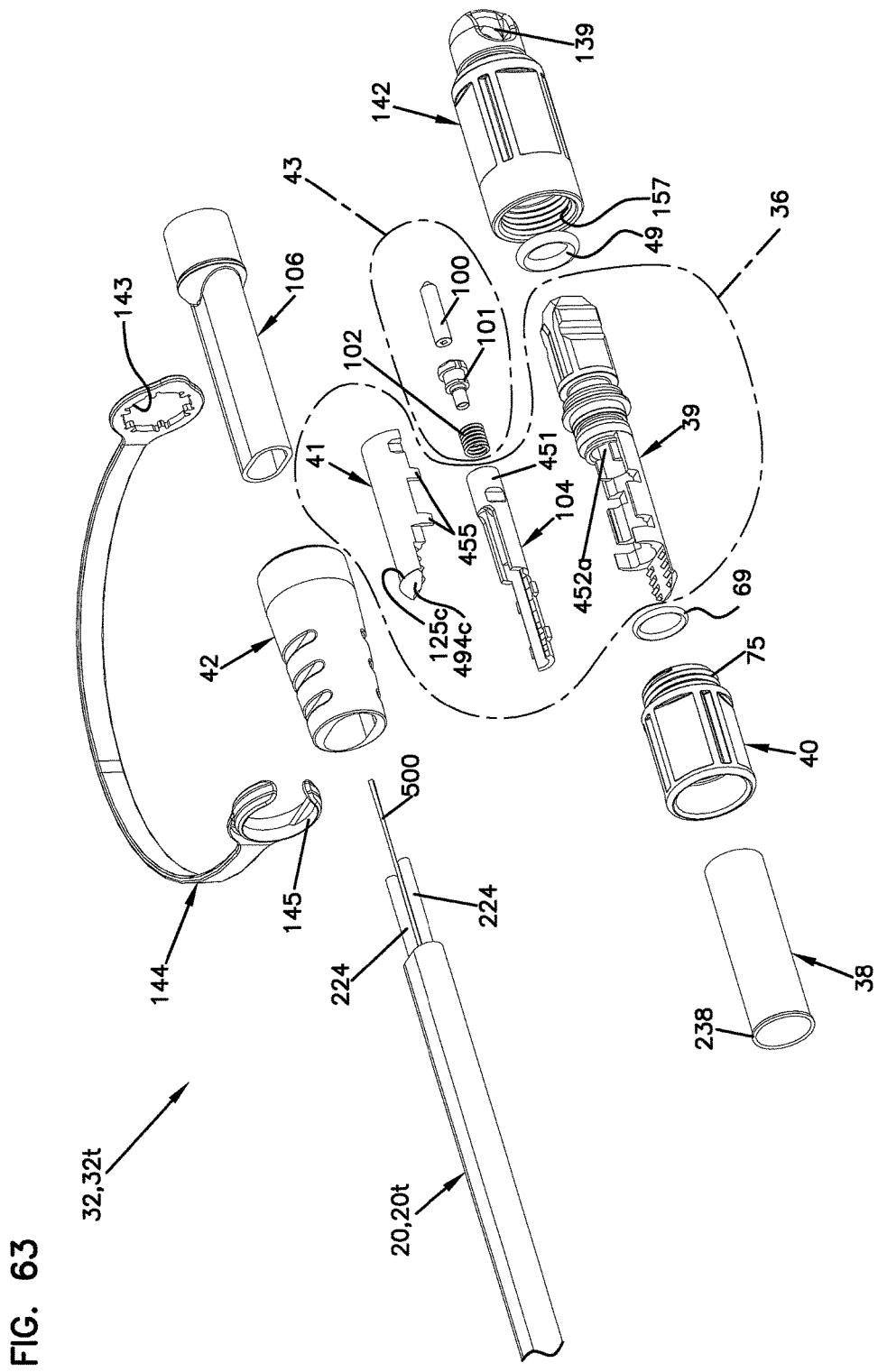
FIG. 63 is an exploded perspective view of the hardened fiber optic connector of FIG. 1 configured for terminating the fiber optic tether cable of FIG. 3.
Figure 64:
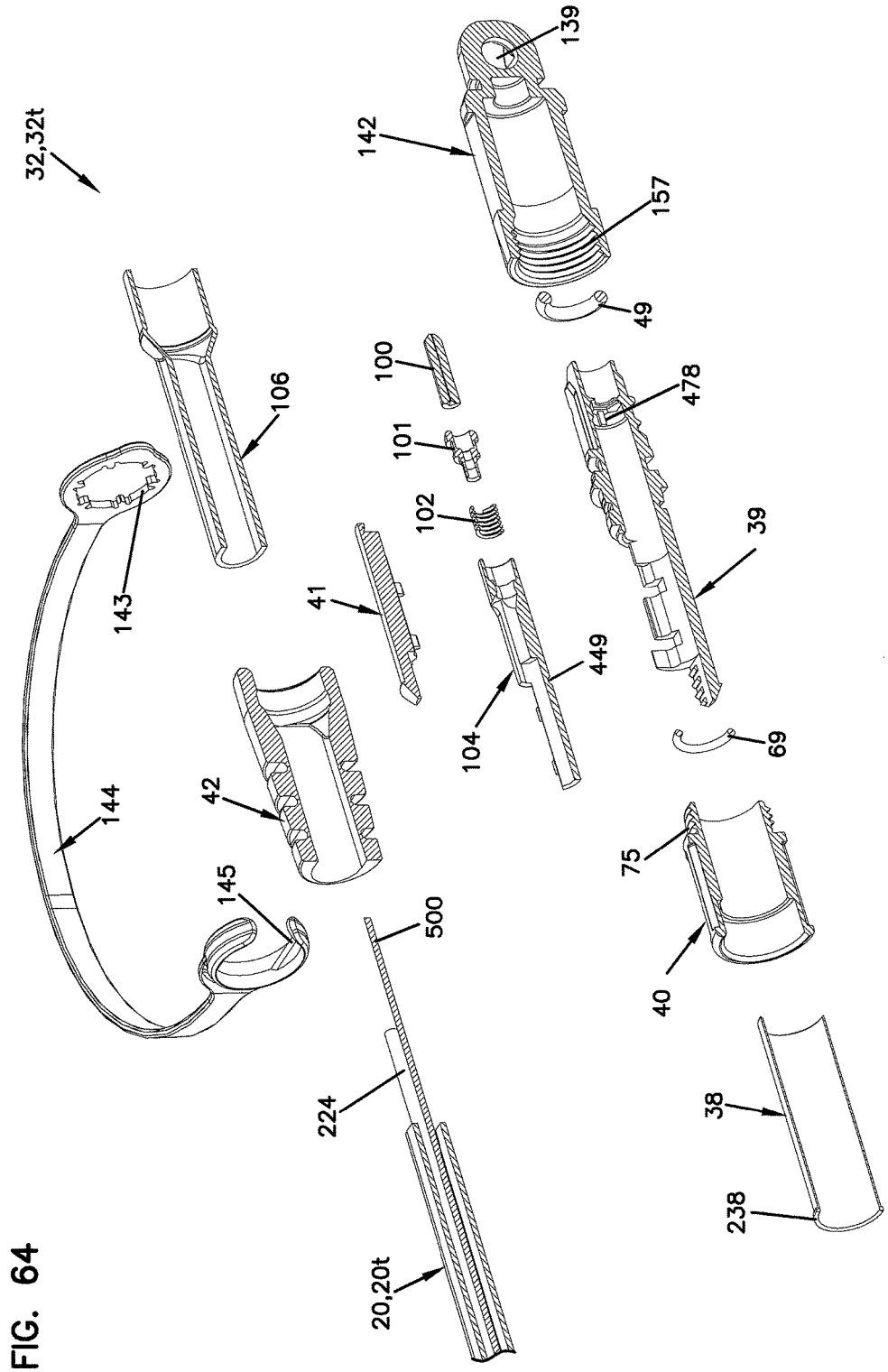
FIG. 64 is the exploded view of FIG. 63 shown in cross-section.
Figure 65:
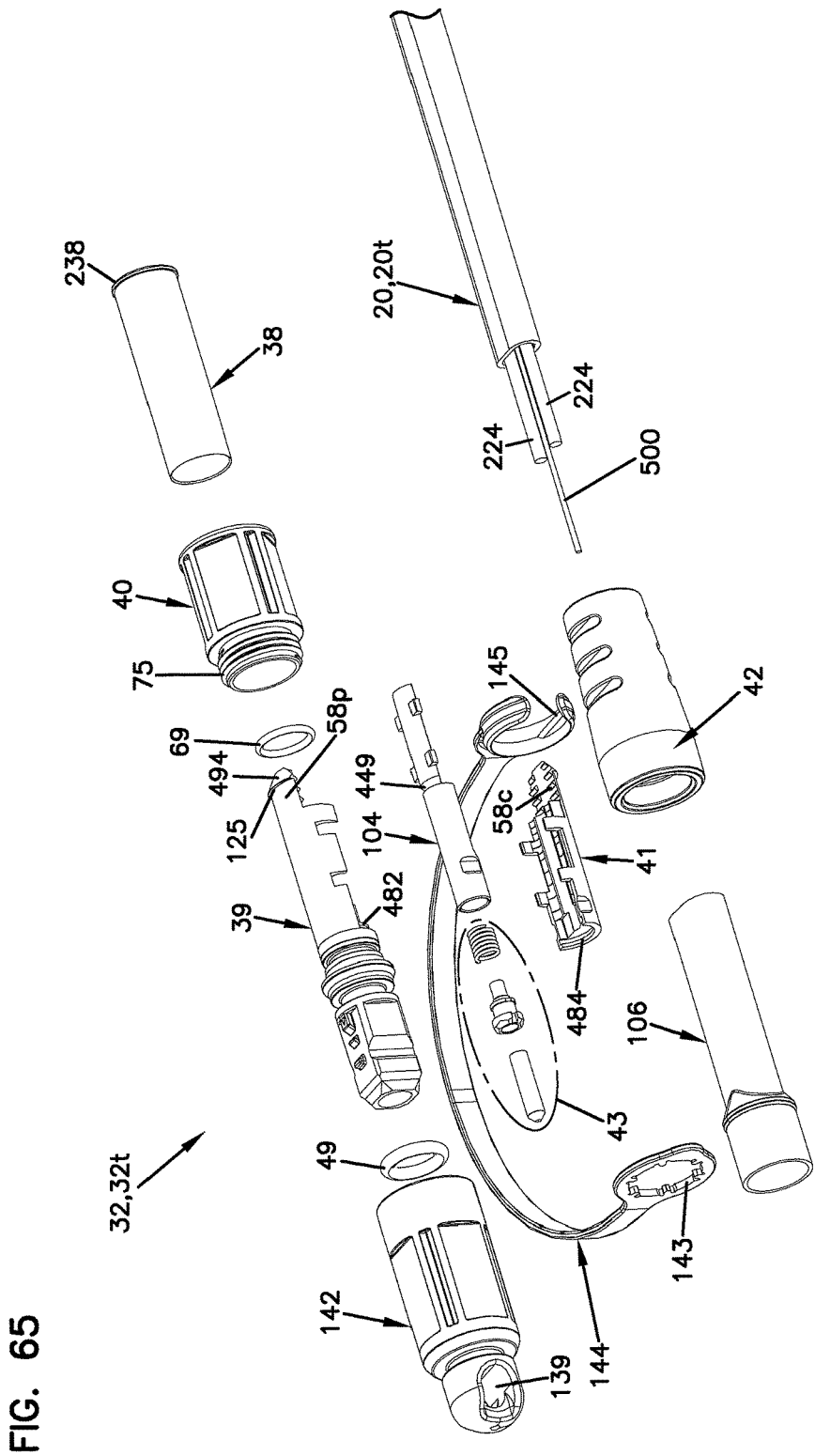
FIG. 65 is another exploded perspective view of the hardened fiber optic connector of FIG. 1 configured for terminating the fiber optic tether cable of FIG. 3.
Figure 66:
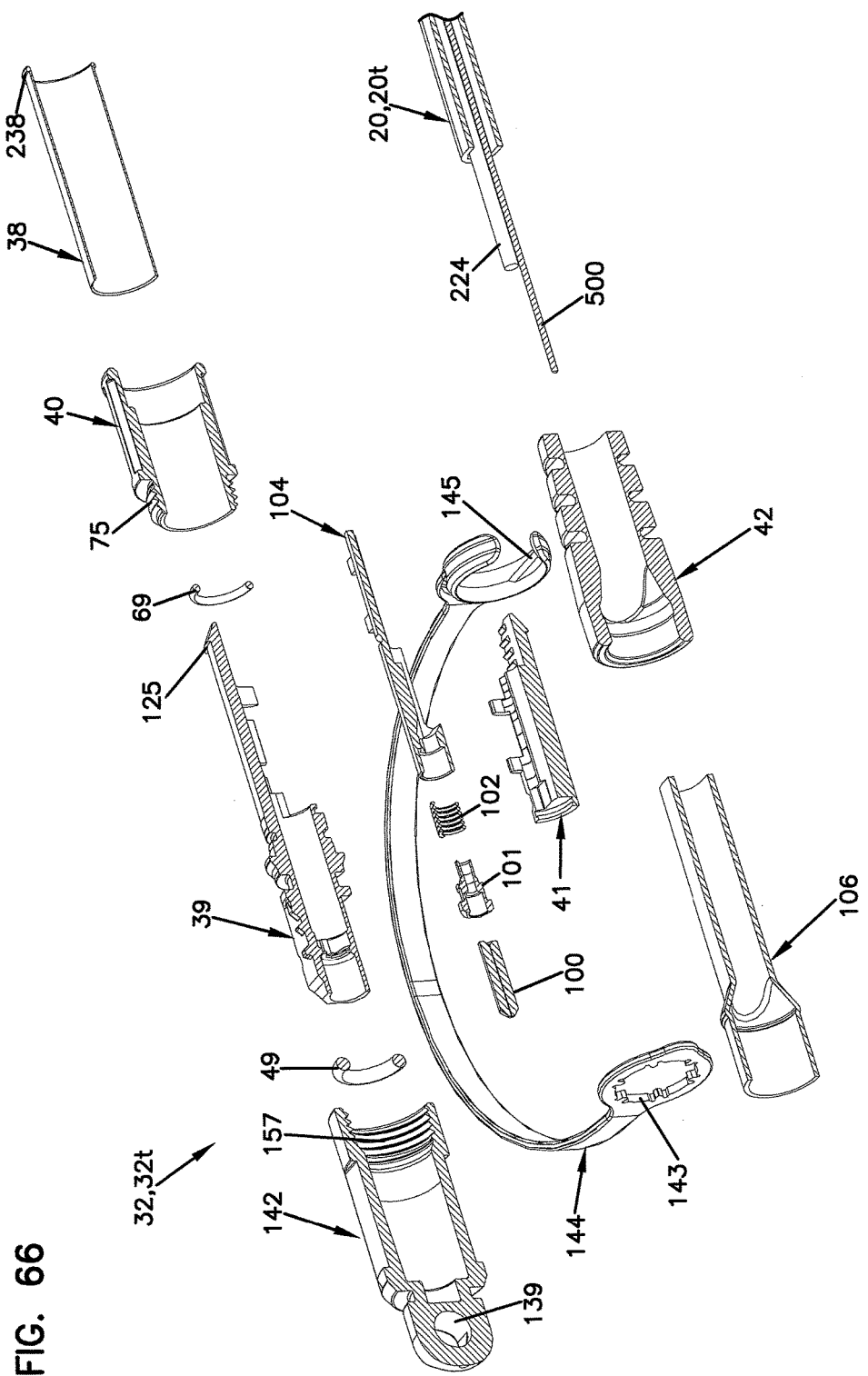
FIG. 66 is the exploded view of FIG. 65 shown in cross-section.
Figure 67:
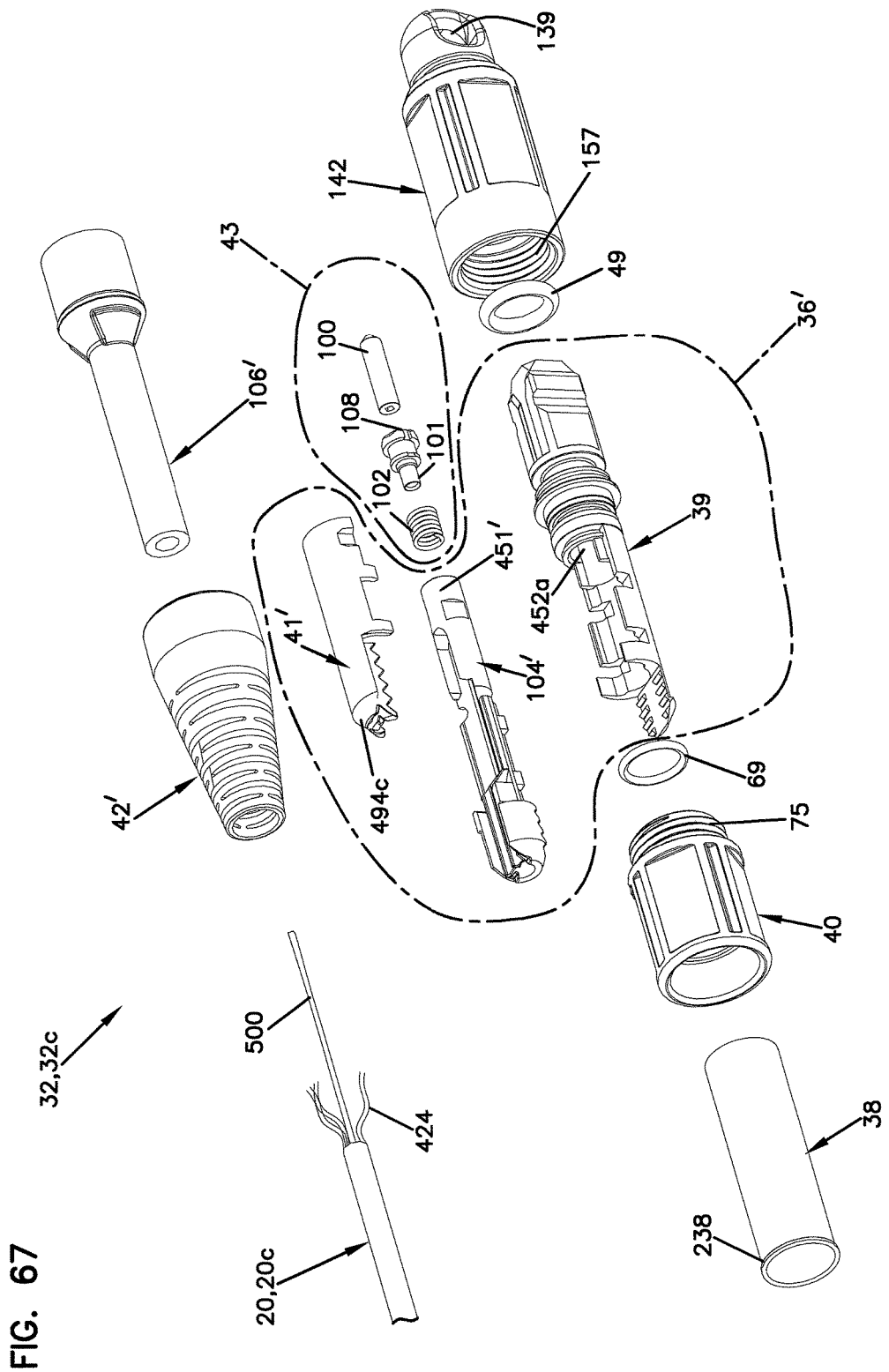
FIG. 67 is an exploded perspective view of the hardened fiber optic connector of FIG. 1 configured for terminating the cylindrical fiber optic cable of FIG. 4.
Figure 68:
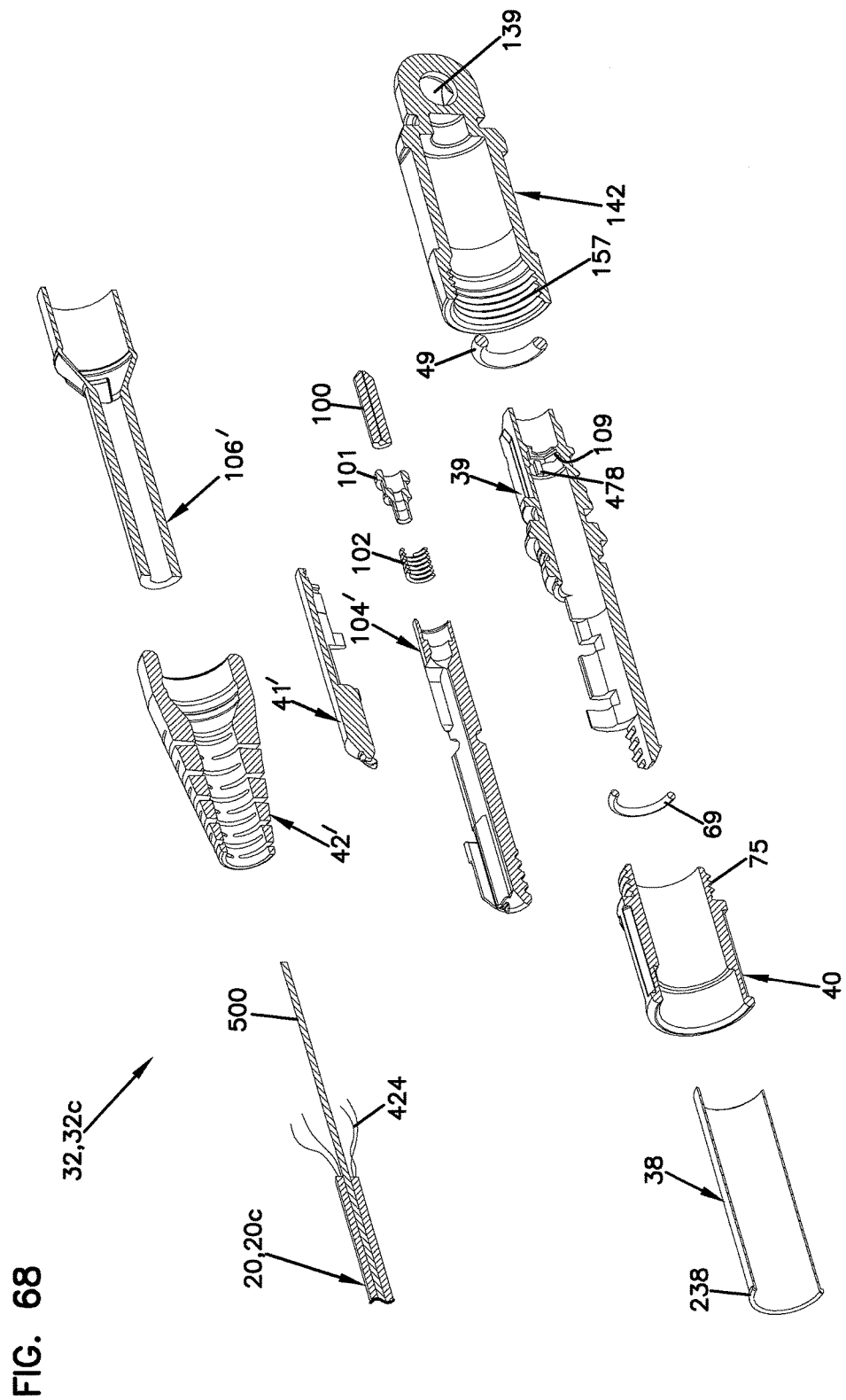
FIG. 68 is the exploded view of FIG. 67 shown in cross-section.
Figure 69:
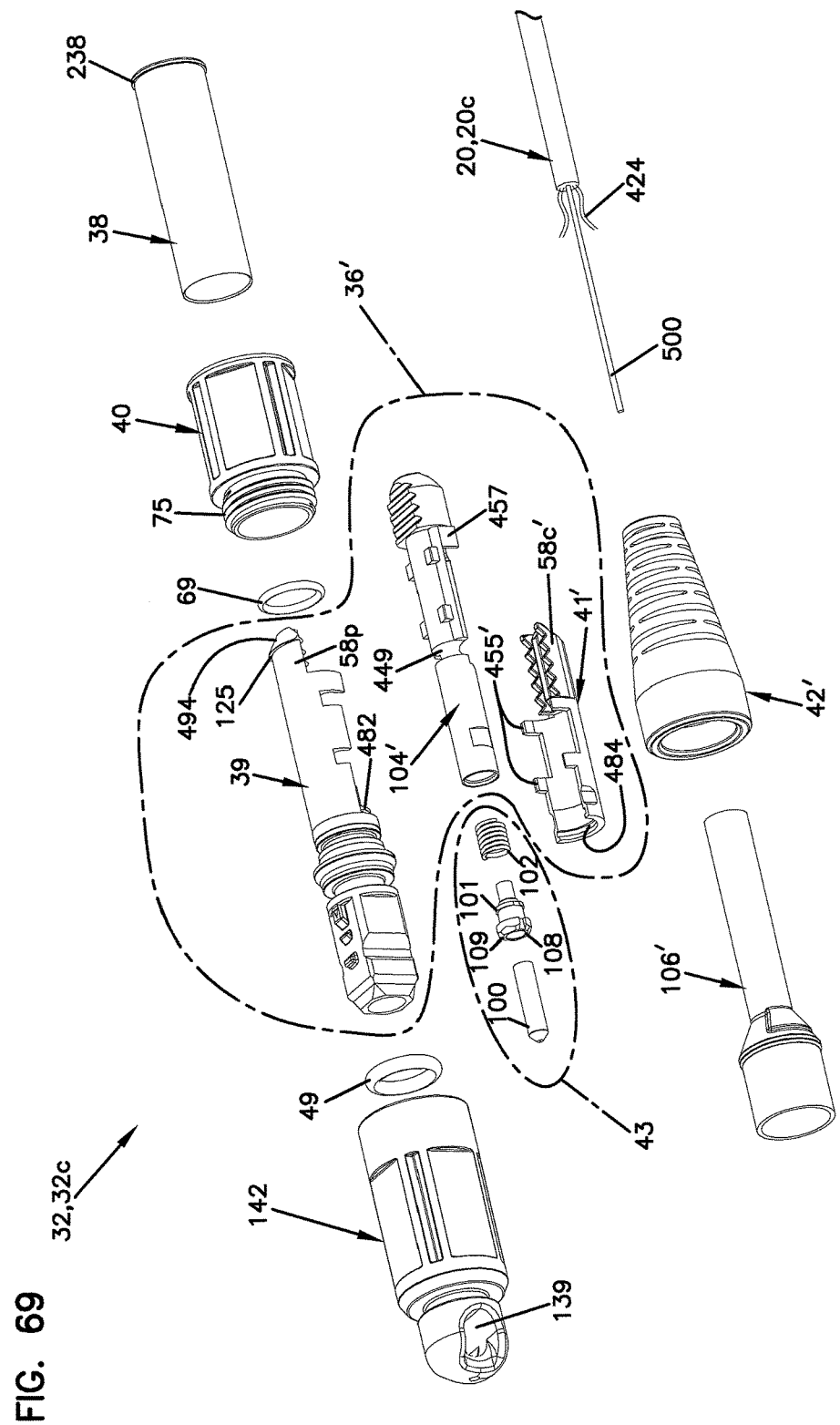
FIG. 69 is another exploded perspective view of the hardened fiber optic connector of FIG. 1 configured for terminating the cylindrical fiber optic cable of FIG. 4.
Figure 70:
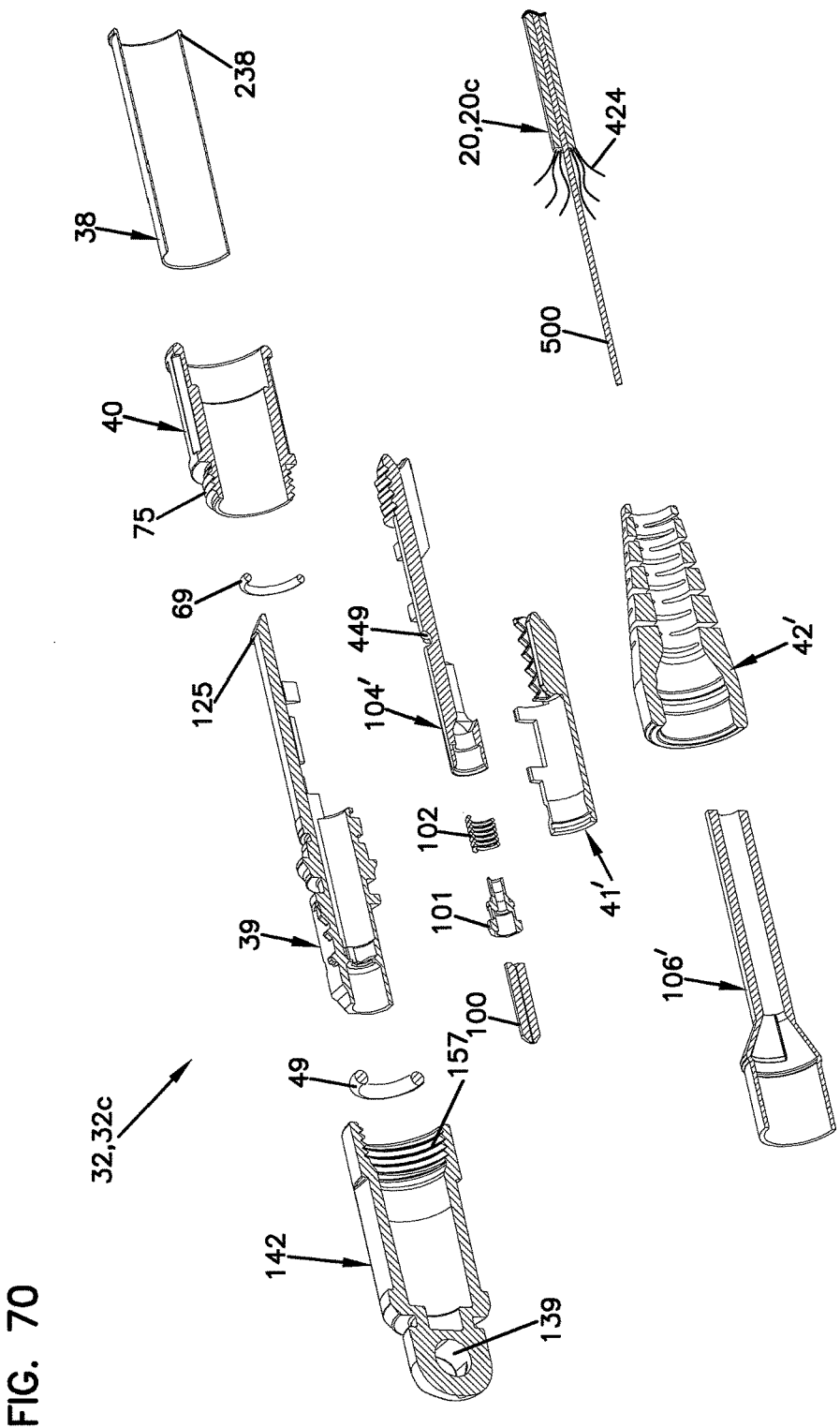
FIG. 70 is the exploded view of FIG. 69 shown in cross-section.
Figure 72:
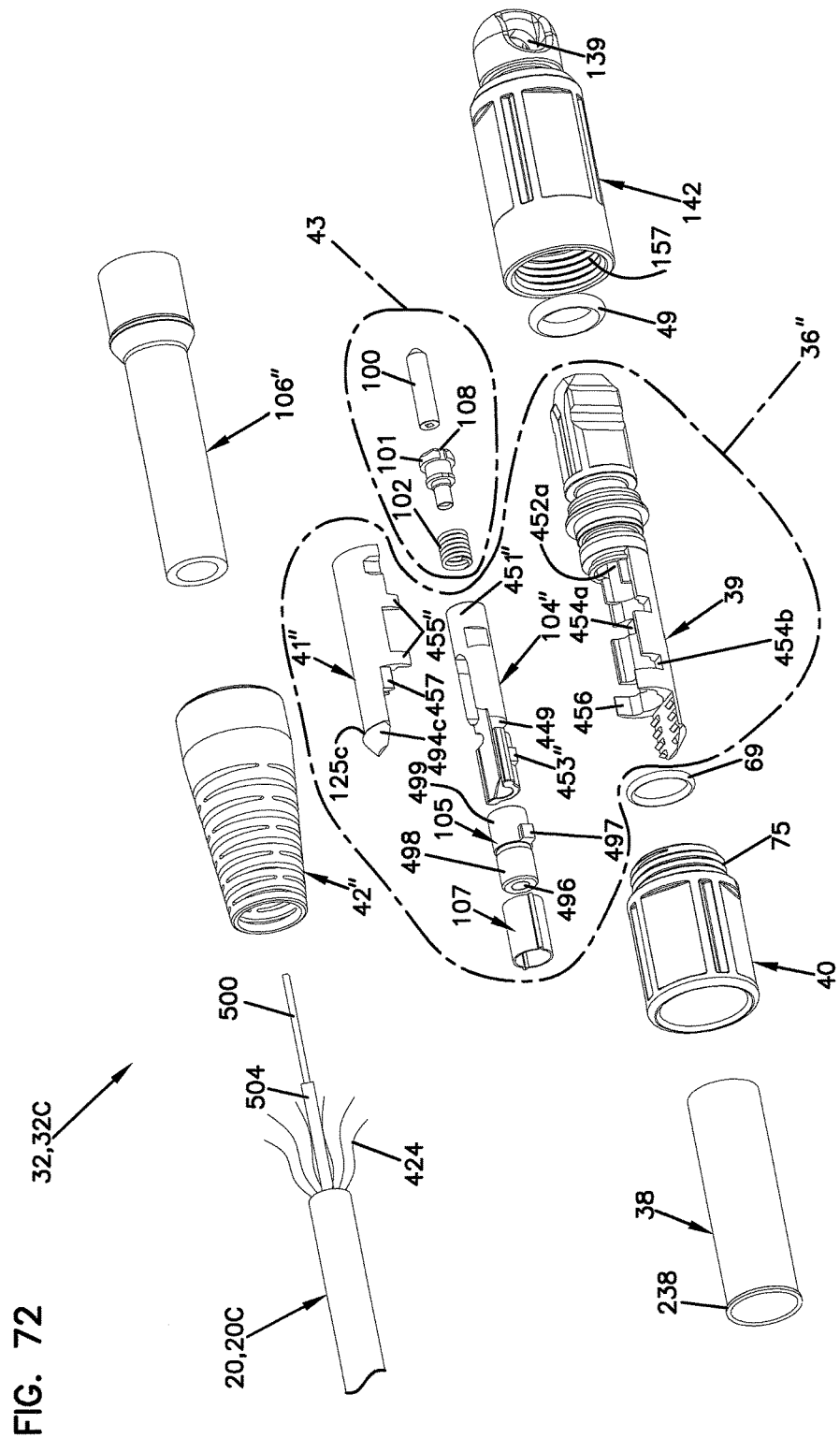
FIG. 72 is an exploded perspective view of the hardened fiber optic connector of FIG. 1 configured for terminating the cylindrical fiber optic cable of FIG. 71.

When assembled to the connector housing 39, the covers 41, 41', and 41" each continue the cylindrical form of the generally cylindrical exterior portion 492 of the connector housing 39 on their respective exteriors as illustrated at FIGS. 48 and 51. Each of the covers 41, 41', and 41" includes a retaining tab 58c, 58c', and 58c" respectively that generally matches and is opposite from the retaining tab 58p of the connector housing 39 when assembled as illustrated at FIGS. 48, 65, 69, and 74. The covers 41, 41', and 41" can include a circumferential shoulder 125c and a tapered region 494c that generally match and are opposite from the circumferential shoulder 125 and the tapered region 494 of the connector housing 39 as illustrated at FIGS. 63 and 72. A proximal pair and a distal pair of cover tabs 455, 455', 455" are included on the covers 41, 41', and 41" to engage the first and second pair of retaining slots 454a, 454b of the connector housing 39 as illustrated at FIGS. 48, 51, 63, 69, and 72. A retaining groove 484 is included on the covers 41, 41', and 41" that is connectable to the retaining lip 482 and the retaining groove 481 of the connector housing 39 as illustrated at FIGS. 47, 53-55, 65, 69, and 74.

Figure 50:
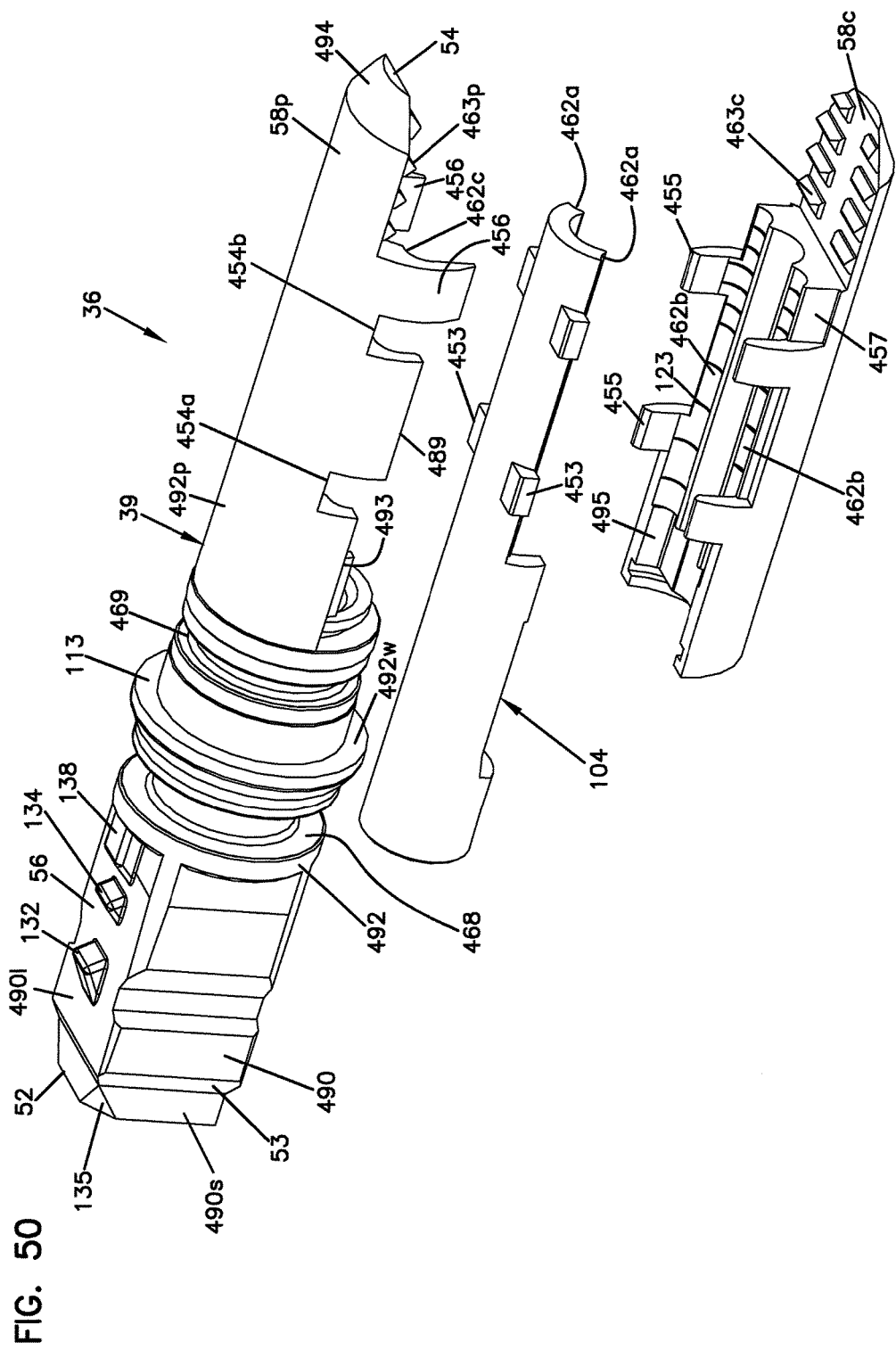
FIG. 50 is another exploded perspective view of the connector housing assembly of FIG. 47.

The cover 41 includes a pair of second channel portions 462b that cooperate with the pair of third channel portions 462c to partly form the pair of channels 462 (further described below) as illustrated at FIGS. 48-50. The second channel portions 462b can include lateral grooves 123 (see FIG. 50). The cover 41 can also include tab receivers 495 for receiving the centering tabs 493 of the connector housing 39 as illustrated at FIG. 50. The retaining tab 58c of the cover 41 includes retaining teeth 463c that generally match and are opposite from the retaining teeth 463p of the retaining tab 58p of the connector housing 39 as illustrated at FIGS. 48-50. A pair of locators 457 for engaging the pair of retaining arms 456 of the connector housing 39 is located between the retaining tab 58c and the proximal pair of cover tabs 455.

Figure 60:
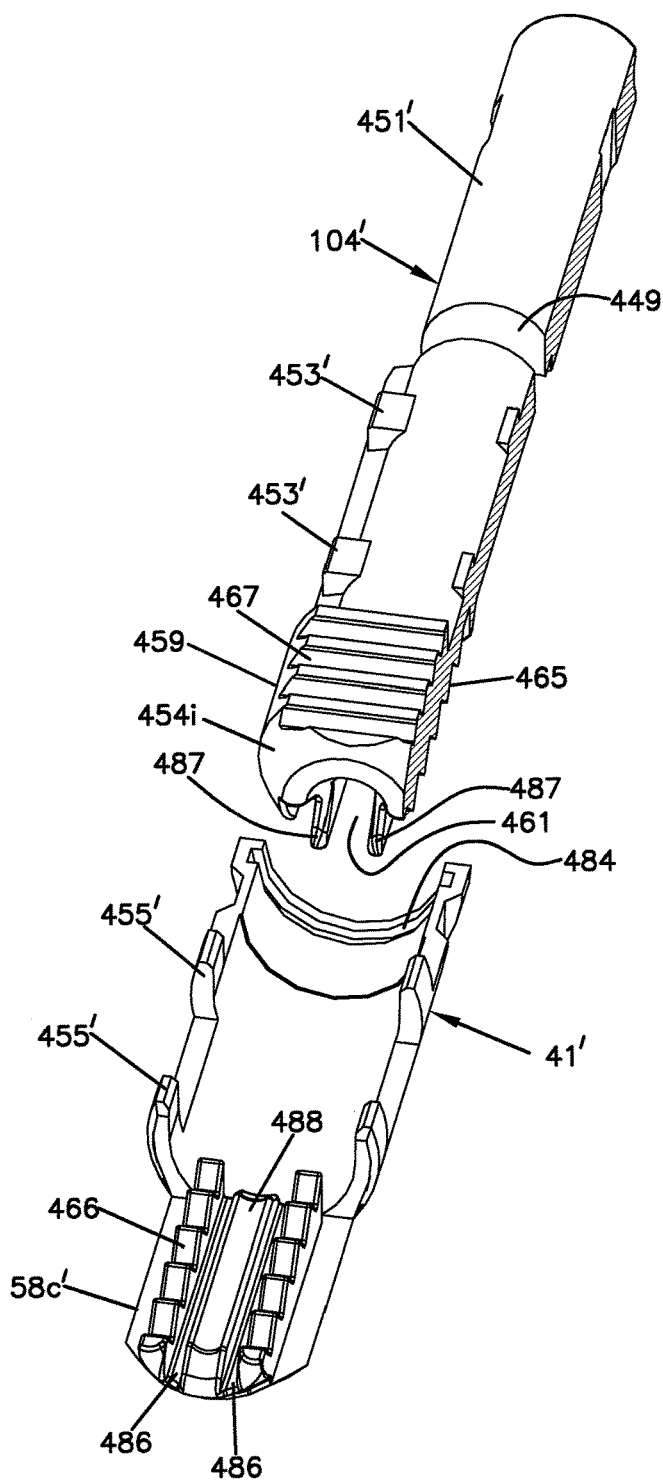
FIG. 60 is an exploded partial cross-sectional view of the cover and the insert/spring holder of FIG. 59 with the insert/spring holder shown in cross-section.

The retaining tab 58c' of the cover 41' includes a pair of longitudinal grooves 486 that extend along the retaining tab 58c' (see FIG. 60). Between the pair of longitudinal grooves 486 is a guide 488 also extending along the retaining tab 58c'. Outward from the guide 488 and the pair of longitudinal grooves 486 are a pair of gripping teeth sets 466 also extending along the retaining tab 58c'.

The cover 41", like cover 41, includes a pair of locators 457 for engaging the pair of retaining arms 456 of the connector housing 39. The pair of locators 457 is located axially between the retaining tab 58c" and the proximal pair of the cover tabs 455" (see FIG. 74).

The insert/spring holders 104, 104', and 104" each are held within the central passage 452 of the three example connector housing assemblies, 36, 36', and 36", respectively. The insert/spring holders 104, 104', and 104" each include a spring seat 476, 472, and 471 within a spring seat pocket 474, 470, and 475 at a distal end of the respective insert/spring holder 104, 104', and 104" as illustrated at FIGS. 47, 54, 55, 71, and 73-75. The insert/spring holder 104" includes a pair of the insert tabs 453" for engaging the first pair of the retaining slots 454a of the connector housing 39. The insert/spring holders 104 and 104' each include a distal pair and a proximal pair of the insert tabs 453, 453' respectively, for engaging the first and the second pair of the retaining slots 454a, 454b of the connector housing 39. One or more flex locations 449 can be included on the insert/spring holders 104, 104', 104" to facilitate bending of the insert/spring holders 104, 104', 104" as illustrated at FIGS. 52, 53, 55, 64, 65, 69, 70, 72, and 73. An interior of the insert/spring holders 104, 104', 104" forms a longitudinal passage that conveys the optical fiber 500 from the cable 20t, 20c, 20C to the ferrule assembly 43 and can at least partly hold the ferrule assembly 43. A partially open side of the insert/spring holders 104, 104', 104" provides lateral access to the interior.

The insert/spring holder 104 includes a pair of first channel portions 462a that cooperate with the pairs of the second and the third channel portions 462b, 462c to partly form the pair of channels 462 as illustrated at FIGS. 48-50. The first channel portions 462a can include lateral grooves 123 (see FIG. 49).

Figure 59:
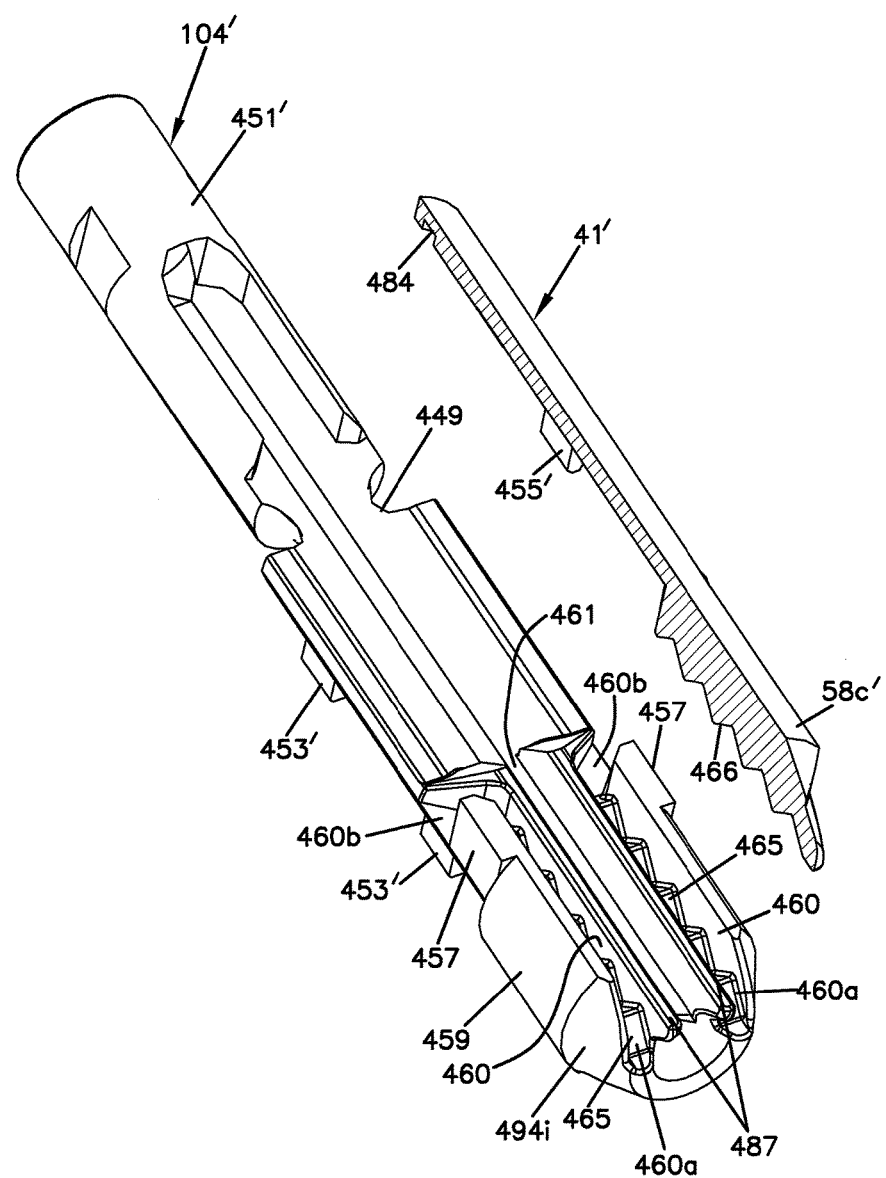
FIG. 59 is an exploded partial cross-sectional view of certain components of the connector housing assembly of FIG. 51, including a cover, shown in cross-section, and an insert/spring holder.

The insert/spring holder 104' includes a strength member engaging portion 459 with an exterior that continues the cylindrical form of both the cover 41' and the cylindrical exterior portion 492 of the connector housing 39 (see FIG. 51). The strength member engaging portion 459 includes a tapered region 494i at a proximal end of the insert/spring holder 104'. The tapered region 494i generally continues and completes the tapered region 494 of the connector housing 39 and the tapered region 494c of the cover 41' (see FIG. 51). The strength member engaging portion 459 further includes a pair of channels 460 with an entrance 460a adjacent the proximal end of the insert/spring holder 104' and an exit 460b exiting out the sides near an opposite end of the strength member engaging portion 459 above the proximal pair of the insert tabs 453' as illustrated at FIG. 59. A pair of gripping teeth sets 465 engagable with the pair of the gripping teeth sets 466 of the retaining tab 58c' of the cover 41' is included within the pair of the channels 460 (see FIG. 54). A passage 461 between inside walls 487 of the pair of the channels 460 holds the guide 488 of the cover 41' and the inside walls 487 fit within the longitudinal grooves 486 of the retaining tab 58c' of the cover 41'. The strength member engaging portion 459 further includes retaining teeth 467 engagable with the pair of the retaining teeth 463p of the retaining tab 58p of the connector housing 39 (see FIG. 54). The insert/spring holder 104' further includes a pair of locators 457 for engaging the pair of retaining arms 456 of the connector housing 39. The pair of locators 457 is located on the strength member engaging portion 459 adjacent a proximal side of the exit 460b of the channels 460.

The insert/spring holders 104 and 104' each directly engage the strength members 224 and the axial reinforcing fibers 424 of the cables 20t and 20c respectively. The insert/spring holder 104" does not directly engage the axial reinforcing fibers 424 of the cable 20C. Instead, the cable anchor 105 and the anchor crimp band 107 of the connector housing assembly 36" are directly connected to the axial reinforcing fibers 424 of the cable 20C.

Figure 71:
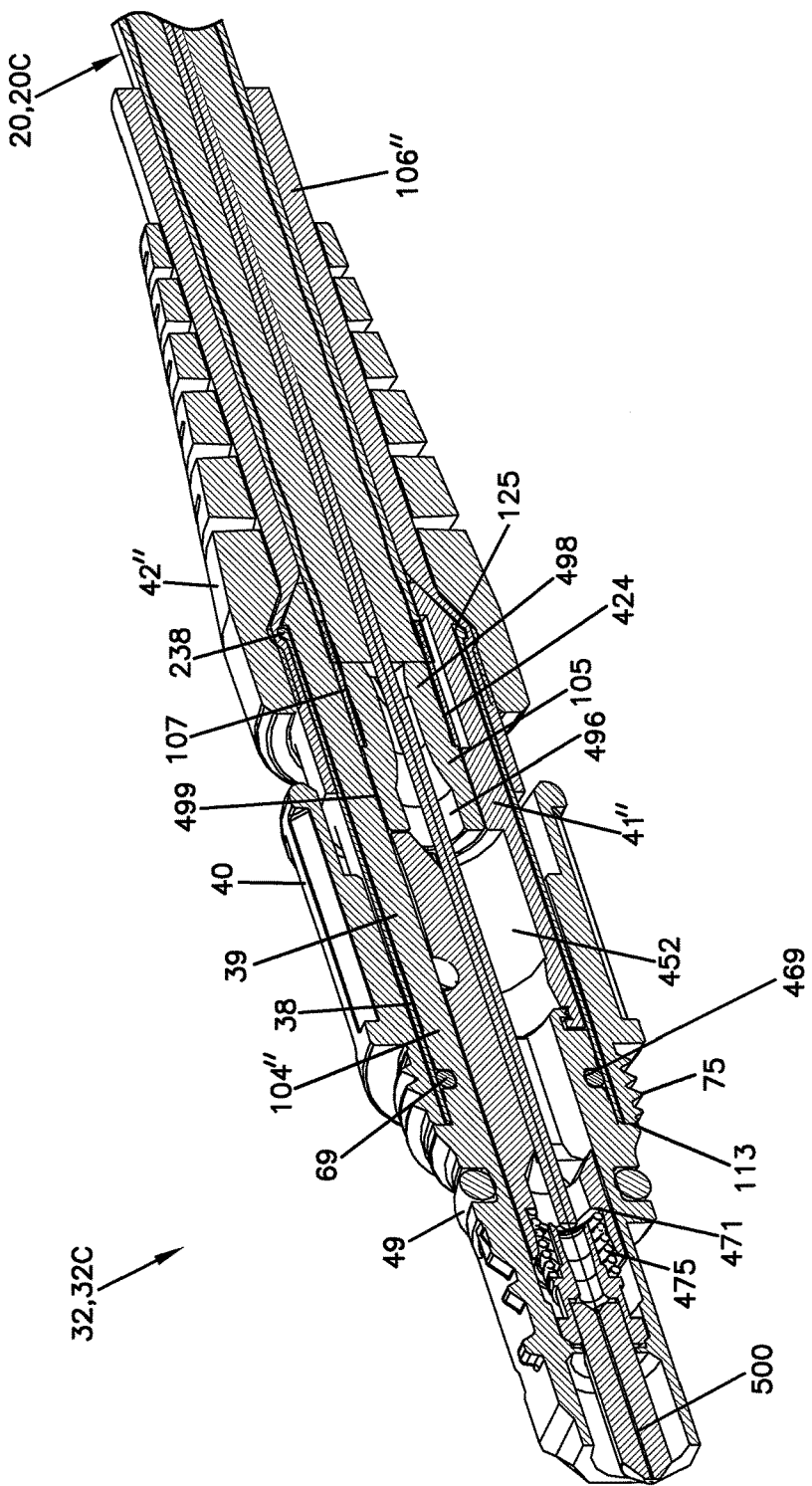
FIG. 71 is a cross-sectional perspective view of the hardened fiber optic connector of FIG. 1 configured for terminating another cylindrical fiber optic cable.
Figure 73:
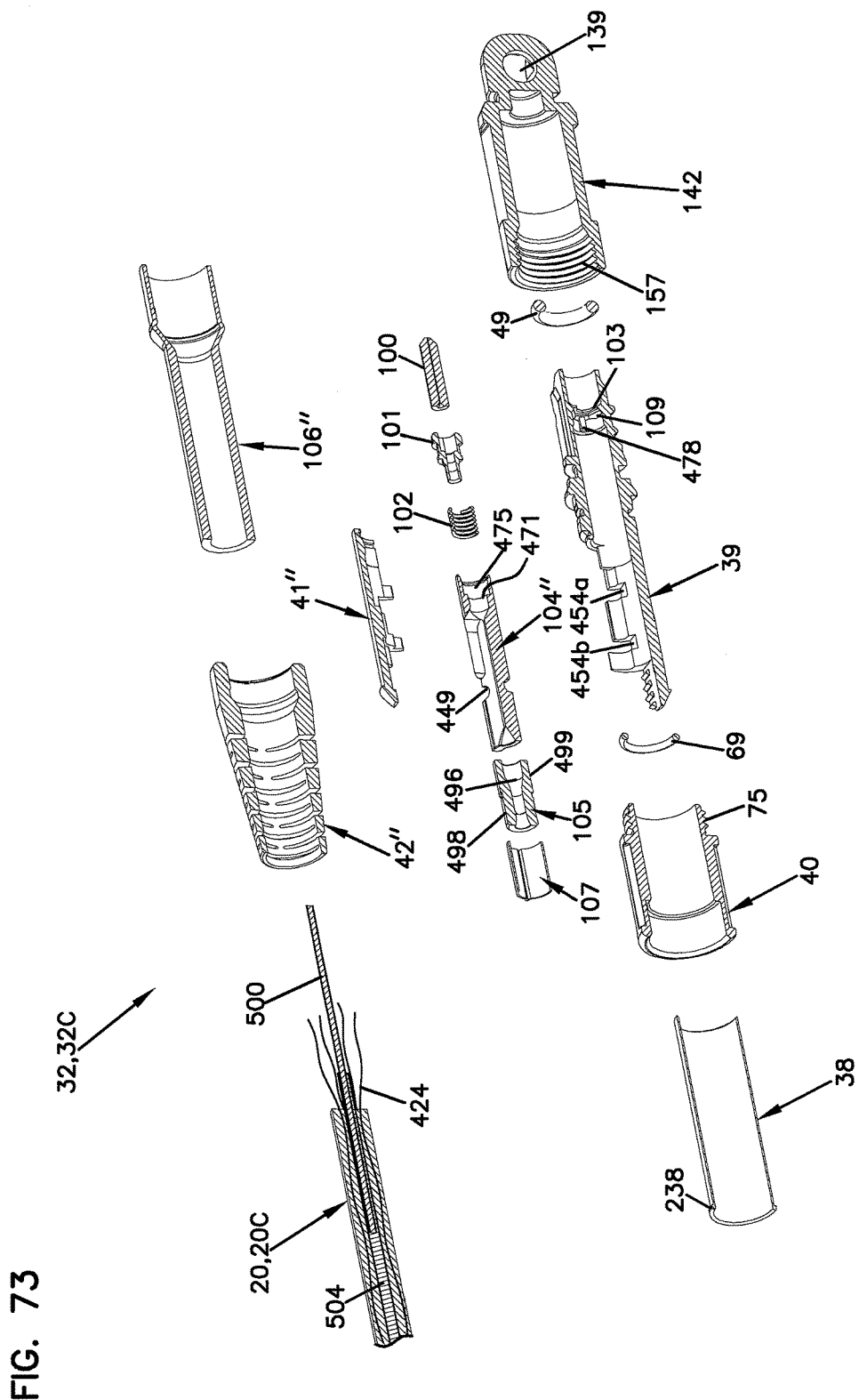
FIG. 73 is the exploded view of FIG. 72 shown in cross-section.
Figure 74:
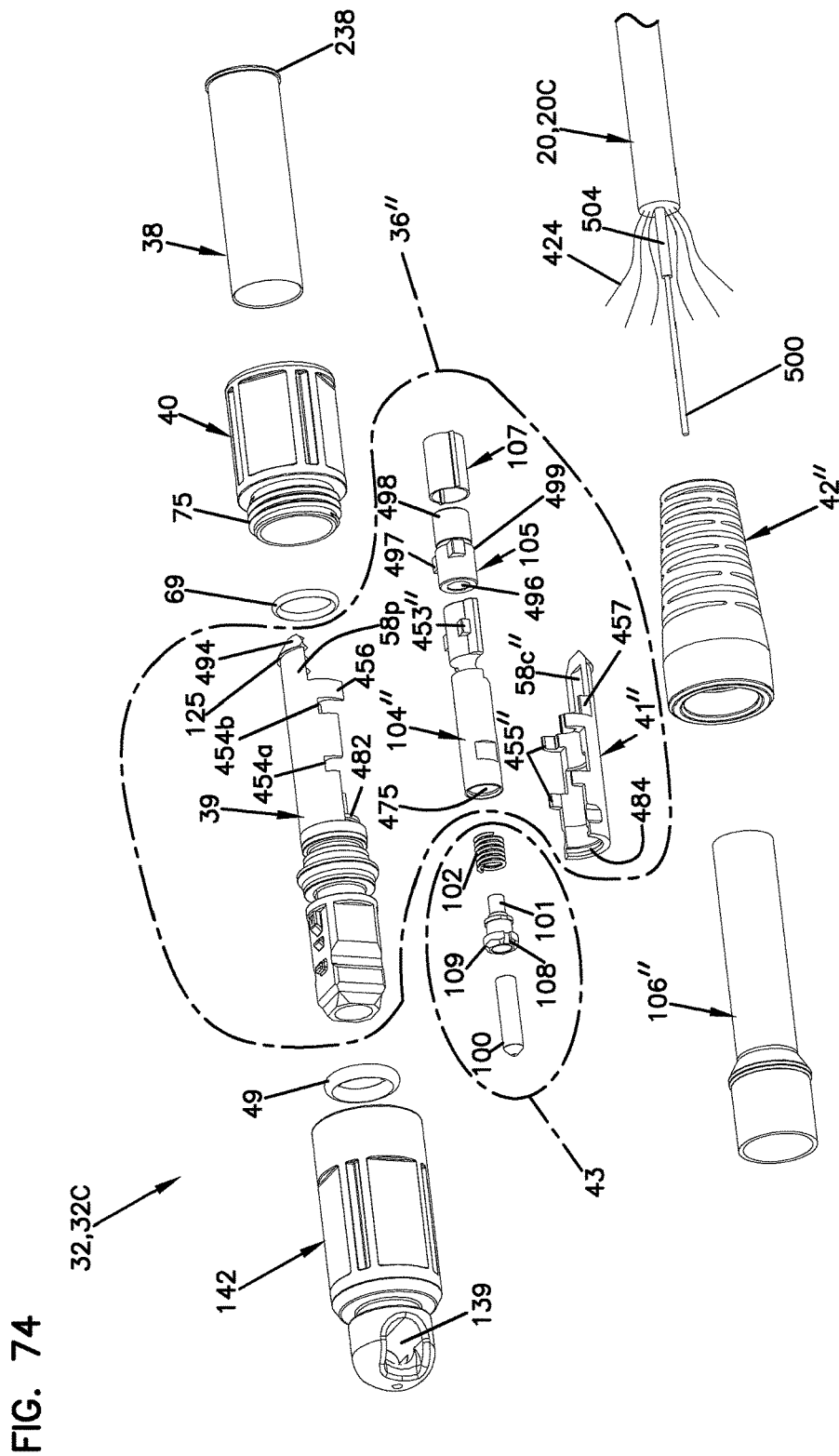
FIG. 74 is another exploded perspective view of the hardened fiber optic connector of FIG. 1 configured for terminating the cylindrical fiber optic cable of FIG. 71.
Figure 75:
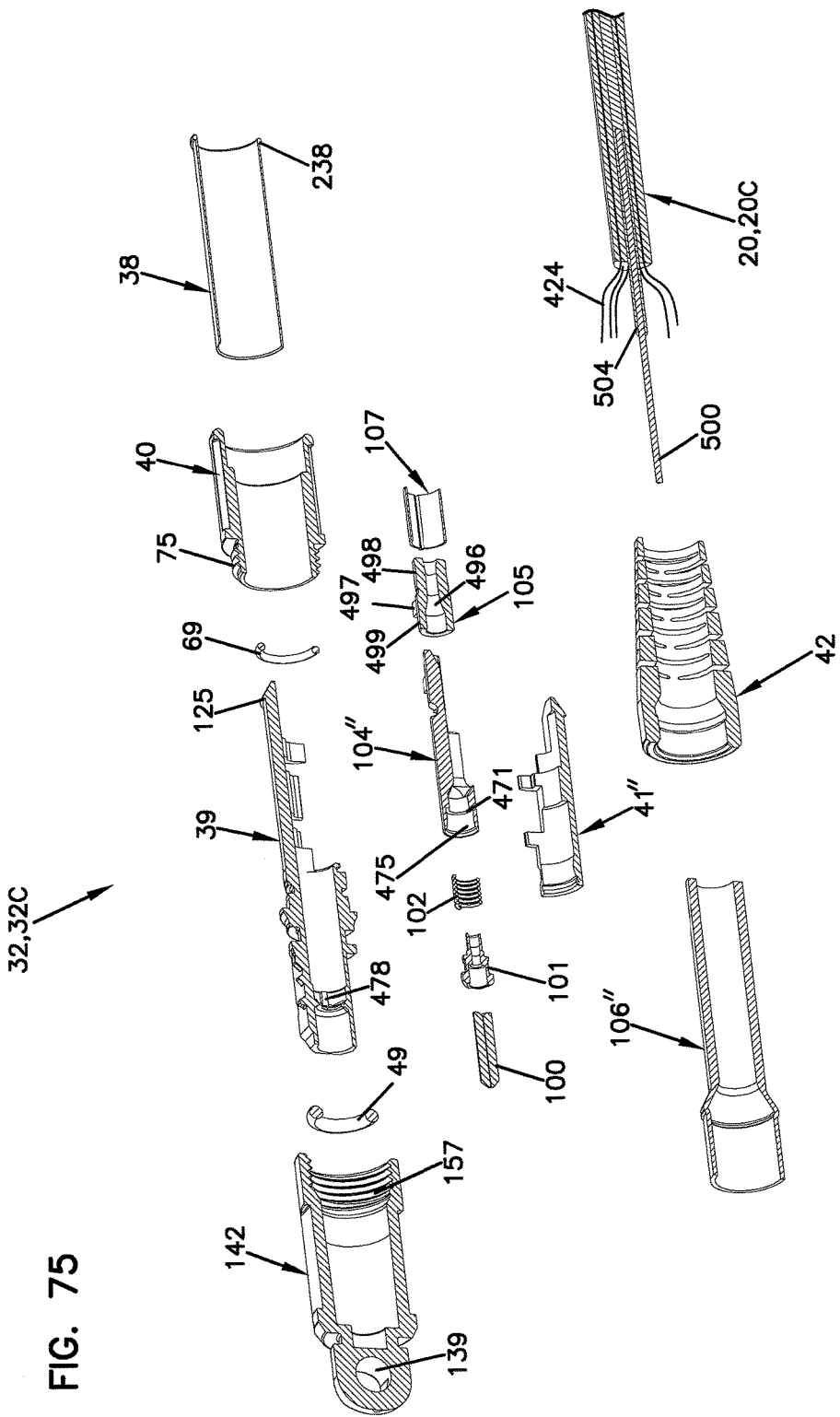
FIG. 75 is the exploded view of FIG. 74 shown in cross-section.

The cable anchor 105 includes a longitudinal passage 496 that conveys the optical fiber 500 from the cable 20C to the central passage 452 of the connector housing assembly 36" (see FIGS. 71-73). An exterior 499 of the cable anchor 105 fits within the proximal portion 452b of the central passage 452 defined between the partial cylindrical segment 492p of the connector housing 39 and the cover 41". A pair of anchor tabs 497 of the cable anchor 105 engages the second pair of retaining slots 454b of the connector housing 39 (see FIG. 72). A crimp support region 498 grips the axial reinforcing fibers 424 of the cable 20C and supports the anchor crimp band 107 when the anchor crimp band 107 is crimped over the fibers 424 and the support region 498.

The process of assembling the connector 32 to the cable 20 will now be described in detail. In particular, the first example embodiment, with the connector 32t terminating the tether cable 20t; the second example embodiment, with the connector 32c terminating the cylindrical cable 20c; and the third example embodiment, with the connector 32C terminating the cylindrical cable 20C will be described. Aspects that are similar between the first, second, and third example embodiments will be described concurrently.

The first, second, and third example embodiments can all use the same ferrule assembly 43. The ferrule assembly 43 of the connector 32t, 32c, 32C includes the ferrule 100 (e.g., a ceramic ferrule), a barrel 101 mounted on the ferrule 100, and the spring 102. The ferrule assembly 43 is loaded into the distal portion 452a of the central passage 452 within the plug portion 56 of connector housing 39 while the cover 41, 41', 41" and the insert/spring holder 104, 104', 104" are removed from the connector housing assembly 36, 36', 36" (the cable anchor 105 and the anchor crimp band 107 are also removed from the connector housing assembly 36"). To load the ferrule assembly 43 into the connector housing 39, the ferrule 100 is positioned in the distal portion 452a of the central passage 452 by inserting the tapered tip of the ferrule 100 through the proximal end of the distal portion 452a. As so inserted, the barrel 101 abuts against the shoulder 103 (see FIGS. 54 and 55) located within the plug portion 56. In a preferred embodiment, the orientation between the ferrule assembly 43 and the connector housing 39 is controlled by aligning a keyway 108 of the barrel 101 with the key 478 of the connector housing 39 (see FIGS. 47 and 74). A hex shape of the barrel 101 can engage the hex seat 109 within the connector housing 39 thus preventing rotation between the ferrule assembly 43 and the connector housing 39 after assembly (see FIGS. 55 and 73). The spring 102 is then inserted into the distal portion 452a behind the rest of the ferrule assembly 43.

With the ferrule assembly 43 loaded, the distal end of the insert/spring holder 104, 104', 104" is also loaded into the distal portion 452a of the central passage 452 with the spring 102 entering the spring seat pocket 474, 470, 475 and seating against the spring seat 476, 472, 471 such that the spring 102 is captured within the distal portion 452a between the barrel 101 and the insert/spring holder 104, 104', 104". In this manner, the ferrule 100 is spring biased in a distal direction. The insert tabs 453, 453', 453" will not pass longitudinally through the passage 452 and must be lifted above the open side 489 of the partial cylindrical segment 492p of the connector housing 39 when installing the insert/spring holder 104, 104', 104". In certain embodiments, the insert/spring holder 104, 104', 104" is bent allowing the distal end to be started in the passage 452 while the insert tabs 453, 453', 453" are lifted above the open side 489. Bending the insert/spring holder 104, 104', 104" may be accommodated by making it of a suitably flexible material and/or by incorporating one or more of the flex locations 449 (see FIG. 55). When the insert/spring holder 104, 104', 104" is fully inserted into the passage 452, the insert tabs 453, 453', 453" are lowered into the retaining slots 454*a*, 454*b* of the connector housing 39. The distal end of the insert/spring holder 104, 104', 104" can thereby be inserted into the distal portion 452*a* of the central passage 452.

To maintain the position of the insert/spring holder 104, 104', 104" within the connector housing 39, the insert tabs 453, 453', and 453" of the insert/spring holder 104, 104', 104" are engaged within the appropriate retaining slots 454*a*, 454*b* and an outer surface 451, 451', 451" of the insert/spring holder 104, 104', 104" fits closely within the distal portion 452*a* of the central passage 452.

A sealing member 69 (e.g., an O-ring) is preferably mounted within the second annular sealing groove 469 (see FIGS. 51 and 71) of the connector housing 39 at this point in the assembly process.

Installation of the connector 32*t* onto the end of the fiber optic cable 20*t* will now be described, with reference to FIGS. 61-66, continuing the discussion of the first example embodiment. To begin installation, the end of the fiber optic cable 20*t* is prepared using a stripping process. In the stripping process, the outer jacket 226 is stripped away to expose the strength members 224 and the buffer tube 220 (see FIG. 56). After the stripping process, a portion of the buffer tube 220 is cut away to expose the optical fiber 500.

After the end of the cable 20*t* has been prepared as described above, the boot 42 is slid onto the end of fiber optic cable 20*t*, followed by a sealing tube 106 (e.g., a heat shrink tube or heat shrink tape/wrap), the coupling nut 40, and a crimp band 38. The bare optical fiber 500 is then fed through the insert/spring holder 104, the spring 102, and the ferrule 100 of the ferrule assembly 43 that are preloaded into the connector housing 39.

Once the optical fiber 500 has been fed through the ferrule 100 and the connector housing 39 with the insert/spring holder 104 installed, the cable 20*t* is secured to the connector housing 39 such that the cable 20*t* extends longitudinally from the proximal end 54 of the housing 39. FIGS. 63-66 are perspective views including the connector housing assembly 36 having the cover 41 separated from it, such as in position for installation with a fiber optic cable 20*t*. To make the connection, the strength members 224 of the fiber optic cable 20*t* are placed within the pairs of the first and the third channel portions 462*a*, 462*c* and the buffer tube 220 is inserted into the proximal portion 452*b* of the central passage 452, such that the optical fiber 500 extends generally along axis $A_1$. Adhesive is then applied to the buffer tube 220, the strength members 224, the central passage 452, and the first, second, and third channel portions 462*a*, 462*b*, 462*c* (including those in the insert/spring holder 104, the cover 41, and the connector housing 39). The adhesive may be an epoxy or any other type of adhesive. Alternatively, fasteners could also be used to connect the cover 41 with the connector housing 39. The connector housing 39 and the cover 41 are properly aligned by the retaining groove 481 and lip 482, the centering tabs 493, the pair of retaining arms 456, and the first and second pair of retaining slots 454*a*, 454*b* of the connector housing 39 engaging and interlocking with the retaining groove 484, the tab receivers 495, the pair of locators 457, and the cover tabs 455 of the cover 41 respectively. The cover 41 is then squeezed against the connector housing 39 to enclose the strength members 224, the buffer tube 220, and the optical fiber 500 within the connector housing assembly 36. When the cover 41 is squeezed onto the connector housing 39, the excess adhesive flows out from the various joints and can then be wiped away.

The fiber optic cable 20*t* is preferably stripped in the previous steps such that the outer jacket 226 terminates at a shoulder 136 (see FIGS. 47 and 48) of the connector housing assembly 36. The shoulder 136 is located at distal ends of tabs 58*p*, 58*c* and at the proximate ends of the first, second, and third channel portions 462*a*, 462*b*, 462*c*. The tabs 58*p*, 58*c*, therefore, cover the end of the outer jacket 226 when the cover 41 and the connector housing 39 are connected. When the cover 41 and the connector housing 39 are pressed together, the teeth 463*c*, 463*p* of the tabs 58*c*, 58*p* are pressed into or against the outer jacket 226. The teeth 463*c*, 463*p* are oriented to resist movement of the outer jacket 226 in the proximal direction away from the connector housing assembly 36. Therefore, the teeth 463*c*, 463*p* provide further connection means to hold the fiber optic cable 20*t* firmly engaged with the connector housing assembly 36.

The interior of the connector housing assembly 36 further includes structure for improving adhesion between the adhesive and the interior of the housing assembly 36. For example, the interior of the housing assembly 36 includes a plurality of the lateral grooves 123 for improving the adhesion characteristics of the interior surface of the housing assembly 36. Other adhesion improving structures include knurling, surface roughening, or other structures.

Installation of the connector 32*c* onto the end of the fiber optic cable 20*c* will now be described, with reference to FIGS. 59, 60, and 67-70, continuing the discussion of the second example embodiment. To begin installation, the end of the fiber optic cable 20*c* is prepared using a stripping process. In the stripping process, the outer jacket 502 is stripped away to expose the axial reinforcing fibers 424 and the buffer tube 504 (see FIG. 57). After the stripping process, a portion of the buffer tube 504 is cut away to expose the optical fiber 500 and the axial reinforcing fibers 424 are gathered in two roughly equal bunches on opposite sides of the optical fiber 500 (see FIG. 58).

After the end of the cable 20*c* has been prepared as described above, the boot 42' is slid onto the end of fiber optic cable 20*c*, followed by a sealing tube 106' (e.g., a heat shrink tube or heat shrink tape/wrap), the coupling nut 40, and the crimp band 38. The bare optical fiber 500 is then fed through the insert/spring holder 104', the spring 102, and the ferrule 100 of the ferrule assembly 43 that are preloaded into the connector housing 39.

Once the optical fiber 500 has been fed through the ferrule 100 and the connector housing 39 with the insert/spring holder 104' installed, the cable 20*c* is secured to the connector housing 39 such that the cable 20*c* extends longitudinally from the proximal end 54 of the housing 39. FIGS. 67-70 are perspective views including the connector housing assembly 36' having the cover 41' separated from it, such as in position for installation with a fiber optic cable 20*c*. To make the connection, the two bunches of axial reinforcing fibers 424 of the fiber optic cable 20*c* are placed, one each, within the pair of the channels 460 of the insert/spring holder 104' and the buffer tube 504 is placed within the passage 461 of the insert/spring holder 104' and continued through into the proximal portion 452*b* of the central passage 452, such that the optical fiber 500 extends generally along axis $A_1$ (see FIG. 1). The two bunches of axial reinforcing fibers 424 preferably enter at the entrance 460*a* of the channels 460 and exit at the exit 460*b* where they can be trimmed or continue under the crimp band 38 (installed below). Adhesive is then applied to the buffer tube 504, the axial reinforcing fibers 424, and the central passage 452. The adhesive may be an epoxy or any other type of adhesive. Alternatively, fasteners could also be used to connect the cover 41' with the connector housing 39. The connector housing 39 and the cover 41' are properly aligned by the retaining groove 481 and lip 482, the centering tabs 493, and the first and second pair of retaining slots 454a, 454b of the connector housing 39 engaging and interlocking with the retaining groove 484, an interior portion, and the cover tabs 455' of the cover 41' respectively. Additionally, the pair of retaining arms 456 of the connector housing 39 engages the pair of locators 457 of the insert/spring holder 104' (see FIG. 52), and the pair of the gripping teeth sets 466 of the cover 41' engage the pair of the gripping teeth sets 465 and the pair of channels 460 of the insert/spring holder 104' (see FIGS. 59 and 60). The cover 41' is then squeezed against the connector housing 39 to enclose the axial reinforcing fibers 424, the buffer tube 504, and the optical fiber 500 within the connector housing assembly 36'. When the cover 41' is squeezed onto the connector housing 39, the excess adhesive flows out from the various joints and can then be wiped away.

The fiber optic cable 20c is preferably stripped in the previous steps such that the outer jacket 502 terminates at the proximal end 54 of the connector housing 39 (see FIG. 54) of the connector housing assembly 36'. When the cover 41' and the connector housing 39 are pressed together, the gripping teeth sets 465, 466 of the insert/spring holder 104' and the cover 41' are pressed together and clench and grip the axial reinforcing fibers 424 of the cable 20c. The teeth sets 465, 466 are oriented to resist movement of the axial reinforcing fibers 424, and thereby the cable 20c, in the proximal direction away from the connector housing assembly 36'.

The interior of the connector housing assembly 36' can further include structures for improving adhesion between the adhesive and the interior of the housing assembly 36'. Such adhesion improving structures include knurling, surface roughening, or other structures.

Installation of the connector 32C onto the end of the fiber optic cable 20C will now be described, with reference to FIGS. 71-75, continuing the discussion of the third example embodiment. To begin installation, the end of the fiber optic cable 20C is prepared using a stripping process. In the stripping process, the outer jacket 502 is stripped away to expose the axial reinforcing fibers 424 and the buffer tube 504 (see FIG. 57) and to create a new end of the outer jacket 502. After the stripping process, a portion of the buffer tube 504 is cut away to expose the optical fiber 500 (see FIG. 72).

After the end of the cable 20C has been prepared as described above, the boot 42" is slid onto the end of fiber optic cable 20C, followed by a sealing tube 106" (e.g., a heat shrink tube or heat shrink tape/wrap), the coupling nut 40, the crimp band 38, and the anchor crimp band 107. The bare optical fiber 500 and the buffer tube 504 are then fed through the longitudinal passage 496 of the cable anchor 105 at an end nearest the crimp support region 498. The axial reinforcing fibers 424 are spread radially apart and positioned over the crimp support region 498 and the crimp support region 498 is placed adjacent the new end of the outer jacket 502. The anchor crimp band 107 is then slid over the crimp support region 498 with the axial reinforcing fibers 424 circumferentially distributed between the anchor crimp band 107 and the crimp support region 498. The anchor crimp band 107 is then crimped onto and against the crimp support region 498 capturing and securing the axial reinforcing fibers 424 and thereby the fiber optic cable 20C to the cable anchor 105. The bare optical fiber 500 is then fed through the insert/spring holder 104", the spring 102, and the ferrule 100 of the ferrule assembly 43 that are preloaded into the connector housing 39.

Once the optical fiber 500 has been fed through the ferrule 100 and the connector housing 39 with the insert/spring holder 104" preinstalled, the cable 20C is secured to the connector housing 39 such that the cable 20C extends longitudinally from the proximal end 54 of the housing 39 (see FIG. 71). FIGS. 72-75 are perspective views including the connector housing assembly 36" having the cover 41" separated from it, such as in position for installation with a fiber optic cable 20C. To make the connection, the pair of anchor tabs 497 of the cable anchor 105 are engaged with the second pair of retaining slots 454b of the connector housing 39 (see FIG. 72). Adhesive is then applied to the buffer tube 504, the axial reinforcing fibers 424, and the central passage 452. The adhesive may be an epoxy or any other type of adhesive. Alternatively, fasteners could also be used to connect the cover 41" with the connector housing 39. The connector housing 39 and the cover 41" are properly aligned by the retaining groove 481 and lip 482, the centering tabs 493, the pair of retaining arms 456, and the first and second pair of retaining slots 454a, 454b of the connector housing 39 engaging and interlocking with the retaining groove 484, an interior portion, the pair of locators 457, and the cover tabs 455" of the cover 41" respectively. The cover 41" is then squeezed against the connector housing 39 to enclose the cable anchor 105, the axial reinforcing fibers 424, the buffer tube 504, and the optical fiber 500 within the connector housing assembly 36". When the cover 41" is squeezed onto the connector housing 39, the excess adhesive flows out from the various joints and can then be wiped away.

The fiber optic cable 20C is preferably stripped in the previous steps such that the outer jacket 502 terminates at the proximal end 54 of the connector housing 39 (see FIG. 71) of the connector housing assembly 36". When the cover 41" and the connector housing 39 are pressed together, the cable anchor 105 is captured within the connector housing assembly 36". The cable 20C thereby resists movement in the proximal direction away from the connector housing assembly 36".

The interior of the connector housing assembly 36" can further include structures for improving adhesion between the adhesive and the interior of the housing assembly 36". Such adhesion improving structures include knurling, surface roughening, or other structures.

After the cover 41, 41', 41" has been connected with the connector housing assembly 36, 36', 36" and the fiber optic cable 20t, 20c, 20C, the crimp band 38 is slid over a part of the connector housing assembly 36, 36', 36". The crimp band 38 is preferably located between the circumferential shoulder 113 and the circumferential shoulder 125 of the connector housing 39. A flange 238 of the crimp band is preferably adjacent the circumferential shoulder 125 and the circumferential shoulders 125c of the cover 41, 41', 41" (see FIGS. 69-71). After the crimp band 38 is located on the connector housing assembly 36, 36', 36", it is crimped in place to hold the cover 41, 41', 41" securely onto the connector housing assembly 36, 36', 36". The sealing tube 106, 106', 106" is then slid over a portion of the crimp band 38 so as to cover and seal the end of the cable 20t, 20c, 20C, the proximal end of the connector housing assembly 36, 36', 36", and at least a portion of the crimp band 38. Heat is then applied to the sealing tube 106, 106', 106" to cause the sealing tube 106, 106', 106" to shrink and tightly form around the adjacent portions of the connector housing assembly 36, the crimp band 38, and the fiber optic cable 20t, 20c, 20C, to seal the connector 32t, 32c, 32C from foreign substances. The coupling nut 40 is then slid over the crimp band 38, the sealing tube 106, 106', 106", and the connector housing assembly 36. The boot 42, 42', 42" is then slid onto the connector 32t, 32c, 32C and over the sealing tube 106, 106', 106". The boot 42, 42', 42" is, for example, a flexible polymeric/rubber material. At the distal end of the boot 42, 42', 42", the boot 42, 42', 42" can include a structure (e.g., an inwardly projecting flange or lip) that provides a mechanical interlock with the flange 238 of the crimp band 38 as it forms a ridge through the sealing tube 106, 106', 106" (see FIGS. 62 and 71). Although the tabs 58p, 58c are spaced from the boot 42, 42', 42" by the sealing tube 106, 106', 106", the sealing tube 106, 106', 106" fits tightly around the tabs 58p, 58c, such that the circumferential shoulders 125 and 125c and tapered regions 494 and 494c can be engaged by the boot 42, 42', 42". The sealing member 49 is then mounted with the annular sealing groove 468 about the connector housing 39 to complete the installation of connector 32t, 32c, 32C onto fiber optic cable 20t, 20c, 20C. The boot 42, 42', 42" retains the coupling nut 40 on the connector housing assembly 36, 36', 36".

A seal can be formed between the crimp band 38 and the connector housing 39 by the O-ring/sealing member 69 mounted within the second annular sealing groove 469 (see FIGS. 51 and 71) of the connector housing 39. Since the connector housing 39 is of unitary construction and wholly forms a perimeter of the connector housing assembly 36, 36', 36" at the location of the second annular sealing groove 469, the connector housing assembly 36, 36', 36" is also sealed to the crimp band 38 by the O-ring/sealing member 69.

In a preferred embodiment, the sealing member 49 (e.g., an O-ring seal) mounts around the periphery/exterior 31 of the connector housing 39 and preferably within the first annular sealing groove 468. In alternate embodiments, the sealing member 49 can be mounted within the adapter 34. In still other embodiments, the sealing member 49 may not be mounted on either the adapter 34 or the connector housing 39. The sealing member 49 is adapted for providing a seal between the connector housing 39 and the adapter 34 when the first fiber optic connector 32 is plugged into the first port 35 of the adapter 34. Since the connector housing 39 is of unitary construction and wholly forms a perimeter of the connector housing assembly 36, 36', 36" at the location of the first annular sealing groove 468, the connector housing assembly 36, 36', 36" is also sealed to the adapter 34 by the O-ring/sealing member 49. This likewise applies to the cap 142, the interface converter 190, and other objects to which the connector housing assembly 36, 36', 36" is connected to.

The first connector 32 also includes a crimp band 38 that mounts over the connector housing assembly 36, 36', 36" and the cover 41, 41', 41", and a sealing tube 106, 106', 106" that seals the interface between the cable 20t, 20c, 20C and the connector housing assembly 36, 36', 36". The crimp band 38 assists in retaining the cover 41, 41', 41" on the connector housing assembly 36, 36', 36" and also assists in securing the strength members 224 of the cable 20t and the axial reinforcing fibers 424 of the cable 20c, 20C in place between the cover 41, 41', 41" and the connector housing 39.

Various features and components of the fiber optic adapter 34 will now be described in detail including certain features discussed above. Referring to FIGS. 15, 17, 18, 20, 22, 28, 43, and 76-80, the adapter 34 of the first, fifth, and sixth fiber optic connection system arrangements 610, 650, 660 includes an outer housing 44 having a first housing piece 45 that interconnects with a second housing piece 47. The first housing piece 45 defines a first end 70 of the outer housing 44 at which the first port 35 is located. The second housing piece 47 defines a second end 72 of the outer housing 44 at which the second port 37 is located. The adapter assembly 140, mentioned above, mounts within the outer housing 44 (see FIGS. 76-78). The adapter 34 also includes the mounting ring or nut 46, mentioned above, that mounts around the exterior of the outer housing 44.

Figure 78:
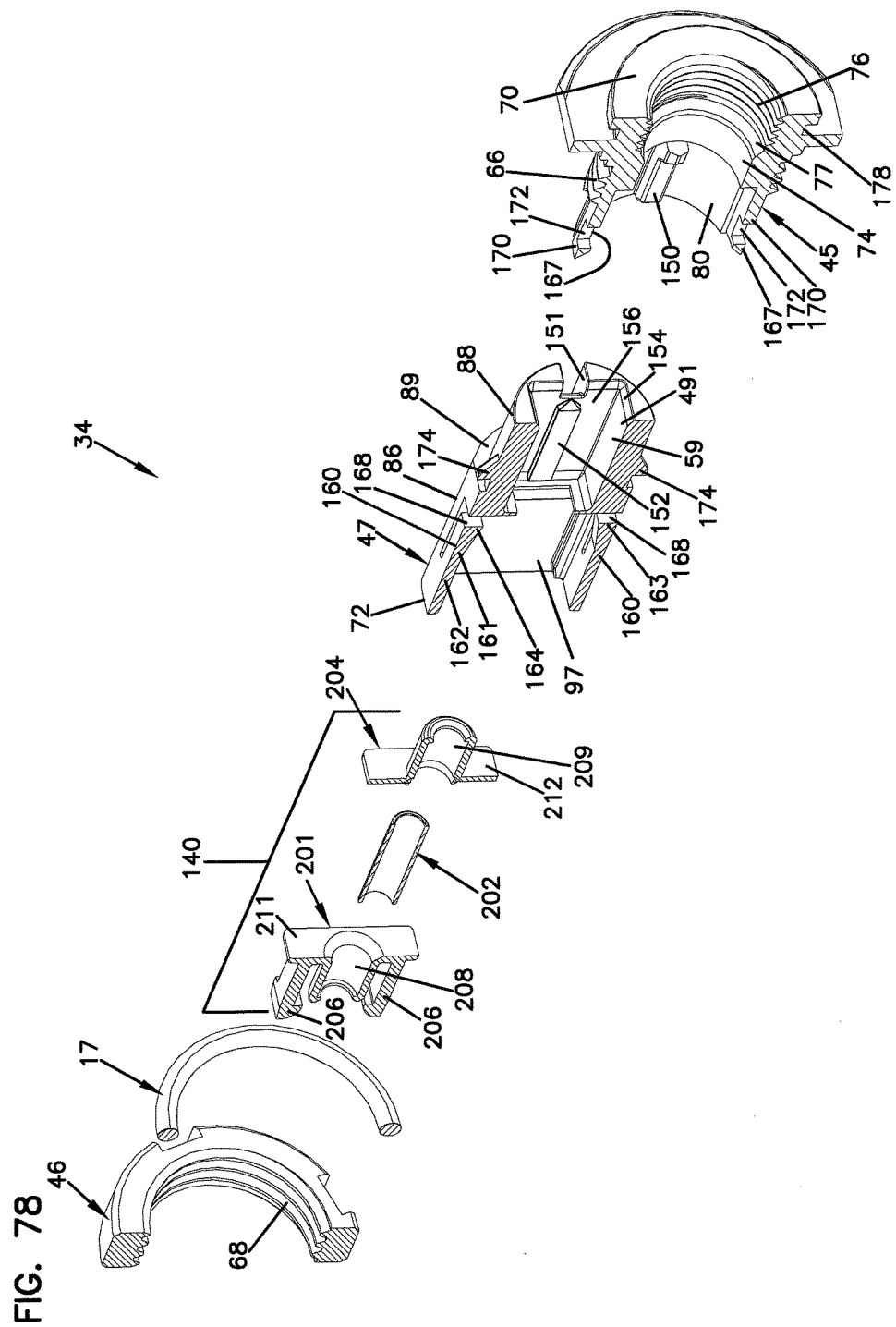
FIG. 78 is the exploded view of FIG. 77 shown in cross-section.
Figure 79:
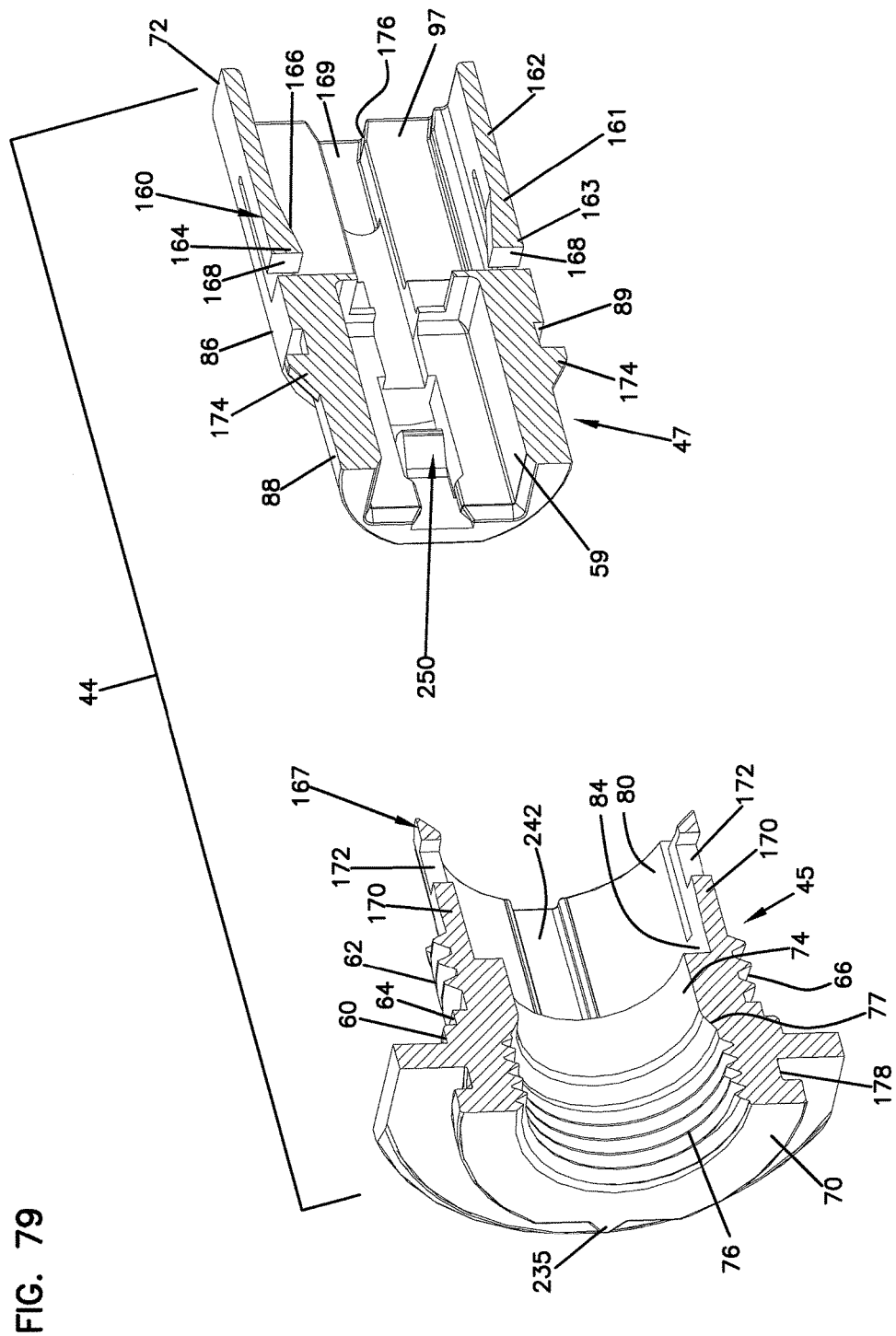
FIG. 79 is a cross-sectional exploded perspective view of the first housing piece and the second housing piece of FIG. 18 of the hardened fiber optic adapter of FIG. 1.
Figure 80:
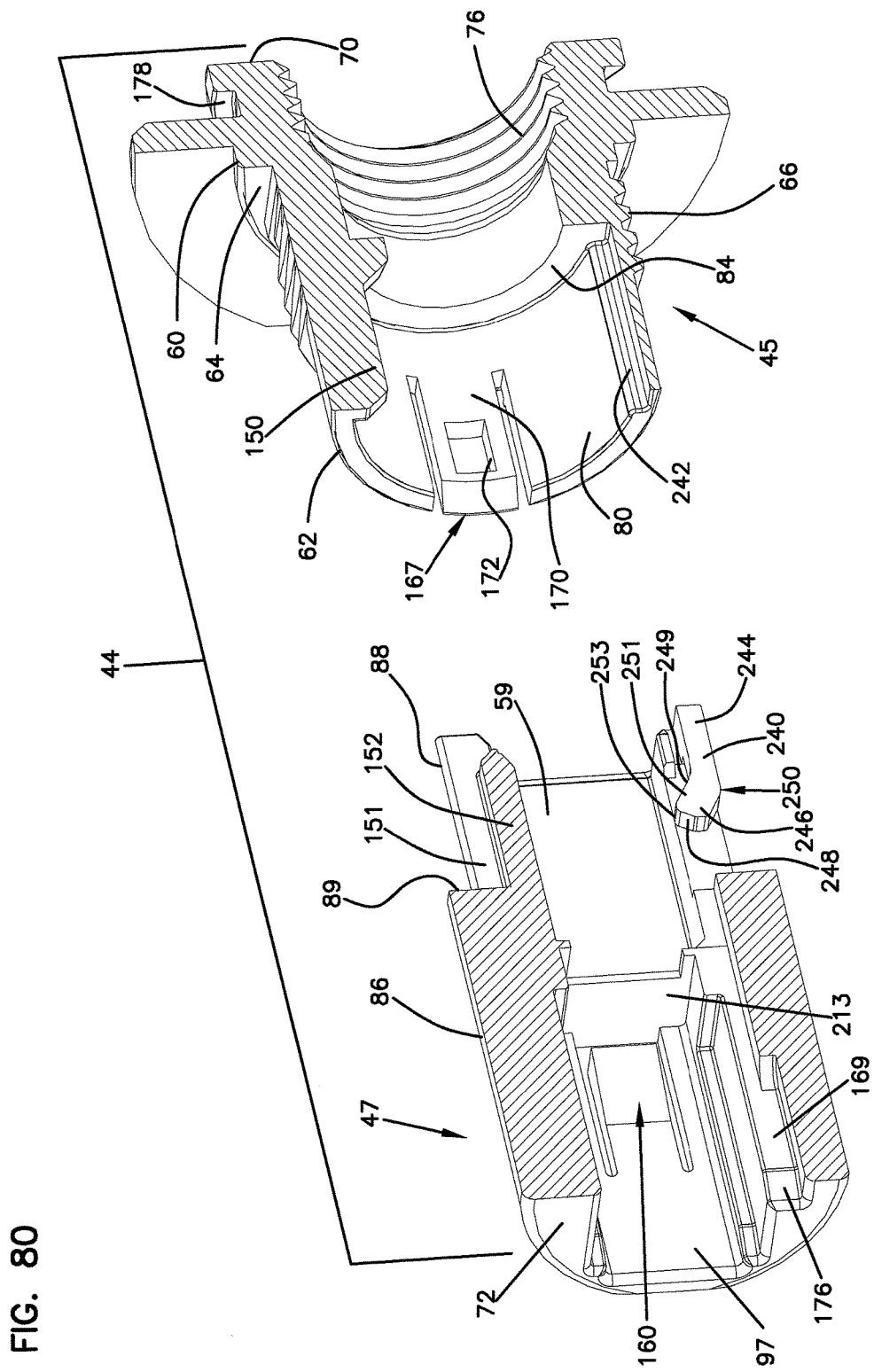
FIG. 80 is another cross-sectional exploded perspective view of the first housing piece and the second housing piece of FIG. 18 of the hardened fiber optic adapter of FIG. 1.

The first housing piece 45 of the adapter 34 includes a first region 60 separated from a second region 62 by a shoulder 64 (see FIGS. 79 and 80). The first and second regions 60, 62 have generally cylindrical outer shapes and the shoulder 64 provides a diameter reduction from the first region 60 to the second region 62. The second region 62 defines external threads 66 located adjacent the shoulder 64. The external threads 66 are sized to mate with corresponding internal threads 68 (see FIG. 78) of the mounting nut 46 such that the mounting nut 46 can be threaded on the second region 62 of the first housing piece 45. The second region 62 also includes a pair of oppositely positioned latches 167 for use in securing the first housing piece 45 to the second housing piece 47. Each of the latches 167 includes a flexible cantilever arm 170 having a base end integrally formed with the second region 62. Each cantilever arm 170 defines an opening 172 adapted to receive a corresponding retention tab 174 of the second housing piece 47 when the first and second housing pieces 45, 47 are connected together.

Figure 76:
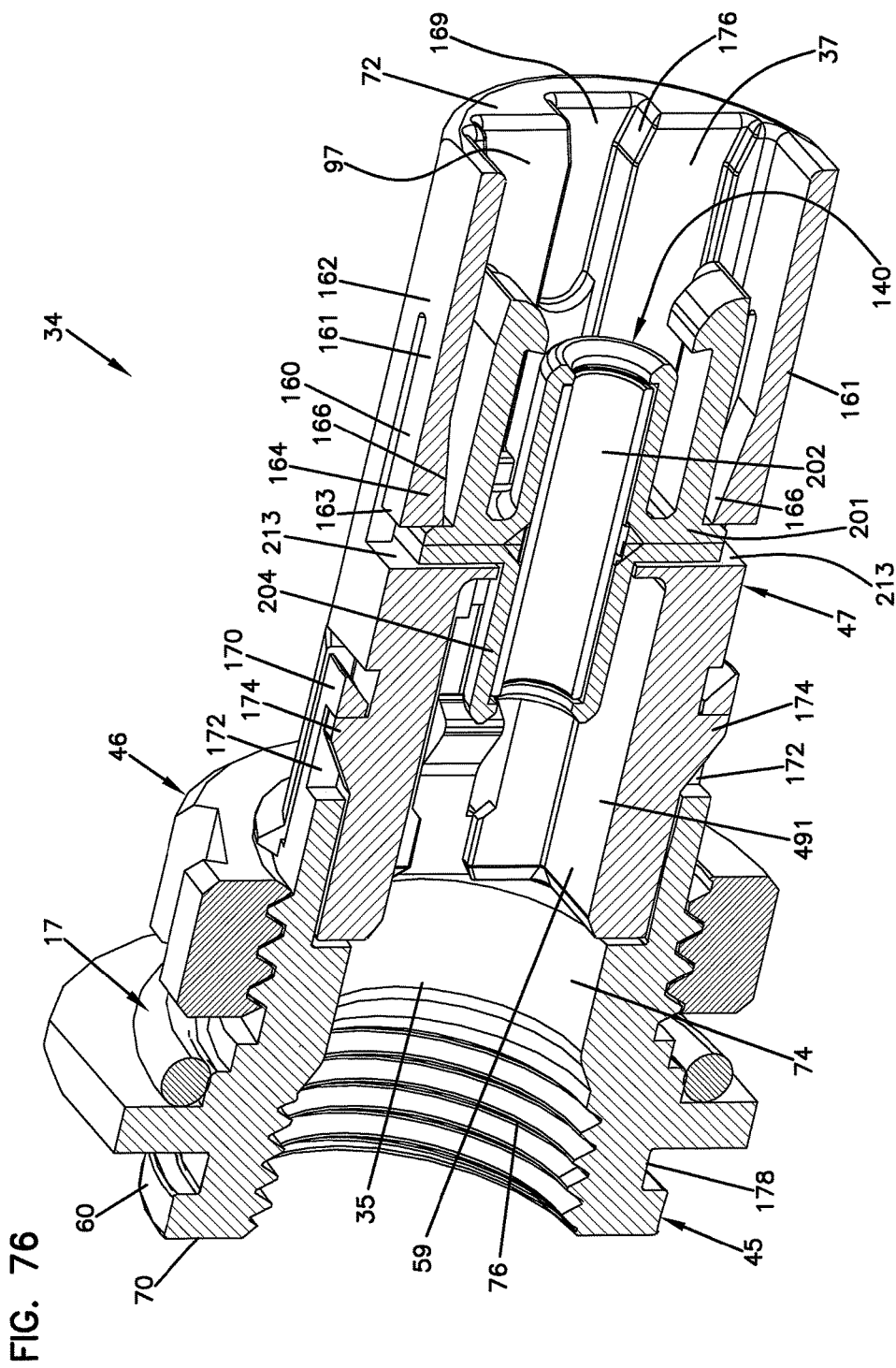
FIG. 76 is a cross-sectional perspective view of the flange mountable hardened fiber optic adapter of FIG. 1.

Referring to FIGS. 76, 79, and 80, the first region 60 defines an opening of the first port 35 of the adapter 34. The internal threads 76, mentioned above, are provided within the first region 60 adjacent the first end 70 of the housing 44. The internal threads 76 within the first port 35 are sized to threadingly receive the exterior screw threads 75 of the coupling nut 40 when the coupling nut 40 is threaded into the first port 35 to provide a secure connection between the first connector 32 and the adapter 34.

Figure 77:
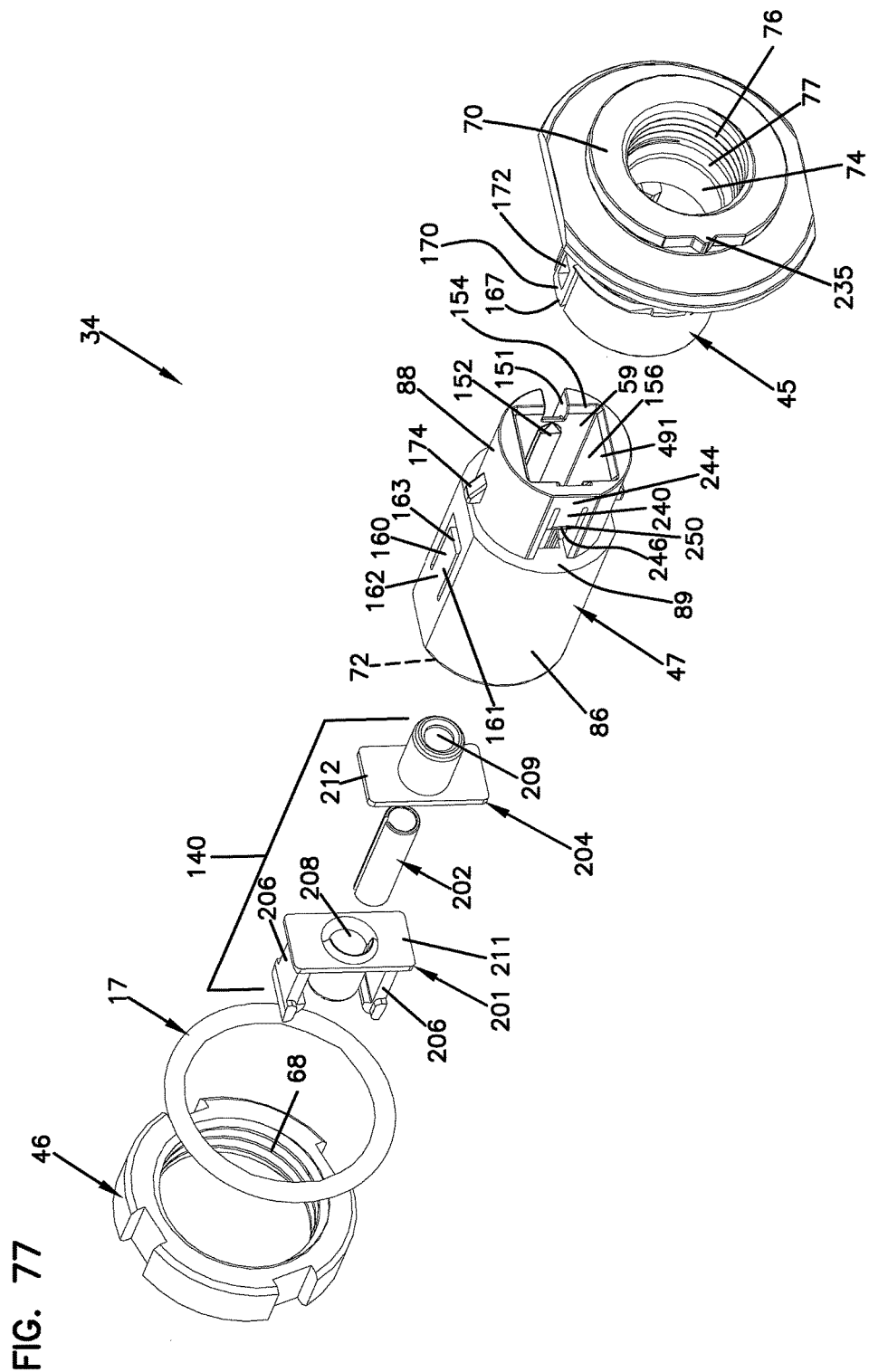
FIG. 77 is an exploded view of the hardened fiber optic adapter of FIG. 1.

Referring now to FIGS. 77 and 78, the first housing piece 45 defines the sealing surface 74, mentioned above, positioned inside the first housing piece 45 at a location adjacent to the internal threads 76. The tapered seat 77, mentioned above, decreases the internal diameter of the first port 35 from the internal threads 76 to the sealing surface 74. The sealing surface 74 is preferably generally cylindrical and is adapted to engage the sealing member 49 of the first connector 32 when the first connector 32 is fully inserted within the first port 35. The interface between the sealing surface 74 and the sealing member 49 provides an internal environmental seal between the first connector 32 and the adapter 34.

Referring now to FIGS. 79 and 80, the first housing piece 45 defines an internal pocket 80 within the second region 62 for receiving a second region 88 of the second housing piece 47 when the housing pieces 45, 47 are interconnected. The pocket 80 is separated from the sealing surface 74 by a shoulder 84 that provides an increase in diameter from the sealing surface 74 to the pocket 80. As shown at FIGS. 78 and 80, a keying member 150 (e.g., a tab or a rail) is provided at the pocket 80 for ensuring proper rotational alignment between the first housing piece 45 and the second housing piece 47. The keying member 150 is received within a corresponding keyway 151 defined by the second housing piece 47 when the first and second housing pieces 45, 47 are interconnected together.

The second housing piece 47 of the adapter 34 includes a first region 86 separated from the second region 88 by a shoulder 89. The first and second regions 86 and 88 each have generally cylindrical outer shapes. The shoulder 89 provides a reduction in outer diameter from the first region 86 to the second region 88. The retention tabs 174 for interconnecting the first housing piece 45 with the second housing piece 47 are provided at the second region 88.

The first region 86 of the second housing piece 47 includes a pair of oppositely positioned latches 160 for securing the adapter assembly 140 within the second housing piece 47. As shown at FIGS. 76-78, each of the latches 160 includes a flexible cantilever arm 161 having a base end 162 integrally formed with the second housing piece 47, and a free end 163 positioned opposite from the base end 162. Retention tabs 164 are provided at the free ends 163. The retention tabs 164 include angled surfaces 166 that angle toward the central axis of the adapter 34, and retention surfaces 168 that are generally transversely aligned relative to the central axis of the adapter 34. The first region 86 of the second housing piece 47 can also include a keying slot 169 (see FIGS. 76, 79, and 80) for receiving a corresponding rail 165 of the second connector 28 (see FIG. 2) to ensure that the second connector 28 is inserted into the second port 37 at the proper rotational orientation. In a preferred embodiment, the keying slot 169 includes a pair of end chamfers 176, adjacent the second end 72, to aid insertion of the rail 165.

The second region 88 of the second housing piece 47 defines a first plug receptacle 59 for receiving the plug portion 56 of the first connector 32 when the first connector 32 is inserted into the first adapter port 35. The previously described generally rectangular interior 491 is preferably included within the first plug receptacle 59. The first plug receptacle 59 can optionally include a tapered portion that converges toward the second end 72 of the adapter 34. The tapered portion can facilitate maintaining alignment of the first connector 32 within the adapter 34 and/or provide draft to facilitate the injection molding of the second housing piece 47. The first region 86 of the second housing piece 47 also defines a second plug receptacle 97 corresponding to the second adapter port 37. The second plug receptacle 97 is adapted for receiving the second fiber optic connector 28.

The adapter assembly 140 of the adapter 34 includes a connector retention clip 201, the split sleeve 202, and a backing piece 204. The split sleeve 202 is adapted for receiving the ferrules of the first and second connectors 32, 28 when the connectors 32, 28 are inserted into the adapter 34 to maintain alignment between the fibers 500 of the connectors 32, 28. The connector retention clip 201 includes a pair of latching arms 206 that interlock with the second connector 28 when the second connector 28 is inserted within the second port 37 of the adapter 34. In this manner, the latching arms 206 retain the second connector 28 within the second port 37. The connector retention clip 201 also includes a cylindrical receptacle 208 for receiving one end of the split sleeve 202. The other end of the split sleeve 202 is received within a cylindrical receptacle 209 of the backing piece 204. In this manner, the split sleeve 202 is captured between the retention clip 201 and the backing piece 204. Flanges 211, 212 of the retention clip 201 and the backing piece 204 are secured together to retain the split sleeve 202 between the retention clip 201 and the backing piece 204. When the split sleeve 202 is mounted between the retention clip 201 and the backing piece 204, the split sleeve 202 has a limited amount of space available for sliding axially within the cylindrical receptacles 208, 209. However, this limited space does allow for the split sleeve 202 to float within the cylindrical receptacles 208, 209 in order to provide proper alignment between the ferrules 100 of the connectors 28, 32.

The assembled adapter assembly 140 is loaded into the second housing piece 47 by inserting the adapter assembly 140 into the second plug receptacle 97 through the second adapter port 37. As the adapter assembly 140 is inserted into the second plug receptacle 97, the flanges 211, 212 of the adapter assembly 140 engage the angled surfaces 166 of the cantilever arms 161 causing the cantilever arms 161 to flex outwardly. After the flanges 211, 212 have been pressed past the angled surfaces 166, the cantilever arms 161 snap radially inwardly and the retention surfaces 168 of the retention tabs 164 capture and retain the adapter assembly 140 within the second housing piece 47 (see FIG. 76). As so positioned, the retention clip end of the adapter assembly 140 is accessible from the second port 37 of the adapter 34 and the backing piece end of the adapter assembly 140 is accessible from the first port 35 of the adapter 34. The flanges 211, 212 are captured between the retention surfaces 168 of the retention tabs 164 and a shoulder 213 of the second housing piece 47 (see FIGS. 76 and 80). The cylindrical receptacle 208 of the retention clip 201 is positioned within the second plug receptacle 97 and the cylindrical receptacle 209 of the backing piece 204 is located within the first plug receptacle 59. The split sleeve 202 is aligned generally along the central axis of the adapter 34. In the depicted embodiment, the adapter 34 does not include structure (e.g., a spring or other biasing or resilient structure) for facilitating allowing the adapter assembly 140 to float within the outer housing 44. Instead, the retention tabs 164 in cooperation with the second plug receptacle 97 prevent the adapter assembly 140 from floating or otherwise moving significantly within the outer housing 44. However, as indicated above, there is a limited amount of space between the split sleeve 202, which is disposed within the adapter assembly 140, and the cylindrical receptacles 208, 209 that allows for the split sleeve 202 to float within the cylindrical receptacles 208, 209.

After the adapter assembly 140 has been snapped within the second housing piece 47 of the outer housing 44, the first and second housing pieces 45, 47 are connected together. (Alternatively, the adapter assembly 140 can be snapped within the second housing piece 47 after the first and second housing pieces 45, 47 are connected together.) For example, the second region 88 of the second housing piece 47 is inserted into the pocket 80 defined within the second region 62 of the first housing piece 45. During insertion, rotational alignment is ensured by inserting the keying member 150 of the first housing piece 45 into the keyway 151 of the second housing piece 47. As the second region 88 of the second housing piece 47 is inserted into the pocket 80 of the first housing piece 45, the cantilever arms 170 engage the retention tabs 174 causing the cantilever arms 170 to flex radially outwardly. To facilitate this engagement and flexing, ramps can be provided on the cantilever arms 170 and/or the retention tabs 174. When the openings 172 of the cantilever arms 170 align with the retention tabs 174, the cantilever arms 170 snap radially inwardly to a locked position in which the retention tabs 174 protrude through the openings 172.

As discussed above, the adapter 34 is adapted to be mounted within the opening 18 defined by a wall of the enclosure 19. To mount the adapter 34 in the opening 18, the mounting nut 46 is first removed. The second end 72 of the outer housing 44 is then inserted from the exterior of the enclosure 19 through the mounting opening 18 until the shoulder 64 abuts against the outside surface of the enclosure wall. Thereafter, the threads 68 of the mounting nut 46 are threaded on the threads 66 of the outer housing 44 until the nut 46 abuts against an inside surface of the enclosure wall. With the enclosure wall captured between the shoulder 64 and the mounting nut 46, the adapter 34 is securely mounted to the enclosure 19 (see FIG. 28).

As indicated above, the adapter 34 is configured for providing an optical connection between the first connector 32 and the second connector 28. To provide this connection, the first connector 32 is mounted in the first port 35 and the second connector 28 is mounted in the second port 37 of the adapter 34. To mount the first connector 32 in the first adapter port 35, the first connector 32 is inserted axially into the port 35 until the plug portion 56 fits within the first plug receptacle 59 and the latch 250 of the adapter 34 snaps between the first protrusion 132 and the second protrusion 134 of the connector housing 39. As so positioned, the ferrule 100 fits within one end of the split sleeve 202 and the sealing member 49 engages the sealing surface 74. As discussed above, the connection is finalized by threading the threaded portion 75 of the coupling nut 40 into the internal threads 76 of the adapter 34 until a first end surface 115 (shown at FIGS. 24 and 44) of the coupling nut 40 abuts the circumferential shoulder 113 of the connector housing 39, thereby retaining the plug portion 56 of the connector housing 39 within the first plug receptacle 59 of the second region 88 of the second housing piece 47 of the adapter 34 (as shown at FIG. 25). The second connector 28 is mounted in the second adapter port 37 by inserting the connector axially into the port 37 until the connector 28 is snapped between the arms 206 of the connector retention clip 201. As so positioned, the ferrule 230 of the connector 28 is received within the other end of the split sleeve 202 such that the ferrules 230, 100 are held in axial alignment with one another.

The first, second, third, fifth, and sixth fiber optic connection system arrangements 610, 620, 630, 650, 660 of the fiber optic connection system 600 preferably have a compact configuration adapted to provide relatively high circuit densities. In one embodiment, diameter D1 of the sealing member 49 (see FIG. 27) and diameter D2 of the sealing surface 74 (see FIG. 28) each are less than or equal to 15 mm. In an alternate embodiment, the diameter D1 of the sealing member 49 and the diameter D2 of the sealing surface 74 each are less than or equal to 12.5 mm. In another embodiment, the diameter D1 of the sealing member 49 and the diameter D2 of the sealing surface 74 each are less than or equal to 10 mm. The diameter D1 of a given sealing member 49 can compress from a free dimension to an installed dimension when the connector 32 is fully installed in the adapter 34. Dimensional values characterizing the diameter D1 of the sealing member 49 in this paragraph are with respect to the installed dimension. The diameters D1 and D2 can also apply to the fourth fiber optic connection system arrangements 640.

The example embodiments presented above illustrate a single optical fiber from a first cable being optically connected with a single optical fiber from a second cable. The example ferrules presented above are likewise illustrated as single fiber ferrules. In other embodiments, the structure of the fiber optic connection system has the same general configuration as one or more of the fiber optic connection system arrangements 610, 620, 630, 640, 650, 660 of the system 600 of FIG. 82 except that the connector includes a multi-termination ferrule (e.g., a ferrule with more than one fiber mounted therein) and an adapter is adapted for connecting a first multi-termination connector to a second multi-termination connector. Example multi-termination ferrules generally have a rectangular configuration, and example multi-termination adapters generally include rectangular multi-termination ferrule receptacles for accommodating multi-termination ferrules.

In the present disclosure, the term generally parallel includes items and variations that are approximately parallel and actually parallel. Likewise, the term generally perpendicular includes items and variations that are approximately perpendicular and actually perpendicular. Other uses of the terms generally and general (e.g., generally matches, generally aligns, generally extends, generally continues, generally cylindrical, generally rectangular) also include the actual form, forms with slight variations, and forms substantially including the specified characteristic.

In the present disclosure, fiber optic cables including buffer tubes are discussed and illustrated. Fiber optic cables including one or more optical fiber not within a buffer tube can be substituted for any of the illustrated fiber optic cables. Such optical fibers not within a buffer tube generally follow the same path as a buffered optical fiber.

From the forgoing detailed description, it will be evident that modifications and variations can be made in the devices of the disclosure without departing from the spirit or scope of the invention.

What is claimed is:

1. A ruggedized fiber optic connector that is compatible with a non-ruggedized fiber optic adapter and a ruggedized fiber optic adapter, the non-ruggedized fiber optic adapter including a pair of retention latches, the ruggedized fiber optic connector comprising:
    a ferrule aligned along a central longitudinal axis;
    a connector housing including a plug portion having an interface end sized to fit within the non-ruggedized fiber optic adapter and the ruggedized fiber optic adapter, the ferrule being positioned at the interface end of the plug portion, the plug portion having a first side and an opposite second side and further having a third side and an opposite fourth side, the third and fourth sides extending between the first and second sides, the central longitudinal axis being positioned between the first and second sides and being also positioned between the third and fourth sides, the plug portion including:
        a first catch structure including first and second catches that engage the pair of retention latches of the non-ruggedized fiber optic adapter to retain the plug portion within the non-ruggedized fiber optic adapter, the first catch being provided at the first side of the plug portion, the second catch being provided at the second side of the plug portion; and
        a second catch structure for engaging the ruggedized fiber optic adapter to retain the plug portion within the ruggedized fiber optic adapter, the second catch structure being provided at the third side.

2. The ruggedized fiber optic connector of claim 1, further comprising:
    a ruggedized retention member mounted on the connector housing, the ruggedized retention member rotatable relative to the connector housing about the central longitudinal axis and configured to engage the ruggedized fiber optic adapter to retain the plug portion within the ruggedized fiber optic adapter.

3. The ruggedized fiber optic connector of claim 1, wherein the plug portion has a generally rectangular cross-sectional shape.

4. The ruggedized fiber optic connector of claim 1, wherein the first and second catches of the first catch structure are formed by recesses provided at the first and second side of the plug portion of the connector housing.

5. The ruggedized fiber optic connector of claim 4, wherein the recesses are defined at least in part by recessed latch engagement surfaces that engage the pair of retention latches of the non-ruggedized fiber optic adapter to retain the plug portion within the non-ruggedized fiber optic adapter, the recessed latch engagement surfaces being angled relative to the central longitudinal axis such that the recessed latch engagement surfaces extend radially outwardly relative to the central longitudinal axis as the recessed latch engagement surfaces extend in a direction of insertion of the ruggedized fiber optic connector.

6. The ruggedized fiber optic connector of claim 1, wherein the second catch structure includes a projection provided at the third side of the plug portion of the connector housing.

7. The ruggedized fiber optic connector of claim 6, wherein the projection includes a protruding latch engagement surface that engages a retention latch of the ruggedized fiber optic adapter to retain the plug portion within the ruggedized fiber optic adapter, the protruding latch engagement surface being angled relative to the central longitudinal axis such that the protruding latch engagement surface extends radially outwardly relative to the central longitudinal axis as the protruding latch engagement surface extends in the direction of insertion of the ruggedized fiber optic connector.

8. The ruggedized fiber optic connector of claim 7, wherein the fourth side of the connector housing defines a connector alignment slot for rotationally aligning the plug portion within the ruggedized fiber optic adapter, the connector alignment slot extending in a direction parallel to the central longitudinal axis and including a tapered portion that widens as the connector alignment slot extends in the direction of insertion of the ruggedized fiber optic connector.

9. The ruggedized fiber optic connector of claim 1, wherein the second catch structure is rotationally offset about ninety degrees about the central longitudinal axis relative to the first catch structure.

10. The ruggedized fiber optic connector of claim 1, wherein:

the first catch is formed by a first recess, the first recess defined at the first side and extending between the third side and the fourth side; and the second catch is formed by a second recess, the second recess defined at the second side and extending between the third side and the fourth side, the second recess arranged on the second side oppositely and symmetrically to the first recess arranged on the first side.

11. The ruggedized fiber optic connector of claim 1, wherein the second catch structure includes a third catch formed by a first protrusion and a second protrusion, both of the first protrusion and the second protrusion projecting outwardly from the third side and aligned along the central longitudinal axis.

12. The ruggedized fiber optic connector of claim 11, wherein the first protrusion and the second protrusion are arranged on the third side adjacent the first catch and the second catch.

13. The ruggedized fiber optic connector of claim 11, wherein the third catch includes a third protrusion opposite to the first protrusion with the second protrusion therebetween on the third side along the central longitudinal axis.

14. The ruggedized fiber optic connector of claim 1, wherein the first catch is formed by a first detent provided on the first side, and the second catch is formed by a second detent provided on the second side, each of the first and second detents including a declined surface at an angle relative to the central longitudinal axis such that hooks of a fiber optic adapter are forced into the first and second detents as cantilevered arms of the fiber optic adapter un-flex, the cantilevered arms of the fiber optic adapter configured to flex outwardly when the ruggedized fiber optic connector is inserted into the fiber optic adapter.

15. The ruggedized fiber optic connector of claim 1, wherein the plug portion has a generally square cross-sectional shape.

16. The ruggedized fiber optic connector of claim 1, wherein the ferrule is a single fiber ferrule.

* * * * *